(12) United States Patent
Layton et al.

(10) Patent No.: US 12,493,582 B2
(45) Date of Patent: Dec. 9, 2025

(54) MULTI-SERVICE BUSINESS PLATFORM SYSTEM HAVING CUSTOM OBJECT SYSTEMS AND METHODS

(71) Applicant: HubSpot, Inc., Cambridge, MA (US)

(72) Inventors: Stuart P. Layton, Waltham, MA (US); Bryan Ash, Arlington, MA (US); Jared Williams, Somerville, MA (US); Sophie Higgs, Somerville, MA (US); Robert McEneaney, Concord, MA (US); Dylan Sellberg, Swampscott, MA (US); Anna Perko, Wenham, MA (US)

(73) Assignee: HubSpot, Inc., Cambridge, MA (US)

( * ) Notice: Subject to any disclaimer, the term of this patent is extended or adjusted under 35 U.S.C. 154(b) by 418 days.

(21) Appl. No.: 17/448,228

(22) Filed: Sep. 21, 2021

(65) Prior Publication Data

US 2022/0092028 A1     Mar. 24, 2022

Related U.S. Application Data

(60) Provisional application No. 63/080,900, filed on Sep. 21, 2020.

(51) Int. Cl.
    *G06F 16/245*     (2019.01)
    *G06F 16/11*     (2019.01)
    (Continued)

(52) U.S. Cl.
    CPC .......... *G06F 16/164* (2019.01); *G06F 16/122* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 7,136,941 B2 | 11/2006 | Nguyen et al. | |
| 7,580,982 B2 | 8/2009 | Owen et al. | |

(Continued)

FOREIGN PATENT DOCUMENTS

| | | |
|---|---|---|
| WO | 2016156858 A1 | 10/2016 |
| WO | 2018089619 A1 | 5/2018 |

(Continued)

OTHER PUBLICATIONS

Givens, Brien, "Bounded Knapsack Algorithm", www.codeproject.com, https://www.codeproject.com/Articles/706838/Bounded-Knapsack-Algorithm, Jan. 8, 2014, 5 pages.

(Continued)

*Primary Examiner* — Loan T Nguyen
(74) *Attorney, Agent, or Firm* — Cooper Legal Group, LLC

(57) ABSTRACT

The disclosure is directed to various ways of improving the functioning of computer systems, information networks, data stores, search engine systems and methods, and other advantages. Among other things, provided herein are methods, systems, components, processes, modules, blocks, circuits, sub-systems, articles, and other elements (collectively referred to in some cases as the "platform" or the "system") that collectively enable, in one or more datastores (e.g., where each datastore may include one or more databases) and systems, the creation, development, maintenance, and use of a set of custom objects (and core objects) for use in a wide range of activities, including sales activities, marketing activities, service activities, content development activities, and others, as well as improved methods and systems for sales, marketing and services that make use of such entity resolution systems and methods as well as custom objects.

23 Claims, 64 Drawing Sheets

(51) Int. Cl.
*G06F 16/16* (2019.01)
*G06F 16/28* (2019.01)

(56) References Cited

U.S. PATENT DOCUMENTS

| | | | |
|---|---|---|---|
| 7,584,114 B2 | 9/2009 | Estrada et al. | |
| 7,779,039 B2 * | 8/2010 | Weissman | G06F 16/284 |
| | | | 707/793 |
| 7,792,835 B2 | 9/2010 | Bohannon et al. | |
| 7,831,676 B1 | 11/2010 | Nagar | |
| 7,984,297 B2 | 7/2011 | Bohannon et al. | |
| 7,992,145 B2 | 8/2011 | Emerson et al. | |
| 8,006,261 B1 | 8/2011 | Haberman et al. | |
| 8,224,902 B1 | 7/2012 | Glasser et al. | |
| 8,442,969 B2 | 5/2013 | Gross | |
| 8,594,618 B2 | 11/2013 | Meyer et al. | |
| 8,706,800 B1 | 4/2014 | Ahmed et al. | |
| 8,719,356 B2 | 5/2014 | Dillingham et al. | |
| 9,304,862 B2 | 4/2016 | Simon et al. | |
| 9,305,104 B2 | 4/2016 | Wu et al. | |
| 9,317,816 B2 | 4/2016 | Zeng et al. | |
| 9,356,947 B2 | 5/2016 | Shraim et al. | |
| 10,115,060 B2 | 10/2018 | Chestnut et al. | |
| 10,217,058 B2 | 2/2019 | Gamon et al. | |
| 10,387,559 B1 | 8/2019 | Wendt et al. | |
| 10,635,659 B2 * | 4/2020 | Reddy Vennapusa | |
| | | | G06F 16/2379 |
| 10,771,425 B2 | 9/2020 | Kebinger et al. | |
| 10,826,866 B2 | 11/2020 | Kramer et al. | |
| 10,853,082 B1 | 12/2020 | Aleti et al. | |
| 10,867,003 B2 | 12/2020 | O'Donnell et al. | |
| 10,911,394 B2 | 2/2021 | Kramer et al. | |
| 10,931,623 B2 | 2/2021 | O'Brien et al. | |
| 10,992,780 B1 | 4/2021 | Rudrappa Goniwada et al. | |
| 11,070,511 B2 | 7/2021 | O'Brien et al. | |
| 2002/0099697 A1 | 7/2002 | Jensen-Grey | |
| 2002/0152254 A1 | 10/2002 | Teng | |
| 2002/0199194 A1 | 12/2002 | Ali | |
| 2003/0097617 A1 | 5/2003 | Goeller et al. | |
| 2003/0208472 A1 | 11/2003 | Pham | |
| 2004/0034652 A1 | 2/2004 | Hofmann | |
| 2004/0111327 A1 | 6/2004 | Kidd | |
| 2004/0122803 A1 | 6/2004 | Dom et al. | |
| 2004/0260621 A1 | 12/2004 | Foster | |
| 2005/0160166 A1 | 7/2005 | Kraenzel | |
| 2005/0188028 A1 | 8/2005 | Brown et al. | |
| 2005/0210111 A1 | 9/2005 | Fukudome | |
| 2005/0265319 A1 | 12/2005 | Clegg et al. | |
| 2006/0095556 A1 | 5/2006 | Arnold et al. | |
| 2006/0212931 A1 | 9/2006 | Shull et al. | |
| 2006/0224673 A1 | 10/2006 | Stern et al. | |
| 2006/0242140 A1 | 10/2006 | Wnek | |
| 2007/0011073 A1 | 1/2007 | Gardner et al. | |
| 2007/0136430 A1 | 6/2007 | Qureshi et al. | |
| 2007/0203996 A1 | 8/2007 | Davitz et al. | |
| 2007/0299777 A1 | 12/2007 | Shraim et al. | |
| 2008/0027951 A1 | 1/2008 | Bohannon et al. | |
| 2008/0034432 A1 | 2/2008 | Bohannon et al. | |
| 2008/0168269 A1 | 7/2008 | Wilson | |
| 2008/0172606 A1 | 7/2008 | White | |
| 2009/0013041 A1 | 1/2009 | Farmer et al. | |
| 2009/0019003 A1 | 1/2009 | Bohannon et al. | |
| 2009/0119268 A1 | 5/2009 | Bandaru et al. | |
| 2009/0138711 A1 | 5/2009 | Heimbigner | |
| 2009/0248813 A1 | 10/2009 | Sawhney | |
| 2010/0161506 A1 | 6/2010 | Bosenick et al. | |
| 2010/0161735 A1 | 6/2010 | Sharma | |
| 2010/0186088 A1 | 7/2010 | Banerjee et al. | |
| 2010/0228777 A1 | 9/2010 | Imig et al. | |
| 2010/0235915 A1 | 9/2010 | Memon et al. | |
| 2010/0312837 A1 | 12/2010 | Bodapati et al. | |
| 2011/0029504 A1 | 2/2011 | King et al. | |
| 2011/0149725 A1 | 6/2011 | Zhao et al. | |
| 2011/0179067 A1 | 7/2011 | Dalvi et al. | |
| 2011/0258218 A1 | 10/2011 | Hayes et al. | |
| 2012/0053887 A1 | 3/2012 | Nurmi | |
| 2012/0191546 A1 | 7/2012 | Phelan et al. | |
| 2012/0197862 A1 | 8/2012 | Woytowitz et al. | |
| 2012/0198056 A1 | 8/2012 | Shama et al. | |
| 2012/0202449 A1 | 8/2012 | Meyer et al. | |
| 2012/0316904 A1 | 12/2012 | Eder | |
| 2012/0324580 A1 | 12/2012 | Glasser et al. | |
| 2013/0007627 A1 | 1/2013 | Monaco | |
| 2013/0047034 A1 | 2/2013 | Salomon et al. | |
| 2013/0054622 A1 | 2/2013 | Karmarkar et al. | |
| 2013/0073336 A1 | 3/2013 | Heath | |
| 2013/0138555 A1 | 5/2013 | Shishkov | |
| 2013/0238715 A1 | 9/2013 | Sanyal et al. | |
| 2013/0339456 A1 | 12/2013 | Nikolayev et al. | |
| 2014/0006139 A1 | 1/2014 | Aggarwal et al. | |
| 2014/0025683 A1 | 1/2014 | Howland et al. | |
| 2014/0025763 A1 | 1/2014 | Furlong et al. | |
| 2014/0105508 A1 | 4/2014 | Arora | |
| 2014/0108309 A1 | 4/2014 | Frank et al. | |
| 2014/0156681 A1 | 6/2014 | Lee et al. | |
| 2014/0214974 A1 | 7/2014 | Kurzanski | |
| 2014/0236663 A1 | 8/2014 | Smith | |
| 2014/0258169 A1 | 9/2014 | Wong et al. | |
| 2014/0279622 A1 | 9/2014 | Bharadwaj et al. | |
| 2014/0280453 A1 | 9/2014 | Mattison et al. | |
| 2014/0328172 A1 | 11/2014 | Kumar et al. | |
| 2014/0372363 A1 | 12/2014 | Chestnut et al. | |
| 2014/0372566 A1 | 12/2014 | Milne et al. | |
| 2015/0006647 A1 | 1/2015 | Steinberg et al. | |
| 2015/0019910 A1 | 1/2015 | Simon et al. | |
| 2015/0032826 A1 | 1/2015 | Gunaratnam | |
| 2015/0032827 A1 | 1/2015 | Tyler et al. | |
| 2015/0081611 A1 | 3/2015 | Shivakumar | |
| 2015/0100896 A1 | 4/2015 | Shmarovoz et al. | |
| 2015/0154664 A1 | 6/2015 | Mae | |
| 2015/0188874 A1 | 7/2015 | Feinstein | |
| 2015/0237061 A1 | 8/2015 | Shraim et al. | |
| 2015/0248490 A1 | 9/2015 | Myslinski | |
| 2015/0286357 A1 | 10/2015 | Penha et al. | |
| 2015/0312187 A1 | 10/2015 | Menna et al. | |
| 2015/0324469 A1 | 11/2015 | Keyngnaert et al. | |
| 2015/0347924 A1 | 12/2015 | Zeng et al. | |
| 2015/0379018 A1 | 12/2015 | Gur et al. | |
| 2015/0381552 A1 | 12/2015 | Vijay et al. | |
| 2016/0012364 A1 | 1/2016 | Filgueiras | |
| 2016/0020917 A1 | 1/2016 | Tuatini et al. | |
| 2016/0026720 A1 | 1/2016 | Lehrer et al. | |
| 2016/0036750 A1 | 2/2016 | Yuan | |
| 2016/0063560 A1 | 3/2016 | Hameed et al. | |
| 2016/0078455 A1 | 3/2016 | O'Donnell et al. | |
| 2016/0119260 A1 | 4/2016 | Ghafourifar et al. | |
| 2016/0156858 A1 | 6/2016 | Tees | |
| 2016/0180248 A1 | 6/2016 | Regan | |
| 2016/0226808 A1 | 8/2016 | Lin | |
| 2016/0232540 A1 | 8/2016 | Gao et al. | |
| 2016/0307191 A1 | 10/2016 | Turgeman et al. | |
| 2016/0315969 A1 | 10/2016 | Goldstein | |
| 2016/0359793 A1 | 12/2016 | Kraios | |
| 2017/0005954 A1 | 1/2017 | Shaltiel et al. | |
| 2017/0031894 A1 | 2/2017 | Bettersworth et al. | |
| 2017/0068982 A1 | 3/2017 | Vangala et al. | |
| 2017/0103439 A1 | 4/2017 | Kolb et al. | |
| 2017/0103441 A1 | 4/2017 | Kolb et al. | |
| 2017/0186042 A1 | 6/2017 | Wong et al. | |
| 2017/0221089 A1 | 8/2017 | Zhu et al. | |
| 2017/0264577 A1 | 9/2017 | Ganin et al. | |
| 2017/0289287 A1 | 10/2017 | Modi et al. | |
| 2017/0317962 A1 | 11/2017 | Chen | |
| 2017/0337569 A1 | 11/2017 | Sasson | |
| 2017/0353410 A1 | 12/2017 | Gonzales | |
| 2018/0039696 A1 | 2/2018 | Zhai et al. | |
| 2018/0097759 A1 | 4/2018 | Brechbuhl et al. | |
| 2018/0097828 A1 | 4/2018 | Coskun | |
| 2018/0121986 A1 | 5/2018 | Akkiraju et al. | |
| 2018/0137203 A1 | 5/2018 | Hennekey et al. | |
| 2018/0219818 A1 | 8/2018 | Kramer et al. | |
| 2018/0219819 A1 | 8/2018 | O'Brien et al. | |
| 2018/0219820 A1 | 8/2018 | Kramer et al. | |
| 2018/0219829 A1 | 8/2018 | Kebinger et al. | |

(56) References Cited

U.S. PATENT DOCUMENTS

| | | |
|---|---|---|
| 2018/0219830 A1 | 8/2018 | O'Brien et al. |
| 2018/0336495 A1 | 11/2018 | Chestnut et al. |
| 2019/0347668 A1 | 11/2019 | Williams et al. |
| 2020/0036673 A1 | 1/2020 | O'Brien et al. |
| 2020/0065857 A1 | 2/2020 | Lagi et al. |
| 2020/0067861 A1 | 2/2020 | Leddy et al. |
| 2020/0210867 A1 | 7/2020 | Banis et al. |
| 2020/0244615 A1 | 7/2020 | O'Brien et al. |
| 2021/0149854 A1* | 5/2021 | Barde .................. H04L 63/126 |

FOREIGN PATENT DOCUMENTS

| | | |
|---|---|---|
| WO | 2018140975 A1 | 8/2018 |
| WO | 2018209254 A1 | 11/2018 |

OTHER PUBLICATIONS

Godiksen, Brian, "Best Practices with Sender Policy Framework (SPF)", www.socketlabs.com,https://www.socketlabs.com/blog/best-practices-sender-policy-framework-spf/, Sep. 14, 2017, 16 pages.

Gorrell, Amy, "How to Build Your SPF Record in 5 Simple Steps", validity.com, https://www.validity.com/blog/how-to-build-your-spf-record-in-5-simple-steps/, Feb. 9, 2019, 3 pages.

PCT/US18/32348, "International Application Serial No. PCT/US18/32348, International Preliminary Report on Patentability mailed Nov. 21, 2019", HubSpot, Inc., 9 pages.

PCT/US18/32348, "International Application Serial No. PCT/US18/32348, International Search Report and Written Opinion mailed Jul. 30, 2018", HubSpot, Inc., 10 Pages.

PCT/US2017/060835, "International Application Serial No. PCT/US2017/060835, International Preliminary Report on Patentability mailed May 23, 2019", HubSpot, Inc., 7 pages.

PCT/US2017/060835, "International Application Serial No. PCT/US2017/060835, International Search Report and Written Opinion mailed Feb. 14, 2018", HubSpot Inc., 12 pages.

PCT/US2018/016038, "International Application Serial No. PCT/US2018/016038, International Preliminary Report on Patentability mailed Aug. 8, 2019", HubSpot, Inc., 8 pages.

PCT/US2018/016038, "International Application Serial No. PCT/US2018/016038, International Search Report and the Written Opinion mailed May 29, 2018.", Hubspot Inc., 12 pages.

PCT/US2018/016038, "International Application Serial No. PCT/US2018/016038, Invitation to Pay Additional Fees and, Where Applicable, Protest Fee mailed on Apr. 2, 2018", Hubspot Inc., 3 pages.

Qureshi, et al., "Improving the Performance of Crawler Using Body Text Normalization", 2 Compusoft 7, 2013, pp. 215, 216.

U.S. Appl. No. 17/121,300, filed Dec. 14, 2020, Pending, O'Donnell, Christopher, et al.

U.S. Appl. No. 17/318,731, filed May 12, 2021, Pending, Urdiales, Hector, et al.

U.S. Appl. No. 17/318,737, filed May 12, 2021, Pending, Urdiales, Hector, et al.

U.S. Appl. No. 17/443,211, filed Jul. 22, 2021, Pending, Hennekey, Tim, et al.

U.S. Appl. No. 17/443,213, filed Jul. 22, 2021, Pending, O'Brien, Michael, et al.

* cited by examiner

| Delivery | Customize | Follow-up | Thank you | Recipients | Options | Preview | Summary |

Customize your follow-up question

A good follow-up NPS question aims to discover why customers gave you the score they did.

Play around with the words to inject your brand's personality, but don't complicate it. A clear, simple question will lead to a higher response rate.

| 0-5 Detractors | 7.5 Passive | 9-10 Promoters |

Follow-up question

Can you tell us more about your experience, so we can get it right the next time?

69

---

○○○

How likely are you to recommend to a friend or colleague?

0 1 2 3 4 5 6 7 8 9 10
○ ○ ○ ○ ● ○ ○ ○ ○ ○ ○

Not at all likely        Extremely likely

Can you tell us more about your experience, so we can get it right the next time?

150

[ Submit ]

This survey is a service from    Delivered by    Customer Hub

Choose recipients ⊙

Decide who gets the survey, based on where they are in the customer lifecycle.

CloneDelete

The contact property Lifecycle stage is equal to Customer.

and

The contact property Close date is known.

AND

OR

---- OR ----

Enroll existing contacts:

EXISTING CONTACTS

0

☐ Enroll contacts who already meet these criteria.

Send the first survey: ⊙

[30] days after meeting the required criteria

Send recurring surveys: ⊙

Every 3 months (recommended) ▽

Delivery  Customize  Follow-up  Thank you  Recipients  Options  Preview  Summary

Delivery  Customize  Follow-up  Thank you  Recipients  Options  Preview  Summary

2300

Choose recipients ⊙

Decide who gets the survey, based on where they are in the customer lifecycle.

< Back
Contact properties

Please select a property ▽

Search properties  🔍

Broadcast Clicks
Last email name
Emails opened
Lead status
Total revenue
Last name
Postal code
Close date
IP City

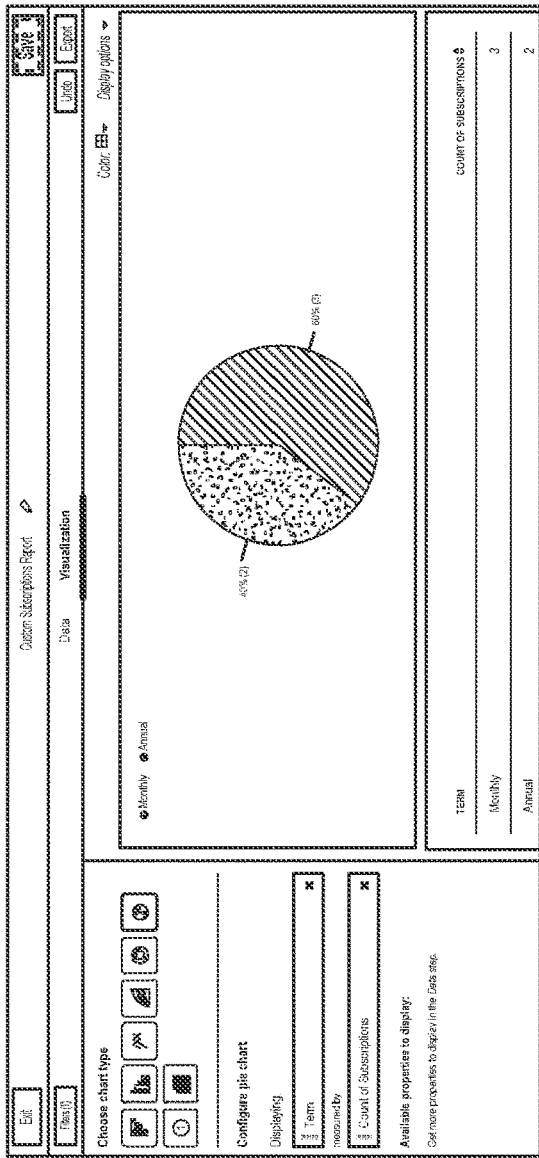

| ENTITY/VECTOR | V1 | V2 | V3 | V4 | V5 |
|---|---|---|---|---|---|
| A | 0.2 | 0.4 | 0.7 | 0.1 | 0.3 |
| B | 0.1 | 0.2 | 0.4 | 0.1 | 0.3 |
| C | 0.6 | 0.2 | 0.4 | 0.2 | 0.1 |
| D | 0.5 | 0.3 | 0.1 | 0.7 | 0.2 |

5702 / 5704 / 5706

| VECTOR/ENTITY | A | B | C | D |
|---|---|---|---|---|
| V1 | 0.2 | 0.1 | 0.6 | 0.5 |
| V2 | 0.4 | 0.2 | 0.2 | 0.3 |
| V3 | 0.7 | 0.4 | 0.4 | 0.1 |
| V4 | 0.1 | 0.1 | 0.2 | 0.7 |
| V5 | 0.3 | 0.3 | 0.1 | 0.2 |

5708

COMPANION MATRIX

| ENTITY/ENTITY | A | B | C | D |
|---|---|---|---|---|
| A | 1 | 0.3 | 0.6 | 0.4 |
| B | 0.3 | 1 | 0.1 | 0.2 |
| C | 0.6 | 0.1 | 1 | 0.8 |
| D | 0.4 | 0.2 | 0.8 | 1 |

MULTI-SERVICE BUSINESS PLATFORM SYSTEM HAVING CUSTOM OBJECT SYSTEMS AND METHODS

CROSS-REFERENCE TO RELATED APPLICATIONS

The present application claims priority to U.S. Provisional Application Ser. No. 63/080,900, filed Sep. 21, 2020, entitled MULTI-SERVICE BUSINESS PLATFORM SYSTEM HAVING CUSTOM OBJECTS. The above application is hereby incorporated by reference in its entirety as if fully set forth herein.

TECHNICAL FIELD

The present application relates to a multi-client service system platform that may be part of a multi-service business platform.

BACKGROUND

Conventional systems for enabling marketing and sales activities for a business user do not also respectively enable support and service interactions with customers, notwithstanding that the same individuals are typically involved in all of those activities for a business, transitioning in status from prospect, to customer, to user. While marketing activities, sales activities, and service activities strongly influence the success of each other, businesses are required to undertake complex and time-consuming tasks to obtain relevant information for one activity from the others, such as forming queries, using complicated APIs, or otherwise extracting data from separate databases, networks, or other information technology systems (some on premises and others in the cloud), transforming data from one native format to another suitable form for use in a different environment, synchronizing different data sources when changes are made in different databases, normalizing data, cleansing data, and configuring it for use.

Some systems are customer relationship management (CRM) systems that may generally provide ability to manage and analyze interactions with customers for businesses. For example, these CRM systems may compile data from various communication channels (e.g., email, phone, chat, content materials, social media, etc.). For example, some CRM systems can be used to monitor and track CRM standard objects. These CRM standard objects can include typical business objects such as accounts (e.g., accounts of customers), contacts (e.g., persons associated with accounts), leads (e.g., prospective customers), and opportunities (e.g., sales or pending deals).

SUMMARY

According to some example embodiments of the disclosure, a method is disclosed. The method may be a computer-implemented method for creating a custom object. The method may include receiving a user request for a custom object creation that may include custom object information. The custom object information may be interpreted and converted into custom object metadata. The custom object metadata may be converted into language-independent data creating the custom object. The custom object, in language-independent data form, may be sent to at least one of a user device or one or more services of a multi-service business platform, for use with at least one of a marketing process, a sales process, or a customer service process. According to some example embodiments, the custom object information may include at least one of a custom object name, an object type, a property of the custom object, or an association of the custom object with another object. In some example embodiments, the custom object information may include an association of the custom object with another second object and the other second object may be another custom object or a core object. In some example embodiments, the interpreting of the custom object information may include executing at least one of business logic or sensible default to interpret the custom object information. In example embodiments, the custom object metadata may be inserted and stored into a relational-type database. The relational-type database may be a relational database management system. In some example embodiments, the one or more services of the multi-service business platform may be applied and used with the language-independent data of the custom object. The one or more services may include at least one of workflow automation, reporting, customer relationship management (CRM)-related actions, analytics, or import/export actions. In some example embodiments, at least one of the marketing process, the sales process, or the customer service process may include services providing at least one of customer relationship management, social media marketing, content management, lead generation, web analytics, search engine optimization, chat, or customer support. In some example embodiments, the creation of the custom object may include updating of one or more multi-tenant data stores that may include at least one of definitions, properties, values, instances, or associations for objects. In some example embodiments, the created custom object may include at least one of a custom identification label, a custom object name, an object type, or a property of the custom object. In some example embodiments, at least one association may be created for the custom object with another second object based on the custom object information. In some example embodiments, the at least one association may include at least one of an association identification, an association type, a first object identification, a second object identification, or a timestamp. The custom object may be directed to the first object identification or the second object identification based on a defined relationship between the custom object and the other second object.

According to some example embodiments of the disclosure, a system is disclosed. The system may be a computing system for creating a custom object. The computing system may include a user device for sending a user request for a custom object creation that may include custom object information. The computing system may include a customization system for receiving the user request. The customization system may be configured to interpret and convert the custom object information into custom object metadata. The customization system may be configured to convert the custom object metadata into language-independent data creating the custom object. The customization system may be configured to send the custom object in language-independent data form to, at least one of the user device or one or more services of a multi-service business platform, for use with at least one of a marketing process, a sales process, or a customer service process.

According to some example embodiments, the system may include multi-tenant data stores that may include at least one of definitions, properties, values, instances, or associations that may be configured to be changed by the customization system when the customization system creates the custom object. In some example embodiments, the system may include an ontology. The ontology may include the custom object with at least of one or more other custom objects or one or more core objects. The ontology may also include one or more associations between the custom object and the at least one of the one or more other custom objects or the one or more core objects. In some example embodiments, the system may include an instance knowledge graph. The instance knowledge graph may include an instance of the custom object with at least one of one or more other custom object instances or one or more core object instances. The instance knowledge graph may also include one or more association instances between the custom object instance and the at least one of the one or more other custom object instances or the one or more core object instances. In some example embodiments, the customization system may include a form filling service for receiving the custom object information from the user device. In some example embodiments, the customization system may include an object schema service for providing an object definition application programming interface (API) for receiving the custom object information from the user device. In some example embodiments, the customization system may include at least one of business logic or sensible default to interpret the custom object information. In some example embodiments, the customization system may include a common data format conversion service to assist with synchronization and integration of the custom object within the multi-service business platform for use with the at least one of the marketing process, the sales process, or the customer service process.

According to some example embodiments of the disclosure, a non-transitory computer readable storage medium is disclosed. The computer readable storage medium may have instructions stored thereon which, when executed across one or more processors, may cause at least a portion of the one or more processors to perform operations. The operations may include receiving a user request for a custom object creation that may include custom object information. The custom object information may be interpreted and converted into custom object metadata. The custom object metadata may be converted into language-independent data creating the custom object. The custom object in language-independent data form may be sent to, a user device or one or more services of a multi-service business platform, for use with at least one of a marketing process, a sales process, or a customer service process.

According to some example embodiments of the disclosure, the creation of the custom object may include updating of one or more multi-tenant data stores including at least one of definitions, properties, values, instances, or associations for objects.

A more complete understanding of the disclosure will be appreciated from the description and accompanying drawings and the claims, which follow.

These and other systems, methods, objects, features, and advantages of the disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIGS. 3, 4, and 5 show examples of user interface elements for presenting suggested topics and related information according to one or more embodiments of the disclosure.

FIG. 21 is a screenshot showing an example GUI of a service system for showing a user a status of a ticket according to one or more embodiments of the disclosure.

FIG. 22 is a screenshot showing an example GUI of a service system for showing a user data surrounding an issued ticket, including a conversation with a contact, according to one or more embodiments of the disclosure.

FIG. 23 is a screenshot showing an example GUI of a service system for showing a user a ticket overview of multiple tickets of various contacts according to one or more embodiments of the disclosure.

FIG. 24 is a screenshot showing an example GUI of a service system for showing a user a feedback overview of multiple contacts of a client according to one or more embodiments of the disclosure.

FIG. 25 is a screenshot showing an example GUI of a service system for showing a user feedback received from a user, including a feedback timeline, according to one or more embodiments of the disclosure.

FIG. 26 is a screenshot showing an example GUI of a service system for showing a user feedback received from a user, including a feedback timeline, according to one or more embodiments of the disclosure.

Figure 28:
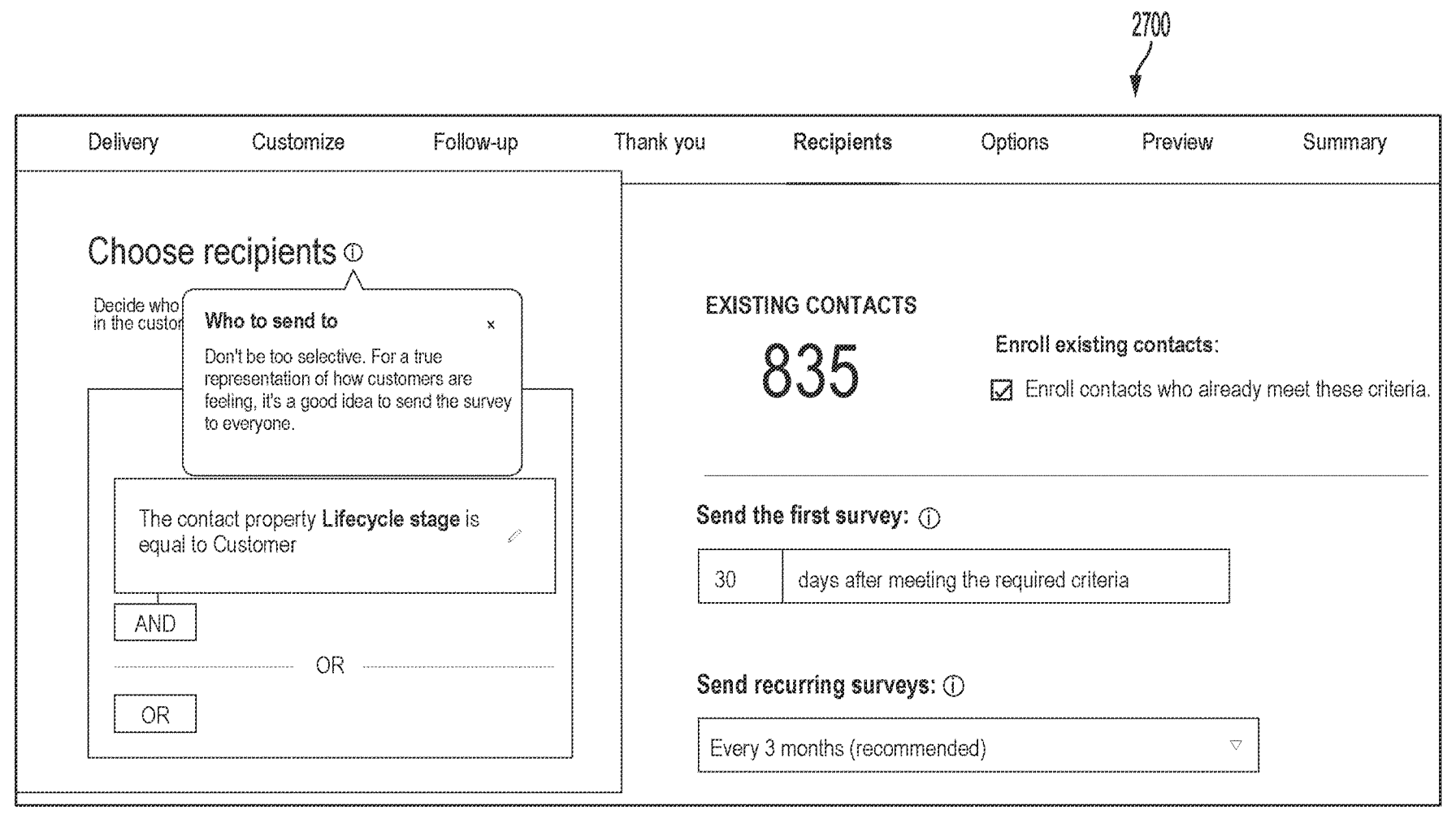
Figure 29:
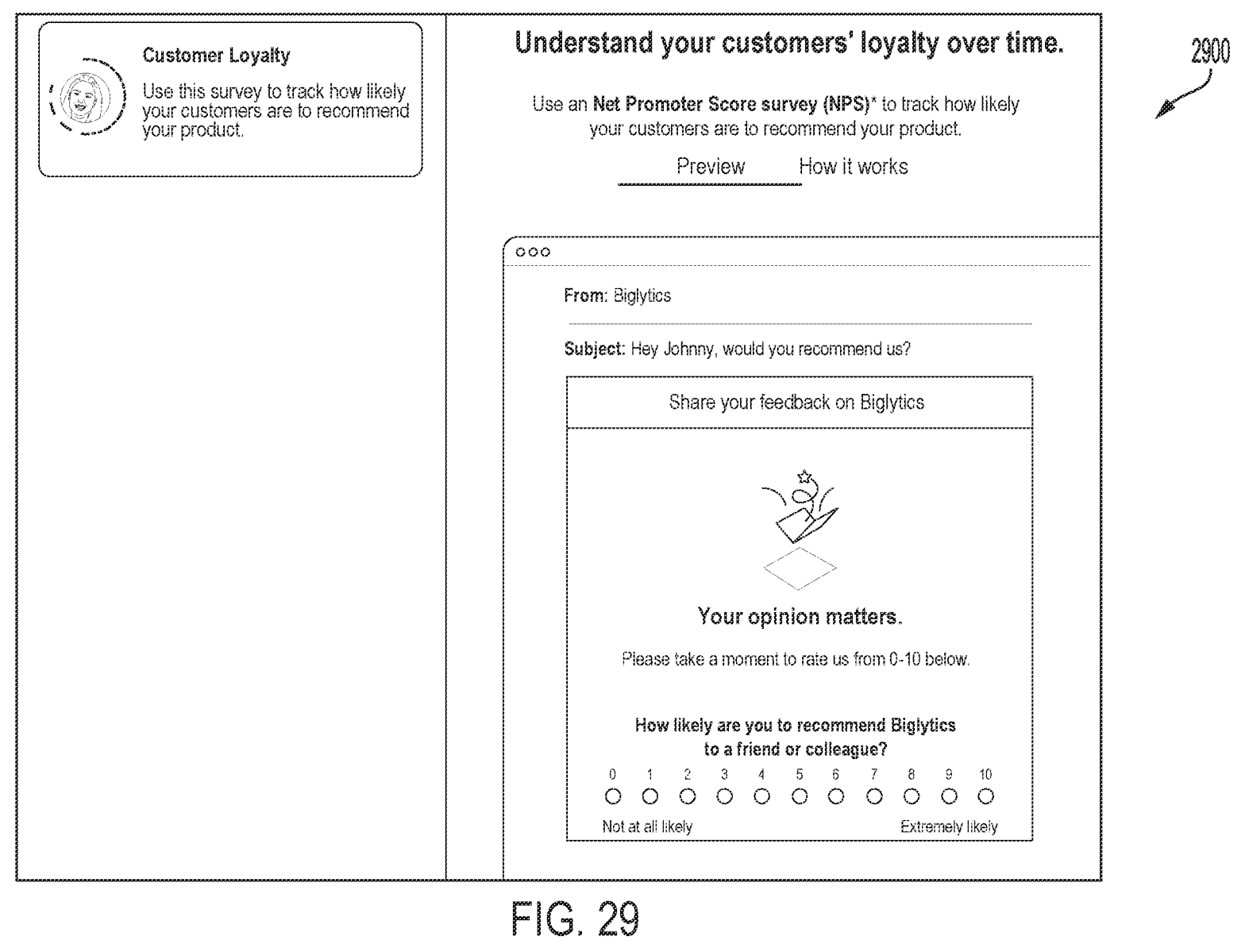
Figure 31:
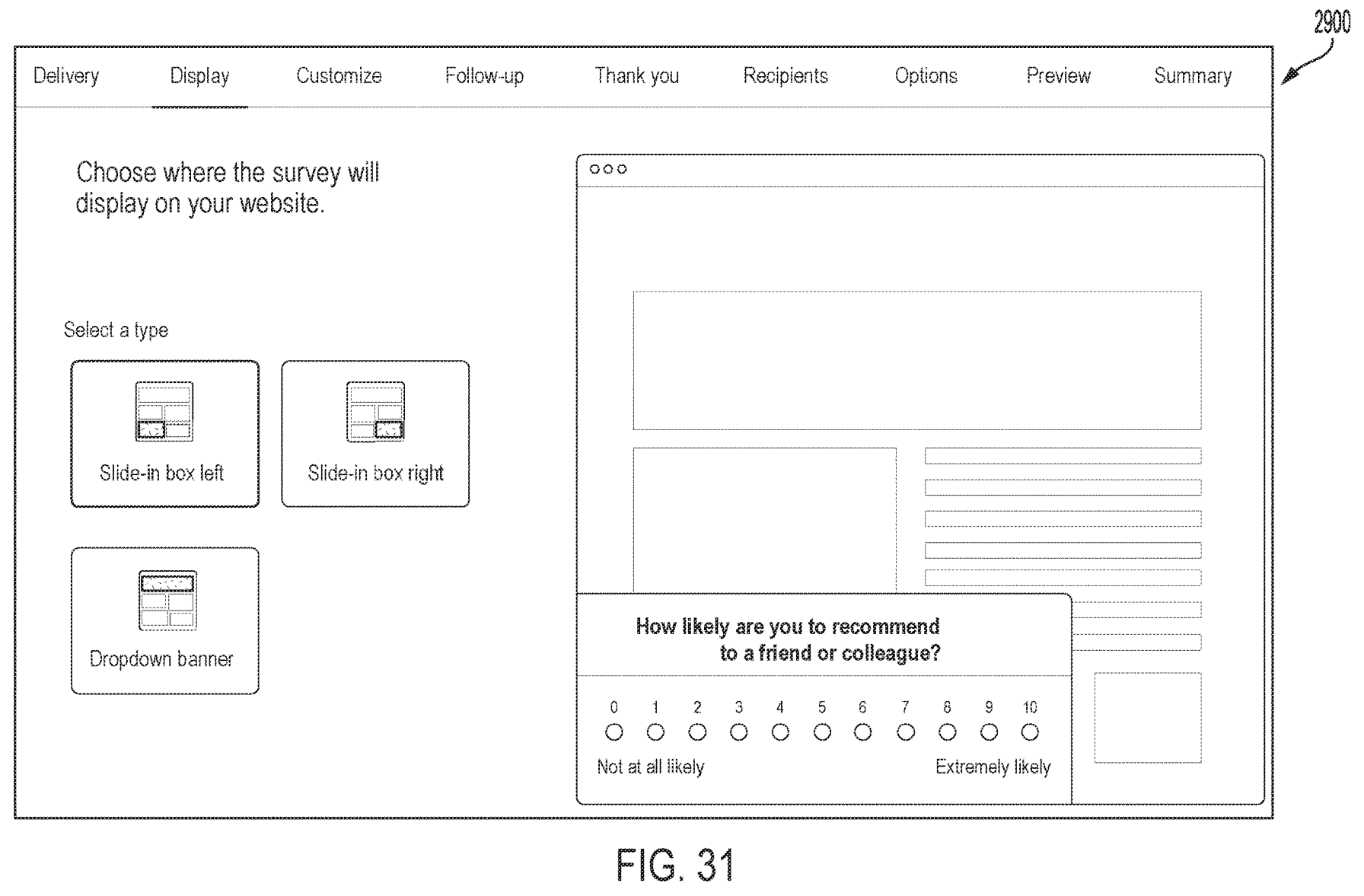

FIGS. 27-35 are screenshots of example GUIs that allow a user corresponding to a client to customize different aspects of the client's respective feedback system, according to one or more embodiments of the disclosure.

FIGS. 37 and 38 are screenshots of an example GUI for uploading content to a service platform for inclusion in a knowledge graph according to one or more embodiments of the disclosure.

FIG. 39 is a screenshot of an example GUI for viewing analytics data related to the uploaded content according to one or more embodiments of the disclosure.

FIGS. 40-44 are screenshots of an example GUI that allows a user to customize the service workflow of a client according to one or more embodiments of the disclosure.

FIGS. 49A-49G are screenshots of an example graphical user interface (GUI) that allows a user to create and use custom objects with the multi-service business platform according to one or more embodiments of the disclosure.

FIG. 57 is a diagram of entity feature-vector and companion matrices according to one or more embodiments of the disclosure.

DETAILED DESCRIPTION

Multi-Service Business Platform

Figure 1:
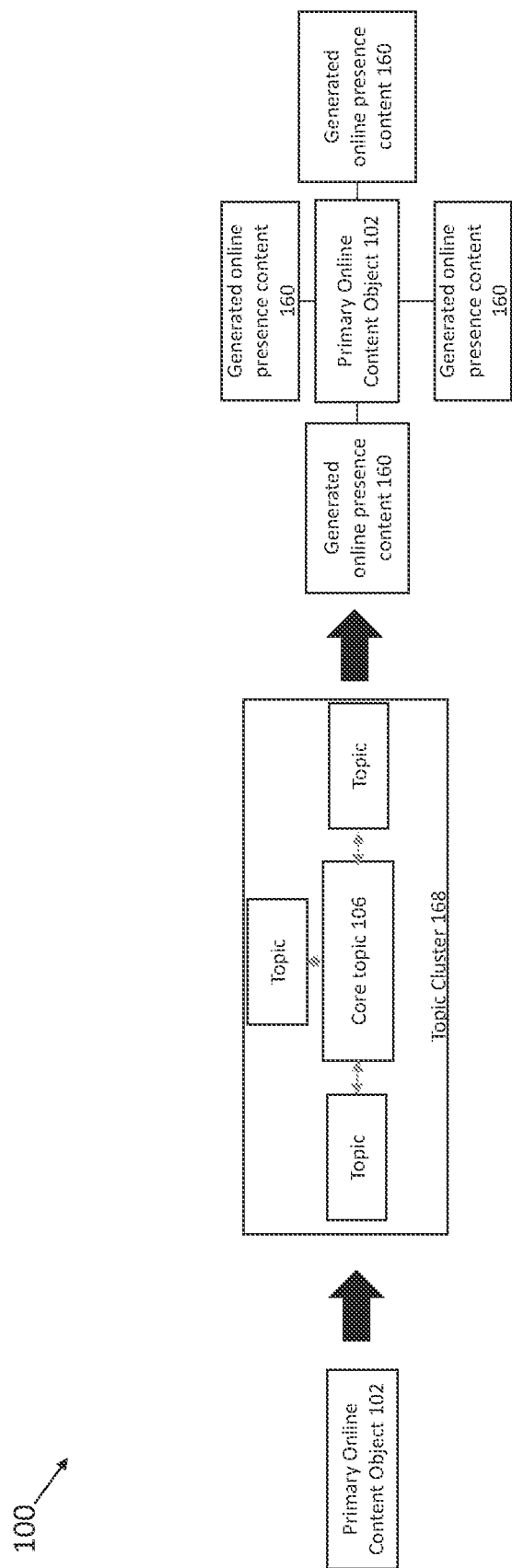
FIG. 1 depicts a high-level flow in which a content platform is used to process online content, identify a cluster of semantically relevant topics and produce generated online presence content involving the semantically relevant topics according to one or more embodiments of the disclosure.

The complex, difficult, and time-consuming tasks described in the disclosure may tend to deter use of information from one activity when conducting the other, except in a somewhat ad hoc fashion. For example, a person providing service to a customer may not know what product the customer has purchased, leading to delay, confusion, and frustration for the service person and the customer. A need exists for the improved methods and systems provided herein that enable, in a single database and system, the development and maintenance of a set of universal contact objects that relate to the contacts of a business and that have attributes that enable use for a wide range of activities, including sales activities, marketing activities, service activities, content development activities, and others, as well as for improved methods and systems for sales, marketing, and services that make use of such universal contact objects.

Further, a need exists for added and improved customizability with CRM systems and other-related systems for marketing and sales activities. While the CRM systems may use standard objects (e.g., accounts, contacts, leads, and opportunities), there is a need for the creation and use of custom objects. Specifically, there is a need for these systems to provide an ability for users to create custom objects relevant to the users' businesses. Also, there is a need for these systems to apply various types of features (e.g., apply processes such as analysis, reporting, workflows) to these custom objects.

In example embodiments, a method and system for creating custom objects may be offered for addressing need for customizability with CRM systems and other-related systems for marketing and sales activities. For example, a multi-service business platform (e.g., framework) may include a customization system that may be used to create custom objects. The multi-service business platform may be configured to provide processes related to marketing, sales, and/or customer service. The multi-service business platform may include a database structure that already has preset or fixed core objects (e.g., contact objects, company objects, deals objects, ticket objects as described in more detail below). However, the ability to create custom objects (e.g., using the customization system) allows for users to have the flexibility of creating any type of custom object (e.g., arbitrary objects) relevant to their business without being restricted to the fixed core objects. This allows for users to customize usage of the multi-service business platform more closely to their business with regard to marketing, sales, and/or customer service. This also may allow for improved and faster development of new custom object types by users and/or developers of the multi-service business platform. Various services of the multi-service business platform may then be applied and/or used with the custom objects. For example, some services that may be applied include workflow automation (e.g., automate based on changes to core objects and based on added custom objects or changes to custom objects and/or core objects), reporting (e.g., report on any custom objects along with core objects), CRM-related actions, analytics (e.g., get analytics for custom objects), import/export, and/or other actions. For example, other actions may include filtering used to search, filter, and list contact objects that may be used with custom objects and/or create lists for custom objects. In example embodiments, other actions may include, but are not limited to, reporting, permissioning, auditing, user-defined calculations, and/or aggregations. Machine learning that may have been used with core objects may also be applied to the custom objects. The multi-service business platform may include a synchronization system that may synchronize some arbitrary custom objects outside the platform to objects in the platform. In summary, in example embodiments, the multi-service business platform may act as an arbitrary platform that may act on arbitrary custom objects that may be used with various services (e.g., used with arbitrary actions and synced to arbitrary systems of the platform) thereby benefiting from these various capabilities.

In general, users may identify specific object types or custom object types that may have been created. The multi-service business platform (e.g., particularly services of the platform) may allow for use of created custom objects from users. Users may choose to create any custom object type that they prefer (e.g., a customer may create definition types and values that may be stored with custom objects and/or instances of custom objects). The multi-service business platform may allow users to dynamically add these unique custom object types with minimal development effort needed from users and the platform itself.

Embodiments of the disclosure are directed to computers, computer systems, networks and data storage arrangements comprising digitally encoded information and machine-readable instructions. The systems are configured and arranged so as to accomplish the present methods, including by transforming given inputs according to instructions to yield new and useful outputs determining behaviors and physical outcomes. Users of the present system and method will gain new and commercially significant abilities to convey ideas and to promote, create, sell, and control articles of manufacture, goods, and other products. The machinery in which the present system and method are implemented will therefore comprise novel and useful devices and architectures of computing and processing equipment for achieving the present objectives.

With reference to FIG. 1, in embodiments of the disclosure, a platform is provided having a variety of methods, systems, components, services, interfaces, processes, components, data structures, and other elements (collectively referred to as the "content development platform 100" except where context indicates otherwise), which enable automated development, deployment, and management of content, typically for an enterprise, that is adapted to support a variety of enterprise functions, including marketing strategy and communications, website development, search engine optimization, sales force management, electronic commerce, social networking, and others. Among other benefits, the content development platform 100 uses a range of automated processes to extract and analyze existing online content of an enterprise, parse and analyze the content, and develop a cluster of additional content that is highly relevant to the enterprise, without reliance on conventional keyword-based techniques. Referring to FIG. 1, the content development platform 100 may generally facilitate processing of a primary online content object 102, such as a main web page of an enterprise, to establish a topic cluster 168 of topics that are relevant to one or more core topics 106 that are found in or closely related to the content of the primary online content object 102, such as based on semantic similarity of the topics in the topic cluster 168, including core topics 106, to content within the primary online content object 102. The platform 100 may further enable generation of generated online presence content 160, such as reflecting various topics in the topic cluster 168, for use by marketers, salespeople, and other writers, or content creators on behalf of the enterprise.

In embodiments, the content development platform 100 includes methods and systems for generating a cluster of correlated content from the primary online content object 102. In embodiments, the primary online content object 102 is a web page of an enterprise. In embodiments, the primary online content object 102 is a social media page of an enterprise. In the embodiments described throughout this disclosure, the main web page of an enterprise, or of a business unit of an enterprise, is provided as an example of a primary online content object 102 and in some cases herein is described as a "pillar" of content, reflecting that the web page is an important driver of business for the enterprise, such as for delivering marketing messages, managing public relations, attracting talent, and routing or orienting customers to relevant products and other information. References to a web page or the like herein should be understood to apply to other types of primary online content objects 102, except where context indicates otherwise. An objective of the content development platform 100 may be to drive traffic to a targeted web page, in particular by increasing the likelihood that the web page may be found in search engines, or by users following links to the web page that may be contained in other content, such as content developed using the content development platform 100.

In an aspect, the present systems, data configuration architectures and methods allow an improvement over conventional online content generation schemes. As stated before, traditional online promotional content relied on key word placement and on sympathetic authorship of a main subject (e.g., a website) and corresponding secondary publications (e.g., blogs and sub-topical content related to the website), which methods rely on known objective and absolute ranking criteria to successfully promote and rank the website and sub-topical content. In an increasingly subjective, personalized and context-sensitive search environment, the present systems and methods develop canonical value around a primary online content object such as a website. In an aspect, a cluster of supportive and correlated content is intelligently generated or indicated so as to optimize and promote the online work product of a promoter (e.g., in support of an agenda or marketing effort). In an example, large numbers of online pages are taken as inputs to the present system and method (e.g., using a crawling, parallel or sequential page processing machine and software).

As shown in simplified FIG. 1, a "core topic" 106 or main subject for a promotional or marketing effort, related to one or more topics, phrases, or the like extracted based on the methods and systems described herein from a primary online content object 102, may be linked to a plurality of supporting and related other topics, such as sub-topics. The core topic 106 may comprise, for example, a canonical source of information on that general subject matter, and preferably be a subject supporting or justifying links with other information on the general topic of a primary online content object 102. In embodiments, visitors to a site where a generated online content 160 is located can start at a hyperlinked sub-topic of content and be directed to the core topic 106 within a page, such as a page linked to a primary online content object 102 or to the primary online content object 102 itself. In an example, the core topic 106 can be linked to several (e.g., three to eight, or more) sub-topics. A recommendation or suggestion tool, to be described further below, can recommend or suggest sub-topics, or conversely, it can dissuade or suggest avoidance of sub-topics based on automated logic, which can be enabled by a machine learned process. As will be discussed herein, a content strategy may be employed in developing the overall family of linked content, and the content strategy may supersede conventional key word based strategies according to some or all embodiments hereof.

In embodiments, the system and method analyze, store and process information available from a crawling step, including for a given promoter's website (e.g., one having a plurality of online pages), so as to determine a salient subject matter and potential sub-topics related to the subject matter of the site. Associations derived from this processing and analysis are stored and further used in subsequent machine learning based analyses of other sites. Data derived from the analysis and storage of the above pages, content and extracted analytics may be organized in an electronic data store, which is preferably a large aggregated database and which may be organized, for example, using MYSQL™ or a similar format.

Figure 2:
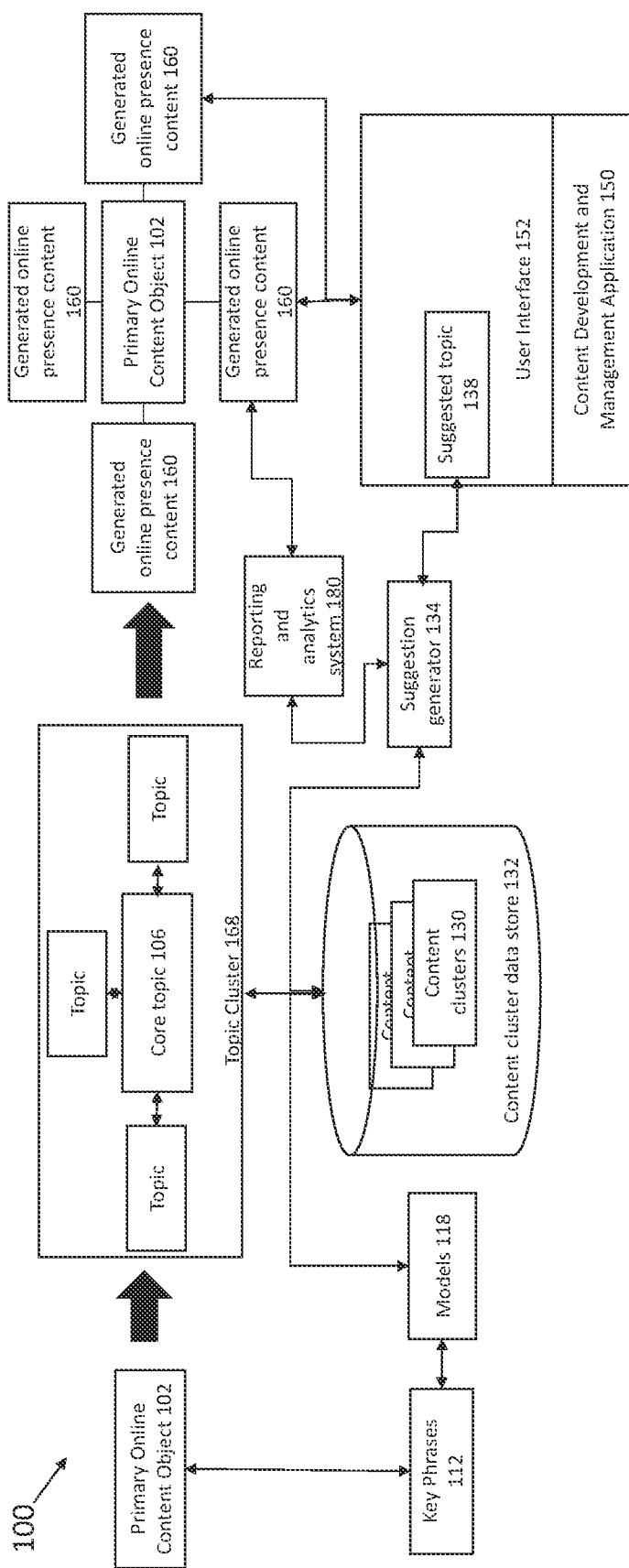
FIG. 2 provides a functional block diagram of certain components and elements of a content development platform, including elements for extracting key phrases from a primary online content object, a content cluster data store for storing clusters of topics and a content development and management application having a user interface for developing content according to one or more embodiments of the disclosure.

FIG. 2 provides a detailed functional block diagram of certain components and elements of a content development platform, including elements for extracting key phrases from a primary online content object, a content cluster data store 132 that stores clusters of topics, and a content development and management application 150 having a user interface that allows users to develop content. Within the platform 100, key phrases 112 are extracted from the primary online content object 102 and are processed, such as using a variety of models 118, resulting in one or more content clusters 130 that are stored in a content cluster data store 132. The clusters may comprise the topic clusters 168 that are semantically relevant to core topics reflected in the primary online content object 102, as indicated by the key phrases. The models 118, which may access a corpus of content extracted by crawling a relevant set of pages on the Internet, are applied to the key phrases 112 to establish the clusters, which arrange topics around a core topic based on semantic similarity. From the content clusters 130 a suggestion generator 134 may generate one or more suggested topics 138, which may be presented in a user interface 152 of a content development management application 150 within which an agent of an enterprise, such as a marketer, a salesperson, or the like may view the suggested topic 138 and relevant information about it (such as indicators of its similarity or relevancy as described elsewhere herein) and create content, such as web pages, emails, customer chats, and other generated online presence content 160 on behalf of the enterprise. Within the interface 152, the resulting generated online presence content 160 may be linked to the primary online content object 102, such that the primary online content object 102 and one or more generated online presence objects 160 form a cluster of semantically related content, such that visitors to any one of the objects 102, 160 may be driven, including by the links, to the other objects 102, 160. In particular, the platform 100 enables the driving of viewers who are interested in the topics that differentiate the enterprise to the online presence content, such as the main web pages, of the enterprise. Performance of the topics may be tracked, such as in a reporting and analytics system 180, such that performance-based suggestions may be provided by the suggestion generator 134, such as by suggesting more suggested topics 138 that are similar to ones that have driven increases in traffic to the primary online content object 102.

The system and method are then capable of projection of the crawled, stored and processed information, using the present processing hardware, networking and computing infrastructure so as to generate specially formatted vectors, e.g., a single vector or multiple vectors. The vector or vectors may be generated according to a Word2vec model used to produce word embeddings in a multi-layer neural network or similar arrangement. Those skilled in the art may appreciate that further reconstruction of linguistic contexts of words are possible by taking a body of content (e.g., language words) to generate such vector(s) in a suitable vector space. Said vectors may further indicate useful associations of words and topical information based on their proximity to one another in said vector space. Vectors based on other content information (e.g., phrases or documents, which can be referred to as Phrase2vec or Document2vec herein) may also be employed in some embodiments. Documents or pages having similar semantic meaning would be conceptually proximal to one another according to the present model. In this way, new terms or phrases or documents may be compared against known data in the data store of the system and generate a similarity, relevance, or nearness quantitative metric. Cosine similarity or other methods can be employed as part of this nearness determination. The similarity may be translated into a corresponding score in some embodiments. In other aspects, said score may be used as an input to another process or another optional part of the present system. In yet other aspects, the output may be presented in a user interface presented to a human or machine. The score can further be presented as a "relevance" metric. Human-readable suggestions may be automatically generated by the system and method and provided as outputs, output data, or output signals in a processor-driven environment such as a modern computing architecture. The suggestions may in some aspects provide a content context model for guiding promoters (e.g., marketers) towards a best choice of topical content to prepare and put up on their websites, including suitable and relevant recommendations for work products such as articles and blog posts and social media materials that would promote the promoters' main topics or subjects of interest or sell the products and services of the marketers using the system and method.

In an aspect, the present system and method allow for effective recommendations to promoters that improve the link structure between existing content materials such as online pages, articles and posts. In another aspect, this allows for better targeting of efforts of a promoter based on the desired audience of the efforts, including large groups, small groups or even individuals.

Implementations of the present system and method can vary as would be appreciated by those skilled in the art. For example, the system and method can be used to create a content strategy tool using processing hardware and special machine-readable instructions executing thereon. Consider as a simple illustrative example that a promoter desires to best market a fitness product, service or informational topic. This can be considered as a primary or "core topic" about which other secondary topics can be generated, which are in turn coupled to or related to the core topic. For example, weightlifting, dieting, exercise or other secondary topics may be determined to have a favorable context-based relevance to the core topic. Specific secondary sub-topics about weightlifting routines, entitled, e.g., 'Best weightlifting routines for men' or 'How to improve your training form' (and so on) may be each turned into a blog post that links back to the core topic web page.

In some embodiments, when a user uses the content strategy tool of the present system and method the user may be prompted to select or enter a core (primary) topic based on the user's own knowledge or the user's field of business. The tool may use this, along with a large amount of crawled online content that was analyzed, or along with extracted information resulting from such crawling of online content and prior stored search criteria and results, which is now context-based, to validate a topic against various criteria.

In an example, topics are suggested (or entered topics are rated) based on the topics' competitiveness, popularity, and/or relevance. Those skilled in the art may appreciate other similar criteria which can be used as metrics in the suggestion or evaluation of a topic.

Competitiveness can comprise a measure of how likely a domain (Web domain) would be ranked on "Page 1" for a particular term or phrase. The lower the percentile ranking, the more difficult it is to rank for that term or phrase (e.g., as determined by a MozRank™ provided by Moz™ indicating a site's authority).

Popularity as a metric is a general measure of a term or phrase's periodic (e.g., monthly) search volume from various major search engines. The greater this percentage, the more popular the term or phrase is.

Relevance as a metric generally indicates how close a term or phrase is to other content put up on the user's site or domain. The lower the relevance, the further away the term or phrase is from what the core topic of the site or domain is. This can be automatically determined by a crawler that crawls the site or domain to determine its main or core topic of interest to consumers. If relevance is offered as a service by embodiments of the present system and method a score can be presented through a user or machine interface indicating how relevant the new input text is to an existing content pool.

Timeliness of the content is another aspect that could be used to drive content suggestions or ratings with respect to a core topic. For example, a recent-ness (recency) metric may be used in addition to those given above for the sake of illustration of embodiments of the system and method.

Therefore, analysis and presentation of information indicating cross relationships between topics becomes effective under the present scheme. In embodiments, these principles may be additionally or alternatively applied to email marketing or promotional campaigns to aid in decision making as to the content of emails sent to respective recipients so as to maximally engage the recipients in the given promotion.

Other possible features include question classification; document retrieval; passage retrieval; answer processing; and factoid question answering.

Note that the present concepts can be carried across languages insofar as an aspect hereof provides for manual or automated translation from a first language to a second language, and that inputs, results and outputs of the system can be processed in one or another language, or in a plurality of languages as desired.

Figure 3:
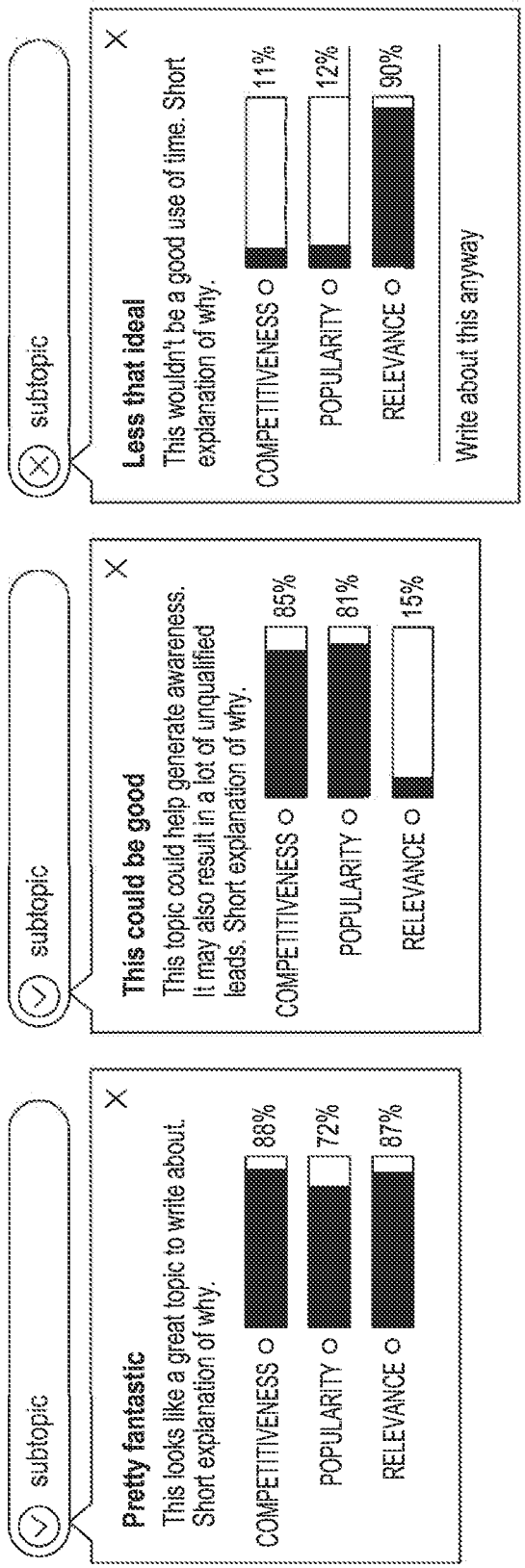
Figure 4:
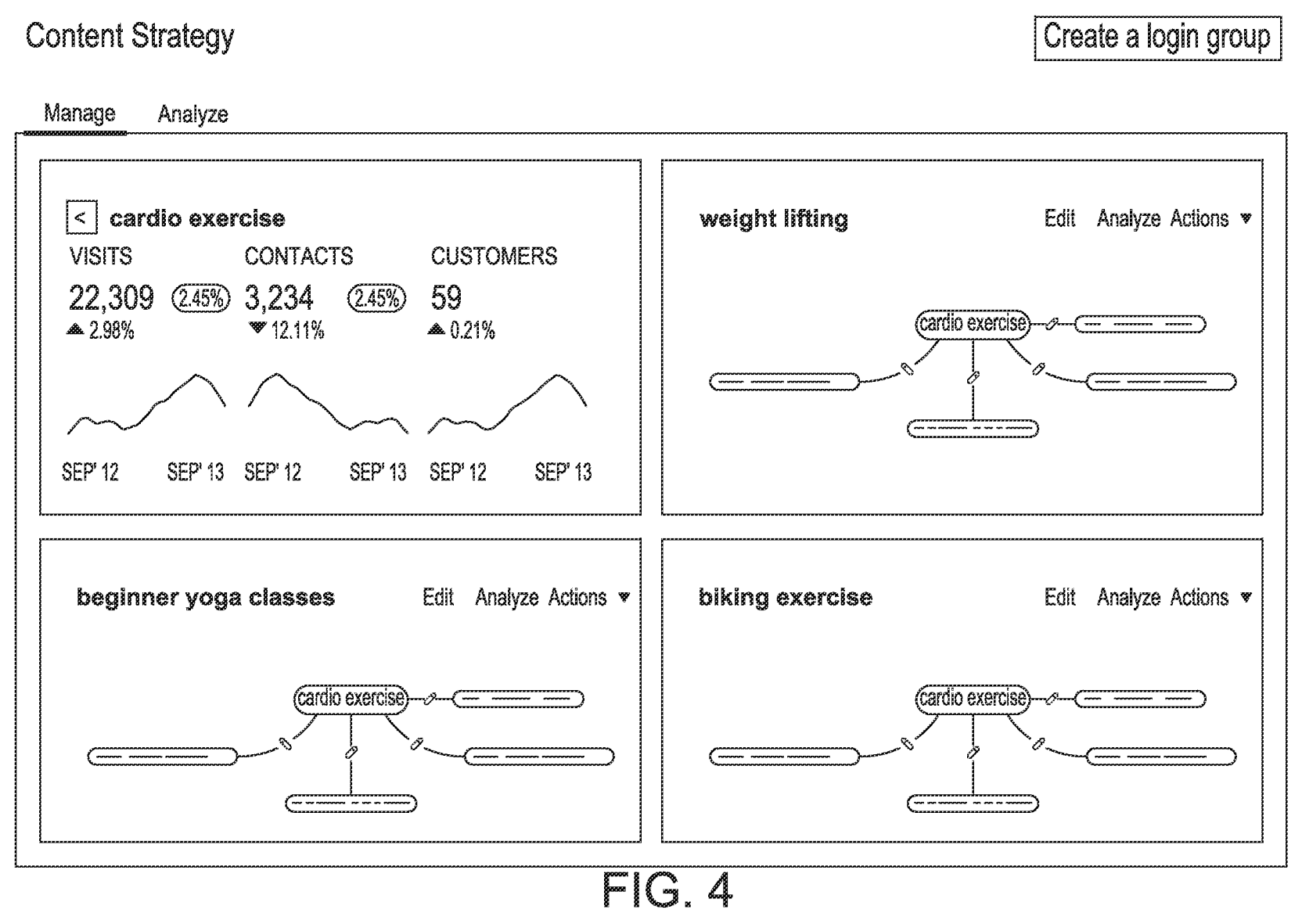
Figure 5:
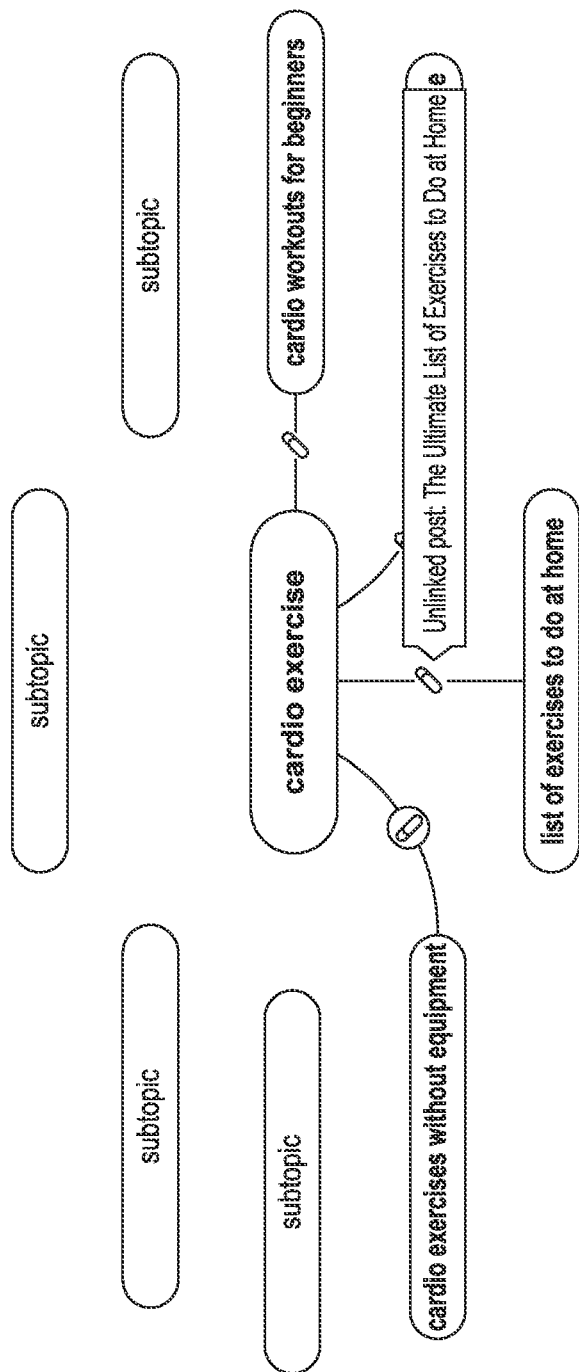

FIG. 3, FIG. 4, and FIG. 5 are illustrative depictions of exemplary simplified aspects of the present system, method and tools. These depictions are not meant to be exhaustive or limiting, but are merely examples of how some features could be provided to a user of the system and method.

Some embodiments hereof employ a latent semantic analysis (LSA) model, encoded using data in a data store and programmed instructions and/or processing circuitry to generate an output comprising an association between various content by the promoter user of the system and method. LSA is being applied here to analyze relationships between a (large) set of documents and the data contained therein. In one embodiment machine learning may be used to develop said association output or outputs.

Figure 6:
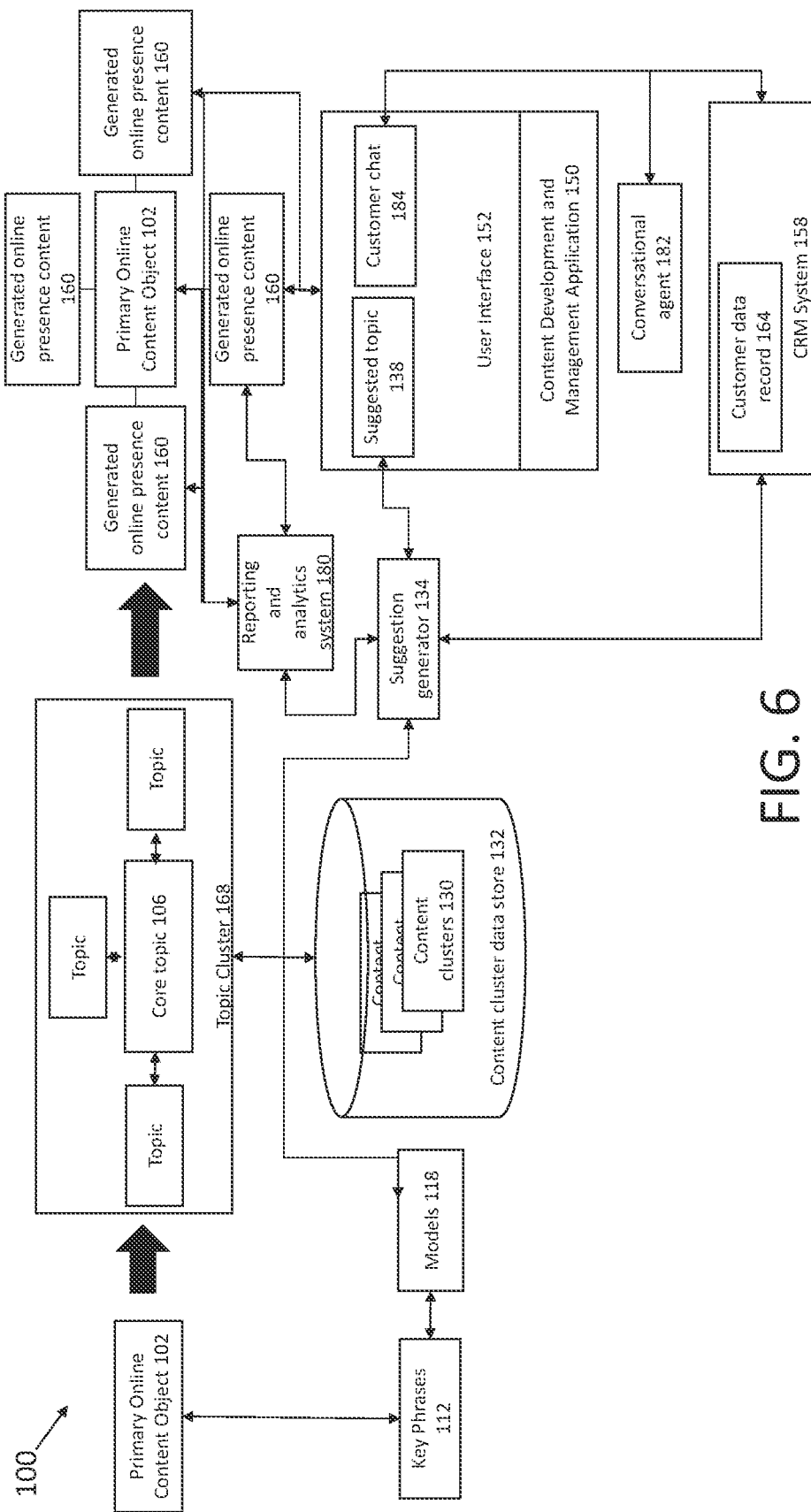
FIG. 6 provides a functional block diagram of certain components and elements of a content development platform, including integration of a customer relationship management system with other elements of the platform according to one or more embodiments of the disclosure.

FIG. 6 provides a functional block diagram of certain additional optional components and elements of the content development platform 100, including integration of a customer relationship management system 158 with other elements of the platform according to one or more embodiments of the disclosure. In embodiments, the generated online content object 160 may comprise messaging content for a customer interaction that is managed via a customer relationship management system 158. In embodiments, the customer relationship management system 158 may include one or more customer data records 164, such as reflecting data on groups of customers or individual customers, including demographic data, geographic data, psychographic data, data relating to one or more transactions, data indicating topics of interest to the customers, data relating to conversations between agents of the enterprise and the customers, data indicating past purchases, interest in particular products, brands, or categories, and other customer relationship data. The customer data records 164 may be used by the platform 100 to provide additional suggested topics 138, to select among suggested topics 138, to modify suggested topics 138, or the like. In embodiments, the CRM system 158 may support interactions with a customer, such as through a customer chat 184, which in embodiments may be edited in the user interface 152 of the content development and management application 150, such as to allow a writer, such as an inside salesperson or marketer who is engaging in a customer chat 184 with the customer to see suggested topics 138 that may be of interest to the customer, such as based on the customer data records 164 and based on relevancy of the topics to the main differentiators of the enterprise. In embodiments, a conversational agent 182 may be provided within or integrated with the platform 100, such as for automating one or more conversations between the enterprise and a customer. The conversational agent 182 may take suggested topics from the suggestion generator 134 to facilitate initiation of conversations with customers around topics that differentiate the enterprise, such as topics that are semantically relevant to key phrases found in the primary online content object 102. In embodiments, the conversational agent 182 may populate the customer chat 184 in the user interface 152, such as providing seed or draft content that a writer for the enterprise can edit.

Figure 7:
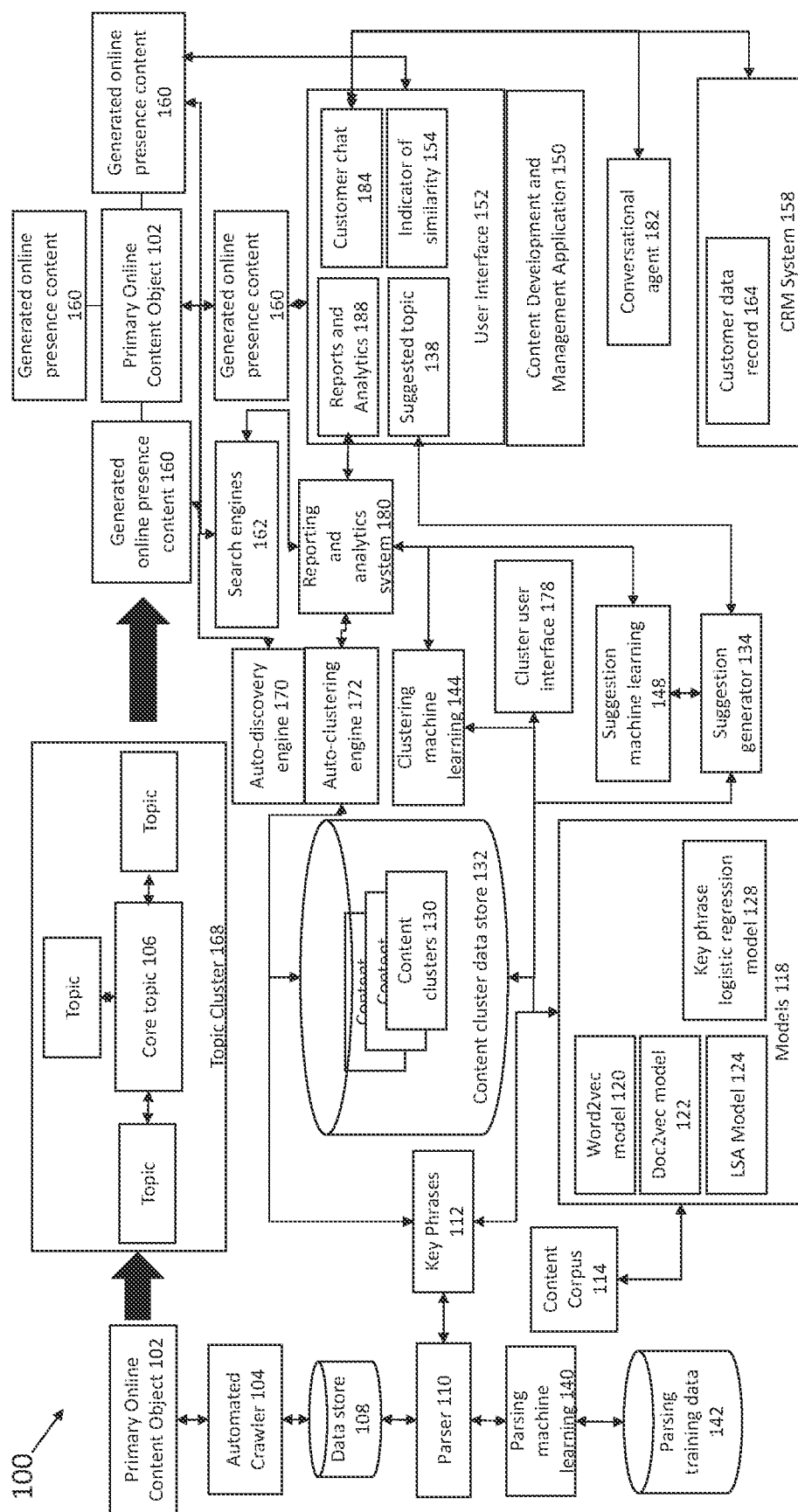
FIG. 7 provides a detailed functional block diagram of components and elements of a content development platform according to one or more embodiments of the disclosure.

FIG. 7 provides a detailed functional block diagram of components and elements of a content development platform according to one or more embodiments of the disclosure. In embodiments, the methods and systems may include an automated crawler 104 that crawls the primary online content object 102 and storing a set of results from the crawling in a data storage facility 108. In embodiments, the data storage facility is a cloud-based storage facility, such as a simple storage facility (e.g., an S3™ bucket provided by Amazon™), and/or on a web service platform (e.g., the Amazon Web Services™ (AWS) platform). In embodiments, the data storage facility is a distributed data storage facility. In embodiments, the automated crawler 104 crawls one or more domains associated with an enterprise customers' content (e.g., the customer's portal, main web page, or the like) as the primary online content object 102 to identify topics already in use on those sites and stores the pages in a data storage facility (e.g., S3™ storage), with metadata in a database (e.g., a MySQL™ database). The content development platform 100 may include a parser 110 that parses the stored content from the crawling activity of the automated crawler 104 and generates a plurality of the key phrases 112 and a content corpus 114 from the primary online content object 102. The content development platform 100 may include, use, or integrate with one or more of a plurality of models 118 for processing at least one of the key phrases 112 and the corpus 114.

In embodiments, the models 118 may include one or more of a word2vec model 120, a doc2vec model 122, a latent semantic analysis (LSA) extraction model, an LSA model 124, and a key phrase logistic regression model 128, wherein the processing results in a plurality of the content clusters 130 representing topics within the primary online content object 102. In embodiments, the platform 100 may take content for the primary online content object 102, such as a website, and extract a number of phrases, such as a number of co-located phrases, based on processing the n-grams present in the content (e.g., unigrams, bi-grams, tri-grams, tetra-grams, and so on), which may in the LSA model 124, be ranked based on the extent of presence in the content and based on a vocabulary that is more broadly used across a more general body of content, such as a broad set of Internet content. This provides a vector representation of a web site within the LSA model 124. Based on crawling with the automatic crawler 104 of over 619 million pages on the public internet (seeking to ignore ignoring those pages that are light on content), an LSA model 124 has been trained using machine learning, using a training set of more than 250 million pages, such that the LSA model 124 is trained to understand associations between elements of content.

In embodiments, the one or more models 118 include the word2vec model 120 or other models (e.g., doc2vec 122 or phrase2vec) that projects crawled-domain primary online object content 102, such as from customers' domains, into a single vector. In embodiments, the vector space is such that documents that contain similar semantic meaning are close together. The application of the word2vec model 120 and the doc2vec model 122 to the vector representation of primary online content object 102 (e.g., website) to draw vectors may result in a content-context model based on co-located phrases. This allows new terms to be compared against that content context database to determine how near it is to the enterprise's existing primary online content objects 102 (e.g., webpages), such as using cosine similarity. That similarity may then be converted into a score and displayed through the UI, such as displaying it as a "Relevancy" score. Ultimately, the content context model may be used to give recommendations and guidance for how individuals can choose good topics to write about, improve the link structure of existing content, and target marketing and other efforts based on their audiences' individual topic groups of interest. In embodiments, the plurality of models 118 used by the platform may comprise other forms of model for clustering documents and other content based on similarity, such as a latent semantic indexing model, a principal component analysis model, or the like. In embodiments, other similar models may be used, such as a phrase2vec model, or the like.

An objective of the various models 118 is to enable clustering of content, or "topic clusters 168" around relevant key phrases, where the topic clusters 168 include semantically similar words and phrases (rather than simply linking content elements that share exactly matching keywords). Semantic similarity can be determined by calculating vector similarity around key phrases appearing in two elements of content. In embodiments, topic clusters may be automatically clustered, such as by an auto-clustering engine 172 that manages a set of software jobs that take web pages from the primary online content object 102, use a model 118, such as the LSA model 124 to turn the primary online content object 102 into a vector representation, project the vector representation on to a space (e.g., a two-dimensional space), perform an affinity propagation that seeks to find natural groupings among the vectors (representing clusters of ideas within the content), and show the groupings as clusters of content. Once groups are created, a reviewer, such as a marketer or other content developer, can select one or more "centers" within the clusters, such as recognizing a core topic within the marketer's "pillar" content (such as a main web page), which may correspond to the primary online content object 102. Nodes in the cluster that are in close proximity to the identified centers may represent good additional topics about which to develop content or to which to establish links; for example, topic clusters can suggest an appropriate link structure among content objects managed by an enterprise and with external content objects, such as third-party objects, where the link structure is based on building an understanding of a semantic organization of a cluster of topics and mirroring the other content and architecture of links surrounding a primary online content object 102 based on the semantic organization.

The content development platform 100 may include a content cluster data store 132 for storing the content clusters 130. The content cluster data store 132 may comprise a MySQL™ database or other type of database. The content cluster data store 132 may store mathematical relationships, based on the various models 118, between content objects, such as the primary online content object 102 and various other content objects or topics, which, among other things, may be used to determine what pages should be in the same cluster of pages (and accordingly should be linked to each other). In embodiments, clusters are based on matching semantics between phrases, not just matching exact phrases. Thus, new topics can be discovered by observing topics or subtopics within semantically similar content objects in a cluster that are not already covered in a primary online content object 102. In embodiments, an auto-discovery engine 170 may process a set of topics in a cluster to automatically discover additional topics that may be of relevance to parties interested in the content of the primary online content object 102.

In embodiments, topics within a cluster in the content cluster data store 132 may be associated with a relevancy score 174 (built from the models 118), which in embodiments may be normalized to a single number that represents the calculated extent of semantic similarity of a different topic to the core topic (e.g., the center of a cluster, such as reflecting the core topic of the primary online content object 102, such as a main web page of an enterprise). The relevancy score 174 may be used to facilitate recommendations or suggestions about additional topics within a cluster that may be relevant for content development.

The content development platform may include a suggestion generator 134 for generating, using output from at least one of the models, a suggested topic 138 that is similar to at least one topic among the content clusters and for storing the suggested topic 138 and information regarding the similarity of the suggested topic 138 to at least one content of the clusters 130 in the content cluster data store 132. Suggested topics 138 may include sub-topic suggestions, suggestions for additional core topics and the like, each based on semantic similarity (such as using a relevancy score 174 or similar calculation) to content in the primary online content object 102, such as content identified as being at the center of a cluster of topics. Suggestions may be generated by using the keyphrase logistic regression model 128 on the primary online content object 102, which, among other things, determines, for a given phrase that is similar to the content in a cluster, how relatively unique the phrase is relative to a wider body of content, such as all of the web sites that have been crawled across the broader Internet. Thus, through a combination of identifying semantically similar topics in a cluster (e.g., using the word2vec model 120, doc2vec model 122, and LSA model 124) and identifying which of those are relatively differentiated (using the keyphrase logistic regression model 128), a set of highly relevant, well differentiated topics may be generated, which the suggestion generator 134 may process for production of one or more suggested topics 138.

In embodiments, the parser 110 uses a parsing machine learning system 140 to parse the crawled content. In embodiments, the parsing machine learning system 140 iteratively applies a set of weights to input data, wherein the weights are adjusted based on a parameter of success, wherein the parameter of success is based on the success of suggested topics 138 in the online presence of an enterprise. In embodiments, the machine learning system is provided with a parser training data set 142 that is created based on human analysis of the crawled content.

In embodiments, the platform 100 uses a clustering machine learning system 144 to cluster content into the content clusters 130. In embodiments, the clustering machine learning system 144 iteratively applies a set of weights to input data, wherein the weights are adjusted based on a parameter of success and the parameter of success is based on the success of suggested topics in the online presence of an enterprise. In embodiments, the clustering machine learning system 144 is provided with a training data set that is created based on human clustering of a set of content topics.

In embodiments, the suggestion generator 134 uses a suggestion machine learning system 148 to suggest topics. In embodiments, the suggestion machine learning system 148 iteratively applies a set of weights to input data, wherein the weights are adjusted based on a parameter of success, and the parameter of success is based on the success of suggested topics in the online presence of an enterprise. In embodiments, the suggestion machine learning system 148 is provided with a training data set that is created based on human creation of a set of suggested topics.

In embodiments, the methods and systems disclosed herein may further include a content development and management application 150 for developing a strategy for development of online presence content, the application 150 accessing the content cluster data store 132 and having a set of tools for exploring and selecting suggested topics 138 for online presence content generation. In embodiments, the application 150 provides a list of suggested topics 138 that are of highest semantic relevance for an enterprise based on the parsing of the primary online content object. In embodiments, the methods and systems may further include a user interface 152 of the application 150 that presents a suggestion, wherein the generated suggestion is presented with an indicator of the similarity 154 of the suggested topic 138 to a topic in the content clusters 130 as calculated by at least one of the models 118.

In embodiments, the content development and management application 150 may include a cluster user interface 178 portion of the user interface 152 in which, after the primary online content object 102 has been brought on board to the content development platform 100, a cluster of linked topics can be observed, including core topics in the primary online content object 102 and various related topics. The cluster user interface 178 may allow a user, such as a sales or marketing professional, to explore a set of topics (e.g., topics that are highly relevant to a brand of the enterprise and related topics) which, in embodiments, may be presented with a relevancy score 174 or other measures of similarity, as well as with other information, such as search volume information and the like. In embodiments, the cluster user interface 178 or other portion of the user interface 152 may allow a user to select and attach one or more topics or content objects, such as indicating which topics should be considered at the core for the enterprise, for a brand, or for a particular project. Thus, the cluster framework embodied in the cluster user interface 178 allows a party to frame the context of what topics the enterprise wishes to be known for online (such as for the enterprise as a whole or for a brand of the enterprise).

The content development and management application 150 may comprise a content strategy tool that encourages users to structure content in clusters based on the notion that topics are increasingly more relevant than keywords, so that enterprises should focus on owning a content topic, rather than going after individual keywords. Each topic cluster 168 may have a "core topic," such as implemented as a web page on that core topic. For example, on a personal trainer's website, the core topic might be "weightlifting." Around those core topics 106 should be subtopics (in this example, this might include things like "best weightlifting routines" or "how to improve your weightlifting form"), each of which should be made into a blog post that links back to the core topic page.

When users use the content development and management application 150, or content strategy tool, the user may be prompted to enter a topic based on the user's own knowledge of the enterprise. The content development and management application 150 or tool may also use information gleaned by crawling domains of the enterprise with the automated crawler 104, such as to identify existing topic clusters on their site (i.e., the primary online content object 102). For each identified core topic, the topic may be validated based on one or more metrics or criteria, (e.g., competitiveness, popularity, relevancy, or the like). In embodiments, a relevancy metric may be determined based on cosine similarity between a topic and the core topic, and/or based on various other sources of website analytics data. Competitiveness may comprise a measure of how likely a domain or the primary online content object 102 is to rank highly, such as on a first page of search engine results, for a particular word, phrase, or term. The lower the percentage on this metric, the harder it will be to achieve a high rank for that term. This may be determined by a source like MozRank™ (provided by Moz™), a PageRank™ (provided by Google™), or other ranking metrics, reflecting the primary online content object's 102 domain authority, absent other factors. Popularity may comprise a general measure of a topic's monthly search volume or similar activity level, such as from various search engines. The higher the percentage, the more popular the term. This may be obtained from a source like SEMRush™, such as with data in broad ranges of 1-1000, 1000-10000, etc. Relevancy may comprise a metric of how close a topic, phrase, term or the like to other content, such as topic already covered in other domains of a user, or the like. The lower the relevancy, the further away a given term is from what an enterprise is known for, such as based on comparison to a crawl by the automated crawler 104 of the enterprise's website and other domains. Relevancy may be provided or supported by the content context models 118 as noted throughout this disclosure.

As the models 118 analyze more topics, the models learn and improve, such that increasingly accurate measures may be provided as relevancy and the like. Once the user has selected a topic, the user may be prompted to identify subtopics related to that topic. Also, the platform 100 may recommend or auto-fill subtopics that have been validated based on their similarity to the core topic and based on other scoring metrics. When the user has filled out a cluster of topics, the platform 100 may alert the user to suggested links connecting each subtopic page to a topic page, including recommending adding links where they are currently absent. The content development and management application 150 may also allow customers to track the performance of each cluster, including reporting on various metrics used by customers to analyze individual page performance. The content development and management application 150 or tool may thus provide several major improvements over our current tools, including a better "information architecture" to understand the relationship between pieces of content, built-in keyword validation, and holistic analysis of how each cluster of topics performs.

In embodiments, the user interface 152 facilitates generation of generated online presence content 160 related to the suggested topic 138. In embodiments, the user interface 152 includes at least one of key words and key phrases that represent the suggested topic 138, which may be used to prompt the user with content for generation of online presence content. In embodiments, the generated online presence content is at least one of website content, mobile application content, a social media post, a customer chat, a frequently asked question item, a product description, a service description and a marketing message. In embodiments, the generated online presence content may be linked to the primary online content object 102, such as to facilitate traffic between the generated online presence content and the primary online content object 102 and to facilitate discovery of the primary online content object 102 and the generated online presence content 160 by search engines 162. The user interface 152 for generating content may include a function for exploring phrases for potential inclusion in the generated online presence content 160; for example, a user may input a phrase, and the platform 100 may use a relevancy score 174 or other calculation to indicate a degree of similarity. For example, if a topic is only 58% similar to a core topic, then a user might wish to find something more similar. User interface elements, such as colors, icons, animated elements and the like may help orient a user to favorable topics and help avoid unfavorable topics.

In embodiments, the application 150 may facilitate creation and editing of content, such as blog posts, chats, conversations, messages, website content, and the like, and the platform may parse the phrases written in the content to provide a relevancy score 174 as the content is written. For example, as a blog is being written, the marketer may see whether phrases that are being written are more or less relevant to a primary online content object 102 that has been selected and attached to an enterprise, a project, or a brand within the platform 100. Thus, the content development and management application 150 may steer the content creator toward more relevant topics, and phrases that represent those topics. This may include prompts and suggestions from the suggestion generator 134. The user interface 152 may include elements for assisting the user to optimize content, such as optimizing for a given reading level and the like. The user interface 152 may provide feedback, such as confirming that the right key phrases are contained in a post, so that it is ready to be posted.

In embodiments, the application 150 for developing a strategy for development of the generated online presence content 160 may access content cluster data store 132 and may include various tools for exploring and selecting suggested topics 138 for generating the generated online presence content 160. In embodiments, the application 150 may further access the content of the customer relationship management (CRM) system 158. In embodiments, the application 150 includes a user interface 152 for developing content regarding a suggested topic 138 for presentation in a communication to a customer, wherein selection of a suggested topic 138 for presentation to a customer is based at least in part on a semantic relationship between the suggested topic as determined by at least one of the models 118 and at least one customer data record 164 relating to the customer stored in the customer relationship management system 158.

The platform 100 may include, be integrated with, or feed the reporting and an analytics system 180 that may provide, such as in a dashboard or other user interface, such as, in a non-limiting example, in the user interface 152 of the content development and management application 150, various reports and analytics 188, such as various measures of performance of the platform 100 and of the generated online content object 160 produced using the platform 100, such as prompted by suggestions of topics. As search engines have increasingly obscured information about how sites and other content objects are ranked (such as by declining to provide keywords), it has become very important to develop alternative measures of engagement. In embodiments, the platform 100 may track interactions across the life cycle of engagement of an enterprise with a customer, such as during an initial phase of attracting interest, such as through marketing or advertising that may lead to a visit to a website or other primary online content objects 102, during a process of lead generation, during conversations or engagement with the customer (such as by chat functions, conversational agents, or the like), during the process of identifying relevant needs and products that may meet those needs, during the delivery or fulfillment of orders and the provision of related services, and during any post-sale follow-up, including to initiate further interactions. By integration with the CRM system 158 of an enterprise, the platform 100 may provide measures that indicate what other activities of or relating to customers, such as generation of leads, visits to web pages, traffic and clickstream data relating to activity on a web page, links to content, e-commerce and other revenue generated from a page, and the like, were related to a topic, such as a topic for which the generated online content object 160 was created based on a suggestion generated in the platform 100. Thus, by integration of a content development and management application 150 and a CRM system 158, revenue can be linked to the generated online presence content 160 and presented in the reporting and analytics system 180.

Figure 8:
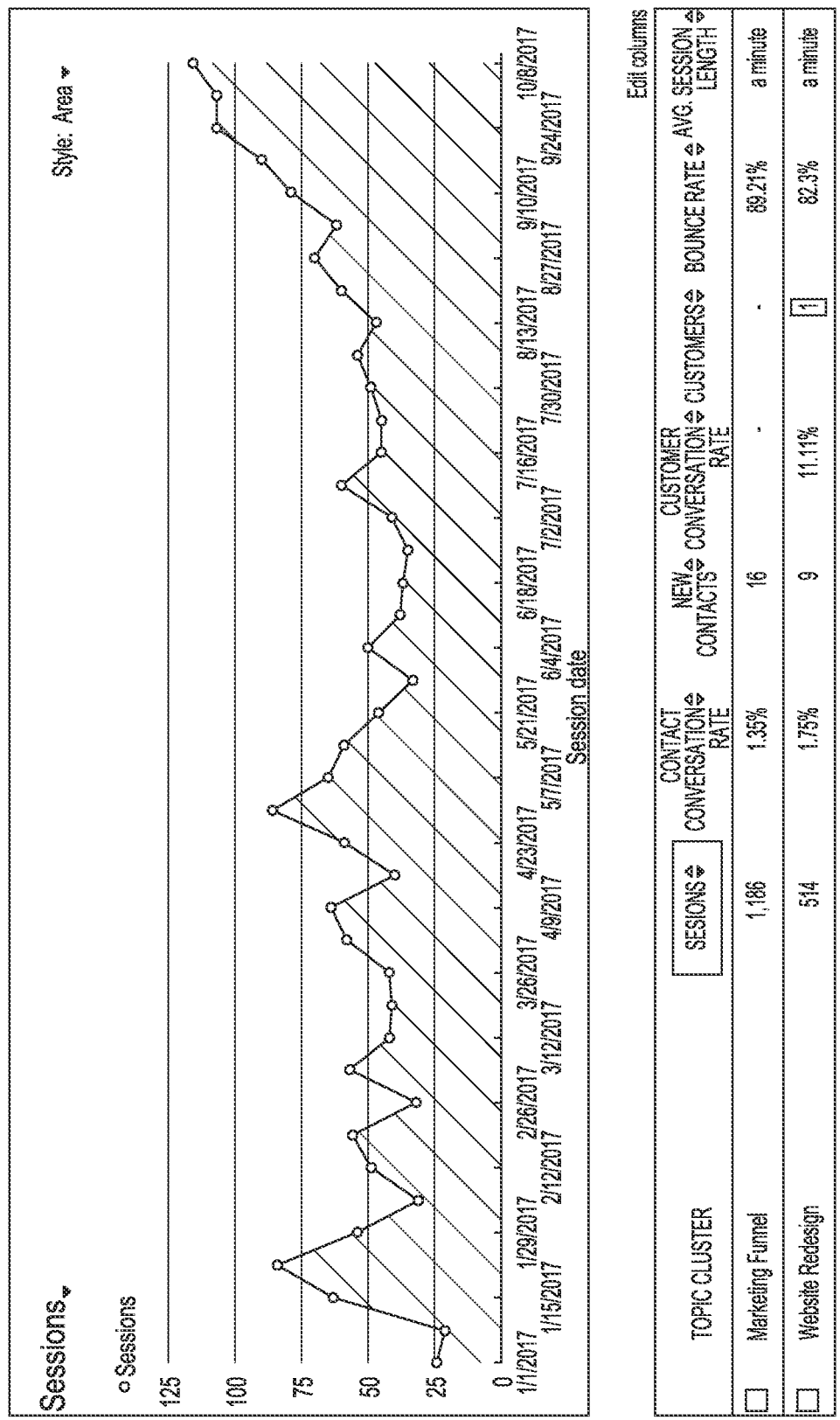
FIG. 8 illustrates a user interface for reporting information relating to online content generated using the content development and management platform according to one or more embodiments of the disclosure.

FIG. 8 shows an example of a user interface of the reporting and analytics system 180.

In general, a wide range of analytics may be aggregated by topic cluster (such as a core topic and related topics linked to the core topic in the cluster), rather than by web page, so that activities involved in generating the content in the cluster can be attributed with the revenue and other benefits that are generated as a result. Among these are elements tracked in a CRM system 158, such as contact events, customers (such as prospective customers, leads, actual customers, and the like), deals, revenue, profit, and tasks.

In embodiments, the platform 100 may proactively recommend core topics, such as based on crawling and scraping existing site content of an enterprise. Thus, also provided herein is the auto-discovery engine 170, including various methods, systems, components, modules, services, processes, applications, interfaces and other elements for automated discovery of topics for interactions with customers of an enterprise, including methods and systems that assist various functions and roles within an enterprise in finding appropriate topics to draw customers into relevant conversations and to extend the conversations in a way that is relevant to the enterprise and to each customer. Automated discovery of relevant content topics may support processes and workflows that require insight into what topics should be written about, such as during conversations with customers. Such processes and workflows may include development of content by human workers, as well as automated generation of content, such as within automated conversational agents, bots, and the like. Automated discovery may include identifying concepts that are related by using a combination of analysis of a relevant item of text (such as core content of a website, or the content of an ongoing conversation) with an analysis of linking (such as linking of related content). In embodiments, this may be performed with awareness at a broad scale of the nature of content on the Internet, such that new, related topics can be automatically discovered that further differentiate an enterprise, while remaining relevant to its primary content. The new topics can be used within a wide range of enterprise functions, such as marketing, sales, services, public relations, investor relations and other functions, including functions that involve the entire lifecycle of the engagement of a customer with an enterprise.

As noted above, customers increasingly expect more personalized interactions with enterprises, such as via context-relevant chats that properly reflect the history of a customer's relationship with the enterprise. Chats, whether undertaken by human workers, or increasingly by intelligent conversational agents, are involved across all of the customer-facing activities of an enterprise, including marketing, sales, public relations, services, and others. Content development and strategy is relevant to all of those activities, and effective conversational content, such as managed in a chat or by the conversational agent 182, needs to relate to relevant topics while also reflecting information about the customer, such as demographic, psychographic and geographic information, as well as information about past interactions with the enterprise. Thus, integration of the content development and management platform 100 with the CRM system 158 may produce appropriate topics within the historical context of the customer and the customer's engagement with the enterprise. For example, in embodiments, tickets or tasks may be opened in a CRM system 158, such as prompting creation of content, such as based on customer-relevant suggestions, via the content development and management application 150, such as content for a conversation or chat with a customer (including one that may be managed by the conversational agent 182 or bot), content for a marketing message or offer to the customer, content to drive customer interest in a web page, or the like. In embodiments, a customer conversation or the customer chat 184 may be managed through the content development and management application 150, such as by having the chat occur within the user interface 152, such that an agent of the enterprise, like an inside salesperson, can engage in the chat by writing content, while seeing suggested topics 138, indicators of relevance or similarity 154 and the like. In this context, relevance indicators can be based on scores noted above (such as reflecting the extent of relevance to core topics that differentiate the enterprise), as well as topics that are of interest to the customer, such as determined by processing information, such as on historical conversations, transactions, or the like, stored in the CRM system 158. In embodiments, to facilitate increased, the customer chat 184 may be populated with seed or draft content created by an automated conversational agent 182, so that a human agent can edit the content into a final version for the customer interaction.

In embodiments, the models 118 (collectively referred to as one or more content context models), and the platform 100 more generally, may enable a number of capabilities and benefits, including helping users come up with ideas of new topics to write about based on a combination of the content cluster data store 132, a graph of topics for the site or other content of the enterprise, and one or more analytics. This may help writers find gaps in content that should be effective, but that are not currently written about. The models 118, and platform 100 may also enable users to come up with ideas about new articles, white papers and other content based on effective topics. The models 118, and platform 100 may also enable users to understand effectiveness of content at the topic level, so that a user can understand which topics are engaging people and which aren't. This may be analyzed for trends over time, so a user can see if a topic is getting more or less engagement. The models 118, and platform 100 may also enable users to apply information about topics to at the level of the individual contact record, such as in the customer relationship management system 158, to help users understand with what content a specific person engages. For example, for a user "Joe," the platform 100, by combining content development and management with customer relationship management, may understand whether Joe is engaging more in "cardio exercise" or "weightlifting." Rather than only looking at the aggregate level, user may at the individual level for relevant topics. Development of content targeted to an individual's topics of interest may be time-based, such as understanding what content has recently been engaged with and whether preferences are changing over time.

The models 118, and the platform 100 may also enable looking at cross relationships between topics. For example, analytics within the platform 100 and on engagement of content generated using the platform 100 may indicate that people who engage frequently with a "cardio" topic also engage frequently with a "running" topic. If so, the platform 100 may offer suggested topics that are interesting to a specific person based on identifying interest in one topic and inferring interest in others.

The models 118, and platform 100 may also enable development of email content, such as based on understanding the topic of the content of an email, an email campaign, or the like. This may include understanding which users are engaging with which content, and using that information to determine which emails, or which elements of content within emails, are most likely to be engaging to specific users.

FIG. 8 illustrates a user interface for reporting information relating to online content generated using the content development and management platform. Various indicators of success, as noted throughout this disclosure, may be presented, such as generated by the reporting and analytics systems 180.

Figure 9:
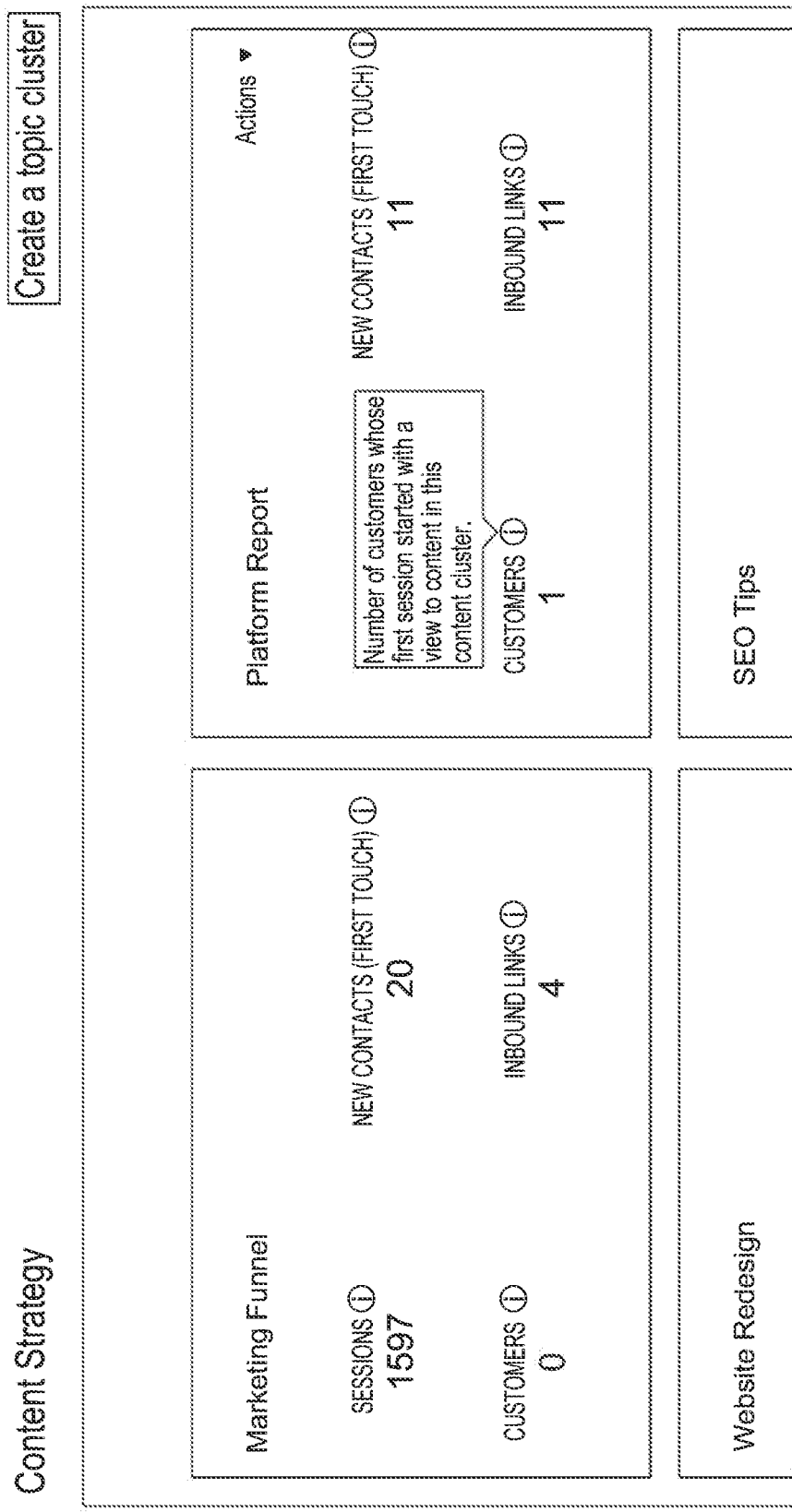
FIG. 9 depicts a user interface in which activity resulting from the use of the platform is reported to a marketer or other user according to one or more embodiments of the disclosure.

FIG. 9 depicts an embodiment of a user interface in which activity resulting from the use of the platform is reported to a marketer or other user. Among other metrics that are described herein, the user interface can report on what customers, such as ones to be entered into or already tracked in the CRM system, have had a first session of engagement with content, such as a web page, as a result of the content strategy, such as where the customers arrive via a link contained in a sub-topic or other topic linked to a core topic as described herein.

The present concepts can be applied to modern sophisticated searching methods and systems with improved success. For example, in a context-sensitive or personalized search request, the results may be influenced by one or more of the following: location, time of day, format of query, device type from which the request is made, and contextual cues.

In an embodiment, a topical cluster comprising a core topic and several sub-topics can be defined and refined using the following generalized process: 1. Mapping out of several (e.g., five to ten) of the topics that a target person (e.g., customer) is interested in; 2. Group the topics into one or more generalized (core) topics into which the sub-topics could be fit; 3. Build out each of the core topics with corresponding sub-topics using keywords or other methods; 4. Map out content ideas that align with each of the core topics and corresponding sub-topics; 5. Validate each idea with industry and competitive research; and 6. Create, measure and refine the data and models and content discovered from the above process. Any disclosed steps are not intended to be limiting or exhaustive, as those skilled in the art might appreciate alternate or additional steps suiting a given application. One or more steps may also be omitted or combined into one step, again, to suit a given application at hand.

In some embodiments, a system and method are provided that can be used to provide relevancy scores (or quantitative metrics) as a service. Content generation suggestions can also be offered as a service using the present system and method, including synonyms, long tail key words and enrichment by visitor analytics in some instances.

Figure 10:
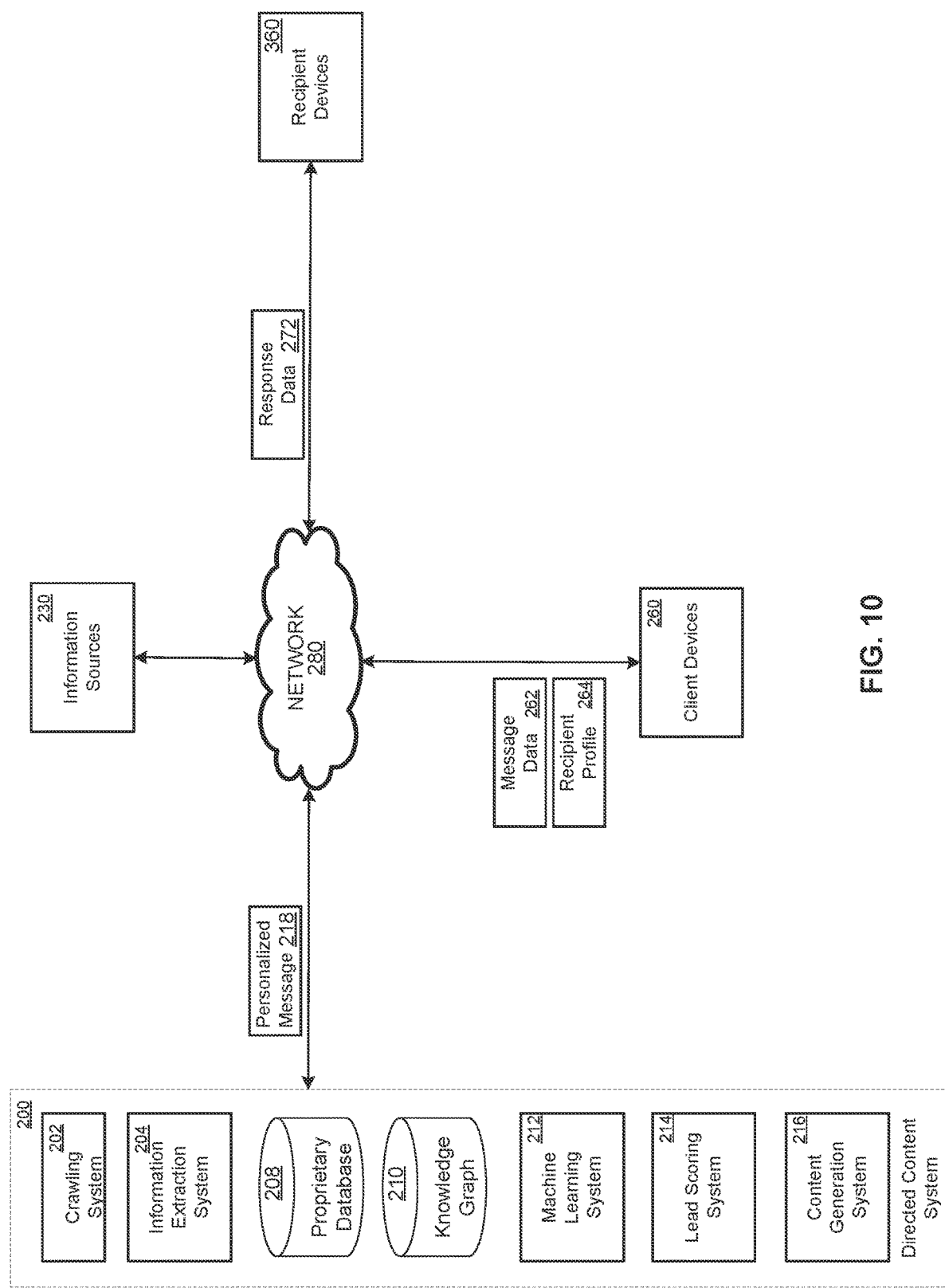
FIG. 10 illustrates an example environment of a directed content system according to one or more embodiments of the disclosure.

FIG. 10 illustrates an example environment of a directed content system 200. In embodiments, the directed content system 200 may be configured to generate "directed content." As used herein, directed content may refer to any textual, audio, and/or visual content that is at least partially personalized for an intended recipient based on information derived by the directed content system 200. In embodiments, the directed content system 200 may be configured to identify recipients that are relevant to a client. As used herein, a client may refer to an enterprise (e.g., a company, a non-profit organization, a governmental entity, and the like) or an individual. A user affiliated with a client may access the directed content system 200 using a client device 260. The directed content system 200 may identify one or more intended recipients to which directed content may be sent to and/or may generate directed content to one or more of the intended recipients. The directed content system 200 may then transmit the directed content to the intended recipients.

In embodiments, the directed content system 200 may include, but is not limited to: a crawling system 202 that implements a set of crawlers that find and retrieve information from an information network (e.g., the Internet); an information extraction system 204 that identifies entities, events, and/or relationships between entities or events from the information retrieved by the crawling system 202; one or more proprietary databases 208 that store information relating to organizations or individuals that use the directed content system 200; one or more knowledge graphs 210 representing specific types of entities (e.g., businesses, people, places, products), relationships between entities, the types of those relationships, relevant events, and/or relationships between events and entities; a machine learning system 212 that learns/trains classification models that are used to extract events, entities, and/or relationships, scoring models that are used to identify intended recipients of directed content, and/or models that are used to generate directed models; a lead scoring system 214 that scores one or more organizations and/or individuals with respect to a content generation task, the lead scoring system referencing information in the knowledge graph; and a content generation system 216 that generates content of a communication to a recipient in response to a request from a client to generate directed content pertaining to a particular objective, wherein the recipient is an individual for which the leading scoring system has determined a threshold level of relevance to the objective of a client. The directed content system 200 uses the understanding from the machine learning system 212 to generate the directed content.

In embodiments, the methods and systems disclosed herein include methods and systems for pulling information at scale from one or more information sources. In embodiments, the crawling system 202 may obtain information from external information sources 230 accessible via a communication network 280 (e.g., the Internet), a private network, the proprietary database 208 (such as a content management system, a customer relationship management database, a sales database, a marketing database, a service management database, or the like), or other suitable information sources. Such methods and systems may include one or more crawlers, spiders, clustering systems, proxies, services, brokers, extractors and the like, using various information systems and protocols, such as Representational State Transfer (REST), Simple Object Access Protocol (SOAP), Remote Procedure Call (RPC), Real Time Operating System (RTOS) protocol, and the like. Such methods, systems, components, services and protocols are collectively referred to herein as "crawlers," or a "set of crawlers," except where context indicates otherwise.

In embodiments, the information extraction system 204 may pull relevant information from each of a variety of data sources (referred to in some cases herein as streams), parse each stream to figure out the type of stream, and optionally apply one or more explicit parsers to further parse specific streams based on the type or structure of the stream. Some streams with defined, static structures allow for direct extraction of information of known types, which can be inserted into the knowledge graph or other data resource without much further processing. In other cases, such as understanding what event happened given a headline of a news article, more processing is required to develop an understanding of the event that can be stored for further use. Certain events are of particular interest to sales and marketing professionals because they tend to be associated with changes in an organization that may increase or decrease the likelihood that an entity or individual will be interested in a particular offering. These include changes in management, especially in "C-level" executives like the CEO, CTO, CFO, CMO, CIO, CSO or the like and officer-level executives like the President or the VP of engineering, marketing or finance, which may indicate directional changes that tend to lead to increased or decreased purchasing. In embodiments, a machine learning system 212 may be configured to learn to parse unstructured data sources to understand that a specific type of event has occurred, such as an event that is relevant to the likelihood that an organization or individual will be interested in a particular offering. Relevant types of events for which particular machine learning systems 212 may be so configured may include, in addition to changes in management, attendance at trade shows or other industry events, participation in industry organizations like consortia, working groups and standards-making bodies, financial and other events that indicate growth or shrinking of a business, as well as other events described throughout this disclosure.

Figure 11:
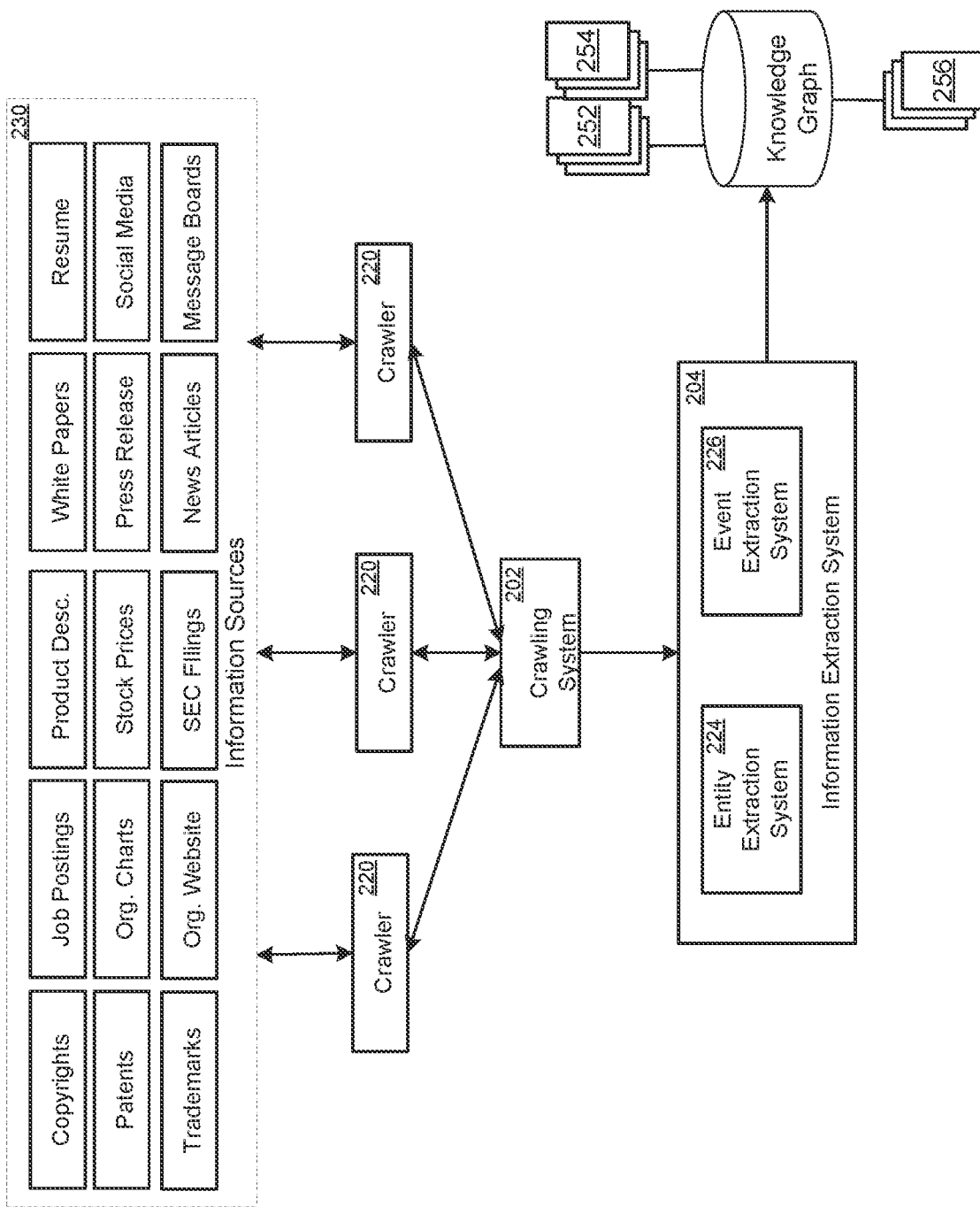
FIG. 11 depicts an example of the crawling system and the information extraction system maintaining a knowledge graph according to one or more embodiments of the disclosure.

FIG. 11 illustrates an example of the crawling system 202 and the information extraction system 204 maintaining the knowledge graph 210, whereby the crawling system 202 and the information extraction system 204 may operate to obtain information from one or more information sources 230 and to update the knowledge graph 210 based on the obtained information. In FIG. 11, a set of crawlers 220 obtain (e.g., crawling and/or downloading) information relating to entities and events from various information sources 230. In embodiments, the set of crawlers 220 are controlled/directed by the crawling system 202 to identify documents that may contain information regarding entities, events, and relationships. Types of entities include, but are not limited to, organizations (e.g., companies), people, governments, cities, states, countries, dates, populations, markets, sectors, industries, roles, and products. Information about organizations may be obtained from, for example, company news articles, job postings, SEC filings, organizational charts, press releases, and any other digital documents relating to organizations such as patents, trademarks, blog posts, mentions in forums, market reports, internal documents, company websites, and social media. Information about people may be obtained from, for example, resumes (e.g., education, prior experience), scientific publications, patents, and any other digital documents such as contact information, news mentions, social media pages, blog posts, and personal websites.

In embodiments, the crawlers 220 crawl Internet websites to obtain documents. Internet websites may include, but are not limited to, sites that include company news articles, job postings, SEC filings, patents, trademark registrations, copyrights, blog posts, mentions in forums, market reports, internal documents, company websites, and social media, as well as sites that include information about people, which may include, but are not limited to, education (such as schools attended, degrees obtained, programs completed, locations of schooling and the like), prior experience (including job experience, projects, participation on boards and committees, participating in industry groups, and the like), scientific publications, patents, contact information, news mentions, social media, blog posts, and personal websites. Information may be extracted from websites via a variety of techniques, including but not limited to explicit selection of specific data fields (e.g., from .JSON), automatic extraction of data from raw web site code (e.g., from HTML, or XML code), or automatic extraction of data from images (e.g., using OCR or image classifiers) or video of websites (e.g., using video classifiers). The crawlers 220 may employ various methods to simulate the behavior of human users, including but not limited to simulating computer keyboard keystrokes, simulating computer mouse movement, and simulating interaction with a browser environment. The crawlers 220 may learn to simulate interaction with websites by learning and replicating patterns in the behavior of real website users. z,21

In operation, the crawling system 202 may seed one or more crawlers 220 with a set of resource identifiers (e.g., uniform resource identifiers (URIs), uniform resource locators (URLs), application resource identifiers, and the like). The crawler 220 may iteratively obtain documents corresponding to the seeded resource identifier (e.g., an HTML document). In particular, the crawler 220 may parse the obtained documents for links contained in the documents that include additional resource identifiers. The crawler 220 may then obtain additional documents corresponding to the newly seeded resource identifiers that were identified from the parsed documents. The crawler 220 may continue in this manner until the crawler does not find any new links. The crawler 220 may provide any obtained documents to the crawling system 202, which can in turn dedupe any cumulative documents. The crawling system 202 may output the obtained documents to the information extraction system 204.

In embodiments, the information extraction system 204 may receive documents obtained from the crawlers 220 via the crawling system 202. The information extraction system 204 may extract text and any other relevant data that represents information about a company, an individual, an event, or the like. Of particular interest to users of the directed content platform 200 disclosed herein, such as marketers and salespeople, are documents that contain information about events that indicate the direction or intent of a company and/or direction or intent of an individual. These documents may include, among many others, blog posts from or about a company; articles from business news sources like Reuters™, CB Insights™, CNBC™, Bloomberg™, and others; securities filings (e.g., 10K filings in the US); patent, trademark and/or copyright filings; job postings; and the like. The information extraction system 204 may maintain and update the knowledge graph 210 based on the extracted information, as well as any additional information that may be interpolated, predicted, inferred, or otherwise derived from the extracted information and/or a proprietary database 208.

In embodiments, the information extraction system 204 (e.g., the entity extraction system 224 and the event extraction system 224) may discover and make use of patterns in language to extract and/or derive information relating to entities, events, and relationships. These patterns may be defined in advance and/or may be learned by the system 200 (e.g., the information extraction system 204 and/or the machine learning system 212). The information extraction system 204 may identify a list of words (and sequences of words) and/or values contained in each received document. In embodiments, the information extraction system 204 may use the language patterns to extract various forms of information, including but not limited to entities, entity attributes, relationships between respective entities and/or respective events, events, event types, attributes of events from the obtained documents. The information extraction system 204 may utilize natural language processing and/or machine learned classification models (e.g., neural networks) to identify entities, events, and relationships from one or more parsed documents. For example, a news article headline may include the text "Company A pleased to announce a deal to acquire Company B." In this example, an entity classification models may be able to extract "Company A" and "Company B" as business organization entities because the classification model may have learned that the term "deal to acquire" is a language pattern that is typically associated with two companies. Furthermore, an event classification model may identify a "company acquisition event" based on the text because the event classification model may have learned that the term "deal to acquire" is closely associated with "company acquisition events." Furthermore, the event classification model may rely on the terms "Company A" and "Company B" to strengthen the classification, especially if both Company A and Company B are both entities that are known to the system 200. In embodiments, the information extraction system 204 may derive new relationships between two or more entities from a newly identified event. For example, in response to the news article indicating Company A has acquired Company B, the information extraction system 204 may infer a new relationship that Company A owns Company B. In this example, a natural language processor may process the text to determine that Company A is the acquirer and Company B is the acquisition. Using the event classification of "company acquisition event" and the results of the natural language processing, the information extraction module 204 may infer that Company B now owns Company A. The information extraction system 204 may extract additional information from the news article, such as a date of the acquisition.

In some embodiments, the information extraction system 204 may rely on a combination of documents to extract entities, events, and relationships. For example, in response to the combination of i) a publicly available resume of Person X indicating that Person X works at Company C (e.g., from a LinkedIn® page of Person X); and ii) a press release issued by Company B that states in the body text "Company B has recently added Person X as its new CTO," the information extraction system 204 may extract the entities Person X, Company B, Company C, and CTO. The name of Person X and Company C may be extracted from the resume based on language patterns associated with resumes, while the names of Company B and Person A, and the role CTO may be extracted from the press release based on a parsing and natural language processing of the sentence quoted above. Furthermore, the information extraction system 204 may classify two events from the combination of documents based on natural language processing and a rules-based inference approach. First, the information extraction module 204 may classify a "hiring event" based on the patterns of text from the quoted sentence. Secondly, the information extraction module 204 may infer a "leaving event" with respect to Company C and Person X based on an inference that if a person working for a first company is hired by another company, then the person has likely left the first company. Thus, from the combination of documents described in the disclosure, the information extraction module 204 may infer that Person X has left Company C (a first event) and that Company B has hired Person X (a second event). Furthermore, in this example, the information extraction module 204 may infer updated relationships, such as Person X no longer works for Company C and Person X now works for Company B as a CTO.

In some embodiments, the information extraction system 204 may utilize one or more proprietary databases 208 to assist in identifying entities, events, and/or relationships. In embodiments, the proprietary databases 208 may include one or more databases that power a content relationship management system (not shown), where the database stores structured data relating to leads, customers, products, and/or other data relating to an organization or individual. This structured data may indicate, for example, names of customer companies and potential customer companies, contact points at customer companies and potential customer companies, employees of a company, when a sale was made to a company (or individual) by another company, emails that were sent to a particular lead from a company and dates of the emails, and other relevant data pertaining to a CRM. In these embodiments, the information extraction system 204 may utilize the data stored in the proprietary databases 208 to identify entities, relationships, and/or events; to confirm entities, relationships, or events; and/or to refute identifications of entities, relationships, and/or events.

In embodiments, the entity extraction system 224 parses and derives entities, entity types, entity attributes, and entity relationships into a structured representation based on the received documents. The entity extraction system 224 may employ natural language processing, entity recognition, inference engines, and/or entity classification models to extract entities, entity types, entity attributes, entity relationships, and relationship metadata (e.g., dates on which the relationship was created). In embodiments, the event extraction system 226 may use known parsing techniques to parse a document into individual words and sequences of words. The event extraction system 226 may employ natural language processing and entity recognition techniques to determine whether any known entities are described in a document. In embodiments, the event extraction system 226 may utilize a classification model in combination with natural language processing and/or an inference engine to discover new entities, the entities' respective types, relationships between entities, and the respective types of relationships. In embodiments, the entity extraction system 224 may extract entity attributes from the documents using natural language processing and/or an inference engine. In embodiments, the inference engine may comprise conditional logic that identifies entity attributes (e.g., If/Then statements that correspond to different entity attributes and relationships). For example, the conditional logic may define rules for inferring an employer of an individual, a position of an individual, a university of an individual, a customer of an organization, a location of an individual or organization, a product sold by an organization, and the like. The entity extraction system 224 may employ additional or alternative strategies to identify and classify entities and their respective relationships.

In embodiments, the event extraction system 226 is configured to parse and derive information relating to events and how those events relate to particular entities. For example, news articles, press releases, and/or other documents obtained from other information sources may be fed to the event extraction system 226, which may identify entities referenced in the documents based on the information contained in the news articles and other documents. The event extraction system 226 may be further configured to classify the events according to different event types (and subtypes). The event extraction system 226 may be configured to extract event attributes, such as from the headline and the body of a news article or another document, such as a press release, resume, SEC filing, trademark registration, court filings, and the like. Event types may include, but are not limited to, mergers and acquisitions, client wins, partnerships, workforce reductions or expansions, executive announcements, bankruptcies, opening and closing of facilities, stock movements, changes in credit rating, distribution of dividends, insider selling, financial results, analyst expectations, funding events, security and data breaches, regulatory and legal actions, product releases and recalls, product price changes, project initiatives, budget and operations changes, changes in name or contact, changes in how products and services are represented or described, award wins, conference participations, sponsoring activities, new job postings, promotions, layoffs, and/or charitable donations. Examples of event attributes may include entities that are connected to the event, a time/date when the event occurred, a date when the event occurred, a geographic area where the event occurred (if applicable), and the like. The event extraction system 226 may employ event classification models, natural language processing, and/or an inference engine to identify and classify events. In embodiments, the event extraction system 226 may receive entity information, including entity values (e.g., a name of a person or company, a job title, a state name) and entity types extracted by the entity extraction system 224 to assist in the event classification. In embodiments, an event classification model may receive entity information along with the features of a document to identify and classify events. Drawing from the example of Company A acquiring Company B, an event classification model may receive the entity types of Company A and Company B, the features of the document (e.g., results of parsing and/or natural language processing), as well as a source of the document (e.g., news article from a business focused publication) to determine that the sentence fragment "a deal to acquire" corresponds to a company acquisition event, as opposed a real property purchase event or a sports trade event (both of which may also correlate to "a deal to acquire"). The event extraction system 226 may employ additional or alternative strategies to identify and classify events.

In embodiments, the information extraction system 204 structures the information into structured representations of respective, entities, relationships, and events. In embodiments, the information extraction system 204 updates the knowledge graph 210 with the structured representations.

Figure 12:
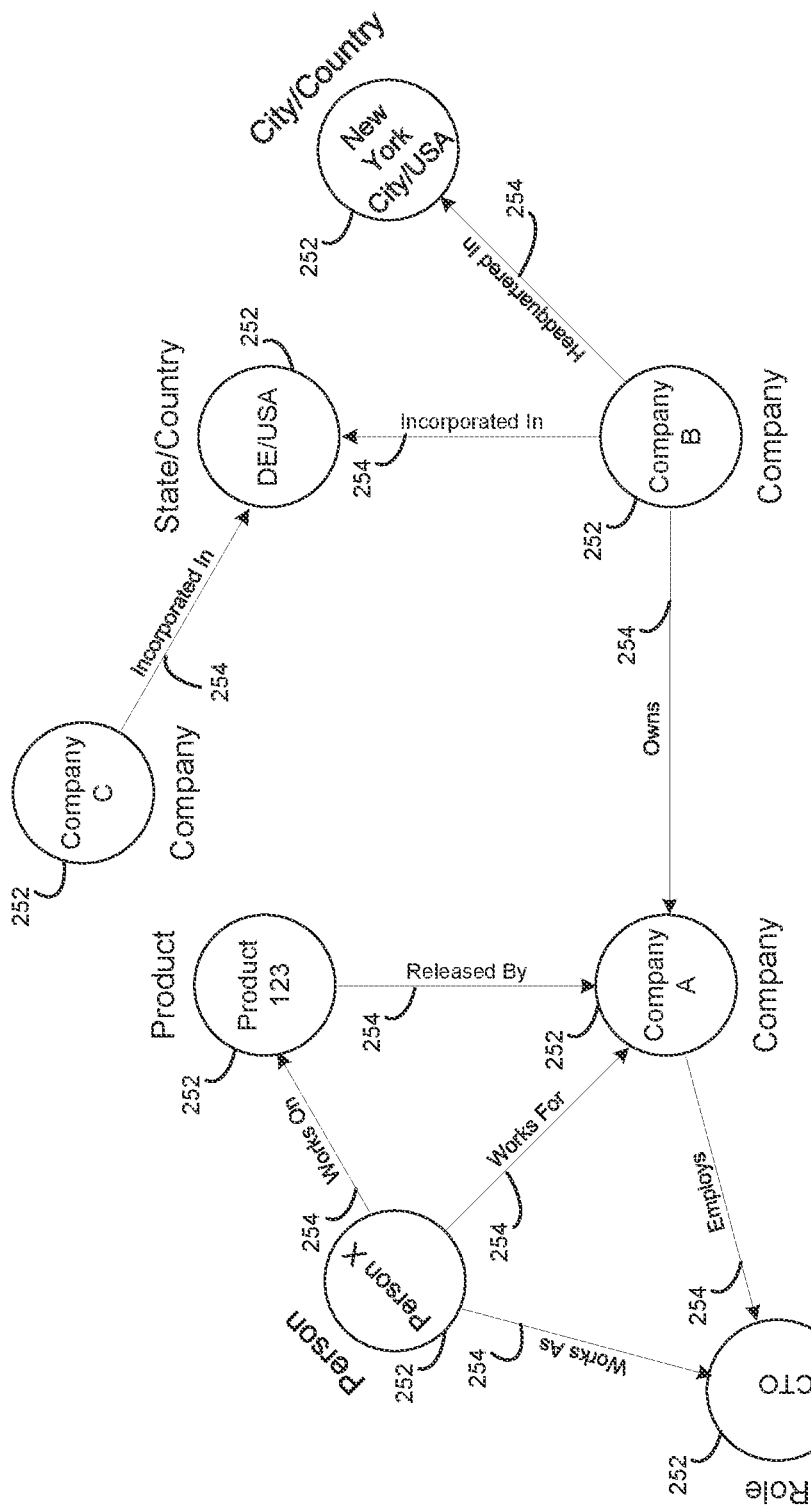
FIG. 12 depicts a visual representation of a portion of an example knowledge graph representation according to one or more embodiments of the disclosure.

FIG. 12 is a visual representation of a portion of an example knowledge graph 210 representation. In embodiments, structured representations in the knowledge graph may be represented by nodes and edges. In the illustrated example, the knowledge graph 210 includes entity nodes 252 that represent entities (e.g., companies, people, places, roles, and the like). In the example, the edges 254 that connect entity nodes 252 represent relationships between the entities represented by the entity nodes 252 connected by a respective edge 254.

In embodiments, each entity node 252 in the knowledge graph 210 may correspond to a specific entity that is known to the system 200 and/or identified by the entity extraction module 224. In some embodiments, each entity node 252 is (or points to) an entity record that includes information relating to the entity represented by the entity node, including an entity identifier (e.g., a unique value corresponding to the entity), an entity type of the entity node (e.g., person, company, place, role, product, and the like), an entity value of the entity (e.g., a name of a person or company), and entity data corresponding to the entity (e.g., aliases of a person, a description of a company, a classification of a product, and the like).

In embodiments, each edge 254 in the knowledge graph 210 may connect two (or more) entity nodes 252 to define a relationship between two (or more) entities represented by the entity nodes 252 connected by the edge 254. In embodiments, edges in the graph may be (or point to) relationship records 254 that respectively define a relationship identifier (a unique identifier that identifies the relationship/edge), a relationship type between two or more entities that defines the type of relationship between the connected entities (e.g., "works for," "works as," "owns," "released by," "incorporated in," "headquartered in," and the like), relationship data (e.g., an entity identifier of a parent entity node and entity identifier(s) of one or more child entity nodes), and relationship metadata (e.g., a date on which the relationship was created and/or identified). In this way, two entity nodes 252 that are connected by an edge 254 may describe the type of relationship between the two entity nodes. In the illustrated example, an entity node 252 of Company A is connected to an entity node 252 of Delaware/USA by an edge 254 that represents an "incorporated in" relationship type. In this particular instance, the entity node 252 of Company A is the parent node and the entity node 252 of Delaware/USA is the child node by way of the directed "incorporated in" edge 254.

In some embodiments, the knowledge graph 210 may further include event nodes (not shown). Event nodes may represent events that are identified by the event extraction system 226. An event node may be related to one or more entity nodes 252 via one or more edges 254, which may represent respective relationships between the event and one or more respective entities represented by the one or more entity nodes connected to the event node. In some embodiments, an event node may be (or point to) an event record 256 that corresponds to a specific event, which may define an event identifier (e.g., a unique value that identifies the event), an event type (e.g., a merger, a new hire, a product release, and the like), and event data (e.g., a date on which the event occurred, a place that the event occurred, information sources from which the event was identified, and the like).

In the case that the information extraction system 204 identifies a new entity, event, and/or relationship, the information extraction system 204 may store the structured representations of new entity, relationship, and/or event in the knowledge graph 210. In cases of known entities, events, and/or relationships, the information extraction system 204 may reconcile any newly derived data in the respective structured representations with data already present in the knowledge graph 210. Updating entities, events, and/or relationships in the knowledge graph 210 may include deleting or replacing structured relationships and/or changing data corresponding to entities, events, and/or relationships in the knowledge graph 210. Drawing from the example of Company A acquiring Company B above, the relationship between the two entities (Company A and Company B) may be represented by a parent entity node 252 of Company A, a child node 252 of Company B, and an "owns" edge 254 connecting the two entity nodes that indicates the relationship type as parent node "owns" child node. Drawing from the example of Person X, the information extraction system 204 may update the knowledge graph 210 by deleting or replacing the edge 254 defining the relationship between the entity node 252 of Person X and the entity node 252 of Company C, such that there is no longer an edge between the entity nodes of Person X and Company C or a previously defined edge (not shown) between the two entity nodes may be replaced with an edge 254 that indicates a "used to work for" relationship between the parent node of Person X and the child entity node of Company C. Furthermore, in this example, the information extraction system 204 may update the knowledge graph 210 to include a first edge 254 indicating a "works for" relationship between a parent node 252 of Person X and a child node 252 of Company B, thereby indicating that Person X works for Company B. The information extracting system 204 may further include a second edge 254 indicating a "works as" relationship between the parent node 252 of Person X and a child node 254 of a CTO Role, which may be related back to Company B by an "employs" role.

Referring back to FIG. 10, the machine learning system 212 is configured to perform machine learning tasks. Learning tasks may include, but are not limited to, training machine learned models to perform specific tasks and reinforcing the trained models based on feedback that is received in connection with the output of a model. Examples of tasks that can be performed by machine learned models can include, but are not limited to, classifying events, classifying entities, classifying relationships, scoring potential recipients of messages, and generating text. Depending on the task, certain types of machine learning may be better suited to a particular task than others. Examples of machine learning techniques can include, but are not limited to, decision tree learning, clustering, neural networks, deep learning neural networks, support vector machines, linear regression, logistic regression, naïve Bayes classifiers, k-nearest neighbor, k-means clustering, random forests, gradient boosting, Hidden Markov models, and other suitable model architectures.

In embodiments, a machine learning system 212 may be configured to learn to identify and extract information about events. In some embodiments, the machine learning system 212 may be configured to train event classification models (e.g., neural networks). An event classification model may refer to a machine learned model that is configured to receive features that are extracted from one or more documents and that output one or more potential events that may be indicated by the documents (or features thereof). Examples of features that may be extracted are words or sequences of words contained in a document or set of documents, dates that are extracted from the documents, sources of the documents, and the like.

In embodiments, the machine learning system 212 trains event classification models that identify events that indicate growth of a business, such as new job postings, financial reports indicating increased sales or market share, jobs reports indicating increased employment numbers, announcements indicating opening of new locations, and the like. Such events, because (among other reasons) they tend to be good indicators of available budgets for acquisition of goods and services, may be relevant to sales and marketing professionals of organizations who provide offerings that assist with growth, such as recruiting services, information technology systems, real estate services, office fixtures and furnishings, architecture and design services, and many others.

In embodiments, the machine learning system 212 trains event classification models that identify events that indicate changing needs of a company, such as C-level hires, layoffs, acquisitions, mergers, bankruptcies, product releases, and the like. Such events tend to be good indicators of companies that may require new services, as the changing of company needs tend to correlate to implementations of new software solutions or needs for specific types of services or employees. These types of events may be of interest to businesses such as construction companies, software companies, staffing companies, and the like.

In embodiments, the machine learning system 212 trains event classification models that identify events that tend to indicate that a business is flat, shrinking or failing, such as a decrease or lack of increase in job postings, financial reports indicating flat or decreased sales or market share, reports indicating decreased employment numbers, reports of lay-offs, reports indicating closing of locations, and the like. Such events may be relevant to sales and marketing professionals of organizations who provide offerings that assist with turnaround efforts, such as sales coaching services, bankruptcy services, and the like.

In embodiments, the machine learning system 212 trains models that are configured to parse job postings of an entity to determine the nature of an organization's hiring as an indicator of need for particular types of goods and services. Among other things, job postings tend to be fairly truthful, as inaccurate information would tend to adversely impact the process of finding the right employees. In embodiments, the machine learning system 212 may include a classifier that learns, based on a training data set and/or under human supervision, to classify job postings by type, such that the classified job postings may be associated with indicators of specific needs of an organization (which itself can be determined by a machine learning system that is trained and supervised). The needs can be stored, such as in the knowledge graph and/or in a customer relationships management or other databases as described throughout this disclosure and the documents incorporated by reference herein, such as to allow a sales and marketing professional to find appropriate recipients for an offering and/or configure communications to recipients within organizations that have relevant needs.

In embodiments, the machine learning system 212 trains models that are configured to parse news articles mentioning an entity or individuals associated with an entity to find events that are indicators of need for particular types of goods and services. News articles tend to be challenging, as they are typically unstructured and may use a wide range of language variations, including jargon, shorthand, and word play to describe a given type of event. In embodiments, the machine learning system 212 may specify a frame for the kind of event that is being sought, such as a specific combination of tags that characterize the event. For example, where the machine learning system 212 needs to be configured to discover events related to a management change, a frame can be specified seeking the name of a person, a role within the management structure of a company, a company, and an action related to that role. In embodiments, parsers may be configured for each of those elements of the frame, such that on a single pass of the article the machine learning system 212 can extract names, roles (e.g., "CEO" or "VP Finance" among many others), companies (including formal names and variants like initial letters and stock symbols) and actions (e.g., "retired," "fired," " "hired," "departs" and the like). In embodiments, names may include proper names of individuals (including full names, partial names, and nicknames) known to serve in particular roles, such as reflected in a customer relationship management database (such as described throughout this disclosure or in the documents incorporated by reference herein) that may be accessed by the machine learning system to assist with the parsing. The machine learning system 212, which may be trained using a training data set and/or supervised by one or more humans, may thus learn to parse unstructured news articles and yield events in the form of the frame, which may be stored in the knowledge graph, such as at nodes associated with the organization and/or the individuals mentioned in the articles. In turn, the events may be used to help sales and marketing professionals understand likely directions of an enterprise. For example, among many other examples, the hiring of a new CTO may indicate a near-term interest in purchasing new technology solutions.

The machine learning system 212 may train event classification models in any suitable manner. For example, the machine learning system 212 may implement supervised, semi-supervised, and/or unsupervised training techniques to train an event classification model. For example, the machine learning system 212 may train an event classification model using a training data set and/or supervision by humans. In some instances, the machine learning system 212 may be provided with a base event classification model (e.g., a generic or randomized classification model) and training data containing labeled and unlabeled data sets. The labeled data sets may, for example, include documents (or features thereof) that describe thousands or millions of known events having known event types. The unlabeled data sets may include documents (or features thereof) without any labels or classifications that may or may not correspond to particular events or event types. The machine learning system 212 may initially adjust the configuration of the base model using the labeled data sets. The machine learning system 212 may then try identifying events from the unlabeled data sets. In a supervised environment, a human may confirm or deny an event classification of an unlabeled data set. Such confirmation or denial may be used to further reinforce the event classification model. Furthermore, as the system 200 (e.g., the event extraction module 226) operates to extract events from information obtained by the crawling system 202, the machine learning system 212 may utilize the classification of said event classifications, the information used to make the entity classifications, and any outcome data resulting from the event classifications to reinforce the event classification model(s). Such event classification models may be trained to find various indicators, such as indicators of specific industry trends, indicators of need and the like.

In embodiments, the machine learning system 212 is configured to train entity classification models. An entity classification model may be a machine learned model that receives one or more documents (or features thereof) and identifies entities indicated in the documents and/or relationships between the documents. An entity classification model may further utilize the knowledge graph as input to determine entities or relationships that may be defined in the one or more documents. The machine learning system 212 may train entity classification models in a supervised, semi-supervised, and/or unsupervised manner. For example, the machine learning system 212 may train the entity classification models using a training data set and/or supervision by humans. In some instances, the machine learning system 212 may be provided with a base entity classification model (e.g., a generic or randomized classification model) and training data containing labeled and unlabeled data sets. The labeled data sets may include one or more documents (or the features thereof), labels of entities referenced in the one or more documents, labels of relationships between the entities referenced in the one or more documents, and the types of entities and relationships. The unlabeled data sets may include one or more documents (or the features thereof), but without labels. The machine learning system 212 may initially train the base entity classification model based on the labeled data sets. The machine learning system 212 may then attempt to classify (e.g., classify entities and/or relationships) entities and/or relationships from the unlabeled data sets. In embodiments, a human may confirm or deny the classifications output by an entity classification model to reinforce the model. Furthermore, as the system 200 (e.g., the event extraction module 226) operates to extract entities and relationships from information obtained by the crawling system 202, the machine learning system 212 may utilize the classification of said entities and relationships, the information used to make the entity classifications, and any outcome data resulting from the entity classifications to reinforce the entity classification model(s).

In embodiments, the machine learning system 212 is configured to train generative models. A generative model may refer to a machine learned models (e.g., neural networks, deep neural networks, recurrent neural networks, and the like) that are configured to output text given an objective (e.g., a message to generate a lead, a message to follow up a call, and the like) and one or more features/attributes of an intended recipient. In some embodiments, a generative model outputs sequences of three to ten words at a time. The machine learning system 212 may train a generative model using a corpus of text. For example, the machine learning system 212 may train a generative model used to generate professional messages may be trained using a corpus of messages, professional articles, emails, text messages, and the like. For example, the machine learning system 212 may be provided messages drafted by users for intended objective. The machine learning system 212 may receive the messages, the intended objectives of the messages, and outcome data indicating whether the message was successful (e.g., generated a lead, elicited a response, was read by the recipient, and the like). As the directed content system 200 generates and sends messages and obtains outcome data relating to those messages, the machine learning system 212 may reinforce a generative model based on the text of the messages and the outcome data.

In embodiments, the machine learning system 212 is configured to train recipient scoring models. A lead scoring model 212 may be a machine learned model (e.g., a regression model) that receives features or attributes of an intended recipient of a message and a message objective and determines a lead score corresponding to the intended recipient. The lead score indicates a likelihood of a successful outcome with respect to the message. Examples of successful outcomes may include, but are not limited to, a message is viewed by the recipient, a response message is sent from the recipient, an article attached in the message is read by the recipient, or a sale is made as a result of the message. The machine learning system 212 may train the lead scoring model 212 in a supervised, semi-supervised, or unsupervised manner. In some embodiments, the machine learning system 212 is fed a training data set that includes sets of triplets, where a triplet may include recipient attributes (e.g., employer, role, recent events, location, and the like), a message objective (e.g., start a conversation, make a sale, generate a web site click), and a lead score assigned (e.g., by a human) to the triplet given the attributes and the message objective. The machine learning system 212 may initially train a model based on the training data. As the lead scoring model is deployed and personalized messages are sent to users, the machine learning system 212 may receive feedback data 272 from a recipient device 270 (e.g., message was ignored, message was read, message was read and responded to) to further train the scoring model.

The machine learning system 212 may perform additional or alternative tasks not described herein. Furthermore, while the machine learning system 212 is described as training models, in embodiments, the machine learning system 212 may be configured to perform classification, scoring, and content generation tasks on behalf of the other systems discussed herein.

Figure 13:
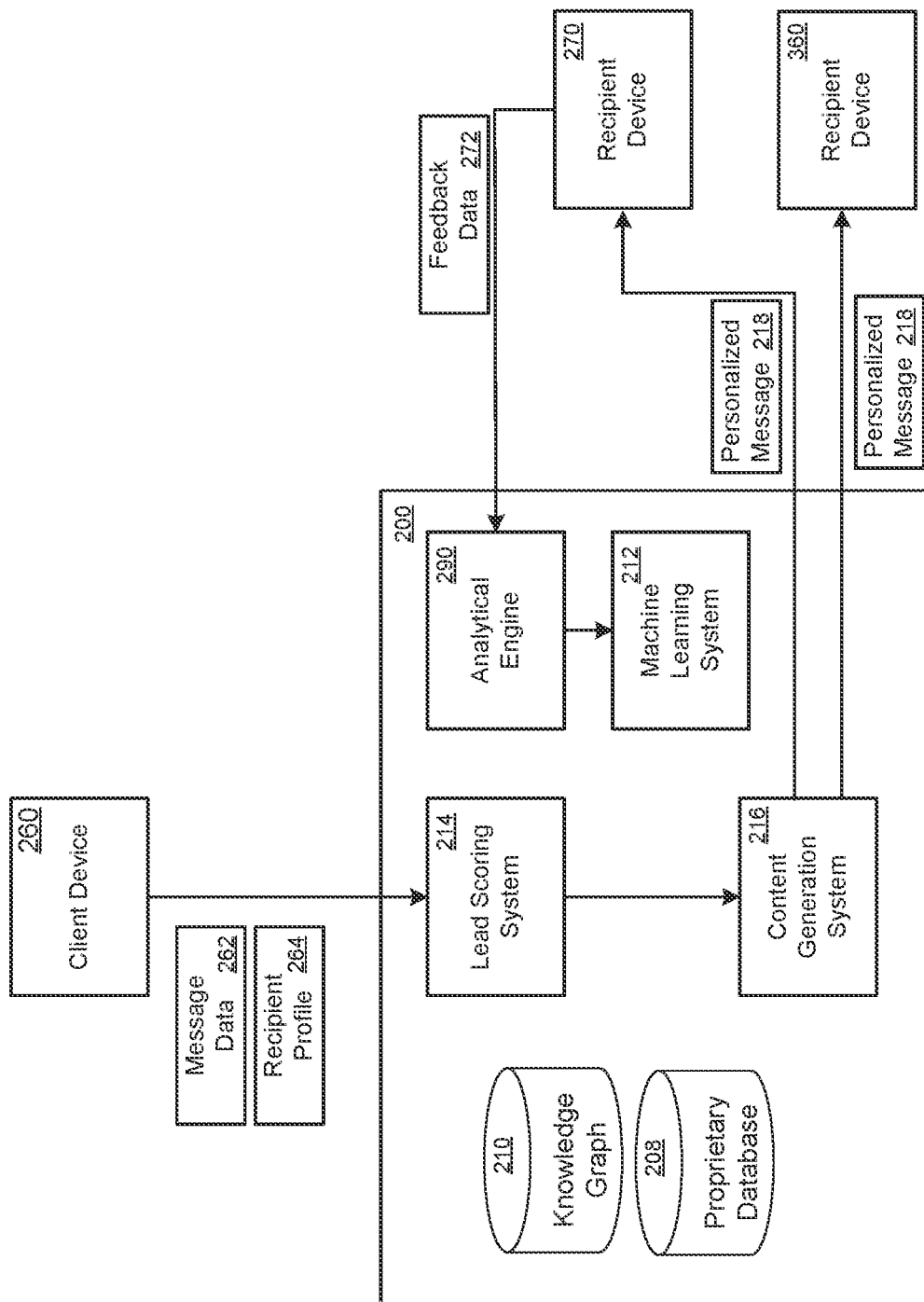
FIG. 13 illustrates an example configuration of the lead scoring system and the content generation system for identifying intended recipients of messages and generating personalized messages for the one or more intended recipients.

FIG. 13 illustrates an example configuration of the lead scoring system 214 and the content generation system 216 for identifying intended recipients of messages and generating personalized messages 218 for the one or more intended recipients. Traditionally, marketers and salespeople rely on bulk emails that are created by populating contact information from a database into a block of free text that has fields for elements that will be retrieved from the database and inserted into the text at the position of the fields. For example, an email template may say "Hi {First name}, . . . ", and first names from the database will be inserted at the point of the {First name} field. The methods and systems disclosed herein enable substantial improvement and enhancement of such templated emails by making available, at large scale, a range of information that is not typically available during bulk email generation. This includes publicly available information about recipients that may serve to personalize or customize the email in a way that makes the message more likely to have a positive outcome (e.g., opened, responded to, closes a deal, and the like).

The lead scoring system 214 and the content generation system 216 may utilize the knowledge graph 210 and/or the proprietary databases 208, as well as a message data 262 and a recipient profile 264 to identify intended recipients and to generate personalized messages 218 for the intended recipients. A personalized message 218 may refer to a message that includes content that is specific to the intended recipient or the organization of the intended recipient. It is noted for purposes of distinguishing from traditional templated bulk messages, merely including a recipient's name, address, or organization name in one or more template fields does not constitute a personalized message 218 in-and-of-itself.

In embodiments, the message data 262 may refer to any information that relates to the messages that a user wishes to have sent. In embodiments, the message data 262 may include an objective of the email. For example, the objective an email may be to open a dialogue, make a sale, renew a subscription, have a recipient read an article, and the like. As is discussed below, the message data 262 may be received from a user via a client device 260 and/or may be generated for the user by the systems described herein. In embodiments, message data may include a message template that includes content that is to be included in the body of the message. For example, a message template may include the name of the "sender," a description of the sender's business, a product description, and/or pricing information. A message template may be created by the user (e.g., using the content management system disclosed elsewhere herein) or may be retrieved by the user and sent from the client device. A message template may include fields to be filled by the content generation system 216 with information, including content that is generated by the content generation system 216 based on information selected from the knowledge graph 210. In some embodiments, the system may automatically infer or generate message templates from historical data provided by the user and/or other users of the system 200. Historical data may include, but is not limited to, historical communication data (e.g., previously sent messages) and/or historical and current customer relationship data, such as the dates, amounts, and attributes of business transactions. In some embodiments, the system 200 may further rely on the objective of a message to generate the template.

In embodiments, a recipient profile 264 may include, among many other examples, information about an ideal recipient, including but not limited to work location, job title, seniority, employer size, and employer industry. The recipient profile 264 may be provided by a user via a client device 260 and/or may be determined using machine learning based on an objective of the message or other relevant factors. In the latter scenario, the machine learning system 212 may determine which types of information are relevant for predicting whether a recipient will open and/or respond to a message. For example, the machine learning system 212 may receive, determine, and/or otherwise obtain feedback data 272 from recipient devices 270. Feedback data 272 may indicate, for example, whether a message was opened, whether a link in the message was clicked, whether an attachment in the message was downloaded or viewed, whether a response was elicited, and the like.

In some scenarios, a user may have a good sense of the type of recipient that the user believes would be interested in the user's offering. For example, a user may wish to sell a new software suite to CTOs of certain types of organizations (e.g., hospitals and health systems). In such cases, a user may optionally input the recipient profile 264 and the message data 262 into the system 200 via a client device 260. In additional or alternative embodiments, the recipient profile 264 may be generated by machine learned models based on, for example, outcomes relating to personalized messages previously generated by the system 200 and/or the objective of the message.

In embodiments, the lead scoring system 214 is configured to identify a list of one or more intended recipients of a message based on the recipient profile 264 (whether specified by a user or generated by machine learning). In embodiments, the lead scoring system 214 may filter the most relevant entities in the knowledge graph 210 using the ideal recipient profile and create a recipient list. The recipient list may indicate a list of people that fit the recipient profile. In some embodiments, the lead scoring system 214 may determine a lead score for each person in the recipient list, whereby the lead score indicates a likelihood that a personalized message 218 sent to that person will lead to a successful outcome. In embodiments, the lead scoring system 214 may use historical and current data provided by the user and/or other users of the system to assess the probability that each recipient in the recipient list will respond to the user's message, and/or will be interested in knowing more about the user's offering, and/or will purchase the user's offering. The historical and current data used to evaluate this likelihood may include the events and conditions experienced by recipients and their employers around the time they made similar decisions in the past, the timing of those events, and their co-occurrence.

In some implementations, the lead scoring system 214 retrieves information relating to each person indicated in the recipient list from the knowledge graph 210. The information obtained from the knowledge graph 210 may include information that is specific to that person and/or to the organization of the user. For example, the lead scoring system 214 may obtain a title of the person, an education level of the person, an age of the person, a length of employment by the person, and/or any events that are associated with the person or the organization of the person. The lead scoring system 214 may input this information to the lead scoring model, which outputs a lead score based thereon. The lead scoring system 214 may score each person in the recipient list. The lead scoring system 214 may then rank and/or filter the recipient list based, at least in part, on the lead scores of each respective person in the list. For example, the lead scoring system 214 may exclude any people having lead scores falling below a threshold from the recipient list. The lead scoring system 214 may output the list of recipients to the content generation system 216.

In embodiments, determining which recipients (referred to in some cases as "leads") should receive a communication may be based on one or more events extracted by the information extraction system 204. Examples of these types of events may include, but are not limited to, job postings, changes in revenue, legal events, changes in management, mergers, acquisitions, corporate restructuring, and many others. For a given recipient, the lead scoring system 214 may seek to match attributes of an individual (such as a person associated with a company) to an extracted event. For example, in response to an event where Company A has acquired Company B, the attributes of an individual that may match to the event may be "works for Company B," "Is a C-level or VP level executive," and "Lives in New York City." In this example, a person having these attributes may be receptive to a personalized message 218 from an executive headhunter. In this way, the lead scoring system 214 may generate the list of intended users based on the matches of attributes of the individual to the extracted event. In some embodiments, the lead scoring system 214 may generate the list of the intended users based on the matches of attributes of the individual to the extracted event given the subject matter and/or objective of the message.

In embodiments, the content generation system 216 receives a recipient list and generates a personalized message 218 for each person in the list. The recipient list may be generated by the lead scoring system 214 or may be explicitly defined by the user. The content generation system 216 may employ natural language generation techniques and/or a generative model to generate directed content that is to be included in a personalized message. In embodiments, the content generation system 216 may generate directed content for each intended recipient included in the recipient list. In generating directed content for a particular individual, the content generation system 216 may retrieve information that is relevant to individual from the knowledge graph 210 and may feed that information into a natural language generator and/or a generative model. In this way, the content generation system 216 may generate one or more instances of directed content that is personalized for the user. For example, the content generation system 216 for an individual that was recently promoted at a company that recently went public may include the following instances of directed content: "Congratulations on the recent promotion!" and "I just read about your company's IPO, that's great news!" In embodiments, the content generation system 216 may merge the directed content with any parts of the message that is to be common amongst all personalized messages. In some of these embodiments, the content generation system 216 may merge the directed content for a particular intended recipient with a message template to obtain a personalized message for the particular intended recipient. In embodiments, the content generation system 216 may obtain the proper contact information of an intended recipient and may populate a "to" field of the message with the proper contact information. Upon generating a personalized message, the content generation system 216 may then output the personalized message. Outputting a personalized message may include transmitting the personalized message to an account of the intended recipient (e.g., an email account, a phone number, a social media account, and the like), storing the personalized message in a data store, or providing the personalized message for display to the user, where the user can edit and/or approve the personalized message before transmission to the intended recipient. A respective personalized message 218 may be delivered to a recipient indicated in the recipient list using a variety of messaging systems including, but not limited to, email, short message service, instant messaging, telephone, facsimile, social media direct messages, chat clients, and the like.

In embodiments, the content generation system 216 may utilize certain topics of information when generating directed content that can be included in an email subject line, opening greeting, and/or other portions of a message to make a more personal message for a recipient. For example, the content generation system 216 may utilize topics such as references to the recipient's past (such as to events the recipient attended, educational institutions the recipient attended, or the like), to the recipient's relationships (such as friends or business relationships), to the recipient's affinity groups (such as clubs, sports teams, or the like), and many others. In a specific example, the content generation system 216 may generate directed content that references the recipient's college, note that the sender observed that the recipient attended a recent trade show, and ask how the recent trade show went. In embodiments, the content generation system 216 may retrieve information from the knowledge graph 210 regarding an intended recipient and may provide that information to a natural language generator to obtain directed content that may reference topics that a recipient may be receptive to. In embodiments, the machine learning system 212 can learn which topics are most likely to lead to successful outcomes. For example, the machine learning system 212 may monitor feedback data 272 to determine which messages are being opened or responded to versus which messages are being ignored. The machine learning system 212 use such feedback data 272 to determine topics that are more likely to lead to successful outcomes.

Events of particular interest to salespeople and marketers may include events that indicate a direction of the recipient's business, such as the hiring of a C-level executive, the posting of job openings, a significant transaction of the business (such as a merger or acquisition), a legal event (such as the outcome of a litigation, a foreclosure, or a bankruptcy proceeding), and the like. Acquiring such information from public sources at scale is challenging, as sources for the information are often unstructured and ambiguous. Accordingly, a need exists for the improved methods and systems provided herein for retrieving information from public sources at scale, recognizing information that may be relevant or of interest to one or more recipients, developing an understanding the information, and generating content for communication to one or more recipients that uses at least a portion of the information.

Building the knowledge graph 210 may be an automated or semi-automated process, including one where machine learning occurs with supervision and where content derived from crawled documents is merged for an entity once confidence is achieved that the content in fact relates to the entity. As the knowledge graph 210 grows with additional content, the presence of more and more content enriches the context that can be used for further matching of events, thus improving the ability to ascribe future events accurately to particular entities and individuals. In embodiments, one or more knowledge graphs 210 of individuals and entities may be used to seed the knowledge graph 210 of the system 200, such as a knowledge graph 210 from a CRM database, or a publicly available database of organizations and people, such as Freebase™, Jago™, Divipedia™, Link Data™, Open Data Cloud™ or the like. In embodiments, if a user realizes that an article is not really about the company they expected, the user can flag the error; that is, the process of linking articles to entities can be human-supervised.

Using the above methods and systems, a wide range of content, such as news articles and other Internet content, can be associated in the knowledge graph 210 with each of a large number of potential recipients, and the recipients can be scored based on the matching of attributes in the knowledge graph 210 to desired attributes of the recipients reflected in the recipient profile 264. For example, all CTOs and VPs of engineering who have started their jobs in the last three months can be scored as the most desired recipients of a communication about a new software development environment, and a relevant article can be associated with each of them in the knowledge graph 210.

Once a set of recipients is known, the system 200 may assist with generation of relevant content, such as targeted emails, chats, text messages, and the like. In such cases, the system composes a personalized message 218 for each recipient in the recipient list by combining a selected message template with information about the recipient and the recipient's organization that is stored in the knowledge graph 210. The information about a recipient and/or the recipient's organization may be inserted into a message template using natural language generation and/or a generative model to obtain the personalized message. The content generation system 216 may use statistical models of language, including but not limited to automatic summarization of textual information to generate directed content based on the information about the recipient and/or the recipient's organization. In embodiments, the content generation system 216 may merge the directed content into a message template to obtain the personalized message for a recipient.

In embodiments, a range of approaches, or hybrids thereof, can be used for natural language generation. In some cases, the knowledge graph 210 may be monitored and maintained to ensure that the data contained therein is clean data. Additionally, or alternatively, the content generation system 216 can be configured to use only very high confidence data from the knowledge graph 210 (e.g., based on stored indicators of confidence in respective instances of data). Being clean for such purposes may include the data being stored as a certain part of speech (e.g., a noun phrase, a verb of a given tense, or the like). Being clean may also include being stored with a level of confidence that the data is accurate, such as having an indicator of confidence that it is appropriate to use abbreviations of a business name (e.g., "IBM" instead of "International Business Machines"), that is appropriate to use abbreviated terms (e.g., "CTO" instead of "Chief Technology Officer"), or the like. In embodiments, where data in the knowledge graph 210 may not be of sufficient structure or confidence, a generative model may be used to generate tokens (e.g., words and phrases) from the content (e.g., information from news articles, job postings, website content, etc.) in the knowledge graph 210 associated with an organization or individual, whereby the model can be trained (e.g., using a training set of input-output pairs) to generate content, such as headlines, phrases, sentences, or longer content that can be inserted into a message.

In embodiments, each respective personalized message may be sent with a message tracking mechanism to a respective recipient of the recipient list. A message tracking mechanism may be a software mechanism that causes transmission of feedback data 272 to the system 200 in response to a certain triggering action. For example, a message tracking mechanism may transmit a packet indicating an identifier of the personalized message and a timestamp when the recipient opens the email. In another example, a message tracking mechanism may transmit a packet indicating an identifier of the personalized message and a timestamp when a recipient downloads an attachment or clicks on a link in the personalized message. In embodiments this may be accomplished by using a batch email system as described in U.S. patent application Ser. No. 15/884,247 (entitled: QUALITY-BASED ROUTING OF ELECTRONIC MESSAGES and filed: Jan. 30, 2018); U.S. patent application Ser. No. 15/884,251 (entitled: ELECTRONIC MESSAGE LIFECYCLE MANAGEMENT and Filed: Jan. 30, 2018); U.S. patent application Ser. No. 15/884,264 (entitled: MANAGING ELECTRONIC MESSAGES WITH A MESSAGE TRANSFER AGENT and filed: Jan. 30, 2018); U.S. patent application Ser. No. 15/884,268 (entitled: MITIGATING ABUSE IN AN ELECTRONIC MESSAGE DELIVERY ENVIRONMENT and filed: Jan. 30, 2018), U.S. patent application Ser. No. 15/884,273 (entitled: INTRODUCING A NEW MESSAGE SOURCE INTO AN ELECTRONIC MESSAGE DELIVERY ENVIRONMENT and filed: Jan. 30, 2018), and PCT Application Serial Number PCT/US18/16038 (entitled: PLATFORM FOR ELECTRONIC MESSAGE PROCESSING and filed: Jan. 30, 2018), the contents of which are all herein incorporated by reference. In embodiments, feedback data 272 may include additional or alternative types of data, such as message tracking information and language that was used in a response (if such response occurred).

In embodiments, the feedback data 272 corresponding to personalized messages sent by the system 200 and potential responses to the personalized messages 218 may be received by the system and analyzed by an analytical engine 290. The analytical engine 290 may utilize the feedback data 272 to identify feedback data 272 corresponding to the personalized messages 218 sent by the system 200 and potential responses to those personalized messages 218 may include, but is not limited to, whether the message 218 was opened, whether an attachment was downloaded, whether a message was responded to, tracking information, language of a potential response from the recipient, and any other information contained explicitly or implicitly in the message communications such as the time and day the message was sent, opened and replied to, and the location where the message was read and replied to. The analytical engine 290 may perform language and/or content tests on the feedback data 272. Language and content tests may include, but are not limited to, A/B testing, cohort analysis, funnel analysis, behavioral analysis, and the like. The results from the analytical engine 290 may be presented to the user. The presentation of the results can be achieved using a variety of methods including, but not limited to, a web-based dashboard, reports or summary emails. In presenting the results of the analytical engine 290 with respect to a set of personalized messages sent on behalf of a user to the user, the user may then take appropriate actions to refine his or her recipient profile 264 and/or message template 262. In embodiments, the system 200 may take appropriate actions by modifying future personalized message using the results of language and content tests. The system 200 may furthermore take appropriate actions to refine the ideal recipient profile.

In embodiments, the analytical engine 290 may pass the feedback data 272 to the machine learning system 212, which may use the feedback data 272 to reinforce one or more models trained by the machine learning system 212. In this way, the machine learning system 212 can determine what types of recipients correlate to higher rates of successful outcomes (e.g., are more likely to open and/or respond to a personalized message), what type of events correlate to higher rates of successful outcomes, what time frames after an event correlate to higher rates of successful outcomes, what topics in the directed content correlate to higher rates of successful outcomes, and the like.

As noted above, the system 200 may be used to help salespeople and marketers, such as to send automatically generated emails promoting an offering, where the emails are enriched with information that shows awareness of context and includes information of interest to recipients who match a given profile. The emails are in particular enriched with text generated from the knowledge graph 210 in which relevant information about organizations and individuals, such as event information, is stored. In embodiments the system 200 generates subject lines, blog post titles, content for emails, content for blog posts, or the like, such as phrases of a few words, e.g., about 5 words, about 6-8 words, about 10 words, about 15 words, a paragraph, or more, up to an including a whole article of content. In embodiments, where large amounts of reference data are available (such as where there are many articles about a company), it is possible to generate full articles. In other cases, shorter content may be generated, as noted above, by training a system to generate phrases based on training on a set of input-output pairs that include event content as inputs and summary words and phrases as outputs. As an example, company descriptions have been taken from LinkedIn™ and used to generate conversational descriptions of companies. Inputs varied by company, as the nature of the data was quite diverse. Outputs were configured to include a noun-phrase and a verb-phrase, where the verb phrase was constrained to be in a given tense. In embodiments, a platform and interface are provided herein in which one or more individuals (e.g., curators), may review input text (such as of company websites, news articles, job postings, and other content from the knowledge graph 210) and the individuals can enter output text summarizing the content of the inputs in the desired form (noun phrase, verb phrase). The platform may enable the user to review content from the knowledge graph as well as to search an information network, such as a CRM system or the Internet, to find additional relevant information. In embodiments, the CRM system may include access to data about recipients maintained in a sales database, a marketing database, a service database, or a combination thereof, such that individuals preparing output text (which in turn is used to train the natural language generation system) have access to private information, such as about conversations between salespeople and individuals in the recipient list, past communications, and the like.

In embodiments, training data from the platform may be used to train a model to produce generated text, and the curators of the platform may in turn review the text to provide supervision and feedback to the model.

In embodiments, the system 200 may include automated follow-up detection, such that variants of language generated by the model may be evaluated based on outcomes, such as responses to emails, chats and other content, deals won, and the like. Thus, provided herein is a system wherein the outcome of a transaction is provided as an input to train a machine learning system to generate content targeted to a recipient who is a candidate to undertake a similar transaction.

In embodiments, outcome tracking can facilitate improvement of various capabilities of the system 200, such as information extraction, cleansing of content, generation of recipient profiles, identification of recipients, and generation of text. In embodiments, text generation may be based on the nature of the targeted recipient, such as based on attributes of the recipient's organization (such as the size of the organization, the industry in which it participates, and the like). In embodiments, a machine learning system may provide for controlled text generation, such as using a supervised approach (as described in the disclosure with summarization) and/or with an unsupervised or deep learning approach. In embodiments, the system may train a model to learn to generate, for example, blog post titles, email subject lines, or the like, conditioned on attributes like the industry of the recipient, the industry of a sales or marketing person, or other attributes. In embodiments, different language variants may be generated, such as text of different lengths, text of different complexity, text with different word usage (such as synonyms), and the like, and a model may be trained and improved on outcomes to learn to generate text that is most likely to achieve a favorable outcome, such as an email or blog post being read, a reply being received, content being clicked upon, a deal won, or the like. This may include A/B type testing, use of genetic algorithms, and other learning techniques that include content variation and outcome tracking. In embodiments, content may be varied with respect to various factors such as verb tense, sentiment, and/or tone. For example, verb tense can be varied by as using rule-based generation of different grammatical tenses from tokens (e.g., words and phrases) contained in content attached to a node in the knowledge graph 210. In another example, sentiment can be varied by learning positive and negative sentiment on a training set of reviews or other content that has a known positive or negative sentiment, such as numerically numbered or "starred" reviews on e-commerce sites like Amazon™ or review sites like Yelp™. In another example, tone can be varied by learning on text that has been identified by curators as angry, non-angry, happy, and the like. Thus, variations of text having different length, tense, sentiment, and tone can be provided and tracked to determine combinations that produce favorable outcomes, such that the content generation system 216 progressively improves in its ability to produce effecting content for communications.

In various embodiments using no supervision (e.g., unsupervised learning), as soon as the system 200 has anything as an output, the system 200 can begin collecting labels, which in turn can be used for learning. In embodiments, the system can train an unsupervised model to create a heuristic, then apply supervision to the heuristic.

In embodiments, outcome tracking may include tracking content to determine what events extracted by the information extraction system, when used to generate natural language content for communications, tend to predict deal closure or other favorable outcomes. Metrics on deal closure may be obtained for machine learning from a CRM system, such as one with an integrated sales, marketing and service database as disclosed herein and in the documents incorporated by reference.

In embodiments, the system 200 may include variations on timing of events that may influence deal closure; that is, the system 200 may explore how to slice up time periods with respect to particular types of events in order to determine when an event of a given type is likely to have what kind of influence on a particular type of outcome (e.g., a deal closure). This may include events extracted by the information extraction system 204 from public sources and events from, for example, a CRM system, an email interaction tracking system, a content management system, or the like. For example, the time period during which a CTO change has an influence on purchasing behavior can be evaluated by testing communications over different time intervals, such that the system 200 learns what events, over what time scales, are worth factoring in for purposes of collecting information, storing information in the knowledge graph 210 (as "stale" events can be discarded), using information to generate content, targeting recipients, and forming and sending communications to the recipients. Outcome tracking can include tracking interaction information with email systems, as described in the documents incorporated herein by reference. As examples, the machine learning system 212 may learn what communications to send if a prospect has opened up collateral several times in a six-month space, how the cadence of opening emails or a white paper corresponds to purchasing decisions, and the like. As another example, if an event indicates a change in a CTO, the event may be tracked to discover a rule or heuristic, such as that a very recent (e.g., within two months) CTO change might indicate difficulty closing a deal that was in the pipeline, while a change that is not quite as recent (e.g., between five and eight months before) might indicate a very favorable time to communicate about the same offering. Thus, methods and systems are provided for learning time-based relevance of events for purposes of configuration of communications that include content about the events to recipients of offers. In embodiments, the system 200 may vary time windows, such as by sliding time windows of varying duration (e.g., numbers of weeks, months, or the like) across a starting and ending period (e.g., one-year, some number of months, multiple years, or the like), before or after a given date, such as a projected closing date for a deal, or the like. The system 200 can then see what happened at each point of time and adjust the sizes of time windows for information extraction, recipient targeting, message generation, and other items that are under control of the system 200, including under control of machine learning. Thus, the system can run varying time windows against a training set of outcomes (such as deal outcomes from a CRM system as disclosed herein) to tune the starting point and duration of a time windows around each type of event, in order to learn what events are useful over what time periods.

As noted above, win-loss data and other information from a CRM system may be used to help determine what data is useful, which in turn avoids unnecessary communication to recipients who are not likely to be interested. Thus, an event timing data set is provided, wherein varying time windows are learned for each event to determine the effect of the event on outcomes when the event is associated with communications about offerings. Outcomes can include wins and losses of deals (such as for many different elements of the systems), messages opened (such as for learning to generate subject lines of emails), messages replied to (such as for learning to generate suitable content), and the like. In embodiments, time windows around events may, like other elements, be learned by domain, such as where the industry involved plays a role. For example, the same type of event, like a CTO change, may be relevant for very different time periods in different industries, such as based on the duration of the typical sales cycle in the industry.

In embodiments, learning as described herein may include model-based learning based on one or more models or heuristics as to, for example: what types of events and other information are likely to be of interest or relevance for initiating or continuing conversations; what recipients should be targeted and when, based on industry domain, type of event, timing factors, and the like; what content should be included in messages; how content should be phrased; and the like. Learning may also include deep learning, where a wide range of input factors are considered simultaneously, with feedback from various outcomes described throughout this disclosure and in the documents incorporated by reference herein. In embodiments, learning may use neural networks, such as feed forward neural networks, classifiers, pattern recognizers, and others. For generative features, such as natural language generation, one or more recurrent neural networks may be used. The system may run on a distributed computing infrastructure, such as a cloud architecture, such as the Amazon Web Services™ (AWS™) architecture, among others.

In embodiments, content generated using the system, such as directed content enriched with information extracted by the information extraction system and stored in the knowledge graph, may be used for a variety of purposes, such as for email marketing campaigns, for populating emails, chats and other communications of salespeople, for chats that relate to sales, marketing, service and the like, for dialog functions (such as by conversational agents), and the like. In embodiments, content is used in conjunction with a content management system, a customer relationship management system, or the like, as described throughout this disclosure and in the documents incorporated by reference herein.

In embodiments, methods and systems disclosed herein may be used for sales coaching. Conventionally a supervisor may review a sales call or message with a salesperson, such as by playing audio of a call or reviewing text of an email. In embodiments, audio may be transcribed and collected by the information extraction system disclosed herein, including to attach the transcript to a knowledge graph. The transcript may be used as a source of content for communications, as well as to determine scripts for future conversations. As noted above with respect to variations in language, variations in the script for a sales call may be developed by the natural language generation system, such as involving different sequences of concepts, different timing (such as by providing guidance on how long to wait for a customer to speak), different language variations, and the like. Machine learning, such as trained on outcomes of sales conversations, may be used to develop models and heuristics for guiding conversations, as well as to develop content for scripts.

In embodiments, the system 200 may be used to populate a reply to an email, such as by parsing the content of the email, preparing a reply and inserting relevant content from the knowledge graph in the reply, such as to customize a smart reply to the context, identity, organization, or domain of the sender. This may include allowing a recipient to select a short response from a menu, as well as enriching a short response with directed content generated by the content generation system 216 using the knowledge graph 210.

In embodiments, the system 200 may be used in situations where a user, such as a sales, marketing, or service person, has a message template, and the system is used to fill in an introductory sentence with data that comes from a node 252 of the knowledge graph 210 that matches one or more attributes of the targeted recipient. This may include taking structured data from the knowledge graph 210 about organizations and populating a sentence with appropriate noun phrases and verb phrases (of appropriate tense).

In embodiments, the system 200 may provide an activity feed, such as a recommended list of recipients that match timely event information in the knowledge graph 210 based on a preexisting recipient profile or based on a recipient profile generated by the system as described in the disclosure. The system may recommend one or more templates for a given recipient and populate at least some of the content of an email to the recipient. In embodiments involving email, the system 200 may learn, based on outcomes, such as deals won, emails opened, replies, and the like, to configure email content, to undertake and/or optimize a number of relevant tasks that involve language generation, such as providing an optimal subject line as a person types an email, suggesting a preferred length of an email, and the like. The system 200 may look at various attributes of generated language in optimizing generation, including the number of words used, average word length, average phrase length, average sentence length, grammatical complexity, tense, voice, word entropy, tone, sentiment, and the like. In embodiments, the system 200 may track outcomes based on differences (such as a calculated edit distance based on the number and type of changes) between a generated email (or one prepared by a worker) and a template email, such as to determine the extent of positive or negative contribution of customizing an email from a template for a recipient.

In embodiments, the system 200 may be used to generate a smart reply, such as for an automated agent or bot that supports a chat function, such as a chat function that serves as an agent for sales, marketing or service. For example, if representatives typically send out a link or reference in response to a given type of question from a customer within a chat, the system 200 can learn to surface the link or reference to a service person during a chat, to facilitate more rapidly getting relevant information to the customer. Thus, the system 200 may learn to select from a corpus a relevant document, video, link or the like that has been used in the past to resolve a given question or issue.

In embodiments, the system 200 may automatically detect inappropriate conduct, such as where a customer is engaged in harassing behavior via a chat function, so that the system prompts (or generates) a response that is configured to draw the inappropriate conversation to a quick conclusion, protecting the representative from abuse and avoiding wasting time on conversations that are not likely to lead to productive results.

In embodiments, the system 200 may be used to support communications by service professionals. For example, chat functions are increasingly used to provide services, such as to help customers with standard activities, like resetting passwords, retrieving account information, and the like. In embodiments, the system 200 may serve a relevant resource, such as from a knowledge graph, which may be customized for the recipient with content that is relevant to the customer's history (such as from a CRM system) or that relates to events of the customer's organization (such as extracted by the information extraction system).

In embodiments, the system 200 may provide email recommendations and content for service professionals. For example, when a customer submits a support case, or has a question, the system may use events about their account (such as what have the customer has done before, product usage data, how much the customer is paying, and the like), such as based on data maintained in a service support database (which may be integrated with a sales and marketing database as described herein), in order to provide recommendations about what the service professional should write in an email (such as by suggesting templates and by generating customized language for the emails, as described herein). Over time, service outcomes, such as ratings, user feedback, measures of time to complete service, measures of whether a service ticket was opened, and others may be used to train the system 200 to select appropriate content, to generate appropriate language and the, in various ways described throughout this disclosure. Outcomes may further include one or more indicators of solving a customer's problem, such as the number of responses required (usually seeking to keep them low); presence or absence of ticket deflection (i.e., avoiding unnecessary opening of service tickets by providing the right answer up front); the time elapsed before solution or resolution of a problem; user feedback and ratings; the customer's net promoter score for the vendor before and after service was provided; one or more indices of satisfaction or dissatisfaction; and the like.

Figure 14:
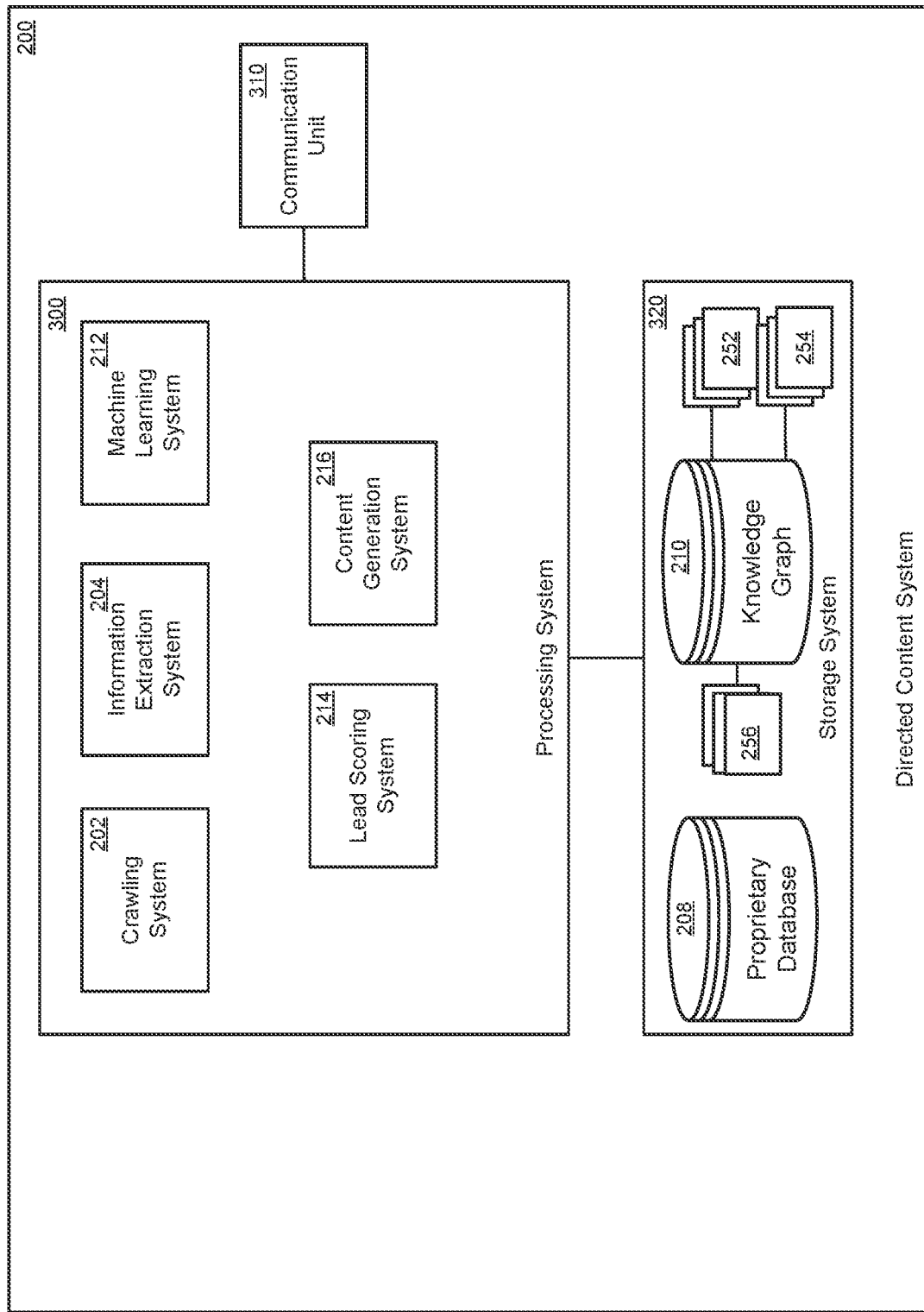
FIG. 14 illustrates an example configuration of the directed content system according to one or more embodiments of the disclosure.

FIG. 14 illustrates an example configuration of the directed content system 200. In the illustrated example, the directed content system 200 includes a processing system 300, a communication system 310, and a storage system 320.

The processing system 300 includes one or more processors that execute computer-readable instructions and non-transitory memory that stores the computer-readable instructions. In implementations having two or more processors, the two or more processors can operate in an individual or distributed manner. In these implementations, the processors may be connected via a bus and/or a network. The processors may be located in the same physical device or may be located in different physical devices. In embodiments, the processing system 300 may execute the crawling system 202, the information extraction system 204, the machine learning system(s) 212, the lead scoring system 214, and the content generation system 216. The processing system 300 may execute additional systems not shown.

A communication system 310 may include one or more transceivers that are configured to effectuate wireless or wired communication via a communication network 280. The communication system 310 may implement any suitable communication protocols. For example, the communication system 310 may implement, for example, the IEEE 801.11 wireless communication protocol and/or any suitable cellular communication protocol to effectuate wireless communication with external devices via a wireless network. Additionally, or alternatively, the communication system 310 may be configured to effectuate wired communication. For example, the communication system 310 may be configured to implement a LAN communication protocol to effectuate wired communication.

The storage system 320 includes one or more storage devices. The storage devices may be any suitable type of computer readable mediums, including but not limited to read-only memory, solid state memory devices, hard disk memory devices, Flash memory devices, one-time programmable memory devices, many time programmable memory devices, RAM, DRAM, SRAM, network attached storage devices, and the like. The storage devices may be connected via a bus and/or a network. Storage devices may be located at the same physical location (e.g., in the same device and/or the same data center) or may be distributed across multiple physical locations (e.g., across multiple data centers). In embodiments, the storage system 320 may store one or more proprietary databases 208 and one or more knowledge graphs 210.

Figure 15:
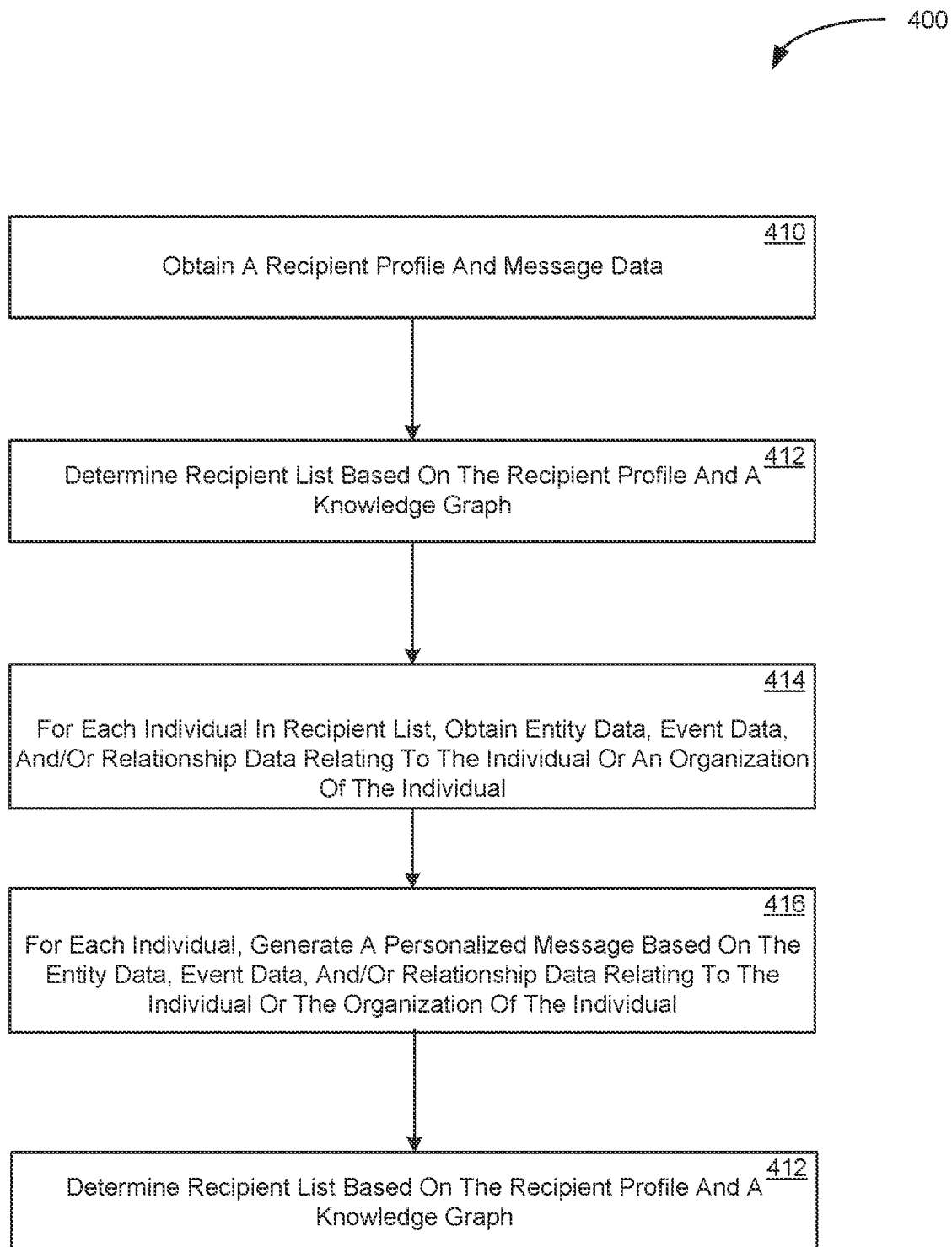
FIG. 15 illustrates a method for generating personalized messages on behalf of a user according to one or more embodiments of the disclosure.

FIG. 15 illustrates a method for generating personalized messages on behalf of a user. In embodiments, the method is executed by the system 200 described with respect to FIGS. 10-14. The method 400 may, however, be performed by any suitable system. In embodiments, the method 400 is executed by the processing system 300 of the system 200.

At 410, the system obtains a recipient profile and message data. In embodiments, the message data may include a message template and/or an objective of the message. The message data may be received from a user of the system and/or derived by the system. For example, in some embodiments, the user may provide a message objective and/or the message template. In some embodiments, the user may provide a message object and the system may generate the message template. In embodiments, a recipient profile may indicate one or more attributes of an ideal recipient of a message that is to be sent on behalf of the user. In embodiments, the system may receive the recipient profile from the user. In some embodiments, the system may determine the recipient profile (e.g., the one or more attributes) based on the message objective and/or one or more attributes of the user.

At 412, the system determines a recipient list based on the recipient profile and a knowledge graph. In embodiments, the system may identify individuals in the knowledge graph having the one or more attributes to obtain the recipient list. In embodiments, the system may generate a lead score for individuals having the one or more attributes and may select the recipient list based on the lead scores of the individuals. In embodiments, the lead score may be determined using a machine learned scoring model. In embodiments, the system may include individuals having the one or attributes and that are associated with a particular type of event (e.g., a change in jobs, a change in management, works for a company that recently was acquired). In some of these embodiments, the time that has lapsed between the present time and the event is taken into consideration when determining the recipient list.

At 414, the system determines, for each individual indicated in the recipient list, entity data, event data, and/or relationship data relating to the individual or an organization of the individual. In embodiments, the system may retrieve the event data, entity data, and/or relationship data from the knowledge graph. For example, the system may begin with an entity node of the individual and may traverse the knowledge graph from the entity node via the relationships of the individual. The system may traverse the knowledge graph to identify any other entities, relationships, or events that are somehow related to the individual and/or entities that are related to the individual. For example, the system may identify information about the individual such as the individual's organization, the individual's educational background, the individual's, the individual's recent publications, news about the individual's organization, news mentions of the individual, and the like.

At 416, the system generates, for each individual indicated in the recipient list, a personalized message that is personalized for the individual based on the entity data, event data, and/or relationship data relating to the individual or an organization of the individual. In embodiments, the system generates directed content for each individual in the recipient list. The directed content may be based on the entity data, event data, and/or relationship data relating to the individual and/or the organization of the individual. In embodiments, the system may employ natural language generators to generate the directed content using entity data, event data, and/or relationship data. In embodiments, the system may employ a generative model to generate the directed content based on the entity data, event data, and/or relationship data. In embodiments, the system may, for each individual, merge the directed content generated for the individual with the message template to obtain a personalized message.

At 418, the system provides the personalized messages. In embodiments, the system may provide the personalized messages by transmitting each personalized message to an account of the individual for which the message was personalized. In response to transmitting a personalized message to an individual, the system may receive feedback data indicating an outcome of the personalized message (e.g., was the message opened and/or responded to, was a link in the message clicked, was an attachment in the message downloaded. The system may use the feedback data to reinforce the learning of one or more of the models described in the disclosure and/or as training data to train new machine learned models. In embodiments, the system may provide the personalized messages by transmitting each personalized message to a client device of the user, whereby the user may approve a personalized message for transmission and/or edit a personalized message before transmission to the individual.

Figure 16:
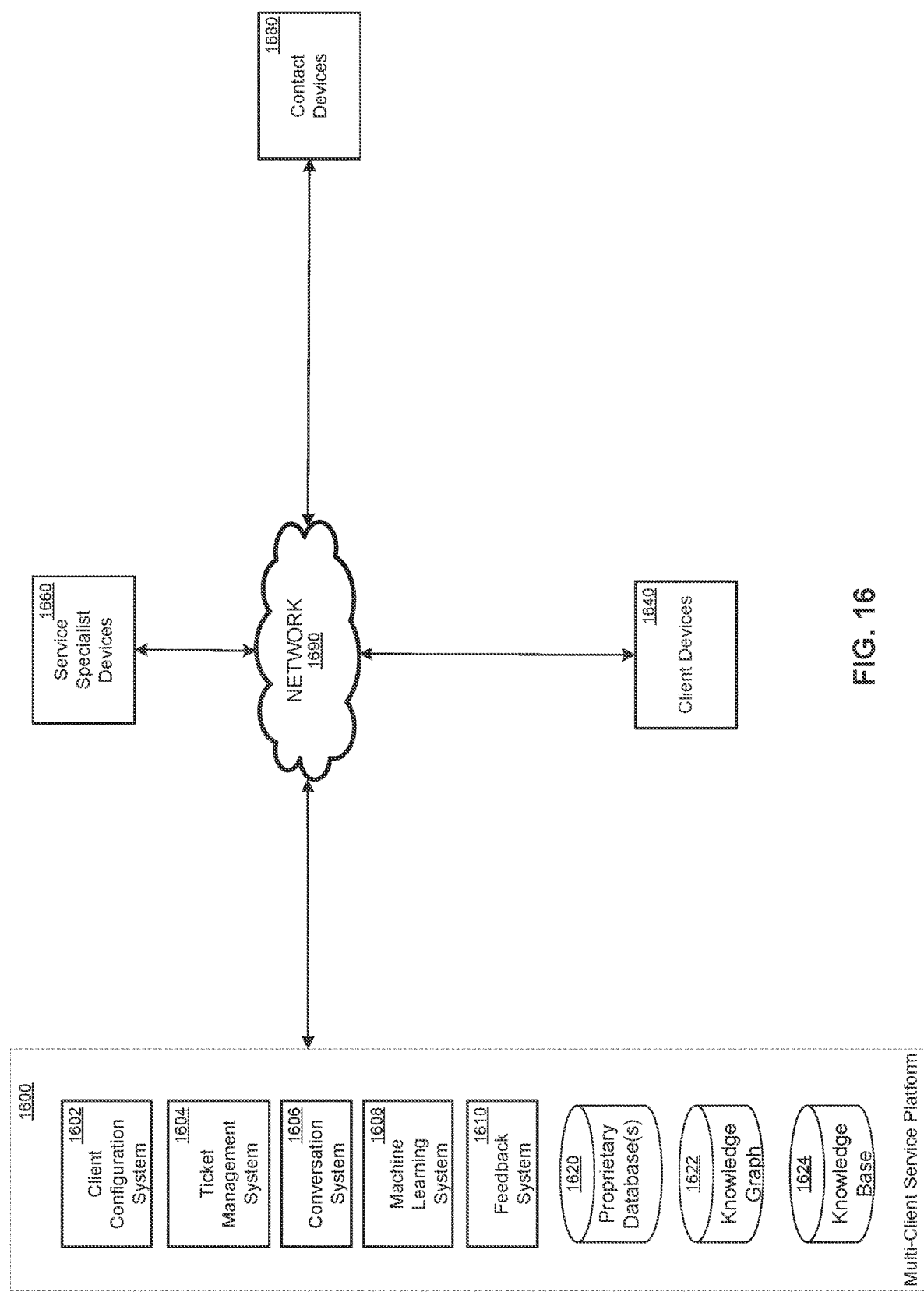
FIG. 16 illustrates an example environment of a multi-client service system platform according to one or more embodiments of the disclosure.

Referring now to FIG. 16, an environment of a multi-client service platform 1600 is shown. A multi-client service platform 1600 may refer to a computing system that provides customer service solutions for any number of different clients. As used herein, a client may refer to an organization (e.g., a business, a government agency, a non-profit, and the like) that engages in some form of commercial or service-related activity, whereby the multi-client service platform 1600 may provide a customized or semi-customized customer service solution to service the customers of the client. In embodiments, the platform 1600 is a multi-tenant platform, such that the system serves the needs of multiple clients, who in turn use the system to provide service, support and the like to their own customers. As used herein, the term "service" should be understood to encompass, except where context indicates otherwise, any of a wide range of activities involved in providing services to customers and others, such as via various workflows of a business, including providing services for value, servicing goods, updating software, upgrading software, providing customer support, answering questions, providing instructions of use, issuing refunds or returns, and many others. As used herein, except where context indicates otherwise, a customer may refer to an entity or individual that engages with the client (e.g., a purchaser of a product or service of the client, a user of the client's software platform, and the like), and the term "customer" should be understood to encompass individuals at different stages of a relationship with a client, such as individuals/organizations who are being targeted with marketing and promotional efforts, prospects who are engaged in negotiations with sales people, customers who have purchased a product, and users of the product or service (such as individuals within a customer organization). Furthermore, as will be discussed in further detail, the term "contact" is used to describe organizational entities or individuals that do engage with, may engage with, or previously engaged with the client. For example, a "contact" may refer to a sales lead, a potential customer, a closed customer (e.g., purchaser, licensee, lessee, loan recipient, policy holder, or the like), and/or a previous customer (e.g., a purchaser that needs service or may review the organization). In this way, the platform 1600 may help track a contact through an entire contact lifecycle (e.g., from the time the contact first comes to the attention of the client as a lead (such as when the client opens a promotional email or clicks on a promotional offer) until the end of the lifecycle of the client's offering(s)). It should be noted that the term contact may refer to a customer, but also to individuals and organizations that may not qualify as "customers" or users of a client.

In some embodiments, the platform 1600 may include, integrate with, or otherwise share data with a CRM or the like. As used in this disclosure, the term CRM may refer to 144 sophisticated customer relations management platforms (e.g., HubSpot® or Salesforce.com®), an organization's internal databases, and/or files such as spreadsheets maintained by one or more persons affiliated with the organization). In some embodiments, the platform 1600 provides a unified database (e.g., a proprietary database 1620) in which a contact record serves as a primary entity for a client's sales, marketing, service, support and perhaps other activities, such that individuals at a client who interact with the same customer at different points in the lifecycle, involving varied workflows, have access to the contact record without requiring data integration, synchronization, or other activities that are necessary in conventional systems where records for a contact are dispersed over disparate systems. In embodiments, data relating to a contact may be used after a deal is closed to better service the contact's needs during a service phase of the relationship. For example, a contact of an invoicing software platform (e.g., the CFO of the company) may have initially been entered into a CRM as a lead. The contact may have subscribed to the software platform, thereby becoming a customer. The contact (or another contact affiliated with the client) may later have an issue using a particular feature of the invoicing software and may seek assistance. The platform 1600 may provide a customer service solution on behalf of the invoicing software, whereby the platform 1600 may, for example, provide one or more interfaces or means to request service. Upon receiving a service request from the contact, the platform 1600 may have access to data relating to the contact from the time the contact was a lead through the service period of the relationship. In this way, the platform 1600 may have data relating to the communications provided to the contact when the contact was just a lead, when the deal was closed, and after the deal closed. Furthermore, the platform 1600 may have information regarding other contacts of the client, which may be useful to addressing a customer-service related issue of the contact.

In embodiments, a client, via a client device 1640, may customize its customer service solution, such that the customer-service solution is tailored to the needs of the client and its customers. In embodiments, a client may select one or more customer service-related service features (or "service features" or "services") and may provide one or more customization parameters corresponding to one or more of the service features. Customization parameters can include customized ticket attributes, service-related content (or "content") to be used in the course of customer service, root URLs for populating a knowledge graph 1622, customer service workflows (or "workflows"), and the like. For example, a client, via the client device 1640, may provide selections of one or more features and capabilities enabled in the platform 1600 as described throughout this disclosure (e.g., automated content generation for communications, automated chat bots, AI-generated follow up emails, communication integration, call routing to service experts, and the like) via a graphical user interface (e.g., drop-down menu, a button, text box, or the like). A client, via the client device 1640, may also use the platform 1600 to find and provide content that may be used to help provide service or support to its contacts (e.g., articles that answer frequency asked questions, "how-to" videos, user manuals, and the like) via a graphical user interface (e.g., an upload portal). The client may further provide information relating to the updated content, such as descriptions of the content, a topic heading of the content, and the like. This can be used to classify the media content in a knowledge graph as further described throughout this disclosure, and ultimately to help identify content that is relevant to a customer service issue, support issue, or the like. A client may additionally or alternatively define one or more customer service workflows via a graphical user interface (e.g., a visualization tool that allows a user to define a customer service workflows of the organization). A service workflow may define a manner by which a particular service-related issue or set of service related issues are to be handled by a client-specific service system (e.g., the system 1900 of FIG. 19). For example, a service workflow for a particular client may define when a customer should be provided a link to content (e.g., useful articles or FAQs) to help the contact solve an issue, when a client is to be routed to a human service expert, when to send a technician, when to send follow-up communications, and the like). In embodiments, a workflow may be defined with respect to a ticket pipeline. The platform 1600 may utilize the client's customization parameters to deploy a client-specific customer service system (discussed in greater detail with respect to FIG. 19). In this way, the customer service offerings of each respective client may be tailored to the business of the client, rather than a one-size-fits-all solution for all clients, irrespective of their business needs.

The platform 1600 provided herein enables businesses to undertake activities that encourage growth and profitability, including sales, marketing and service activities. Among other things, as a user of the platform, a business user is enabled to put customer service at a high level of priority, including to recruit the business user's customers to help in the growth of the business. In embodiments, enabling customer service involves and enables various interactions among activities of a business user that involve service, marketing, sales, among other activities. In some embodiments, the platform 1600 is configured to manage and/or track customer service issues using customer-service tickets (also referred to as "tickets"). A ticket may be a data structure that corresponds to a specific issue that needs to be addressed for a contact by or on behalf of the client. Put another way, a ticket may correspond to a service-related process, or any other process or workflow that has a defined start and finish (e.g., resolution). For example, a particular type of ticket used to support an on-line shopping client may be issued when a contact has an issue with a package not being received. A ticket in this example would relate to an issue with the delivery of the contact's package. The ticket may remain unresolved until the contact receives the package, is refunded, or the package is replaced. Until the ticket is resolved, the ticket may remain an open ticket, despite the number of times the contact interacts with the system.

In embodiments, tickets may have attributes. The attributes may include default attributes and/or custom attributes. Default ticket attributes are attributes that are included in any ticket issued by the platform 1600. Custom attributes are attributes that are selected or otherwise defined by a client for inclusion in tickets issued on behalf of the client. A client may define one or more different types of tickets that are used in the client's client-specific service system. Examples of default ticket attributes, according to some implementations of the platform 1600, may include (but are not limited to) one or more of a ticket ID or ticket name attribute (e.g., a unique identifier of the ticket), a ticket priority attribute (e.g., high, low, or medium) that indicates a priority of the ticket, a ticket subject attribute (e.g., what is the ticket concerning), a ticket description (e.g., a plain-text description of the issue to which the ticket pertains) attribute, a pipeline ID attribute that indicates a ticket pipeline to which the ticket is assigned, a pipeline stage attribute that indicates a status of the ticket with respect to the ticket pipeline in which it is being processed, a creation date attribute indicating when the ticket was created, a last update attribute indicating a date and/or time when the ticket was last updated (e.g., the last time an action occurred with respect to the ticket), a ticket owner attribute that indicates the contact that initiated the ticket, and the like. Examples of custom ticket attributes are far ranging, as the client may define the custom ticket attributes, and may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a contact frequency attribute indicating a number of times a contact has been contacted, a media asset attribute indicating media assets (e.g., articles or videos) that have been sent to the contact during the ticket's lifetime, and the like.

In embodiments, the platform 1600 includes a client configuration system 1602, a ticket management system 1604, a conversation system 1606, a machine learning system 1608, a feedback system 1610, a proprietary database 1620, a knowledge graph 1622, and a knowledge base 1624. The platform 1600 may include additional or alternative components without departing from the scope of the disclosure. Furthermore, the platform 1600 may include, be integrated with or into, or communicate with the capabilities of a CRM system and/or other enterprise systems, such as the content development platform 100 and/or directed content system 200 described in the disclosure. In some embodiments, the platform 1600 enables service and/or support as well as at least one of sales, marketing, and content development, with a common database (or set of related databases) that has a single contact record for a contact.

In embodiments, the client configuration system 1602 allows a client (e.g., a user affiliated with a client) to customize a client-specific service system, and configures and deploys the client-specific service system based on the client's customizations. In embodiments, the client configuration system 1602 presents a graphical user interface (GUI) to a client user via a client device 1630. In embodiments, the GUI may include one or more drop down menus that allows users to select different service features (e.g., chat bots, automated follow up messages, FAQ pages, communication integration, and the like). Alternatively, a user affiliated with a client may select one of multiple packages (e.g., "basic", "standard", "premium", or "enterprise"), where each package includes one or more service features and is priced accordingly. In these embodiments, the service features in a respective package may be cumulative, overlapping, or mutually exclusive. In scenarios where the packages are mutually exclusive, a client may select multiple packages.

Once a service feature is selected, a user affiliated with the client may begin customizing one or more aspects of the service feature (assuming that the selected service feature is customizable). It should be noted that some service features allow for heavy customization (e.g., workflow definitions, pipeline definitions, content uploads, email templates, conversation scripting, and the like), while other service features do not allow for any customization or for minimal customization (e.g., custom logos).

In embodiments, the client configuration system 1602 is configured to interface with the client devices 1640 to receive customization parameters from respective clients corresponding to selected service features. As mentioned, customization parameters may include ticket attributes for client-specific tickets, service-related content (also referred to as "content" or "media assets") to be used in the course of customer service, root URLs for populating the knowledge graph 1622, ticket pipeline definitions, customer service workflows (or "workflows") definitions, communication templates and/or scripts, and the like.

In embodiments, the client configuration system 1602 is configured to allow a client (e.g., a user affiliated with a client) to configure one or more different types of tickets that are used to record, document, manage, and/or otherwise facilitate individual customer service-related events issued by contacts of the client. For example, a client can customize one or more different types of tickets and, for each different type of ticket, the custom ticket attributes of the ticket. In embodiments, the client configuration system 1602 presents a GUI to a user affiliated with the client via the client device 1640 that allows a user to configure ticket objects, which are used to generate instances of tickets that are configured according to the client's specifications. The user may command the client configuration system 1602 to create a new ticket object, via the GUI. In doing so, the client may define, for example, the type of ticket, the different available priority levels, a pipeline that handles the ticket, and/or other suitable information. For example, using a menu or a text input box, the user can designate the type of ticket (e.g., "refund request ticket") and the different available priority levels (e.g., low or high). In embodiments, the client configuration system 1602 may allow a user to designate a pipeline to which the ticket is assigned. Alternatively, the pipeline may be defined in a manner, such that the ticket management system 1604 listens for new tickets and assigns the ticket to various pipelines based on the newly generated ticket and information entered in by the user.

In embodiments, the user may further configure a ticket object by adding, removing, modifying, or otherwise updating the custom attributes of the ticket object. In embodiments, the GUI presented by the client configuration system 1602 may allow the user to define new attributes. The GUI may receive an attribute name and the variable type of the attribute (e.g., an integer, a flag, a floating point, a normalized score, a text string, maximum and minimum values, etc.) from the user via the GUI (e.g., using a menu and/or a text input box). In embodiments, the GUI may allow the user to define the manner by which the attribute value is determined. For example, the user may designate that a value of an attribute may be found in a specific field or fields of a specific database record, answers from the client in a live chat or chat bot transcript (e.g., extracted by an NLP system), and the like. The ticket management system 1604 may utilize such definitions to populate the attributes of new ticket instances generated from the ticket object. The GUI may allow a user to modify or otherwise edit the attributes of the ticket. For example, a user may rename a ticket type, add or delete attribute types, modify the data types of the different ticket attributes, and the like.

In some examples, in configuring a knowledge base of a client-specific service system, the client configuration system 1602 may present a GUI that allows users to upload articles, videos, tutorials, and other content. A knowledge base may refer to a collection of articles, videos, sound records, or other types of content that may be used to assist a contact when dealing with an issue. The contents in a knowledge base may be provided to a contact in a variety of different manners, including by a customer-service specialist (e.g., during a live chat or in a follow-up email), by a chat bot, or from a help page (e.g., a webpage hosted by the platform 1600 or the client's website). In some embodiments, the GUI allows a user to designate one or more root URLs that allow the platform 1600 to crawl a website for media assets and/or retrieve media assets. In some embodiments, the client configuration system 1602 may utilize the root URL to generate the knowledge graph 1622 (or portion thereof) that references the media assets used in connection with a client's service system. In some embodiments, the GUI may further allow a user to define topic headings to which the content is relevant or directed. For example, the user may provide the topics via a text string or may select topics from a menu or series of hierarchical menus. In embodiments, the topic headings may be used to organize the uploaded content in the client's help page and/or to assist in selection of the content when assisting a contact.

In another example, the client configuration system 1602 may present a GUI that includes a pipeline definition element. In embodiments, a pipeline definition element allows a user to visually create a ticket pipeline. In some of these embodiments, the GUI may allow a user to define one or more stages of a ticket pipeline, and for each stage in the pipeline, the user may further define zero or more workflows that are triggered when the ticket reaches the particular stage in the pipeline. In embodiments, the user may define the various stages of a ticket pipeline and may define the attributes (and values thereof) of a ticket that corresponds to each stage. For example, the user may define a new ticket stage and may define that the ticket should be in the new ticket stage when a new ticket is generated but before any further communications have been made to the contact. The user may then define a second stage that indicates the ticket is waiting for further response from the client and may further define that the ticket should be in the "waiting for contact" stage after a new ticket notification has been sent to the client, but before the client has responded to the request (which may be part of the client's customer service requirements). The user may configure the entire pipeline in this manner.

In embodiments, the client configuration system 1602 may allow a user to create new and/or update workflows by defining different service-related workflow actions (also referred to as "actions") and conditions that trigger those actions. In some embodiments, a workflow may be defined with respect to a ticket. For example, the user affiliated with a cable or internet service provider (or "ISP") can define an action that notifies a customer when a new ticket is generated (e.g., generates and sends an email to the user that initiated the ticket). In this example, the GUI may be configured to allow the user to define the type or types of information needed to trigger the condition and/or other types of information that may be requested from the customer before triggering the email (e.g., the nature of the problem or reason for calling). The GUI may also allow the user to provide data that may be used to generate the email, such as an email template that is used to generate the email. Continuing this example, the user may define another action that routes the user to a human service specialist and one or more conditions that may trigger the action, such as unresolved issues or client requests. The user can add the action and conditions to the workflow, such that when the condition or conditions are triggered, the customer is routed to a live service specialist.

The client configuration system 1602 may allow a user affiliated with a client to configure other service features without departing from the scope of the disclosure. For example, in embodiments, the client configuration system 1602 may allow a user to upload one or more scripts that a chat bot may utilize to communicate with contacts. These scripts may include opening lines (e.g., "hello, how may we assist you today") and a decision tree that defines dialog in response to a response from the contact (or lack of response). In some embodiments, the decision tree may designate various rules that trigger certain responses, whereby the rules may be triggered as a result of natural language processing of input received from the contact.

Figure 37:
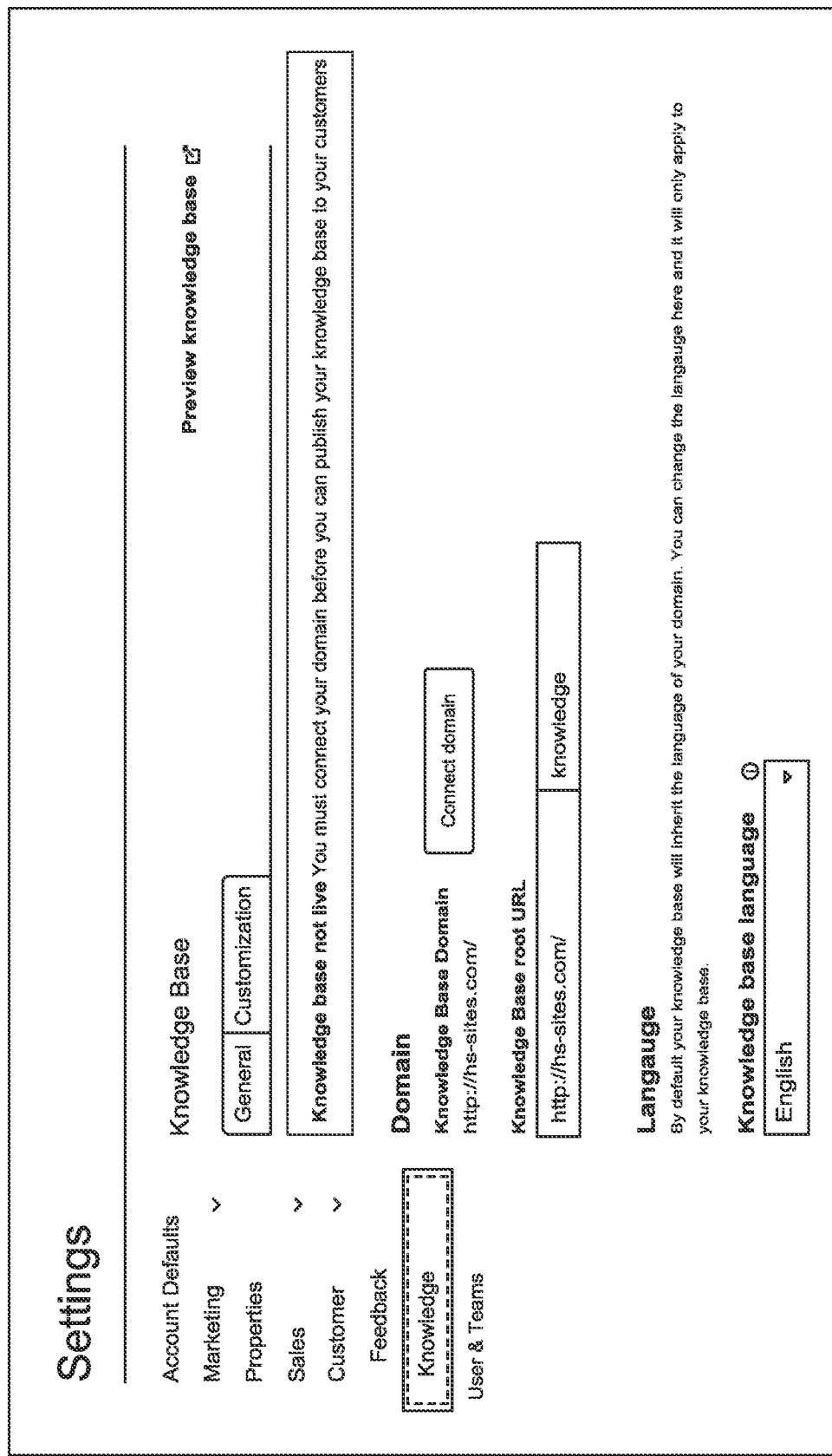
Figure 38:
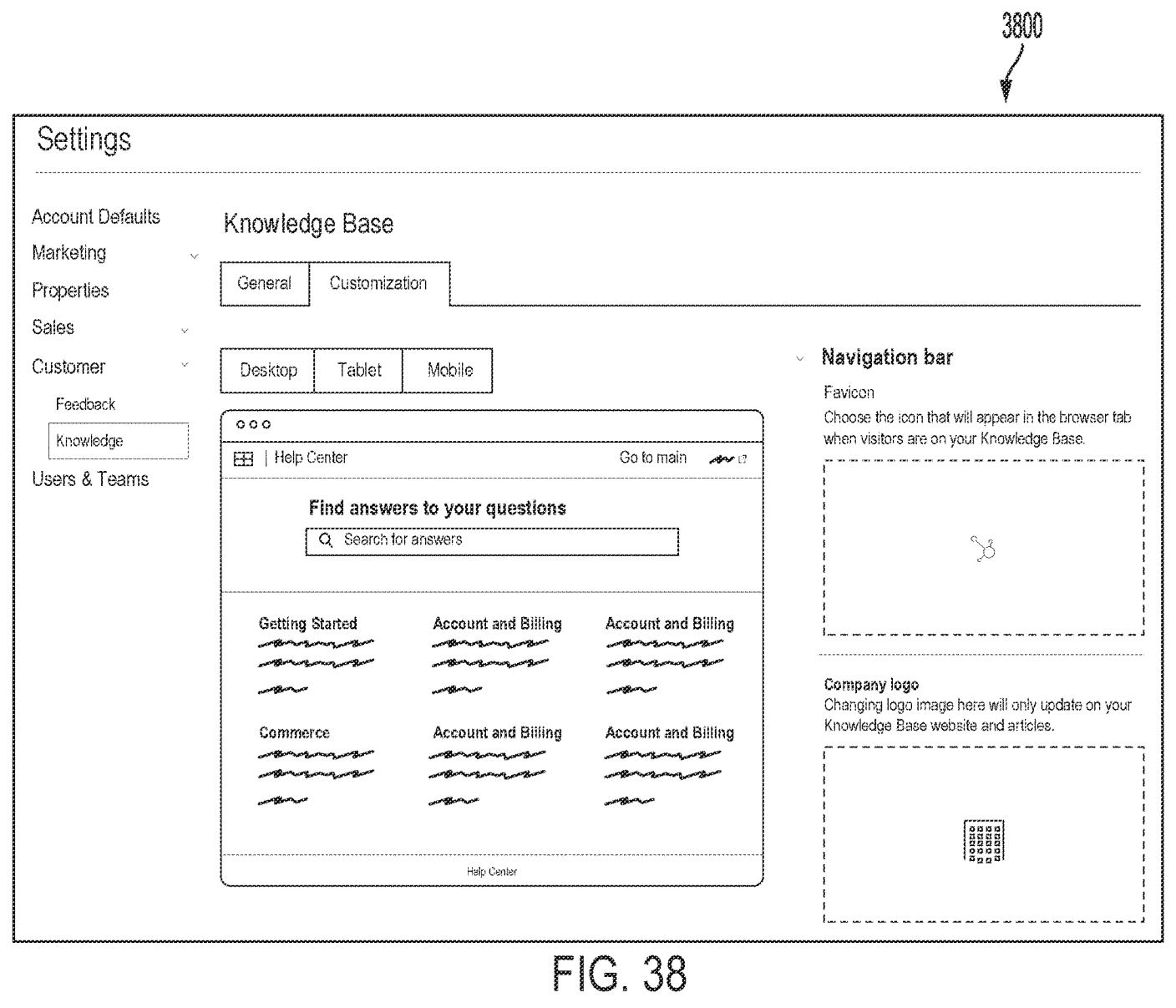

FIGS. 37-44 have been provided for examples of a manner by which a client may provide certain customization parameters to the platform 1600 via a graphical user interface (GUI). For example, FIGS. 37-38 illustrate examples of GUIs that allow users to upload content to the platform 1600 for inclusion in the knowledge graph 1622 that may be used in connection with a client specific service system. In the GUI 3700 presented in FIG. 37, a user may provide a root URL via the GUI 3700, whereby the root URL may be used by the platform 1600 to crawl and/or extract information from a series of webpages starting with the webpage indicated by the root. The GUI 3700 may further allow the user to designate a language that the knowledge graph will support. The GUI 3800 of FIG. 38 allows a user to customize a support page that is deployed on behalf of the client. In embodiments, the GUI 3800 may allow the user to provide customizations for a desktop-based browser, a tablet-based browser, and/or a mobile-based browser. In embodiments, the GUI 3800 may allow the user to upload or otherwise provide an icon that appears in the browser tab of a contact landing on the client's support page and/or a logo of the client that is presented in the support page or other related pages. In this example, the GUI presents a preview of the client's support page, which includes a search bar, topic headers, and articles that link to content (e.g., articles and/or videos). In embodiments, a user may define the topic headers via the GUI and may select/upload the content to include with respect to each topic header. FIG. 39 illustrates a GUI 3900 for viewing analytics data related to uploaded content (e.g., how many views of the article and the average amount of time spent viewing the article). In this example GUI, a user can view analytics related to articles or other media assets (e.g., videos) that relate to customer service. In this way, a client can determine whether its contacts are clicking on the presented content and, if so, how engaged the average contact is by a respective media asset.

Figure 40:
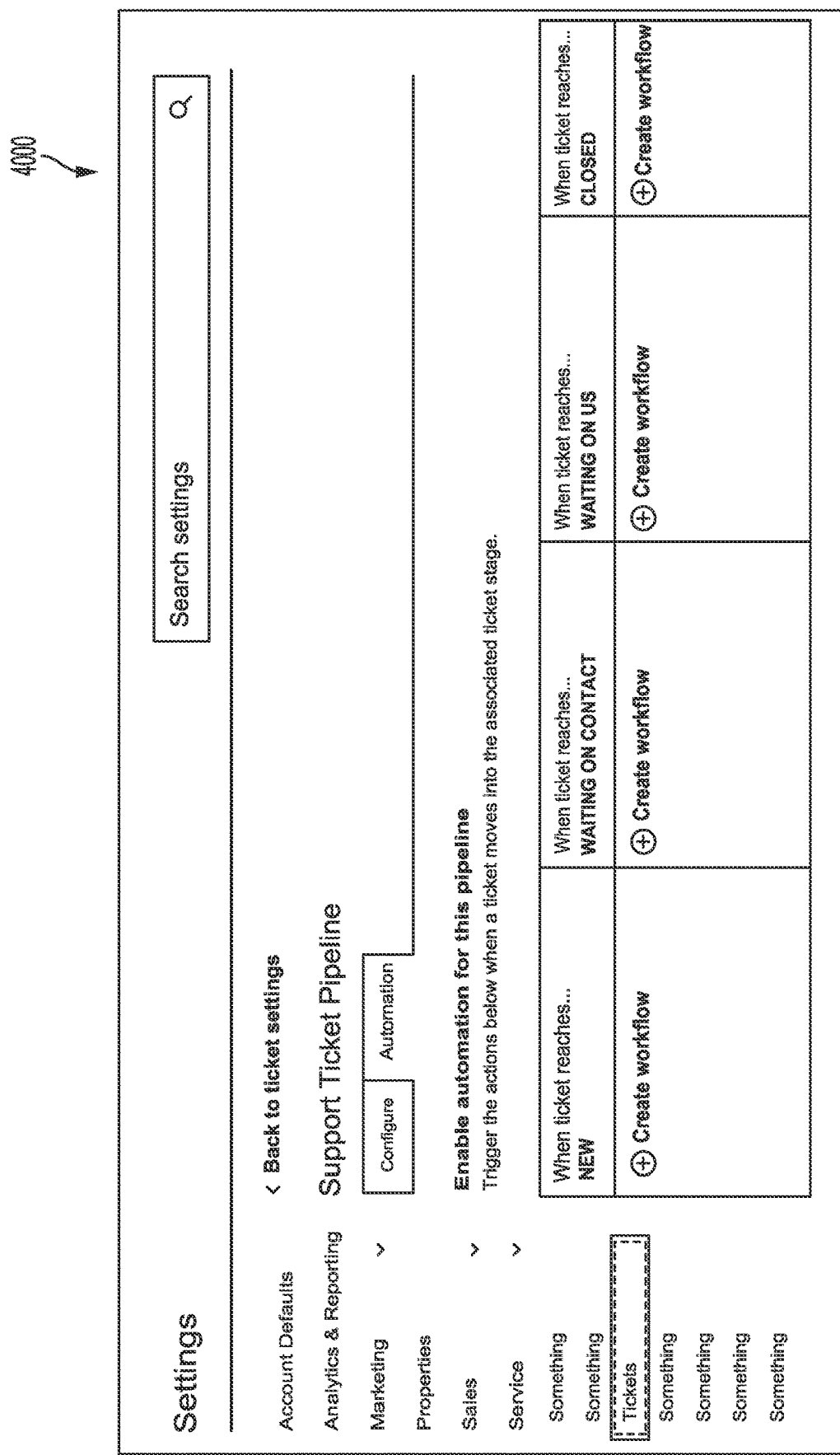
Figure 41:
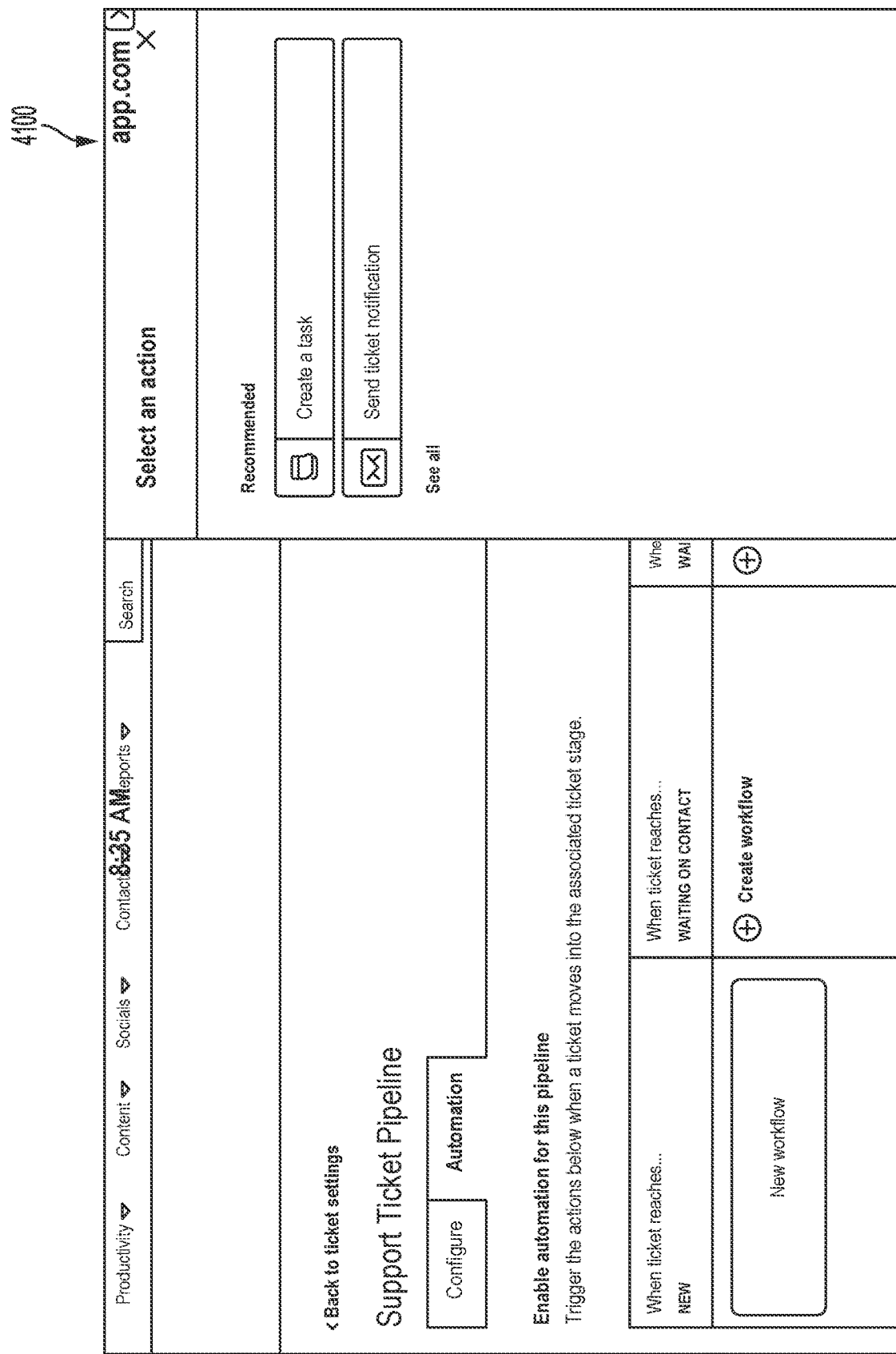
Figure 42:
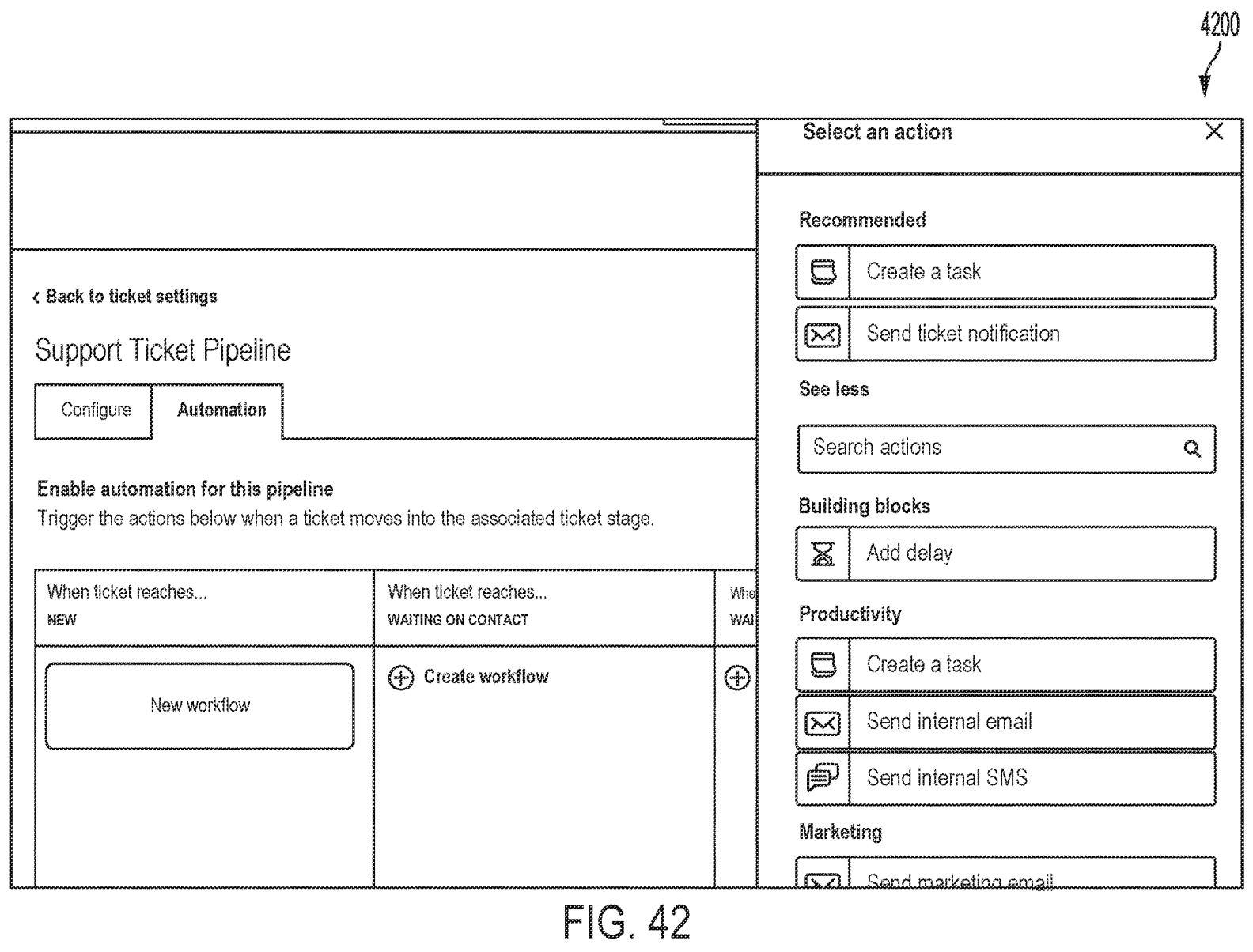
Figure 43:
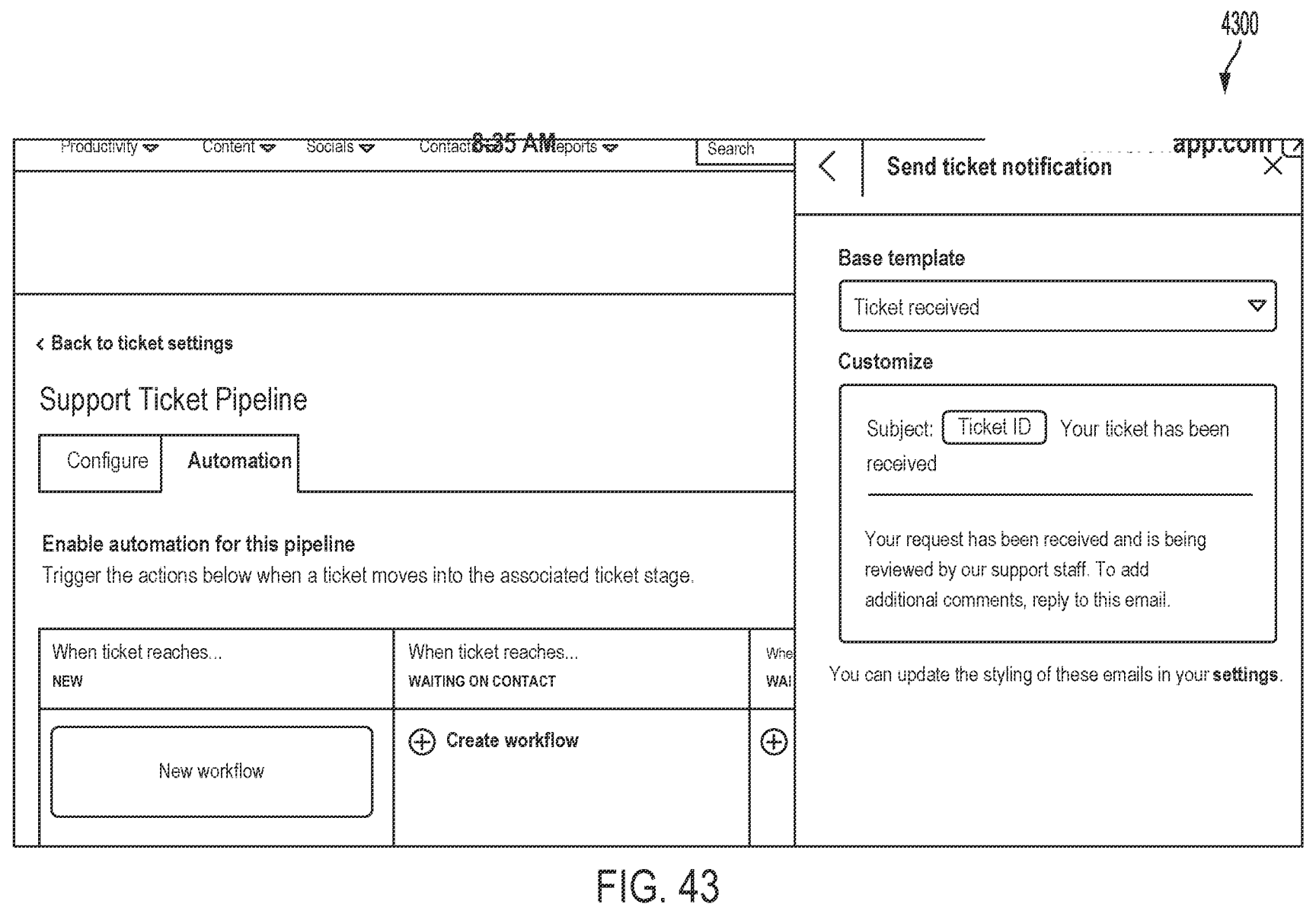
Figure 44:
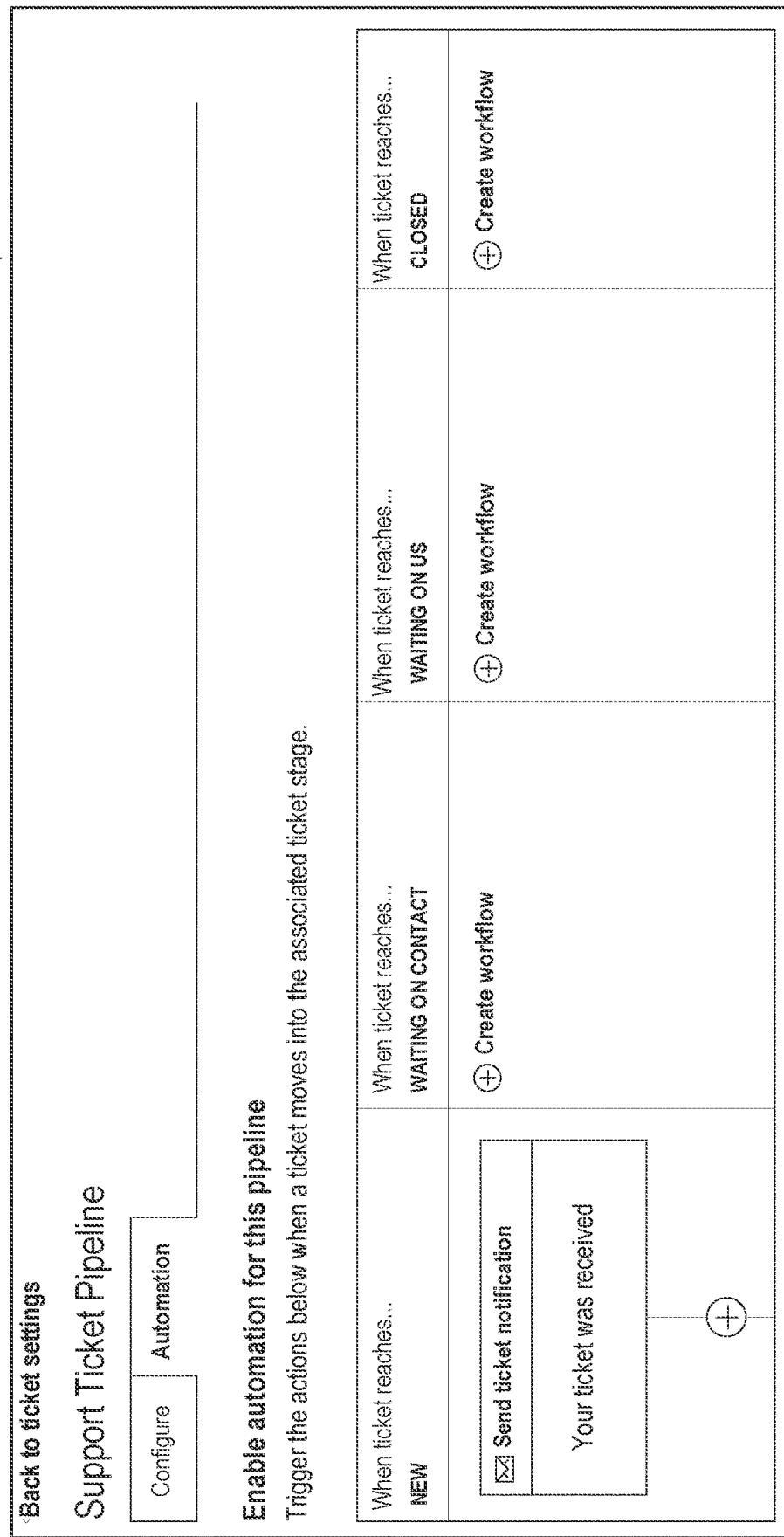

FIGS. 40-44 illustrate examples of GUI 4000 that allow a user of a client to customize service workflows of the client with respect to a ticket pipeline. In the example of FIG. 40, the GUI 4000 presents a ticket pipeline that defines a set of triggering conditions that automate the processing of a ticket, such as the ticket reaching a "new ticket" status when a customer initiates a new ticket, a ticket reaching "waiting on contact" status when customer is expected to make contact with the client, a "waiting on us" status when the client is expected to take action to close the ticket, and a "closed" status when the ticket is closed. The foregoing statuses are provided for a non-limiting example of a ticket pipeline. For each status, the user is presented with the option of defining a workflow when a ticket is in that status. In FIG. 41, the user has elected to define a workflow with respect to the "new" ticket status. The user is presented with a menu that allows the user to create a new custom task or to automatically send a ticket notification (e.g., an email indicating the generation of a new ticket). The example of FIG. 42, the GUI 4000 presents a menu with additional options that are organized based on the action type, whereby the user can select an action from a set of actions presented in the menu. The example menu of actions includes creating a new task, sending a ticket notification, adding a delay, creating a task, sending an internal email, sending an internal SMS, sending an internal SMS message, and the like. In the example of FIG. 43, the user has selected the ticket notification action. In response to the selection, the GUI 4000 presents the user with the option to draft an email template. In the example, the user provides the email template, including template fields such as "Ticket ID" that may be populated with the ticket ID of the newly generated ticket. In the example of FIG. 44, the user has created a workflow action with respect to the new ticket status. The GUI 4000 displays the workflow action with respect to the corresponding new ticket status.

The example GUIs of FIGS. 37-44 are provided as non-limiting examples of GUIs that allow a user to define example customization parameters. The client configuration system 1602 may allow a user to customize additional or alternative service features, some of which are described in greater detail below.

Referring back to FIG. 16, in embodiments, in response to receiving a client's customization parameters, the client configuration system 1602 may configure and deploy a client-specific service system. In embodiments, the platform 1600 implements a microservices architecture, whereby each client-specific service system may be configured as a collection of coupled services. In embodiments, the client configuration system 1602 may configure a client-specific service system data structure that defines the microservices that are leveraged by an instance of the client-specific service system data structure (which is a client-specific service system). A client-specific service system data structure may be a data structure and/or computer readable instructions that define the manner by which certain microservices are accessed and the data that is used in support of the client-specific service system. For example, the client-specific service system data structure may define the microservices that support the selected service features and may include the mechanisms by which those microservices are accessed (e.g., API calls that are made to the respective microservices and the customization parameters used to parameterize the API calls). The client configuration system 1602 may further define one or more database objects (e.g., contact records, ticket records, and the like) from which database records (e.g., My SQL™ database records) are instantiated. For example, the client configuration system 1602 may configure ticket objects for each type of ticket, where each ticket object defines the ticket attributes included in tickets having the type. In embodiments, the client configuration system may include any software libraries and modules needed to support the service features defined by the client in the client-specific service system data structure. The client-specific service system data structure may further include references to the proprietary database 1620 and/or the knowledge graph 1622, such that a deployed client-specific service system may have access to the proprietary database 1620 and the knowledge graph 1622.

In embodiments, the client configuration system 1602 may deploy a client-specific service system based on the client-specific service system data structure. In some of these embodiments may instantiate an instance of the client-specific service system from the client-specific service system data structure, whereby the client-specific service system may begin accessing the microservices defined in the client-specific service system data structure. In some of these embodiments, the instance of the client-specific service system is a container (e.g., a Docker® container) and the client-specific service system data structure is a container image. In these embodiments, the container is configured to access the microservices, which may be containerized themselves.

In embodiments, the ticket management system 1604 manages various aspects of a ticket. The ticket management system 1604 may generate new tickets, assign tickets to new tickets to respective ticket pipelines, manage pipelines including updating the status of tickets as the ticket moves through the various stages of its lifecycle, managing workflows, and the like. In some embodiments, the ticket management system 1604 is implemented as a set of microservices, where each microservice performs a respective function.

In embodiments, the ticket management system 1604 is configured to generate a new ticket on behalf of a client-specific service system. In some of these embodiments, the ticket management system 1604 may listen for requests to generate a new ticket (e.g., an API call requesting a new ticket). The request may include information needed to generate the new ticket, including a ticket type, a subject, a description, a contact identifier, and/or the like. The request may be received in a number of different manners. For example, a request may be received from a contact request (e.g., a contact fills out a form from the client's website or a website hosted by the platform 1600 on behalf of the client), a chat bot (e.g., when a contact raises a specific issue in a chat with the chat bot), via a customer service specialist (e.g., the client calls a service specialist and the service specialist initiates the request), and the like. In response to receiving a ticket request, the ticket management system 1604 generates a new ticket from a ticket object corresponding to the ticket type. The ticket management system 1604 may include values in the ticket attributes of the ticket based on the request, including the ticket type attribute, the subject attribute, the description attribute, the date/time created attribute (e.g., the current date and/or time), the last update attribute (e.g., the current date and/or time), the owner attribute (e.g., the contact identifier), and the like. Furthermore, in some embodiments, the ticket management system 1604 may assign a ticket to a ticket pipeline of the client-specific service system and may update the pipeline attribute to indicate the ticket pipeline to which it was assigned and the status attribute to indicate the status of the ticket (e.g., "new ticket"). In embodiments, the ticket management system 1604 may store the new ticket in the proprietary database 1620 (e.g., a ticket database).

In embodiments, the ticket management system 1604 manages ticket pipelines and triggers workflows defined in the ticket pipelines. In some embodiments, the ticket management system 1604 is configured to manage the ticket pipelines and trigger workflows using a multi-threaded approach. In embodiments, the ticket management system 1604 deploys a set of listening threads that listen for tickets having a certain set of attribute values. In these embodiments, each time a ticket is updated in any way (e.g., any time a ticket attribute value is newly defined or altered), each listening thread determines whether the attribute values indicated in the updated ticket are the attribute values that the listening thread is listening for. If the listening thread determines that the attribute values indicated in the updated ticket are the attribute values that the listening thread is listening for, the listening thread may add the ticket to a ticket queue corresponding to the listening thread. For example, a listening thread may listen for tickets having a ticket attribute that indicates that a communication was sent to a contact requesting further information. In response to identifying a ticket having a ticket attribute that indicates that the communication was sent to the contact, the listening thread may add the ticket to the ticket queue. Once in the ticket queue, the ticket management system 1604 may update the ticket status attribute of the ticket, and may trigger one or more workflows defined with respect to the ticket status. For example, a workflow may trigger the client-specific system to schedule a follow up email if no response is received from the contact within a period of time (e.g., three days).

In some embodiments, the ticket management system 1604 manages workflows on behalf of a client-specific service system. In some embodiments, the ticket management system 1604 is configured to manage workflows using a multi-threaded approach. In embodiments, the ticket management system 1604 deploys a set of workflow listening threads that listen for tickets having a certain set of attribute values. In these embodiments, each time a ticket is updated in any way (e.g., any time a ticket attribute value is newly defined or altered), each workflow listening thread determines whether the attribute values indicated in the updated ticket are the attribute values that the workflow listening thread is listening for. If the workflow listening thread determines that the attribute values indicated in the updated ticket are the attribute values that the workflow listening thread is listening for, the listening thread may add the ticket to a ticket queue corresponding to the workflow listening thread. Once a ticket is added to a ticket queue corresponding to the workflow listening thread, the ticket management system 1604 may execute the workflow with respect to the ticket. For example, during a conversation with a chat bot, a workflow listening thread may listen for a sentiment attribute value that indicates that the contact is frustrated. When the chat bot (e.g., using NLP) determines that the contact is frustrated (e.g., the sentiment score is below or above a threshold), the chat bot may update the sentiment attribute of a ticket corresponding to the contact to indicate that the contact is frustrated. In response, a workflow listening thread may identify the ticket and add it to its queue. Once in the queue, the workflow may define actions that are to be performed with respect to the ticket. For example, the workflow may define that the ticket is to be routed to a service-specialist. In this example, the contact may be routed to a service-specialist, which may include updating the status of the ticket and providing any relevant ticket data to the service-specialist via a service-specialist portal.

In embodiments, the conversation system 1606 is configured to interact with a human to provide a two-sided conversation. In embodiments, the conversation system 1606 is implemented as a set of microservices that can power a chat bot. The chat bot may be configured to leverage a script that guides a chat bot through a conversation with a contact. As mentioned, the scripts may include a decision tree that includes rules that trigger certain responses based on an understanding of input (e.g., text) received from a user. For example, in response to a contact indicating a troubleshooting step performed by the contact, the script may define a response to output to the contact defining a next step to undertake. In some embodiments, the rules in a script may further trigger workflows. In these embodiments, the chat bot may be configured to update a ticket attribute of a ticket based on a trigged rules. For example, in response to identifying a troubleshooting step performed by the contact, the chat bot may update a ticket corresponding to the contact indicating that the client had unsuccessfully performed the troubleshooting step, which may trigger a workflow to send the contact an article relating to another troubleshooting step from the client's knowledge base.

In embodiments, the conversation system 1606 may be configured to implement natural language processing to effectuate communication with a contact. The conversation system 1606 may utilize machine learned models (e.g., neural networks) that are trained on service-related conversations to process text received from a contact and extract a meaning from the text. In embodiments, the models leveraged by the conversation system 1606 can be trained on transcripts of customer service live chats, whereby the models are trained on both what the customer is typing and what the customer service specialist is typing. In this way, the models may determine a meaning of input received from a contact and the chat bots may provide meaningful interactions with a contact based on the results of the natural language processing and a script.

In embodiments, the conversation system 1606 is configured to relate the results of natural language processing with actions. Actions may refer to any process undertaken by a system. In the context of customer service, actions can include "create ticket," "transfer contact to a specialist," "cancel order," "issue refund," "send content," "schedule demo," "schedule technician," and the like. For example, in response to natural language processing speech of a contact stating: "I will not accept the package and I will just send it back," the conversation system 1606 may trigger a workflow that cancels an order associated with the contact and may begin the process to issue a refund.

In embodiments where the platform 1600 supports audible conversations, the conversation system 1606 may include voice-to-text and text-to-speech functionality as well. In these embodiments, the conversation system 1606 may receive audio signals containing the speech of a contact and may convert the contact's speech to a text or tokenized representation of the uttered speech. Upon formulating a response to the contact, the conversation system 1606 may convert the text of the response to an audio signal, which is transmitted to a contact user device 1680.

In embodiments, the machine learning system 1608 may be configured to perform various machine learning tasks for of the platform 1600. The machine learning system 1608 may be implemented as a set of machine learning related microservices.

In some embodiments, the machine learning system 1608 trains and reinforces models (e.g., neural networks, regression-based models, Hidden Markov models, decision trees, and/or the like) that are used by the platform 1600. The machine learning system 1608 can train/reinforce models that are used in natural language processing, sentiment and/or tone analysis, workflow efficacy analysis, and the like. The machine learning system 1608 may train models using supervised, semi-supervised, and/or unsupervised training techniques. In embodiments, the machine learning system 1608 is provided with training data relating to a particular type of task, which it uses to train models that help perform the particular task. Furthermore, in embodiments, the machine learning system 1608 may interact with the feedback system 1610 to receive feedback from contacts engaging with the platform 1600 to improve the performance of the models. More detailed discussions relating to various machine learning tasks are discussed in greater detail throughout this disclosure.

In embodiments, the feedback system 1610 is configured to receive and/or extract feedback regarding interactions with a contact. The feedback system 1610 may receive feedback in any suitable manner. For example, a client-specific service system may present a contact with questions relating to a ticket (e.g., "was this issue resolved to your liking?" or "on a scale of 1-10 how helpful was this article?") in a survey, during a chat bot communication, or during a conversation with a customer service specialist. A contact can respond to the question and the feedback system 1610 can update a contact's records with the response and/or pass the feedback along to the machine learning system 1608. In some embodiments, the feedback system 1610 may send surveys to contacts and may receive the feedback from the contacts in responsive surveys.

In embodiments, the client configuration module 1602 provides a GUI by which clients can customize aspects of their respective feedback systems. For example, the client configuration module 1602 may allow a user of a client to define events that trigger a request for feedback from a contact, how long after a particular triggering event to wait until requesting the feedback, what mediums to use to request the feedback (e.g., text, phone call, email), the actual subject matter of respective requests for feedback, and/or the look and feel of the requests for feedback. The user can define surveys, including questions in the survey and the potential answers for the questions. Examples of GUIs that allow a client to customize its feedback system are provided below.

FIGS. 27-35 illustrate example GUIs 2700, 2900 that allow a user corresponding to a client to customize different aspects of the client's respective feedback system. For example, the GUI 2700 allows the user to define the properties of a contact that is to receive a request for feedback and when to send the feedback request. For example, FIGS. 27, 28, 34, and 35 illustrate examples of the GUI 2700 that allows the user to define the properties of a contact that is to receive a request for feedback and when to send the feedback request. The GUI 2700 may also allow a user to customize the types of questions asked (e.g., score an aspect of the client's business, ask for questions for determining a net promoter score, follow up questions and the like), the actual content of the questions, and the look and feel of the feedback request. For example, FIGS. 29-33 illustrate examples of a GUI 2900 that allows a user to customize the types of questions asked, the actual content of the questions, and the look and feel of the feedback request.

In embodiments, the feedback system 1610 may be configured to extract feedback from an interaction with a contact. In these embodiments, the feedback system 1610 may perform tone and/or sentiment analysis on a conversation with a contact to gauge the tone or sentiment of the contact (e.g., is the contact upset, frustrated, happy, satisfied, confused, or the like). In the case of text conversations, the feedback system 1610 can extract tone and/or sentiment based on patterns recognized in text. For example, if a user is typing or uttering expletives or repeatedly asking to speak with a human, the feedback system 1610 may recognize the patterns in the text and may determine that the user is likely upset and/or frustrated. In the case of audible conversations, the feedback system 1610 can extract features of the audio signal to determine if the contact is upset, frustrated, happy, satisfied, confused, or the like. The feedback system 1610 may implement machine learning, signal processing, natural language processing and/or other suitable techniques to extract feedback from conversations with a contact.

Figure 17C:
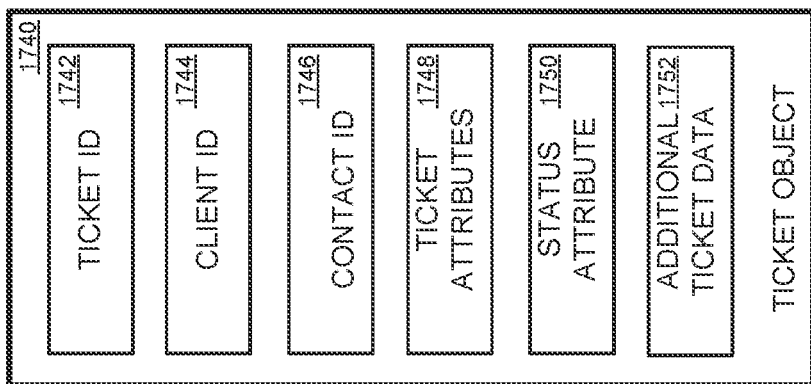
FIG. 17C illustrates an example of a ticket database object according to one or more embodiments of the disclosure.
Figure 17B:
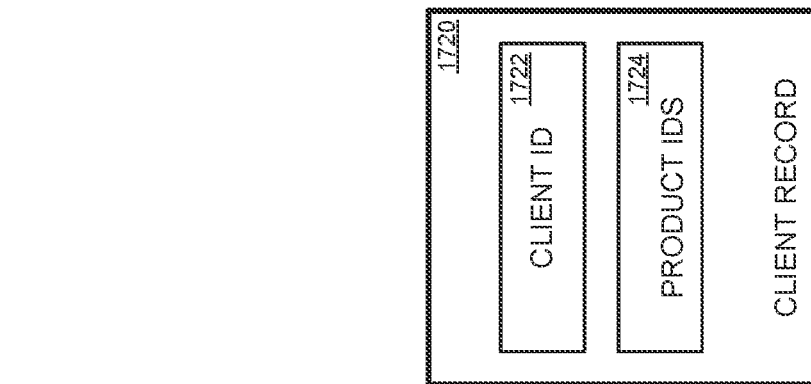
FIG. 17B illustrates an example of a client database object according to one or more embodiments of the disclosure.
Figure 17A:
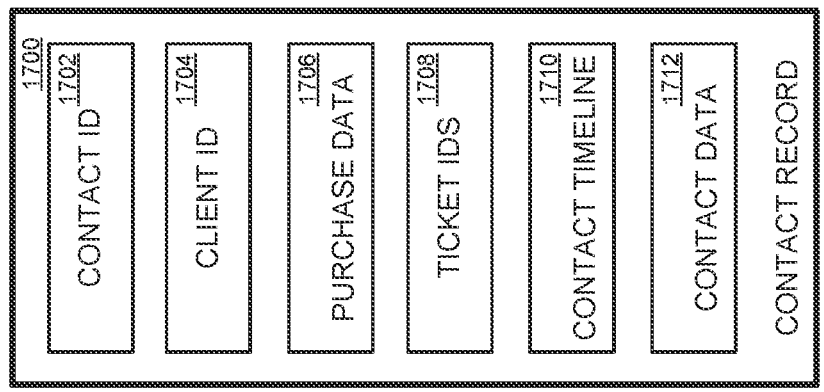
FIG. 17A illustrates an example of a contact database object according to one or more embodiments of the disclosure.

In embodiments, the proprietary database(s) 1620 may store and index data records. In embodiments, the proprietary database(s) 1620 may store contact records, client records, and/or ticket records. The proprietary database(s) 1620 may store additional or alternative records as well, such as product records, communication records, deal records, and/or employee records. FIGS. 17A-17C illustrate example high level schemas of contact records 1700 (FIG. 17A), client records 1720 (FIG. 17B), and ticket records 1740 (FIG. 17C).

FIG. 17A illustrates an example schema of a contact database record 1700. In embodiments, the contact data record 1700 may include a contact ID 1702, a client ID 1704, a purchase data 1706, ticket IDs 1708, a contact timeline 1710, and a contact data 1712. The contact identifier ("ID") 1702 may be a unique value (e.g., string or number) that uniquely identifies the contact from other contacts. It is noted that in some embodiments the client ID 1704 is specific to a relationship between a contact and a client, whereby the contact may only relate to a single client. If a certain individual interacts with multiple clients, then the contact may have multiple contact records associated therewith (i.e., one for each client, where the contact is a customer of different clients (businesses) for the respective products or services of the businesses). The client ID 1704 indicates the client to which the contact corresponds. In embodiments, the client ID 1704 may be a reference to the client record 1720. In this way, the client ID 1704 defines the relationship between the contact and the client. The purchase data 1706 indicates all of the purchases made by the contact with respect to the client. In embodiments, the purchase data may indicate the products and/or services purchased by the client and the dates on which such products or services were purchased. In some embodiments, the products and services may be presented by product IDs. The ticket IDs 1708 indicate any tickets that have been issued with respect to the client. In embodiments, the ticket IDs 1708 include any tickets, resolved or unresolved, that have been issued with respect to the contact. In other embodiments, the ticket IDs 1708 may only include the tickets IDs 1708 that are still open.

In embodiments, the contact timeline 1710 includes a timeline documenting the contact's interaction with the client. The contact timeline may include data from the point in time when the contact was solicited as a lead, when purchases were made by the contact, when tickets were generated on behalf of the contact, when communications were sent to the contact, and the like. Thus, the contact data 1712 and the timeline 1710 provide a rich history of all interactions of the contact with the client, over the lifecycle of a relationship. As a result, an individual, such as a salesperson or service professional, can understand and reference that history to provide relevant communications. More generally, the contact data 1712 may include any data that is relevant to the contact with respect to client. The contact data 1712 may include demographic data (e.g., age and sex), geographic data (e.g., address, city, state, country), conversation data (e.g., references to communications that were engaged in with the client), contact information (e.g., phone number, email address, user name), and the like. Contact data may further include information such as a date that the contact was entered into the system, lifecycle state (what is the current relationship with the contact—current customer, lead, or service only), last purchase date, recent purchase dates, on boarding dates, in-person visit dates, last login, last event, last date a feature was used, demos presented to the contact, industry vertical of the contact, a role of the contact, behavioral data, net promoter score of the contact, and/or a contact score (e.g., net value of the contact to the client or a net promoter score).

It is noted that in some embodiments, the contact record 1700 may be used across multiple platforms, such that the contact record 1700 defines data relevant to the contact through the lifecycle of the contact (e.g., from new lead and/or buyer through customer service). In this way, customer service may be integrated with the sales arm of the client's business. For example, a contact record 1700 corresponding to a warehouse manager (a contact) that purchased an industrial furnace from an HVAC business (a client) may identify or otherwise reference the dates on which the warehouse manager was first contacted, all communications sent between the manager and the HVAC business, a product ID of the furnace, and any tickets that have been initiated by the contact on behalf of the warehouse, and the like. Thus, in some embodiments, the integration of the client's sales and marketing data with the client's customer service infrastructure allows a client-specific service system to address issues with a more complete view of the contact's data and reduces the need for APIs to connect typically unconnected systems (e.g., invoicing system, CRM, contact database, and the like). The foregoing database object is provided for example. Not all the data types discussed are required and the object may include additional or alternative data types not herein discussed.

FIG. 17B illustrates an example schema of a client database record 1720. In embodiments, a client database record 1720 may include a client ID 1722 and one or more product IDs 1724. The client ID 1722 may be a unique value (e.g., string or number) that uniquely identifies the client from other clients. The product IDs 1724 identify/reference products (e.g., goods, services, software) that are offered by the client. The product ID 1724 of a product may reference a product record (not shown) that includes data relating to the product, including warranty data, serial numbers, and the like. The foregoing database object is provided for example. Not all the data types discussed are required and the object may include additional or alternative data types not herein discussed.

FIG. 17C illustrates an example schema of a ticket database record 1740. In embodiments, the ticket database record 1740 may include a ticket ID 1742, a client ID 1744, a contact ID 1746, ticket attributes 1748 including a status attribute 1750, and other additional ticket data 1752. The ticket database record 1740 stores the types of ticket attributes that may be used to identify, track, and/or manage a ticket issued on behalf of a client. The ticket ID 1742 is a unique value (e.g., string or number) that uniquely identifies a ticket from other tickets. The client ID 1744 is a value that indicates the client with respect to which the ticket was issued. As can be appreciated, the client ID 1744 may point to the client record 1720 of a particular client. The contact ID 1746 indicates the contact that initiated the ticket. As can be appreciated, the contact ID 1746 may point to the contact record 1720 of the contact that initiated the ticket. The ticket attributes 1748 may include or reference any data tied to the ticket. As discussed, the ticket attributes may include default ticket attributes and/or custom ticket attributes. Examples of default ticket attributes may include a ticket priority attribute (e.g., high, low, or medium), a ticket subject attribute (e.g., what is the ticket concerning), a ticket description attribute, a pipeline ID attribute, a creation date attribute, a last update attribute, and the like. The custom ticket attributes may depend on the customizations of the customer. In an example, the custom ticket attributes may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a product ID attribute that indicates a product to which the ticket corresponds, a contact frequency attribute indicating a number of times a contact has been contacted, a media asset attribute indicating media assets (e.g., articles or videos) that have been sent to the contact during the ticket's lifetime, and the like. In embodiments, the ticket attributes may further include the ticket status attribute 1750. The ticket status attribute 1750 can indicate a status of the ticket. The status may be defined with respect to the ticket pipeline of the client. For example, example statuses may include: ticket is opened but not acted upon, waiting for customer response, at a chat bot stage, at service specialist, at visit stage, at refund state, issue resolved, and the like. In embodiments, the ticket record 1740 may include additional ticket data 1752. In embodiments, the additional ticket data 1752 may include or reference the specialist or specialists that have helped service the ticket (e.g., employee IDs), any notes entered by specialists, a number of notes entered by the specialists, a list of materials that have been sent to the contact during attempts to resolve the issue, and the like. In embodiments, the additional ticket data 1752 may include references to transcripts of conversations with the contact over different mediums. For example, the additional ticket data 1752 may include or reference conversations had with a bot, over email, in text message, over social media, and/or with a customer service specialist. The additional ticket data 1752 may additionally or alternatively include analytics data. For example, the ticket status attribute 1750 may include a sentiment or tone of the contact throughout the timeline, feedback from the contact, a contact score of the client, and the like.

In embodiments, the additional ticket data 1752 may include or reference a ticket timeline. A ticket timeline may indicate all actions taken with respect to the ticket and when those actions were taken. In some embodiments, the ticket timeline may be defined with respect to a client's ticket pipeline and/or workflows. The ticket timeline can identify when the ticket was initiated, when different actions define in the workflow occurred (e.g., chat bot conversation, sent link to FAQ, sent article, transferred to customer service specialist, made house call, resolved issue, closed ticket, and the like). The ticket timeline of a ticket record 1740 can be updated each time a contact interacts with a client-specific service system with respect to a particular ticket. In this way, many different types of information can be extracted from the ticket timeline (or the ticket record in general). For example, the following information may be extracted: How long a ticket took to come through the pipeline (e.g., how much time was needed to close the ticket); how many interactions with the system did the contact have; how much time passed until the first response was provided; how long did each stage in the pipeline take; how many responses were sent to the contact; how many communications were received from the contact; how many notes were entered into the record; and/or how many documents were shared with the contact.

In embodiments, the knowledge graph 1622 structures a client's knowledge base 1624. The knowledge base 1624 may refer to the set of media assets (e.g., articles, tutorials, videos, sound recordings) that can be used to aid a contact of the client. The knowledge base 1624 of a client may be provided by the client (e.g., uploaded by a user via an upload portal) and/or crawled on behalf of the client by the client configuration system 1602 (e.g., in response to receiving a root URL to begin crawling). In embodiments, media assets may be assigned topic headers that indicate the topics to which the media asset pertains. In this way, a link to a media asset may be displayed in relation to a topic heading and/or may be used by customer service specialists when providing links to a contact seeking assistance with an issue pertaining to the respective topic.

In embodiments where the knowledge graph 1622 structures the client knowledge base 1624, the knowledge graph 1622 may store relationship data relating to the knowledge base 1624 of a client. In embodiments, the knowledge graph 1622 may be the knowledge graph 210 discussed above. In other embodiments, the knowledge graph 1622 may be a separate knowledge graph. In embodiments, the knowledge graph 1622 includes nodes and edges, where the nodes represent entities and the edges represent relationships between entities. Examples of types of entities that may be stored in the knowledge graph 1622 include articles, videos, locations, contacts, clients, tickets, products, service specialists, keywords, topics, and the like. The edges may represent logical relationships between different entities.

Figure 18:
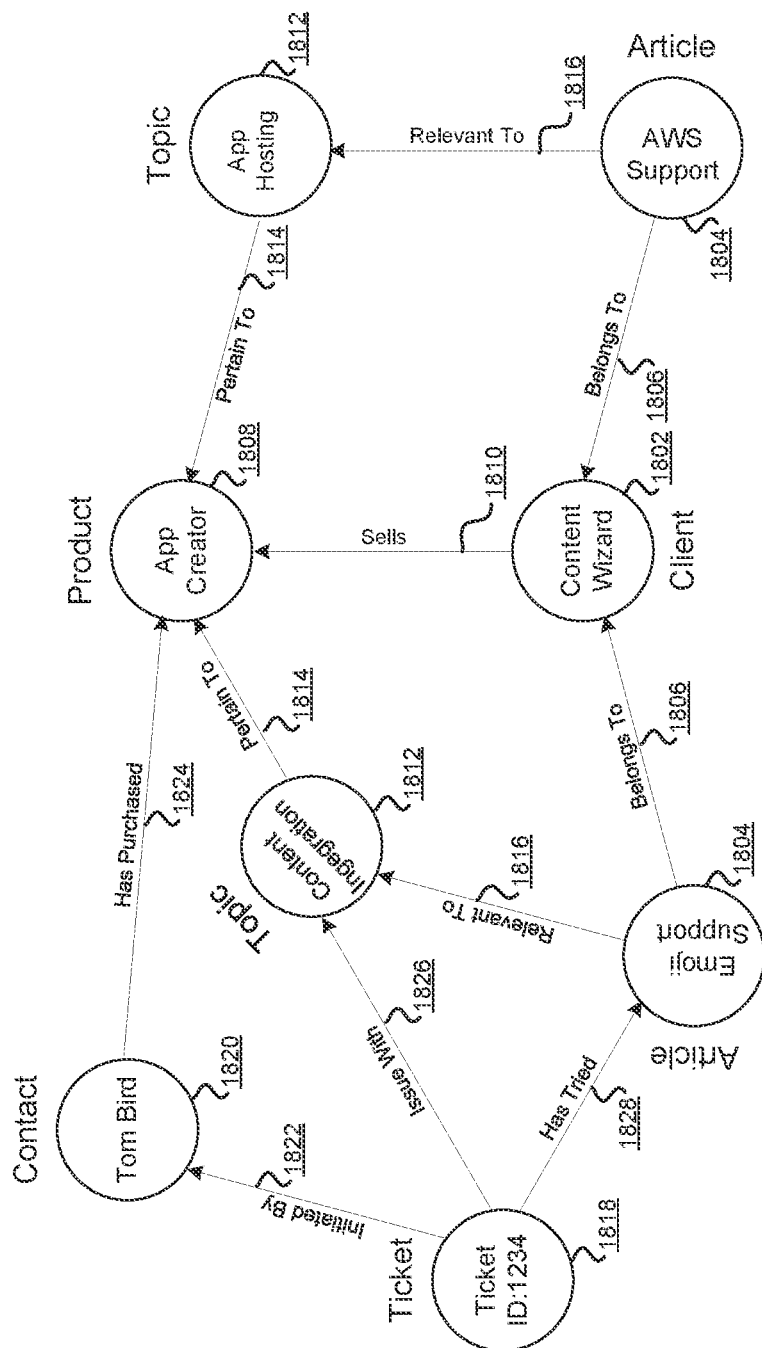
FIG. 18 depicts a visual representation of a portion of an example knowledge graph representation according to one or more embodiments of the disclosure.

FIG. 18 illustrates an example visualization of a portion of the knowledge graph 1622, which is one mechanism among various alternatives (including tables, key-value pairs, directed graphs, clusters, and the like) for representing objects and relationships among objects handled by the platform 1600, including contact objects, tickets, content objects (such as for communications), client objects, timeline objects, and many others. In the example of FIG. 18, the knowledge graph 1622 illustrates a segment of information relating to a knowledge base of a client that includes multiple media assets (e.g., articles). In this example, the client is a company called "Content Wizard" that provides a product called "App Creator." Amongst the topics that are relevant to App Creator are a "content integration" topic and an "app hosting" topic. An article entitled "Emoji Support" is relevant to the "content integration" topic, and an article entitled "AWS Support" is relevant to the "app hosting" topic. The knowledge graph 1622 may organize the client's knowledge base to reflect these relationships. For example, the knowledge graph 1622 may include a client node 1802 that indicates the client "Content Wizard" and article nodes 1804 that correspond to the "Emoji Support" article and the "AWS Support" article. Edges 1806 between the client node 1802 and the respective article nodes 1804 may indicate that the articles are part of the client's knowledge base. Furthermore, a product node 1808 corresponding to the "App Creator" product may be connected to the client node 1802 by an edge 1810 that indicates that Content Wizard sells App Creator. Topic nodes 1812 may connect to a product node 1808 via edges 1814 that indicate a topic that pertains to a product, such that content integration and app hosting are topics that pertain to App Creator. Furthermore, the topic nodes 1812 may be related to the article nodes 1804 (or other media asset nodes) by edges 1816 that indicate an article represented by the article node 1804 is relevant to the related topic.

Furthermore, in embodiments, the knowledge graph 1622 may organize additional data relating to a client. For example, the knowledge graph 1622 may include ticket nodes 1818 and contact nodes 1820. A ticket node 1818 may indicate a ticket that was issued on behalf of the client. A contact node 1820 may represent a contact of the client. In this example, the contact node 1820 may be related to a ticket node 1818 with an edge 1822 that indicates the ticket was initiated by the contact (e.g., ticket #1234 was initiated by Tom Bird). The contact node 1820 may relate to product nodes 1808 with edges 1824 that indicate the contact has purchased a respective product (e.g., Tom Bird has purchased App Creator). Furthermore, the ticket node 1818 may relate to topic node 1812 by an edge 1826 that indicates that the ticket for an issue with a topic (e.g., an issue with content integration). The ticket node 1818 may further relate to the article node 1804 with an edge 1828 indicating that the article has been tried during the servicing of the ticket. It should be appreciated that in these embodiments, additional or alternative nodes may be used to represent different entities in the customer-service workflow, (e.g., status nodes, sentiment nodes, date nodes, etc.) and additional or alternative edges may be used to represent relationships between nodes (e.g., "has the current status", "most recent sentiment was", "was contacted on", "was created on", "was last updated on", etc.).

The knowledge graph 1622 is a powerful mechanism that can support many features of a client-specific service system. In a first example, in response to a service specialist taking a call from the contact for a first time regarding a particular ticket, the client-specific service system 1900 may display a ticket history to the specialist that indicates that the user has purchased App Creator, that the contact's issue is with content integration, and that the contact has been sent the Emoji Support article. In another example, an automated workflow process servicing the ticket may retrieve the ticket node to learn that the contact has already been sent the Emoji Support article, so that it may determine a next course of action. In another example, an analytics tool may analyze all the tickets issued with a particular product and the issues relating to those tickets. The analytics tool, having knowledge of the client workflow, may drill down deeper to determine whether a particular article was helpful in resolving an issue. In another example, a chat bot may utilize the knowledge graph to guide conversations with a contact. For instance, in an interaction between Tom Bird and a chat bot, the chat bot may state: "I see that we've sent you the Emoji Support article, were you able to read it?" If Tom Bird indicates that he has read it (e.g., "Yes, I have"), the chat bot may create a relationship between the article node 1804 and the contact node 1820 indicating that Tom Bird has read the article. If Tom Bird indicates that he has not read the article, the chat bot may then send him a link to the article, which may be referenced in the knowledge graph 1622 by, for example, a "web address" entity node.

It is appreciated that the full knowledge graph 1622 may contain thousands, hundreds of thousands, or millions of nodes and edges. The example of FIG. 18 is a limited example to demonstrate the utility of the knowledge graph 1622 in a customer service setting. In embodiments, the platform 1600 can maintain separate knowledge graphs 1614 for separate clients or may have the knowledge graph 1622 that stores information relating to all clients.

The platform 1600 may add information to the knowledge graph 1622 in any suitable manner. For example, the client configuration system 1602 may employ a crawling system and an information extraction system, as was described in the disclosure with respect to FIG. 11 for example. In some embodiments, a crawling system may be seeded with one or more root URLs, from which the crawling system may begin crawling documents. In the example GUI 3700 of FIG. 37 (discussed below), a user can enter a root URL to seed the crawling system. Additionally or alternatively, the client configuration system 1602 can add information to the knowledge graph 1622 as it is provided by the client (e.g., via upload and/or API) or learned during operation (e.g., via the interactions with the contacts or clients). The client configuration system 1602 may implement any suitable ontology for structuring the knowledge graph 1622. Furthermore, the platform 1600 may add new entity types and relationship types to the knowledge graph of the ontology as they are discovered and/or become necessary.

Figure 19:
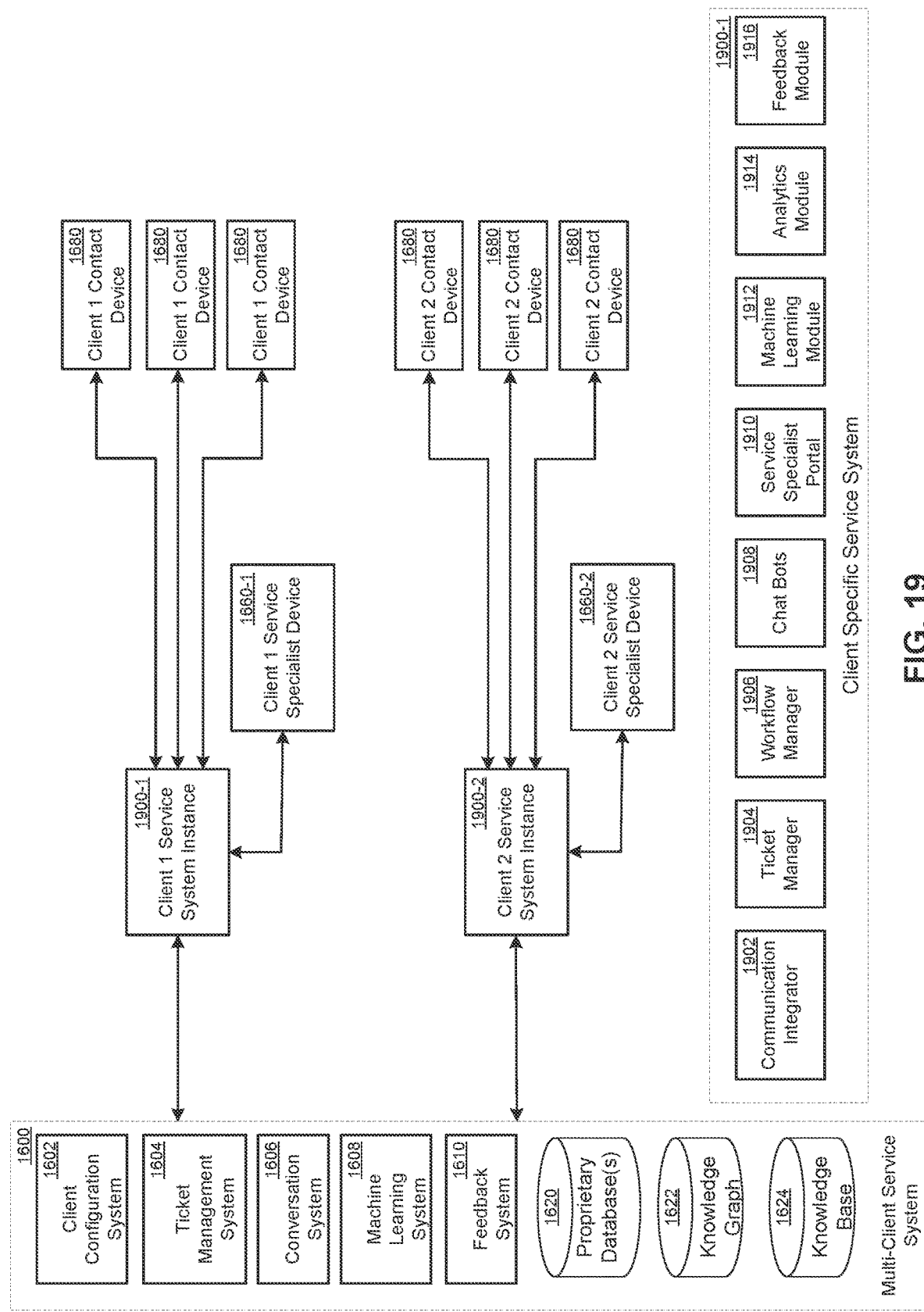
FIG. 19 illustrates an example of a multi-client service system platform providing service systems on behalf of two independent clients according to one or more embodiments of the disclosure.

FIG. 19 illustrates an example of a multi-client service platform 1600 deploying at least two separate client-specific service systems 1900. A first client-specific service system 1900-1 is deployed on behalf of a first client and a second client-specific service system 1900-2 is deployed on behalf of a second client. Each client-specific service system 1900 may be configured according to the client's selected service features and customization parameters. Thus, the first client-specific service system 1900-1 may provide a first set of service features, while the second client-specific service system 1900-2 may provide a second set of service features that may be different than the first set of service features. As discussed, the platform 1600 may be implemented according to a microservices architecture. In these embodiments, each client-specific service system 1900 may be configured to access a respective set of microservices. While some microservices will be used by all client-specific service systems 1900 (e.g., authentication microservices, database services, etc.), other microservices may be accessed by a client-specific service system 1900 only if the client has selected service features that are supported by the other microservices. In some of these embodiments, the client-specific service systems 1900 may be configured to access a set of APIs that leverage the microservices of the multi-client service platform 1600.

In an example configuration, a client-specific service system 1900 may include and/or may leverage one or more of a communication integrator 1902, a ticket manager 1904, a workflow manager 1906, chat bots 1908, service specialist portals 1910, a machine learning module 1912, an analytics module 1914, and/or a feedback module 1916. Depending on the service features selected by a client, a client-specific service system 1900 may not include one or more of the foregoing components. In embodiments, each client-specific service system 1900 may also access one or more proprietary databases 1620, the knowledge graph 1622, and/or the knowledge base 1624. In embodiments, each client-specific service system 1900 may have client specific proprietary databases 1620, knowledge graph 1622, and/or knowledge base 1624 that only the client-specific service system 1900 may access. Alternatively, one or more proprietary databases 1620, the knowledge graph 1622, and/or the knowledge base 1624 may be shared amongst client-specific service systems 1900.

In embodiments, a client-specific service system 1900 may include one or more APIs that allow the client to integrate one or more features of the client-specific service system 1900 in the client's websites, enterprise software, and/or applications. For example, a client website may include a chat feature, whereby the chat bot 1908 interacts with a contact through a chat bot interface (e.g., a text-based chat client) via an API that services the client website.

In embodiments, a communication integrator 1902 integrates communication with a contact over different mediums (e.g., chat bots, specialists, etc.), including the migration of the contact from one medium to another medium (e.g., website to chat bot, chat bot to specialist, website to specialist, etc.). In embodiments, the communication integrator 1902 may access one or more microservices of the platform 1600, including the microservices of the conversation system 1606. For example, in response to a contact engaging with the client's website, the communication integrator 1902 may access a chat bot microservice of the conversation system 1606, which then instantiates the chat bot 1908 that effectuates communication with the contact via a chat bot interface.

In embodiments, the communication integrator 1902 may be configured to determine when or be instructed (e.g., by the workflow manager 1906) to migrate a communication with a contact to another medium, and may effectuate the transfer to the different medium. For example, after a determination that the chat bot 1908 is ineffective in communicating with the contact, the communication integrator 1902 may transfer the contact to a customer service specialist portal 1910, where the contact can converse with a human (e.g., via a text-based chat client or by telephone). In embodiments, the communication integrator 1902 may operate in tandem with the machine learning module 1912 to determine when to migrate a contact to another communication medium. For example, if the machine learning module 1912 determines the text being typed by the contact indicates a frustration or anger on behalf of the contact, the communication integrator 1902 may instruct a chat bot to send a message stating that the case is being transferred to a specialist and may effectuate the transfer. In effectuating the transfer, the communication integrator 1902 may provide a snapshot of the contact's data and the ticket data to the specialist via, for example, the service specialist portal 1910.

In some embodiments, the communication integrator 1902 monitors each current communication session between a contact and the client-specific service system 1900. For example, the communication integrator 1902 may monitor open chat bot sessions, live chats with specialists, phone calls with specialists, and the like. The communication integrator 1902 may then determine or be instructed to migrate the communication session from a first medium to a second medium. In embodiments, the communication integrator 1902 or another suitable component may monitor the content of a communication session (e.g., using speech recognition and/or NLP) to determine that a communication session is to be transferred to a different medium. In the latter scenario, the other component may issue an instruction to the communication integrator 1902 to transfer the communication to another medium. In response, the communication integrator 1902 may retrieve or otherwise obtain information that is relevant to the current communication session, including a ticket ID, contact information (e.g., username, location, etc.), the current issue (e.g., the reason for the ticket), and/or other suitable information. This information may be obtained from the proprietary databases 1620 and/or the knowledge graph 1622 accessible to the client-specific service system 1900. The communication integrator 1902 may then transfer the communication session to a different medium. In some embodiments, the sequence by which a communication session is transferred (e.g., escalating from a chat bot to a specialist or escalating from a text-based chat to a phone call) is defined in a custom workflow provided by the client. The communication integrator 1902 may feed the obtained data to the medium. For example, if being transferred to a specialist, the communication integrator 1902 may populate a GUI of the specialist with the ticket information (e.g., ticket ID and current issue), contact information, the ticket status, transcripts of recent conversations with the contact, and/or the like. The communication session may then commence on the new medium without the contact having to provide any additional information to the system 1900.

In embodiments, the ticket manager 1904 manages tickets with respect to a ticket pipeline on behalf of the client. In embodiments, the ticket manager 1904 of a client-specific service system 1900 leverages the microservices of the ticket management system 1604 of the multi-client service platform 1600 to create, modify, track, and otherwise manage tickets issued on behalf of the client.

In embodiments, the ticket management system 1604 may create tickets on behalf of a respective client. The ticket management system 1604 may create a ticket in response to a number of different scenarios. For example, the ticket management system 1604 may create a ticket when a contact accesses the client's website and reports an issue or makes a customer service request. In this example, the contact may provide identifying information (e.g., name, account number, purchase number, email, phone number, or the like), a subject corresponding to the issue (e.g., a high level reason for initiating the ticket), and a description of the issue. In another example, the ticket management system 1604 may create a ticket in response to contact calling or messaging a customer service specialist with an issue, whereby the customer service specialist requests the new ticket. In this example, the customer service specialist may engage in a conversation (via a text-based chat, a video chat, or a phone call) with the contact and based on the conversation may fill out a ticket request containing identifying information (e.g., name of the contact, account number, purchase number, email of the contact, phone number of the contact, or the like), a subject corresponding to the issue (e.g., a high level reason for initiating the ticket), and a description of the issue. In another example, the ticket management system 1605 may receive a request to create a ticket from a chat bot. In this example, the chat bot may engage in a conversation (via a text-based chat or a phone call) with the contact in accordance with a script, whereby the script prompts the contact to provide identifying information (e.g., name of the contact, account number, purchase number, email of the contact, phone number of the contact, or the like), a subject corresponding to the issue (e.g., a high level reason for initiating the ticket), and a description of the issue. In response to the contact providing this information to the chat bot, the chat bot may issue a request to create a new ticket containing the provided information (e.g., using a ticket request template).

In response to a ticket request, the ticket manager 1904 may generate a new ticket based on the information contained in the request. In embodiments, the ticket manager 1904 may select a ticket object from a set of ticket objects that are customized by the client and may request a new ticket from the ticket management system 1604 using a microservice of the ticket management system 1604. For example, the ticket manager 1904 may select a ticket object based on the subject corresponding to the issue. The ticket manager 1904 may provide the request for the new ticket to the ticket management system 1604, whereby the ticket manager 1904 includes the ticket type, the identifying information, the subject, the description, and any other relevant data with the request. The ticket management system 1604 may then generate the new ticket based on the information provided with the request and may include additional attributes in the new ticket, such as a ticket status, a date/time created attribute, a last updated attribute, and the like. In creating the new ticket and setting the status of the ticket to a new ticket, the ticket management module 1604 may add the new ticket to a ticket pipeline of the client.

In embodiments, the ticket manager 1904 may manage one or more ticket pipelines of the client. As discussed, the ticket management system 1604 may run a set of pipeline listening threads that listen for changes to specific attributes of a ticket, whereby when a ticket pipeline listening thread identifies a ticket having attribute values that it is listening for, the ticket pipeline listening thread adds the ticket to a queue corresponding to the ticket pipeline listening thread. Once in the queue, the ticket is moved to a new stage of the pipeline, and the status attribute of the ticket may be updated to reflect the new stage. For example, a ticket pipeline of an ISP client may include the following stages: new ticket; in communication with contact; troubleshooting issue; obtaining feedback; and ticket closed. Once the ticket is created, it is moved into the new ticket stage of the pipeline. The new ticket stage of the pipeline may include one or more workflows that may be performed for tickets in the new ticket stage (e.g., send notification email to contact, assign to a customer service specialist, instruct customer service specialist to contact the contact, etc.). As the workflows are executed, the ticket attributes of a ticket may change, such that a pipeline listening thread may determine that a customer service specialist has reached out to the contact. In this example, the pipeline listening thread may move the ticket into a queue corresponding to the "in communication with contact" stage of the ticket pipeline.

In embodiments, the workflow manager 1906 performs tasks relating to the execution of workflows. As discussed, a workflow defines a set of actions to be undertaken when performing a service-related task in response to one or more conditions being met. In some scenarios, a workflow may be defined with respect to a pipeline stage. In these scenarios, a workflow may be triggered with respect to a ticket only when the ticket is in the respective stage. Furthermore, a workflow includes a set of conditions that trigger a workflow (whether the workflow is defined with respect to a ticket pipeline or independent of a ticket pipeline). In embodiments, the determination as to whether a workflow is triggered is based on the attributes of a ticket. As discussed, the ticket management system 1604 may deploy workflow listening threads that listen for tickets that meet the conditions of a particular workflow. Upon determining that a ticket meets the conditions of a workflow (or put another way, a ticket triggers a workflow), the workflow listening thread adds the ticket to a workflow queue corresponding to the workflow listening thread.

In embodiments, the workflow manager 1906 may execute workflows and/or facilitate the execution of workflows of a client. In some embodiments, the workflow manager 1906 may be implemented in a multi-threaded manner where the different threads serve respective workflows. For each workflow, the workflow manager 1906 (e.g., a workflow manager thread) may dequeue a ticket from the workflow queue of the workflow. The workflow manager 1906 may then perform actions defined in the workflow and/or may request the execution of actions defined in the workflow from another component (e.g., a microservice). For example, a client may configure the ticket pipeline to include a workflow where a notification email is sent to the contact initiating the contact. Upon a new ticket being generated the workflow manager 1906 may retrieve an email template corresponding to new ticket notifications, may generate the notification email based on the email template and data from the ticket and/or a contact record of the intended recipient, and may send the email to the contact. In another example, a workflow may define a series of actions to be performed after a ticket is closed, including sending a survey and following up with the recipient of the survey who does not respond within a period of time. In this example, the workflow manager 1906 may instruct the feedback module 1916 to send a survey to the contact indicated in the ticket. If the feedback is not received within the prescribed time, the workflow manager 1906 may instruct the feedback module 1916 to resend the survey in a follow up email. The workflow manager 1906 may perform additional or alternative functions in addition to the functions described in the disclosure without departing from the scope of the disclosure.

In embodiments, the chat bot 1908 may be configured to engage in conversation with a human. The chat bot 1908 may utilize scripts, natural language processing, rules-based logic, natural language generation, and/or generative models to engage in a conversation. In embodiments, an instance of a chat bot 1908 may be instantiated to facilitate a conversation with a contact. Upon a contact being directed to the chat bot 1908 (e.g., by the communication integrator 1902), the system 1900 may instantiate the new chat bot 1908. The system 1900 may initialize the chat bot 1908 with data relating to the contact. In embodiments, the system 1900 (e.g., the communication integrator 1902) may initialize the chat bot 1908 with a script that is directed to handle a particular type of conversation, a contact ID of a contact, and/or a ticket ID referencing a ticket initiated by the contact. For example, when a contact visits the client's webpage, an instance of a chat bot may be instantiated (e.g., by the communication integrator 1902), whereby the instance of the chat bot 1908 uses a script written for interacting with contacts coming to the client's page with service-related issues and a contact ID of the contact if available. In embodiments, the chat bot 1908 may obtain information from the proprietary database 1620 and/or the knowledge graph 1614 to engage in the conversation. Initially, the chat bot 1908 may use a script to begin a conversation and may populate fields in the script using information obtained from the proprietary database 1620, the knowledge graph 1622, a ticket ID, a contact ID, previous text in the chat, and the like. The chat bot 1908 may receive communication from the contact (e.g., via text or audio) and may process the communication. For example, the chat bot 1908 may perform natural language processing to understand the response of the user. In embodiments, the chat bot 1908 may utilize a rules-based approach and/or a machine learning approach to determine the appropriate response. For example, if the chat bot 1908, based on the contact's ticket history asks the contact if he is having an issue with content integration and the contact responds by typing "Yes, I can't get emoji to show up in my app," the chat bot 1908 may rely on a rule that states: if no content has been sent to the contact, then send relevant content. In this example, the chat bot 1908 may retrieve an article describing how to integrate emoji into an application and may send a link to the article to the contact (e.g., via a messaging interface or via email). In another example, the chat bot 1908 may provide a ticket timeline to the machine learning module 1912, which in turn may leverage a neural network to determine that the best action at a given point is to send a particular article to the contact. In this example, the chat bot 1908 may retrieve the article recommended by the machine learning module 1912 and may send a link to the article to the contact. In embodiments, the chat bot 1908 may utilize data from the knowledge graph 1622 to provide content and/or to generate a response. Continuing the previous example above, the chat bot 1908, in response to determining that the next communication is to include a link to an article, may retrieve (or may request that another component retrieve) a relevant article or video based on the knowledge graph 1622. Having the topic/type of issue, the chat bot 1908 can identify articles or content that are related to the product to which the ticket corresponds that are relevant to the topic/type of issue. The chat bot 1908 can then provide the content to the contact (e.g., email a link or provide the link in a chat interface). In some embodiments, the chat bot 1908 can also use the knowledge graph 1622 to formulate responses to the contact. For example, if the user asks about a particular product, the chat bot 1908 can retrieve relevant information relating to the product from the knowledge graph 1622 (e.g., articles or FAQs relating to the product). The chat bot 1908 may be configured to understand the ontology of the knowledge graph 1622, whereby the chat bot 1908 can query the knowledge graph to retrieve relevant data. For example, in response to a question about a particular product, the chat bot 1908 can retrieve data relating to the product using the product ID of the product, and may use its knowledge of the different types of relationships to find the answer to the contacts questions.

In embodiments, the chat bots 1908 may be configured to escalate the ticket to a specialist (e.g., via the communication integrator 1902) when the chat bot 1908 determines that it is unable to answer a contacts question (e.g., the results of NLP are inconclusive) or when the chat bot 1908 and/or based on tone and/or sentiment analysis (e.g., the chat bot determines that the contact is becoming upset, angry, or frustrated). In embodiments, tone or sentiment analysis can be performed as a part of the natural language processing that is performed on the contact's communications, such that a tone or sentiment score is included in the output of the natural language processing. In these embodiments, the chat bot 1908 may help conserve resources of a client, by serving as a triage of sorts when handling a ticket. When the ticket is unable to be resolved by the chat bot 1908, a workflow may require that the next step is to migrate the conversation to a service-specialist. In such a situation, the communication integrator 1902 may migrate the contact in accordance with the workflow manager's determination. For example, the communication integrator 1902 may transfer the contact to a service specialist, whereby the service specialist communicates with the contact via a live chat and may view relevant contact information and/or ticket information via the service specialist portal 1910.

The service specialist portal 1910 may include various graphical user interfaces that assist a service specialist when interacting with a contact or otherwise servicing a ticket of a contact. In embodiments, the service specialist portal may include chat interfaces, visualization tools that display a specialist's open tickets and/or various communication threads, analytics tools, and the like. Upon a contact and/or ticket being routed to a service specialist, the communication integrator 1902 may provide the specialist with all relevant data pertaining to the contact and/or the ticket. The communication integrator 1902 may retrieve this information from the proprietary database(s) 1620 and/or the knowledge graph 1622. In an example, the communication integrator 1902 may display the ticket timeline of the ticket (e.g., when events along the ticket manager 1904 were undertaken) in the service specialist portal 1910, the purchase history of the contact, any communications with the contact, and/or any content sent to the contact into a graphical user interface that displays relevant information to the specialist.

Figure 21:
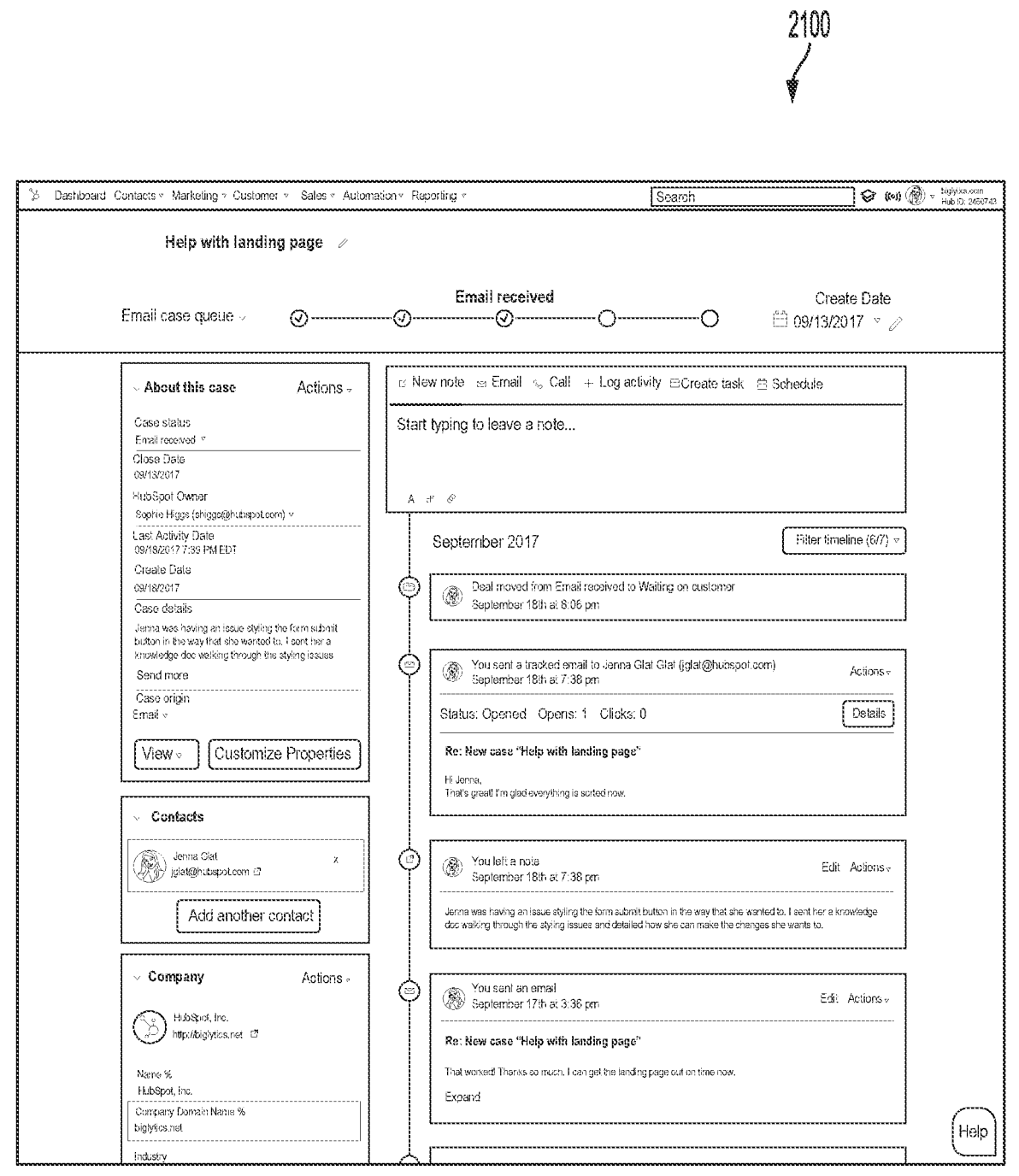
Figure 22:
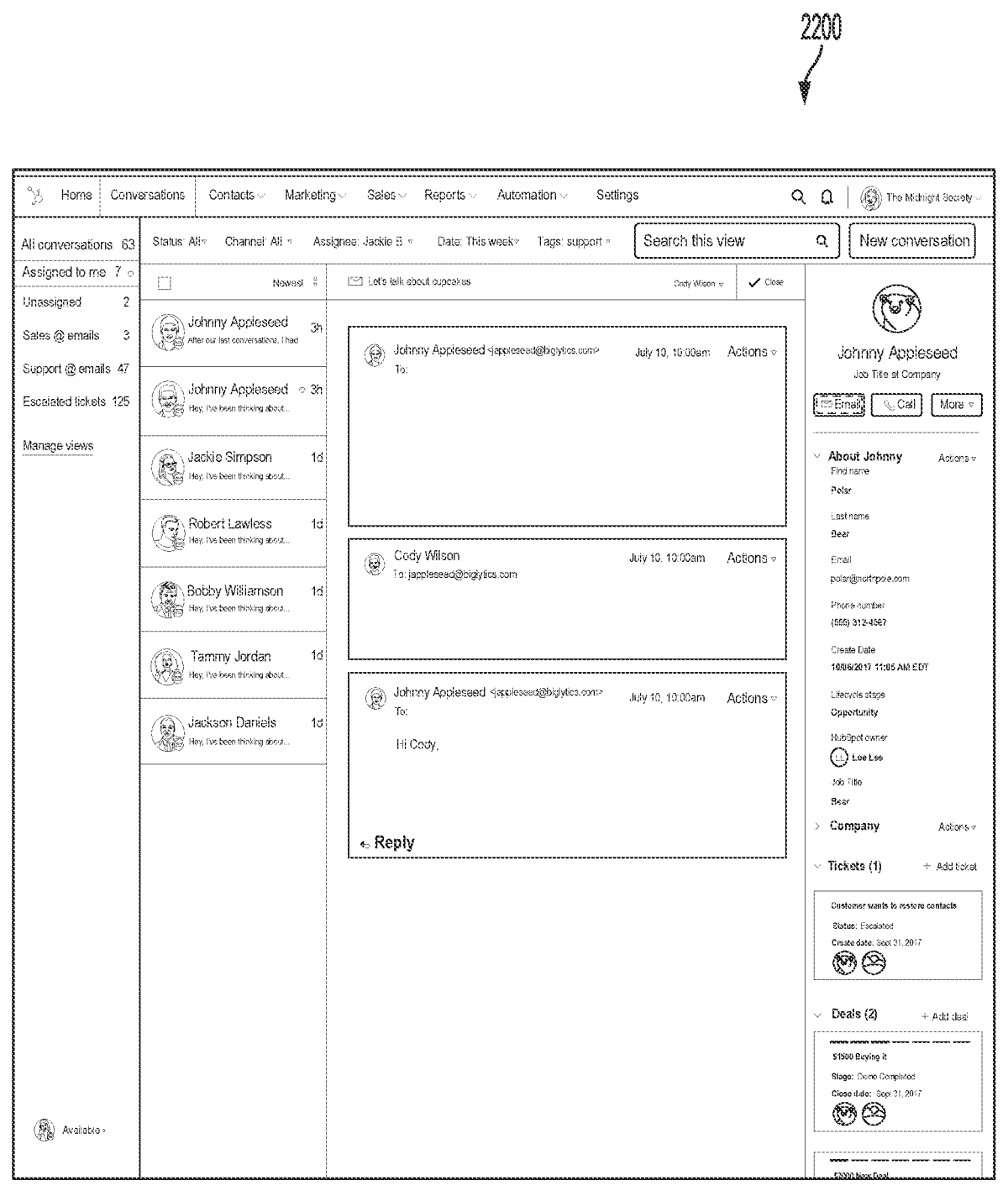
Figure 23:
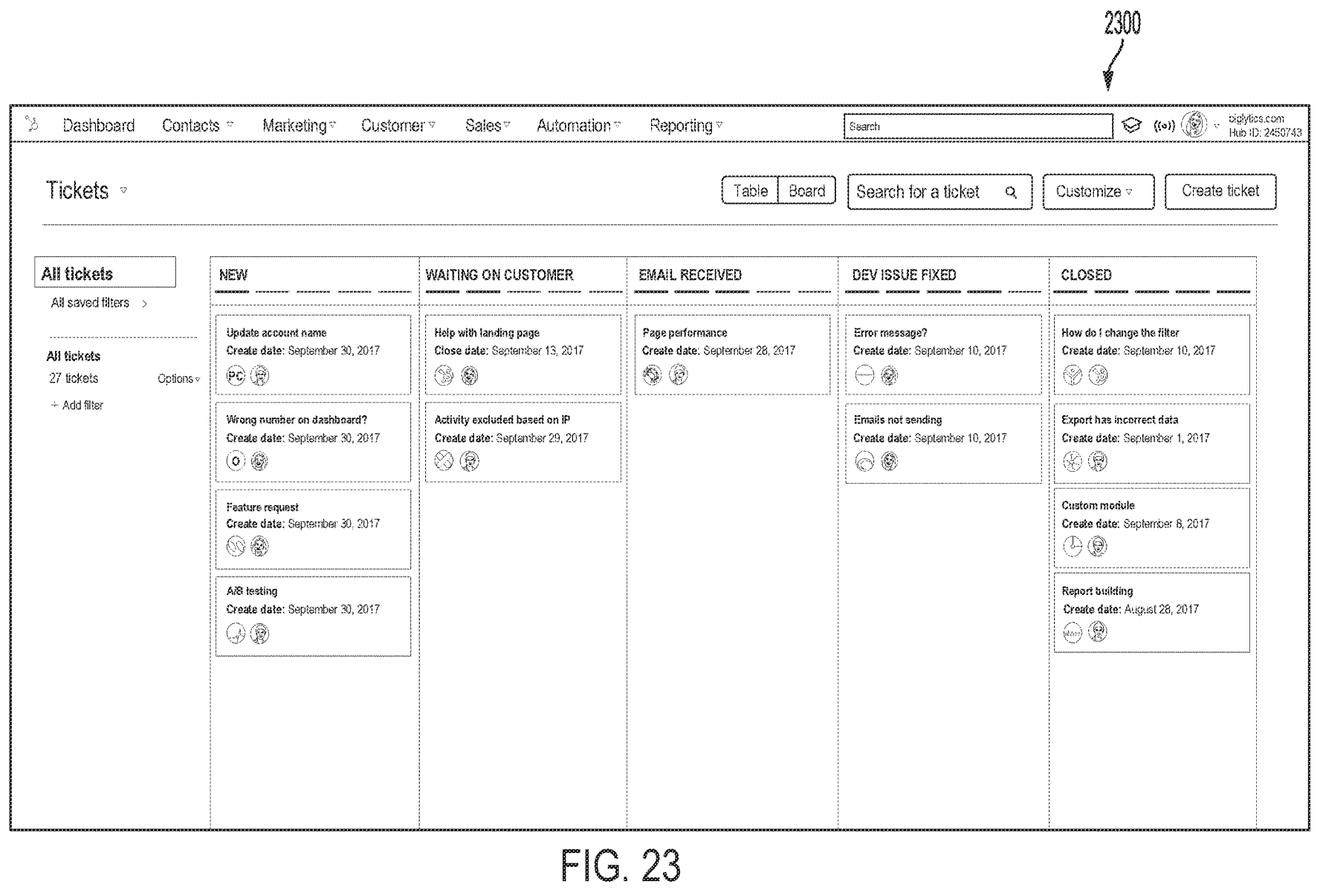

FIGS. 21-23 illustrates an example service specialist portal GUIs that may be presented by the service specialist portal according to one or more embodiments of the disclosure. In the example of FIG. 21, the GUI 2100 displays relevant ticket information to a specialist (or other user), as well as information relating to the contact that initiated the ticket. The GUI 2100 includes a graphical representation of the ticket's timeline (e.g., email sent), and detailed notes about different contact points with the contact. The GUI 2100 may show the name and information of a contact, a date on which the ticket was issued, what articles were opened by a contact with respect to the ticket, communications that were undertaken with the contact, and the like.

FIG. 22 illustrates a GUI 2200 that may be used to impart relevant data to a service specialist. In the illustrated state, the GUI 2200 is a portal that provides a list of a specialist's assigned tickets. In the example GUI 2200, the specialist can view recent messages sent or received by the specialist, and may drill down into a particular conversation. Upon drilling down into a conversation, the GUI 2200 displays relevant information of the contact in relation to a text based communication session with the contact. On the right column of the GUI 2200, relevant ticket and contact data are displayed to the specialist, including a name of the contact, a phone number and email address of the contact, a date on which the contact became a contact, a lifecycle stage of the contact, and links to any tickets that the contact may have open.

FIG. 23 illustrates a GUI 2300 that may be presented to a specialist or another service-related employee (e.g., a supervisor). The GUI 2300 of FIG. 23 is a ticket overview GUI 2300. The GUI 2300 displays a set of open tickets and where the tickets are with respect to the client's ticket pipeline. In this example arrangement, the specialist or supervisor can view tickets that are new, tickets that are awaiting communication from the contact, tickets that have progressed to the email stage, tickets that have been resolved, and tickets that have been closed. Each ticket assigned to the specialist may be displayed in a respective card, whereby the card provides a synopsis of the ticket (e.g., date created, contact name, and general issue). In this view, a specialist can click on a ticket card to drill down to view the details of a particular ticket. In response to a user selection of a particular card, the communication integrator 1902 may retrieve a ticket record corresponding to the ticket represented by the selected card and may output information relating to the ticket in a GUI (e.g., a GUI 2100 of FIG. 21)

In embodiments, the machine learning module 1912 may operate to perform various machine learning tasks related to the multi-client service system 1900. In some embodiments, the machine learning module 1912 may be configured to leverage the microservices of the machine learning system 1608 of the platform, whereby the machine learning system 1608 may provide various machine learning related services, including training models for particular clients based on training data or feedback data associated with the client. In this way, the machine learning module 1912 may be said to train and/or leverage machine learned models (e.g., neural networks, deep neural networks, convolutional neural networks, regression-based models, Hidden Markov models, decision trees, and/or other suitable model types) to perform various tasks for the client-specific service system 1900.

In embodiments, the machine learning module 1912 may train and deploy models (e.g., sentiment models) that are trained to gauge the sentiment and/or tone of the contact during interactions with the system 1900. The models may receive features relating to text and/or audio and may determine a likely sentiment or tone of the contact based on those features. For example, a first contact may send a message stating "Hey guys, I really love my new product, but this is broken;" and a second contact may send a message stating "Hey, I hate this product." Based on features such as keywords (e.g., "love," "broken," and "hate"), message structure, and/or patterns of text, a model may classify the first message as being from a likely pleased contact and in a polite tone, while it may classify the second message as being from a likely angry customer and in a direct tone. This information may be stored as an attribute in a ticket record and/or provided to a chat bot or a service specialist. Tone and sentiment scores may also be fed to the analytics system 1614 and/or feedback system 1616. For example, the analytics module 1914 may utilize tone and sentiment when determining contact scores, which may indicate an overall value of the contact to the client.

In embodiments, the machine learning module 1912 can train a sentiment model using training data that is derived from transcripts of conversations. The transcripts may be labeled (e.g., by a human) to indicate the sentiment of the contact during the conversation. For example, each transcript may include a label that indicates whether a contact was satisfied, upset, happy, confused, or the like. The label may be provided by an expert or provided by the contact (e.g., using a survey). In embodiments, the machine learning module 1912 may parse a transcript to extract a set of features from each transcript. The features may be structured in a feature vector, which is combined with the label to form a training data pair. The machine learning module 1912 may train and reinforce a sentiment model based on the training data pairs. As the client-specific service system 1900 records new transcripts, the machine learning module 1912 may reinforce the sentiment model based on the new transcripts and respective labels that have been assigned thereto.

The machine learning module 1912 can train and/or deploy additional or alternative models as well. In embodiments, the machine learning module 1912 can train models used in natural language processing. In these embodiments, the models may be trained on conversation data of previously recorded/transcribed conversations with customers.

In embodiments, the analytics module 1914 may analyze one or more aspects of the data collected by the system 1900.

In embodiments, the analytics module 1914 calculates a contact score for a contact that is indicative of a value of the contact to the client. The contact score may be based on a number of different variables. For example, the contact score may be based on a number of tickets that the user has initiated, an average amount of time between tickets, the sentiment of contact when interacting with the system 1900, an amount of revenue resulting from the relationship with the contact (or the entity with which the contact is affiliated), a number of purchases made by the contact (or an affiliated entity), the most recent purchase made by the contact, the date of the most recent purchase, a net promoter score (e.g., feedback given by the contact indicating how likely he or she is to recommend the client's product or products to someone else) and the like. In embodiments, the contact score may be based on feedback received by the feedback module 1916. The contact score may be stored in the contacts data record, the knowledge graph 1622, and/or provided to another component of the system (e.g., a chat bot or the service specialist portal 1910).

In embodiments, the analytics module 1914 may generate a contact score of a contact using a contact scoring model. The contact scoring model may be any suitable scoring model (e.g., a regression-based model or a neural network). In embodiments, the analytics module 1914 may generate a feature vector (or any other suitable data structure) corresponding to the contact and may input the feature vector to the scoring model. The analytics module 1914 may obtain contact-related data from the contact record of the contact, the knowledge graph, or other suitable sources. The types of contact-related data may include, but are not limited to, a total amount of revenue derived from the contact, a number of purchases made by the contact, an amount of loyalty points (e.g., frequent flyer miles) held by the contact, a status (e.g., "gold status" or "platinum status") of the contact, an amount of time since the contact's most recent purchase, a number of tickets that the contact has initiated, an average amount of time between tickets from the contact, and/or the average sentiment of contact when interacting with the system (e.g., a normalized value between 0 and 10 where 0 is the worst sentiment, such as angry or rude). In embodiments, the analytics module 1914 may normalize or otherwise process one or more of the contact-related data items. For example, the analytics module 1914 may determine the average sentiment of the contact and may normalize the sentiment on a scale between 0 and 10. The analytics module 1914 may then feed the feature vector to the contact scoring model, which determines and outputs the contact score of the contact based on the feature vector. In embodiments, the contact scoring model is a machine learned model that is trained by the machine learning module 1912. The contact scoring model may be trained in a supervised, unsupervised, or semi-supervised manner. For example, the contact scoring model may be given training data pairs, where each pair includes a feature vector corresponding to a contact and a contact score of the contact. In embodiments, the contact score in a training data pair may be assigned by an expert affiliated with the client and/or the multi-client service platform 1600.

In embodiments, the analytics module 1914 may also collect and analyze data regarding the efficacy of certain actions. For example, the analytics module 1914 may gauge the effectiveness of certain articles or videos, scripts used by chat bots, models used by chat bots, calls handled by customer service specialists, and the like. In embodiments, the analytics module 1914 may rely on a ticket's timeline and/or feedback received from the contact (e.g., surveys or the like), and/or feedback inferred (e.g., sentiment or tone) from the contact to determine the effectiveness of certain actions in the workflow of a client. For example, the analytics module 1914 may determine that certain workflow actions almost always (e.g., >90%) result in a contact escalating the ticket to another communication medium when dealing with a particular type of problem. In a more specific example, a client that is an ISP may first provide a contact with an article describing how to troubleshoot a problem, regardless of the problem. The analytics module 1914 may determine that when the ticket relates to a detected but weaker signal, contacts almost always escalate the ticket to a specialist. The analytics module 1914 may also determine that when the ticket relates to no signal being detected, the troubleshooting article typically resolves the ticket.

Figure 36:
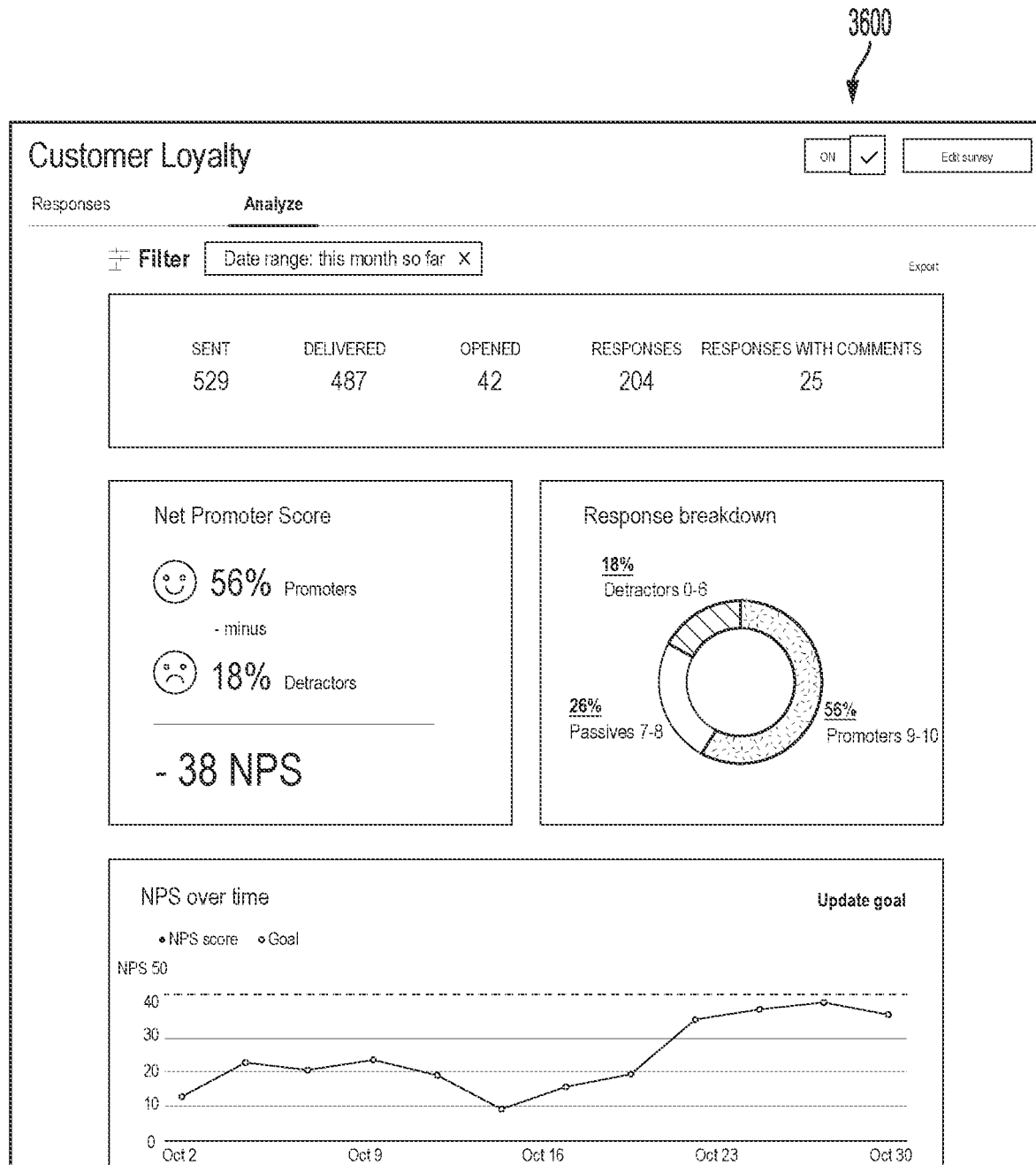
FIG. 36 is a screenshot of an example of a GUI that displays a breakdown of the net promoter scores of the contacts of a particular client according to one or more embodiments of the disclosure.

In embodiments, the analytics module 1914 can be configured to output various analytics related statistics and information to a user associated with the client. For example, the analytics module 1914 can present a GUI that indicates statistics relating to feedback received from contacts. For example, FIG. 36 illustrates an example of a GUI 3600 that displays a breakdown of the net promoter scores of the contacts of a particular client. FIG. 39 illustrates an example of a GUI 3900 that displays statistics relating to articles in a knowledge graph, which may indicate the respective usefulness of the individual articles.

In embodiments, the feedback module 1916 is configured to obtain or otherwise determine feedback from contacts. Feedback may be related to a purchase of a product (e.g., a good or service) and/or the customer. In embodiments, feedback may be obtained directly from a contact using, for example, surveys, questionnaires, and/or chat bots. The feedback collected by the feedback module 1916 may be stored in a contact record of the contact providing feedback, provided to the analytics module 1914, used as training data for reinforcing the machine learned models utilized by the client-specific service system 1900, and the like.

In embodiments, the feedback module 1916 may be configured to execute feedback related workflows, such that certain triggers cause the feedback module 1916 to request feedback from a contact. Examples of triggers may include, but are not limited to, purchases, repurchases, client visits to the contact, service technician visits, product delivery, the ticket initiation, ticket closure, and the like. In another example, a lack of feedback could be a trigger to request feedback. Furthermore, different triggers may trigger different feedback workflows (e.g., a first survey is sent to a contact when an issue is resolved over the phone and a second survey is sent to a contact after a technician visits the contact). A feedback workflow may define when to send a feedback request to a contact, what medium to use to request the feedback, and/or the questions to ask to the contact. Customer attributes of the contacts can also be used to determine a feedback workflow for a customer. Examples of customer attributes may include, but are not limited to, date the contact became a customer, lifecycle state, last purchase date, recent purchase date, on-boarding date, last login, last event, last date a feature was used, demos, industry vertical, role, demographic, behavioral attributes, a net promoter score of the contact, and a lifetime value.

In some embodiments, the feedback module 1916 may be trained (e.g., by the machine learning module 1912) to determine the appropriate time to transmit a request for feedback. In embodiments, the feedback module 1916 is trained to determine the appropriate communication channel to request feedback (e.g., email, text message, push notification to a native application, phone call, and the like). In embodiments, the feedback module 1916 is trained to determine the appropriate questions to ask in a feedback request.

In embodiments, the feedback module 1916 is configured to extract feedback from customer communications. For example, the feedback module 1916 may analyze interactions with contacts to determine a contact's implicit and/or explicit feedback (e.g., whether the contact was satisfied, unsatisfied, or neutral). In an example, the feedback module 1916 system may analyze text containing the phrase "this product is horrible." In this example, the feedback module 1916 may determine that the contact's feedback towards the product is bad.

Figure 24:
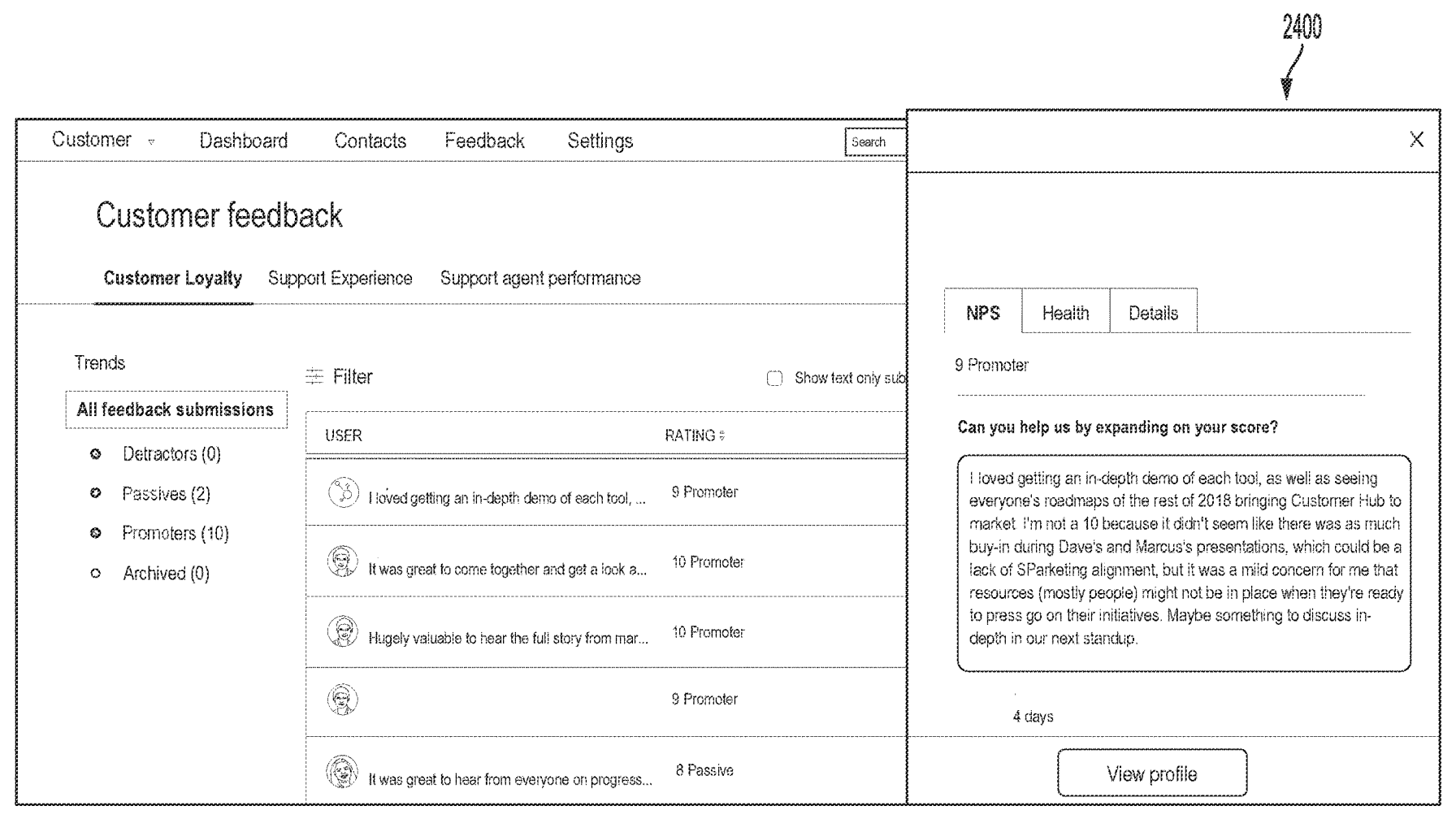
Figure 25:
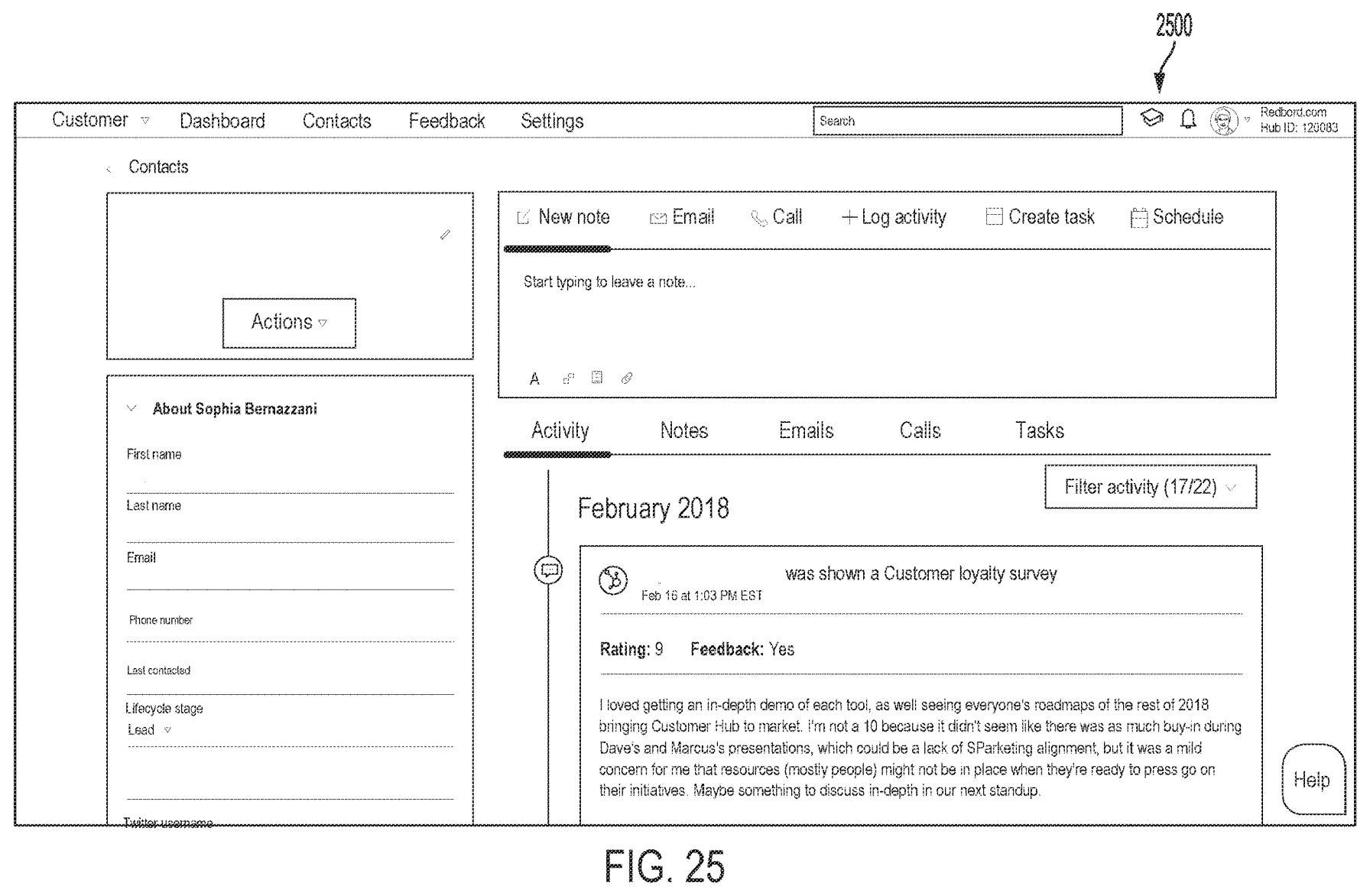
Figure 26:
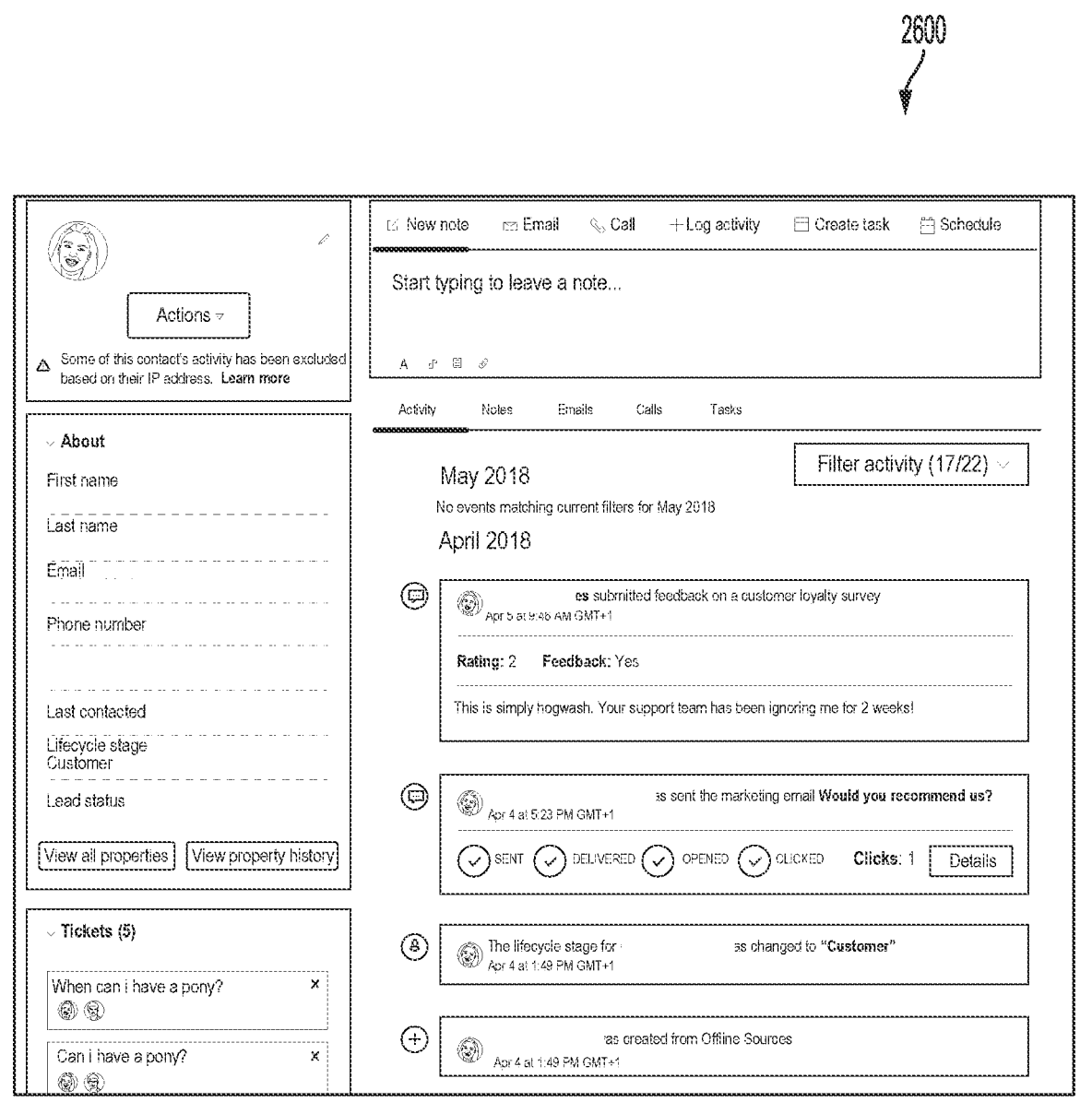

In embodiments, the feedback module 1916 may be configured to display feedback to a user affiliated with the client. The feedback module 1916 may present feedback of contacts individually. For example, the feedback module 1916 may display a GUI that allows a user to view the various contact providing feedback and a synopsis of the contact (e.g., a contact score of the contact, a name of the contact, and the like). The user can click on a particular contact to drill down on their feedback, or a contact profile page. In the example of FIG. 24, an example GUI 2400 allows a user to drill down on the feedback of individual contacts. In the example, the user can click on a particular contact and the GUI 2400 may display the feedback provided by the contact. FIG. 25 is a screen shot of the GUI 2500, whereby the contact's feedback is arranged on a timeline. FIG. 26 is a screenshot of another feedback related GUI 2600. In the example of FIG. 26, the feedback data of a contact is displayed in a timeline. In this example, the GUI 2600 displays individual cards that are related to various feedback events from the contact. The cards may also display at least a portion of the feedback (e.g., scores, text, and the like). The GUI 2600 further allows the user to view the tickets of the contact, the lifecycle history of the contact, a contact history of the contact, a last time the contact contacted the client, and the like.

Figure 20:
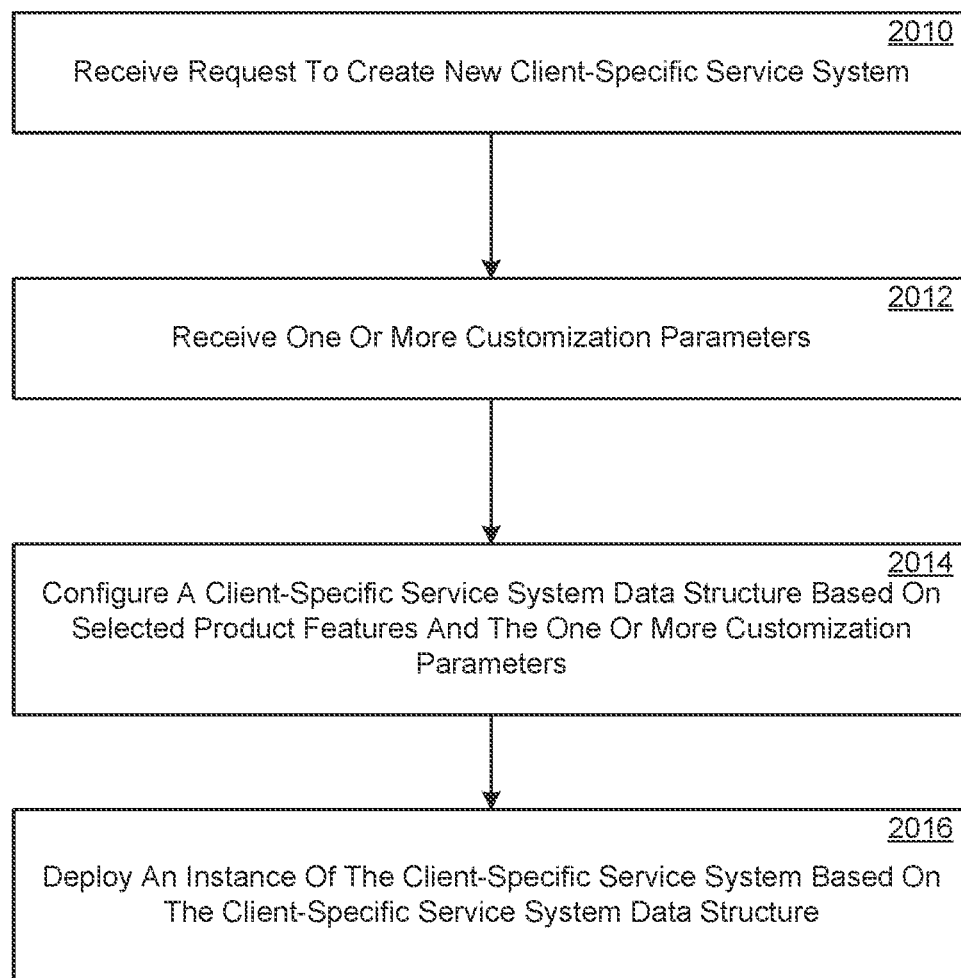
FIG. 20 is a flow chart illustrating a set of operations of a method for deploying a client-specific service system.
Figure 27:
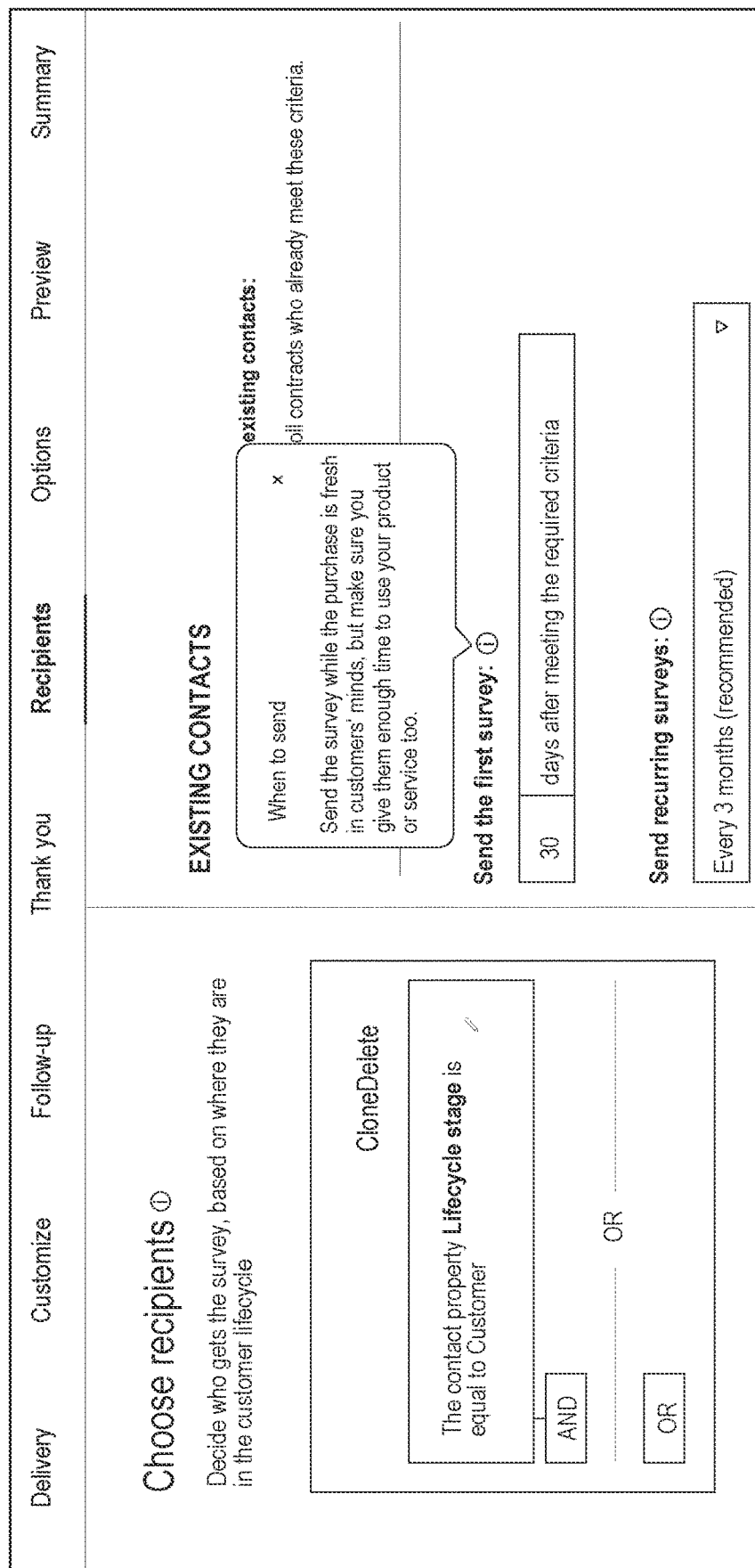
Figure 32:
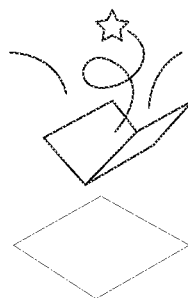
Figure 33:
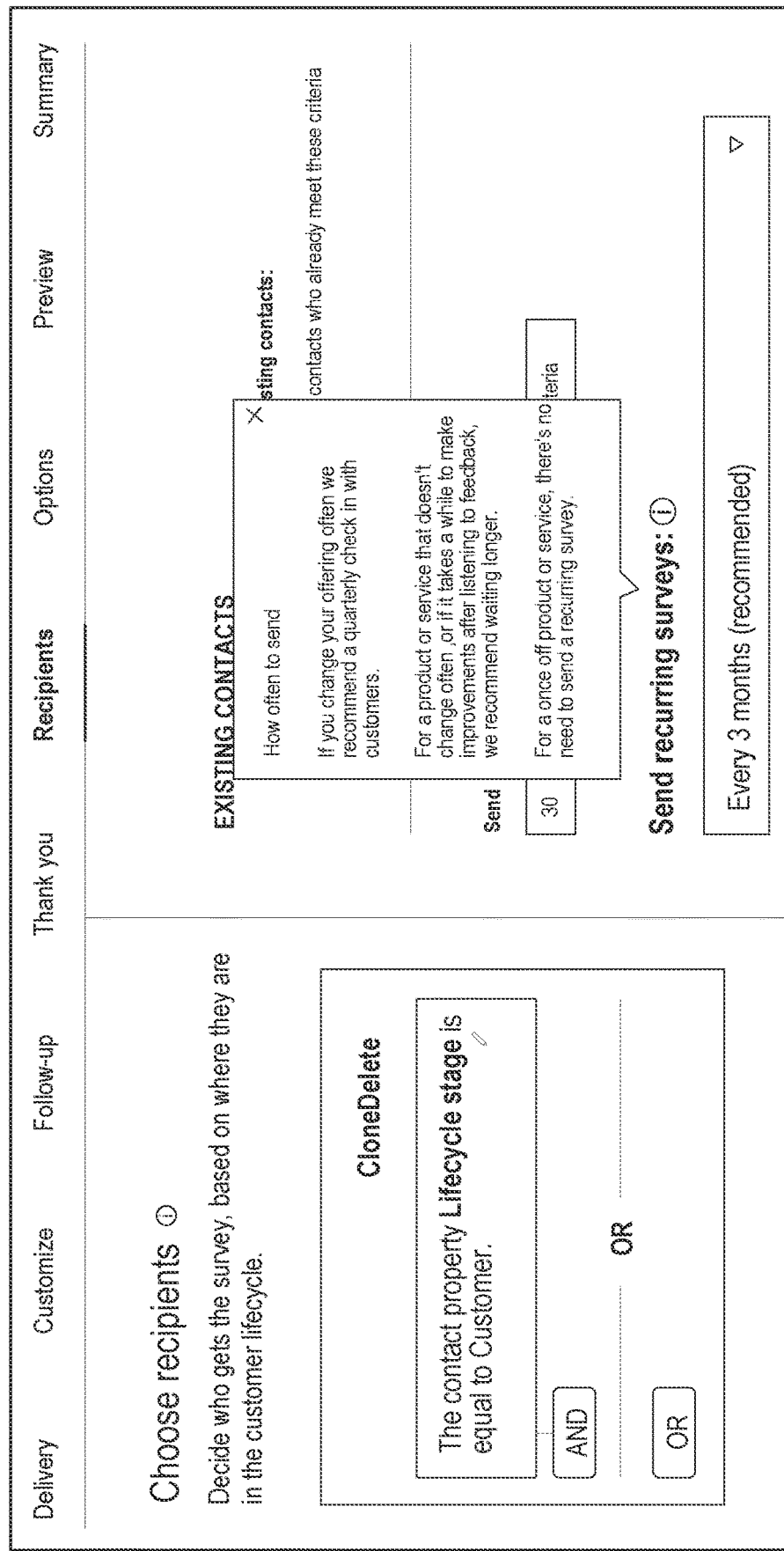

Referring now to FIG. 20, an example set of operations for deploying a client-specific service system, according to one or more embodiments of the disclosure. The method 2000 may be executed by one or more processors of the multi-client service platform 1600 of FIG. 16, and is described with respect thereto. The method 2000 may be performed by other suitable systems as well without departing from the scope of the disclosure.

At 2010, the multi-client service platform 1600 receives a request to create a new client-specific service system 1900. The request may be initiated via a graphical user interface presented to a user affiliated with the client or by a salesperson affiliated with the multi-client service system. The request may include one or more service features which the client would like to incorporate into its client-specific service system. For example, the client may opt from one or more of a ticket support, ticket workflow management, multiple ticket workflows, email/chat and ticket integration, customized email templates, knowledge graph support, conversation routing, customer service website that includes recommended content (e.g., articles or videos on solving common problems), a chat bot (text-based and/or audio-based), automated routing to service specialists, live chat, customer service analytics, customized reporting, and the like. A user affiliated with a client may select the service features to be included in the client-specific service system from, for example, a menu or may subscribe to one or more bundled packages that include respective sets of service features.

At 2012, the system may receive one or more customization parameters. In embodiments, a client user may provide one or more customization parameters via one or more GUIs. The types of customization parameters that a client may provide depends on the services that the client has enlisted. The types of customization parameters may include custom ticket attributes, client branding (e.g., logos or photographs), root URLs to generate a knowledge graph on behalf of the client, topic headings for organizing a client's customer service page, media assets to be included under each respective topic heading, ticket pipeline definitions, workflow definitions, communication templates for automated generation communications, scripts to initiate conversations with a contact using a chat bot, telephone numbers of the client's service specialist system, survey questions and other feedback mechanisms, different types of analytics that may be run, and the like.

In embodiments, a client may customize tickets used in its client-specific service system. In these embodiments, the client may define one or more new ticket objects, where each ticket object may correspond to a different type of ticket. For example, a first ticket object may correspond to tickets used in connection with refund requests and a second ticket object may correspond to tickets that are used in connection with service requests. Thus, if defining more than one ticket object, a client may assign a ticket type to a new ticket object. In embodiments, a ticket object includes ticket attributes. The ticket attributes may include default ticket attributes and custom ticket attributes. The default ticket attributes may be a set of ticket attributes that must remain in the ticket. Examples of default ticket attributes, according to some implementations of the platform 1600, may include (but are not limited to) one or more of a ticket ID or ticket name attribute (e.g., a unique identifier of the ticket), a ticket priority attribute (e.g., high, low, or medium) that indicates a priority of the ticket, a ticket subject attribute (e.g., what is the ticket concerning), a ticket description (e.g., a plain-text description of the issue to which the ticket pertains) attribute, a pipeline ID attribute that indicates a ticket pipeline to which the ticket is assigned, a pipeline stage attribute that indicates a status of the ticket with respect to the ticket pipeline in which it is being processed, a creation date attribute indicating when the ticket was created, a last update attribute indicating a date and/or time when the ticket was last updated (e.g., the last time an action occurred with respect to the ticket), a ticket owner attribute that indicates the contact that initiated the ticket, and the like. Custom ticket attributes are attributes that a user may define, for example, using a GUI. Examples of custom ticket attributes are far ranging, as the client may define the custom ticket attributes, and may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a contact frequency attribute indicating a number of times a contact has been contacted, a media asset attribute indicating media assets (e.g., articles or videos) that have been sent to the contact during the ticket's lifetime, and the like.

In some scenarios, a client may elect to customize one or more ticket pipelines for handling tickets by the client-specific service system 1900, whereby a user affiliated with the client may define one or more ticket pipelines. In some embodiments, the multi-client service platform 1600 may present a GUI that allows the user to define various workflow stages (e.g., "ticket created", "waiting for contact", "routed to chat bot", "routed to service specialist", "ticket closed", and the like). For each stage, the user may define one or more conditions (e.g., ticket attribute values) that correspond to the respective stage. In this way, a ticket meeting the one or more conditions of a respective stage may be moved to that stage. For each stage of the pipeline, the user may define one or more workflows or actions that are performed.

In some scenarios, a client may elect to define one or more workflows. The workflows may be defined with respect to a stage of a pipeline or independent of a pipeline. A workflow may include one or more actions. Thus, a user affiliated with a client may select one or more actions of a workflow. For example, the user may select actions such as "create ticket", "send message", "send email", "route to chat bot", "route to specialist", "define custom action", and the like. In the instance where a user elects to define a custom action, the user may provide further details on how the client-specific service is to respond. For example, the user may select that an article is to be sent to a contact upon a specific type of problem indicated in a newly created ticket. The user may further define the conditions that trigger the workflow. In embodiments, the user may define these conditions using ticket attribute values that trigger the workflow.

In some scenarios, a client may elect to have the client-specific service system 1900 generate automated messages on behalf of the client to contacts in connection with an issued ticket. In these scenarios, a user affiliated with the client may define communication templates that are used to generate automated messages (e.g., SMS messages, emails, direct messages, and the like) to contact. For example, the client may elect to have automated messages be sent to contacts at various points during the workflow. The multi-client service platform 1600 may present a graphical user interface that allows a user to upload or enter the message template. In response to receiving the communication template, the multi-client service platform 1600 may store the message template and may associate the template with the workflow item that uses the template.

In some scenarios, the user may provide a root URL to initiate the generation of a knowledge base. In response to the root URL (or multiple root URLs), the system may crawl a set of documents (e.g., webpages) starting with the root URL. In embodiments, the system may analyze (e.g., via NLP and/or document classifiers) each document and may populate a knowledge graph based on the analysis.

In some instances, the user may define one or more topic headings, and for each topic heading may upload or provide links to a set of media assets (e.g., articles and/or videos) that relate to the heading. In some embodiments, the media assets may be used to recommend additional media assets from a series of crawled websites and/or a knowledge graph. For example, the system may identify media assets having a high degree of similarity (e.g., cosine similarity) to the media assets provided by the user. In these embodiments, the system may output the recommended media contents to the user, such that the user may select one or more of the media contents for inclusion with respect to a topic heading.

In some scenarios, a client may elect to have a client-specific service system provide a chat bot to handle some communications with contacts. For example, a client may elect to have a chat bot handle initial communications with service-seeking contacts. In some embodiments, the multi-client service platform 1600 may present a GUI to a user affiliated with the client that allows the user to upload chat bot scripts that guide the beginning of a conversation. The user may upload additional or alterative data that assists the chat bot, such as transcripts of conversations with human service specialists, such that the chat bot may be trained on conversations that have been deemed effective (e.g., helped resolve an issue). In response to receiving the script and/or any other data, the multi-client service platform 1600 may train the chat bot based on the script and/or any other data.

In some scenarios, a client may elect to have a client-specific service system 1900 request feedback from contacts during one or more stages of a workflow. In some embodiments, the multi-client service platform 1600 may present a GUI to a user affiliated with the client that allows the user to design a survey or questionnaire, including any questions and choices that may be presented to the responder. The GUI may also allow the user to customize other aspects of the survey or questionnaire. For example, the user may provide branding elements that are presented in or in relation to the survey or questionnaire. In embodiments, the user may feedback workflows that define when a survey or questionnaire is to be sent to a user and/or the communication medium used to send the survey or questionnaire to a user.

In some scenarios, a client may elect to have a client-specific service system 1900 route contacts to a telephone call with a service specialist. In some of these embodiments, a user affiliated with the client may provide routing data that can route a contact to a service specialist. For example, the user may provide a phone number associated with a call center or a roster of service specialists and their direct phone numbers and/or extensions.

At 2014, the multi-client service platform 1600 may configure a client-specific service system data structure based upon the selected service features and the one or more customization parameters. In embodiments, the platform 1600 implements a microservices architecture, whereby each client-specific service system may be configured as a collection of connected services. In embodiments, the platform 1600 may configure a client-specific service system data structure that defines the microservices that are leveraged by an instance of the client-specific service system data structure (which is a client-specific service system). A client-specific service system data structure may be a data structure and/or computer readable instructions that define the manner by which certain microservices are accessed and the data that is used in support of the client-specific service system. For example, the client-specific service system data structure may define the microservices that support the selected service features and may include the mechanisms by which those microservices are accessed (e.g., API calls that are made to the respective microservices and the customization parameters used to parameterize the API calls). The platform 1600 may further define one or more database objects (e.g., contact records, ticket records, and the like) from which database records (e.g., My SQL™ database records) are instantiated. For example, the client configuration system 1602 may configure ticket objects for each type of ticket, where each ticket object defines the ticket attributes included in tickets having the type. In embodiments, the platform 1600 may include any software libraries and modules needed to support the service features defined by the client in the client-specific service system data structure. The client-specific service system data structure may further include references to the proprietary database(s) 1620, the knowledge graph 1622, and/or knowledge base 1624, such that a deployed client-specific service system may have access to the proprietary database 1620, the knowledge graph 1622, and/or the knowledge base 1624.

At 2016, the multi-client service platform 1600 may deploy the client-specific service system 1900. In embodiments, the multi-client service platform 1600 may deploy an instance (or multiple instances) of the platform 1600 based on the client-specific service system data structure. In some embodiments, the platform 1600 may instantiate an instance of the client-specific service system from the client-specific service system data structure, whereby the client-specific service system 1900 may begin accessing the microservices defined in the client-specific service system data structure. In some of these embodiments, the instance of the client-specific service system is a container (e.g., a Docker® container) and the client-specific service system data structure is a container image. For example, in embodiments where the client-specific service system data structure is a container, the multi-client service platform 1600 may install and build the instance of the client-specific service system 1900 on one or more servers. In these embodiments, the container is configured to access the microservices, which may be containerized themselves. Once deployed, the client-specific service system 1900 may begin creating tickets and performing other customer-service related tasks, as described in the disclosure.

Custom Object Systems and Methods

A multi-service business platform (e.g., may also be referred to as a framework) may be configured to provide processes related to marketing, sales, and/or customer service for users. The multi-service business platform may include a database structure that may have preset or fixed core objects (e.g., platform may support core objects). For example, the core objects may include contact objects, company objects, deal objects, and ticket objects. These core objects may be described and defined above in the disclosure and may be further described and defined in the disclosure below with respect to the multi-service business platform example.

Contact objects may be defined as people who may communicate with an organization (e.g., anyone who may interact with business) such as customers or prospective customers of the business (e.g., people who may convert on a form, people who contact chat team of business, and/or people who met business team at an event). Each contact object may be defined with properties (e.g., a name of the contact, a phone number of the contact, an email address of the contact, a physical address of the contact, a title of the contact, and the like). Contacts may work at companies such that company objects may also be important to represent in data. Company objects may be defined as organizations or businesses that may communicate with a user's organization (e.g., organization of user of the multi-service business platform). Each company object may include properties such as a company name, an address of the company (e.g., main location, headquarters, or the like), and other suitable properties.

A deal object may be defined as opportunities that may be available from interactions with contacts (e.g., contact objects) and/or companies (e.g., company objects). Deal objects may be defined as and represent transactions that may be typically between two businesses. Each deal object may include properties such as a sale made by a customer to a company via a contact. Some examples of deal objects may include the amount of a deal (e.g., deal_amount), an estimated close date for a deal (e.g., estimated_close_date), and a likelihood to close a deal (e.g., likelihood_to_close). Likelihood to close may be determined from machine learning. For example, machine learning may be used to take previously closed deals and may create a model around what types of properties (e.g., attributes) and objects may create a highly likely result to close and then may output values based on this predictive machine learning.

Ticket objects may be defined as customer requests for support or help (e.g., service ticket that may relate to a service request that may be issued by a company to a user via a contact). Some examples of properties for ticket objects may include date ticket was opened (e.g., date_opened), priority of ticket, last date custom replied to ticket (e.g., last_date_customer_replied), last date rep replied to ticket (e.g., last_date_rep_replied), and the like.

The multi-service business platform may include associations between core objects. In some examples, the associations may be a set of core associations. For example, each association may be a directed association, such that a respective association may define a type of relationship from a first object to a second object. For example, an association between a contact object and a company object may be "works for" such that the contact object "works for" (association) the company object. When an instance of the contact object (e.g., the contact object instance identifies Bob as a contact) may be associated with an instance of the company object (e.g., the company object instance may identify "Acme Corp." as a the company) with a "works for" association, then the individual indicated by the company object instance may be defined in the customer databases as working for the company indicated in the company object instance (e.g., Bob works for Acme Corp.).

In example embodiments, two objects may be associated using one or more different types of associations and the associations may be directed in both directions (e.g., association and inverse association). An inverse association of the association may be created automatically for every association. For example, the association in one direction may be "works for" and the inverse association may be "employs" which may be created for the same association automatically. This same association may be viewed from the contact object and viewed from the company object such that the association may be defined as the contact object "works for" (association) the company object or the company object "employs" (inverse association) the contact object. The associations may be between the same types of objects and/or between different types of objects. For example, in continuing the example of the company object and the contact object, a contact object instance may indicate that the company defined by the company object instance may employ the individual defined by the contact object instance vis-à-vis the "employs" association (e.g., Acme Corp employs Bob) and that the individual works for the company vis-à-vis the "works for" association (e.g., Bob works for Acme Corp).

In some example embodiments, two objects may have multiple associations in the same direction. Continuing the example of the contact object and the company object, a contact object may be associated with a company object by a "works for" association, a "previously worked for" association, a "sells to" association, and/or other suitable types of associations. Similarly, the company object may be associated with a contact object with an "employs" association, a "previously employed" association, a "buys from" association, and/or other suitable types of associations. In this way, different types of relationships between instances of objects may be defined within the customer's databases.

In example embodiments, objects may also have the same object type directed associations. For example, a contact object may be associated to itself with one or more directed associations, such as a "is supervised by" association, a "supervises" association, or the like. For example, if Bob and Alice may work for the same company and Alice may supervise Bob, then an instance of a contact object that may define Bob may be associated with a contact object instance that may identify Alice with a "is supervised by" association (e.g., Bob "is supervised by" Alice) and/or Alice's contact object instance may be associated with Bob's contact object instance with a "supervises" association (e.g., Alice "supervises" Bob).

In example embodiments, the multi-service business platform may include a system for creating custom objects providing customizability and may execute methods in support thereof. For example, the multi-service business platform may include a customization system that may be used by users to create custom objects. These custom objects may be created to be specific to each user's (e.g., client's) business and the custom objects may be used on the multi-service business platform. The ability to create custom objects within the multi-service business platform may speed up development of new types of custom objects for the platform. In some examples, the customization system may be a separate system from the multi-service business platform and may communicate with the multi-service business platform (e.g., via external application programming interfaces (APIs)).

Custom objects (e.g., may also be referred to as custom object definitions) may be defined as purposely non-prescriptive objects (e.g., flexible/customizable in contrast from fixed core objects). A user may create custom objects relevant to their business and the user's business needs (e.g., relevant to a user's business model). The custom objects may provide an alternative where objects of interest to businesses may not fit smoothly within core objects (e.g., not necessarily fit as contacts, companies, deals, and/or tickets). The user may create custom objects that may be particularly useful to one or more services (e.g., workflows, reporting) of the multi-service business platform as described in the disclosure. Each custom object or custom object definition may include an object type, properties (e.g., some properties may be set on an instance), and possible associations. In example embodiments, custom objects and/or types of custom objects may include products, goods such as devices/machines (e.g., cars, drones, boats, mobile phones, etc. such that these devices/machines custom objects may be used to track details about ownership, service, cost of devices/machines), business services, shipments (e.g., may be used to store data about fulfillment of orders that may be intended to be sent out), applications (e.g., may be used to store data that tracks progress of an application), projects (e.g., may be used to store data about work or deliverables), locations/stores (e.g., may be used to store granular data about companies and their many physical locations such as store locations and/or company headquarters location), customer locations (e.g., may be locations of customers that buy products and/or services from user's business), events (e.g., may be used to store and track physical or online events a company holds), listings (e.g., may be used to store data about real estate listings for a real estate company), referrals (e.g., may be used to link two things together to notate a referral or referrer), and the like. Some businesses may have unique relationships from operating in an agency type model that the businesses may want to identify, monitor, and/or track using custom objects.

Custom objects may provide users with the ability to model their business. For example, custom objects may allow users to model their own version of contacts, companies, deals, and/or tickets or any other type of object for their businesses that may allow the users to customize what they want for objects and/or object types. The custom objects may be used with the multi-service business platform such that the upstart of the multi-service business platform may provide various functionality for usage of these custom objects. When a user may build a custom object, the user may utilize all services (e.g., features) of the multi-service business platform such that the user (e.g., user's business) may use these services throughout the multi-service business platform towards relevant custom objects that may match user's business needs.

In some examples, users may create custom objects with respect to usefulness with services of the multi-service business platform. For example, an auto manufacturer user may create car or vehicle custom objects that may fit into the auto manufacturer's business workflows (e.g., workflow automation) that may be used on the multi-service business platform. In another example, a user may choose to add custom objects that may be particularly useful with reporting service for user's business needs.

In general, this ability to create custom objects provides increased and improved customizability across the multi-service business platform. This provides several advantages to the multi-service business platform as described in the disclosure. For example, some advantages may include customization for users with respect to their business industry or field, specific customization towards each user's business itself such that one user in a business industry (e.g., car industry) may have different custom object needs with respect to another user in the same business industry, increased speed of development of various new types of objects by users and by developers of the multi-service business platform, etc.

Using a yoga business as an example (e.g., where the user may be a yoga business owner), the user may create custom objects towards their yoga business (e.g., where the yoga business may include multiple studios that may be staffed with multiple instructors that may teach different classes that may be taught to students in accordance with the instructors' respective schedules). In this example, a user (e.g., a user affiliated with the yoga studio or a third-party consultant) may create (e.g., via a GUI) a set of custom objects that relate to the yoga business, including defining the properties of each custom object. For example, the custom objects created may be studio objects, class objects, instructor objects, student objects, and schedule objects. Each studio custom object may include properties such as address of studio, rent of studio, and date when studio opened (e.g., date_opened). Each class custom object may include properties such as name of class, price of class, and schedule of class. Each instructor custom object may include properties such as date when instructor was hired (e.g., date_hired), latest certification date of instructor (e.g., latest_certification_date), certification expiration date of instructor (e.g., certification expiration date), and number of classes taught by instructor (e.g., number_of_classes_taught). Each student custom object may include properties such as date joined by student (e.g., date_joined), number of classes attended by student (e.g., number_of_classes_attended), date last attended a class by student (e.g., date_last_attended_a_class), total lifetime value of student (e.g., total_lifetime_value), credit of student, address of student, and phone number of student.

In example embodiments, the user may also define a set of associations between objects (e.g., custom objects and/or core objects). This yoga example may include several examples of associations. For example, one association may be "class_taught_by" which may be between the custom object instructor and/or a contact object (e.g., where contact may be instructor) and the class custom objects that the instructor teaches. Another example association may be "taught_at_location" which may be an association between the class custom object and the studio custom objects based on where a particular class may be held (e.g., may be determined from address or location information properties of studio custom objects). In another example, the "taught_at_location" association may be an association between the instructor custom object and the studio custom objects based on at which yoga studios a particular instructor teaches. There may be other associations created between instructor custom objects and core objects (e.g., contact objects) as well as student custom objects and core objects (e.g., contact objects). This may allow for actions to be taken based on these associations such as emails to be sent to instructors and students based on the associations of instructor custom objects and student custom objects with contact objects.

In example embodiments, machine learning may be used with custom objects to determine a likelihood to attend based on custom objects and properties that may be created. For example, the multi-service business platform may provide prompts for a user to define inputs into a machine learning model, e.g., the user may submit via prompts several properties (e.g., how often does student attend, how many classes is student signed up for, subscription plan, etc.) that may impact whether a student may be likely or unlikely to attend a class and the machine learning model may be used to perform calculations based on these inputs. In other example embodiments, the machine learning model may determine insights (e.g., properties relating to attendance may be determined) as data may be received from instances of the occurrence of actions relating to instances of the custom objects. For example, instances of associations between the object instances (e.g., between custom object instances and/or core object instances) may be used to determine these properties (e.g., based on properties of the association instances).

Figure 45:
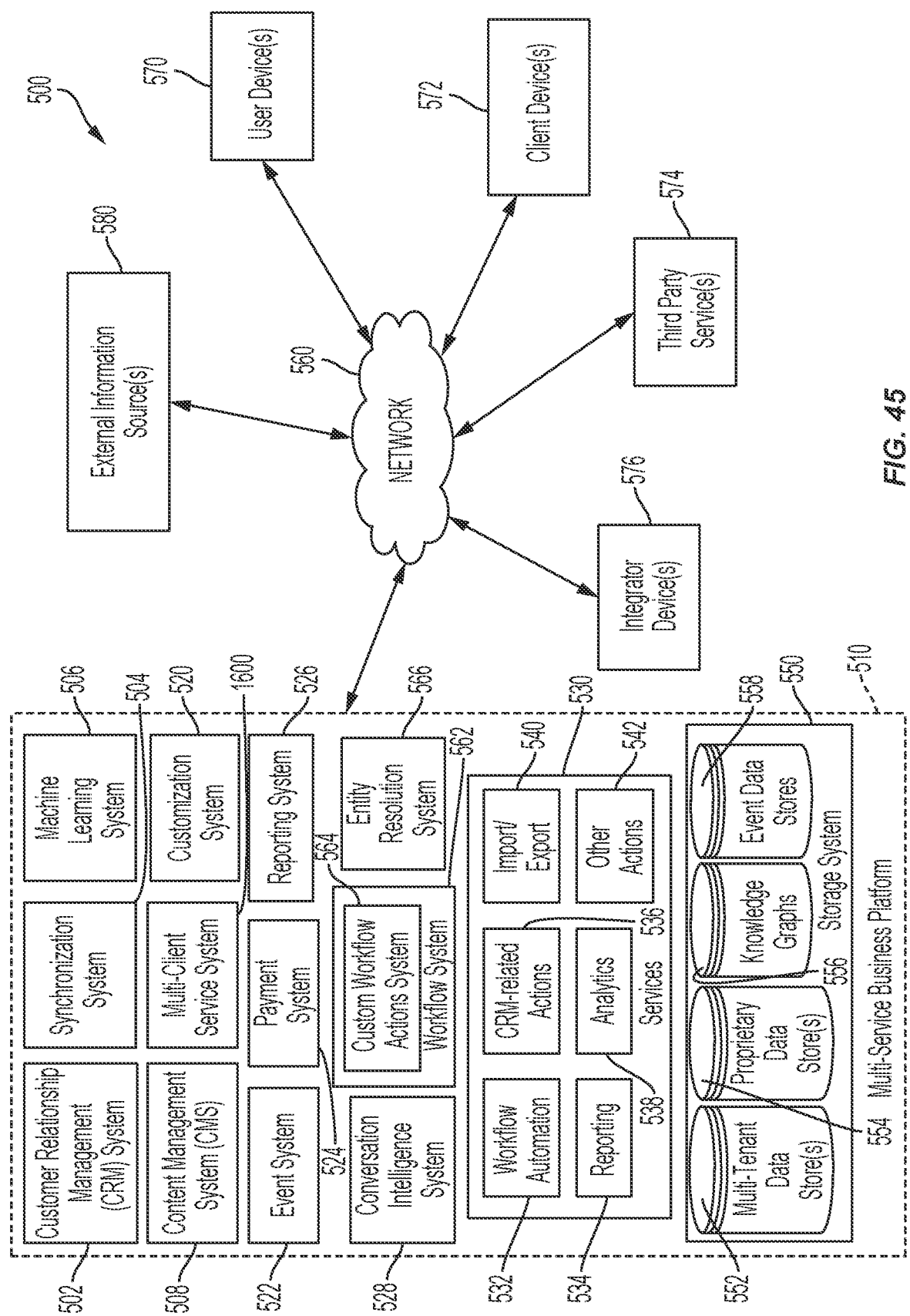
FIG. 45 is an example environment view of a multi-service business platform communicating with various systems, devices, and data sources according to one or more embodiments of the disclosure.

Referring now to example implementations of FIG. 45, there is shown an example environment 500 including a multi-service business platform 510 (e.g., may be also referred to as a multi-tenant distributed system that may serve the needs of multiple users who in turn use the system to provide services, support, and the like for their customers). The multi-service business platform 510 may communicate with various systems, devices, and data sources according to example embodiments of the disclosure. The multi-service business platform 510 may be referred to as a framework system or a multifunction business platform. The multi-service business platform 510 may include various systems 502-508, 1600, 520, 522-528, 562, 566, services 530, and a storage system 550. Specifically, the multi-service business platform 510 may include a customization system 520 (e.g., may also be referred to as a custom object creation system or custom object definition system). The customization system 520 may be used in a process to create custom objects and create associations for the custom objects.

These created custom objects may be used with various services 530 of the multi-service business platform 510 (e.g., may also be referred to as features of the multi-service business platform). In examples, services 530 may include workflow automation 532 (e.g., workflows), reporting 534, customer relationship management (CRM)-related actions 536, analytics 538, import/export actions 540, other actions 542, and the like. Other actions 542 may include, for example, filtering used to search, filter, and list objects (e.g., contact objects) that may be used with other objects and/or create lists for other types of objects. In some examples, other actions 542 may include reporting, permissioning, auditing, user-defined calculations, and aggregations. The multi-service business platform 510 may include a non-exhaustive list of services 530 (e.g., set of features) that may be changed and/or added to the multi-service business platform 510 over time such that these services 530 may be automatically used with old and new core objects and/or custom objects.

The multi-service business platform 510 may be used to provide all of the objects (specifically custom objects) with various capabilities from these services 530. These various types of services 530 may be applied and/or used with the objects. For example, the workflow automation 532 (e.g., workflow system) may be used to add verbs (automation actions) with respect to nouns (e.g., custom objects). The core objects and custom objects may take advantage of all these services 530 (e.g., features) such that there may be a single source of truth (e.g., objects) that the services 530 and/or other systems of the platform may reason about that may be built onto the multi-service business platform 510.

The storage system 550 may include multi-tenant data store(s) 552, knowledge graph(s) 556, and proprietary data store(s) 554 (e.g., proprietary databases that may be similar to proprietary databases 208, 1620 described in the disclosure). Custom objects and/or core objects may include information that may be stored in the multi-tenant data stores 552 of the storage system 550. The custom objects and/or core objects as well as possible relationships (e.g., associations) between objects may be stored in an ontology of the knowledge graph(s) 556 at least implicitly and one or more instance knowledge graphs may be included in the knowledge graph(s) 556.

The multi-service business platform 510 may include other systems that may be used with the created custom objects such as a customer relationship management (CRM) system 502, a synchronization system 504, a machine learning system 506, a content management system (CMS) 508, and a multi-client service system 1600 (as described in the disclosure above). These systems may function and/or be used similarly to the same or similar systems described in the disclosure. For example, the machine learning system 506 that may already be used with core objects may also be applied similarly to the custom objects. The synchronization system 504 of the multi-service business platform 510 may synchronize some arbitrary custom objects outside the platform 510 to objects in the platform 510. In summary, in examples, the multi-service business platform 510 may act as an arbitrary platform that may act on arbitrary custom objects using various systems 502-508, 1600, 520, 522-528, 562, 566 and the services 530 (e.g., used with arbitrary actions and synced to arbitrary systems of the platform) thereby benefiting from these various capabilities.

The multi-service business platform 510 may communicate with external systems and data sources via a communication network 560 (e.g., Internet, public network, private network, etc.). Specifically, the multi-service business platform 510 may communicate with user device(s) 570 (e.g., user may be using the customization system 520 from the user device 570 to create custom objects via network 560), client device(s) 572 (e.g., tracking various activities of the client device 572 of a customer for purposes of sales and marketing with respect to custom objects), and various external information sources 580. The external information sources 580 may include company information or data on customers, products, sales, third party data, resource description framework (RDF) site summary (RSS) feeds or really simple syndication (RSS) feeds, telemetrics (e.g., from email, websites, app usage), and the like with respect to custom objects. The multi-service business platform 510 may also communicate with third party service(s) 574 (e.g., third party applications, websites, Snowflake, etc.) via network 560.

The multi-service business platform 510 may also communicate with integrator device(s) 576. Integrator devices 576 may refer to user devices used by third-party integrator users that may create and may define a series of custom objects that may be integrated with other objects in the multi-service business platform 510 and may be offered to users (e.g., clients) of the multi-service business platform 510. The multi-service business platform 510 may include APIs (as described in the disclosure) that a user may use to define custom objects and integrate those custom objects into the CRM (e.g., CRM system 502) and thereby into the multi-service business platform 510. These same APIs may be available to integrator users to do the same thing. The integrator users may define a series of custom objects, then the integrator users may define object definitions. When a client installs that integration, the multi-service business platform 510 may enable the client (e.g., users of the client) to then start creating instances of custom objects defined by the integrator user(s).

Using yoga studio example again, an integrator user may have a company that builds CRM integration for yoga studios. This company may not be a yoga studio itself but may provide the CRM integration. For example, the integrator user may define a set of custom objects (including properties) that may be used by yoga studios or other fitness class-based businesses. The custom objects may include a studio custom object, an instructor custom object, a student custom object, a class custom object, and a schedule custom object. In this example, any client of the multi-service business platform 510 that operates a yoga studio (or other fitness, class-based business) may use the custom objects defined by the integrator (e.g., for a fee to the integrator) when on-boarding their business to the multi-service business platform 510. For example, the yoga studio users (e.g., from yoga studio businesses) may install integration (e.g., CRM integration from the integrator user) to be used on the multi-service business platform 510. After integration, the yoga studio users may be able to take advantage of the custom objects (e.g., custom definitions of the custom objects) created by the integrator user such as the "yoga class" custom object, the "yoga instructor" custom object, and the "yoga student" custom object. The yoga studio users may also have access to the services 530 of the multi-service business platform 510 such as reporting 534 (e.g., user reports), workflow automation 532 (e.g., user workflows), etc. that may be used with these custom objects. It may be as if each yoga studio user may rely on the integration from the integrator user such that the integration may be packaged with the custom objects and definitions for users of the multi-service business platform 510.

Figure 46:
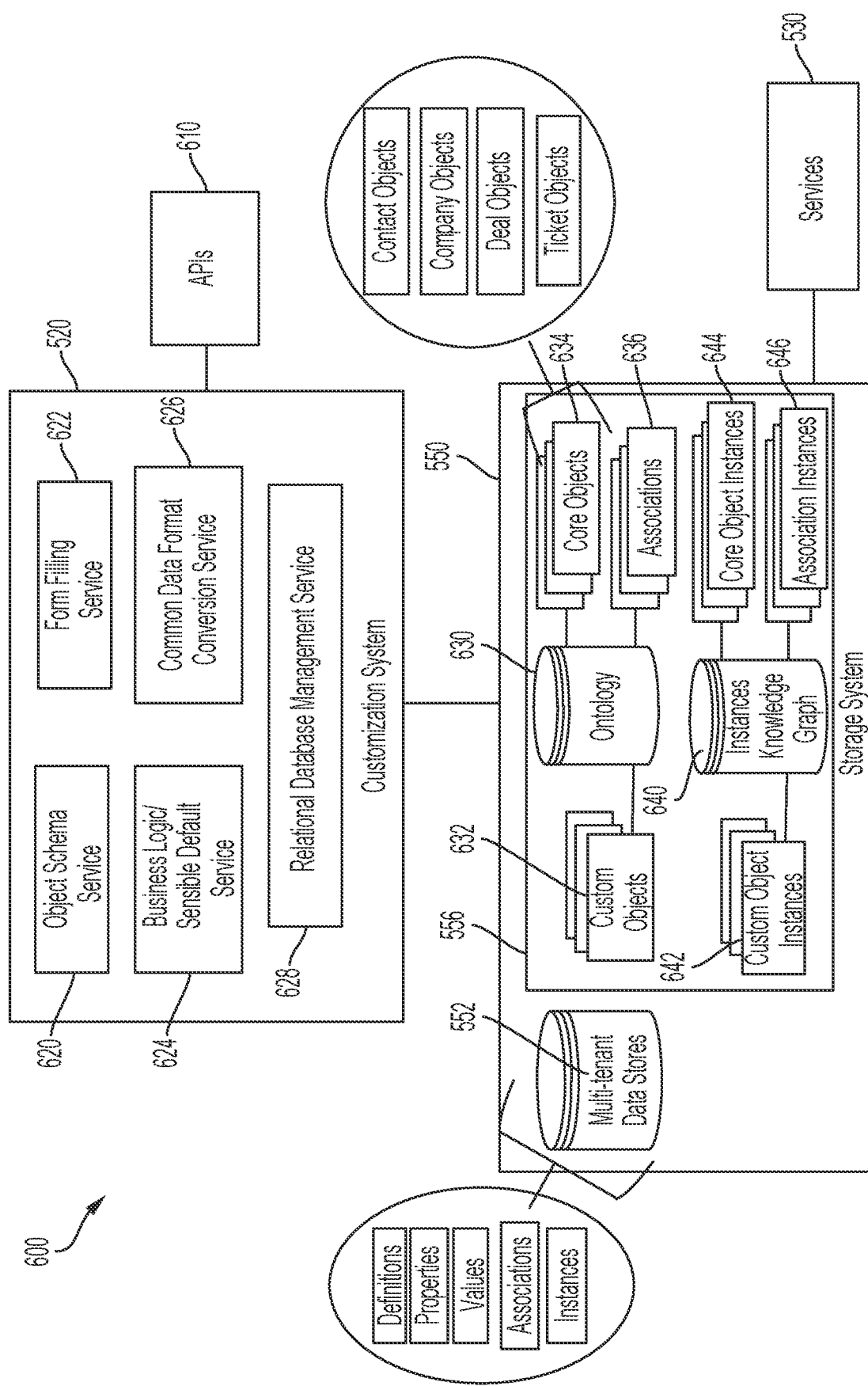
FIG. 46 is an example detailed view of a customization system of the multi-service business platform according to one or more embodiments of the disclosure.

Referring now to example implementations of FIG. 46, there is shown a portion of the multi-service business platform 510 with specific emphasis on details of the customization system 520 and the storage system 550 used to create custom objects. In some examples, the customization system 520 may be a development tool such as a "generic data representation" system. In examples, the multi-service business platform 510, as described in the disclosure, may be a collection of processes that work over or on top of the customization system 520 (e.g., specifically APIs of the customization system 520). This may mean that a custom object created in and/or by the customization system 520 (e.g., including properties related to the custom object) may be immediately used by the services 530 and/or systems 502-508, 1600, 520, 522-528, 562, 566 of the multi-service business platform 510 to execute various tasks.

In example embodiments, as shown, the customization system 520 may use application programming interfaces (APIs) 610 as a computing interface to communicate and interact with users via the user devices 570 and/or integrator users via integrator devices 576. The customization system may include and use an object schema service 620 for providing a data application programming interface (API) such as an object definition API for receiving custom object information from the user devices 570 and/or integrator devices 576. The object definition API may be a CRM definition API, an object schema API, CustomObject data API, or a new schema API (e.g., user may create new schema API which may be defined as a form when filling out this API). The object definition API may be used for communicating the custom object information with the customization system 520 in creating custom objects. These data APIs (e.g., object definition APIs and/or APIs 610) may be "generic data representation" APIs that may be used by users (e.g., via user devices 570), integrator users (via integrator devices 576), and/or developer engineers (via multi-service business platform 510) to express a data model that may exist within the multi-service business platform 510 (e.g., framework).

The customization system 520 may include other services, components, and/or modules that may be used in the process of creating custom objects. For example, the customization system 520 may receive a user request for a custom object creation including custom object information (e.g., custom object name, an object type, at least one property of the custom object, and an association of the custom object with another object) from a user device 570 via the APIs 610. For example, the customization system 520 may include a form filling service 622 for receiving the custom object information for the custom object. For example, the form filling service 622 may provide a form (e.g., via a GUI) that may include prompts (e.g., spaces in a form) for the user to submit or input custom object information that may include a name (e.g., fill out name), a label, and basic information such as properties (e.g., description information about properties which may be similar to core value or core structure of metadata for the custom object being defined). Development documents may be used, or the user may use their own client for the form. In summation, the user may use the APIs 610, a custom object may be created, and then the user may login to the multi-service business platform 510 to monitor how custom objects may be integrated with the rest of the multi-service business platform 510.

The customization system 520 may include and may execute a business logic/sensible default service 624 (e.g., may use business logic and/or sensible defaults) to interpret custom object information in order to convert the custom object information into custom object metadata. The customization system 520 may include and use a relational database management service 628 (e.g., structured query language database service such as open source MySQL™ database service) to insert and store the custom object metadata into a relational-type database (e.g., relational database management system). The customization system 520 may convert the custom object metadata into language-independent data creating a custom object. The custom object may be sent in language-independent data form to the user device 570 and/or services of the multi-service business platform 510, for use with marketing processes, sales processes, and/or customer service processes. For example, each custom object may be viewed by the user as a record on the user device 570 from the multi-service business platform 510. The customization system 520 may also include a common data format conversion service 626 that may assist with synchronization and integration of the custom object within the multi-service business platform 510 (e.g., integration of the custom object with the services 530 of the platform 510).

The customization system 520 may also communicate and direct changes to data on the storage system 550 when creating custom objects. Specifically, the multi-tenant data stores 552 of the storage system 550 may include definitions, properties, values, instances, and associations for all objects (e.g., including custom objects and core objects). These multi-tenant data stores 552 may be changed by the customization system 520 when creating custom objects. The storage system 550 may include knowledge graph(s) 556 such as an instance knowledge graph 640. The knowledge graph(s) 556 may also include, at least implicitly, an ontology 630. The ontology 630 may include the custom object with other custom objects 632 and/or core objects 634 (e.g., contact objects, company objects, deal objects, and/or ticket objects) along with one or more associations 636 (e.g., as added or selected associations 636 by the user) between the objects. Similarly, the instance knowledge graph 640 may include an instance of the custom object with other custom object instances 642 and/or core object instances 644 along with one or more association instances 646 between the object instances based on monitoring of activities of actual entities corresponding to these objects. Instances of objects (e.g., instances of custom objects 642 and/or instances of core objects 644) may be referred to as records.

The multi-tenant data stores 552 (e.g., which may include one or more databases) may be updated when adding custom objects. As described in the disclosure, the multi-tenant data stores 552 of the storage system 550 may include definitions, properties, values, instances, and associations. In some examples, the multi-tenant data stores 552 may include a set of data stores that collectively support custom objects and that may be updated by users of the multi-tenant data stores 552. For example, one data store may be a definitions data store that may be a system of records for storing objects and respective object definitions (e.g., list of core objects and custom objects). This definitions data store may be a definition of what objects (e.g., custom objects and/or core objects) exist. This definitions data store may include a list of objects, e.g., contacts, companies, deals, tickets, and custom objects (e.g., line items, products, etc.). This list of objects (e.g., custom objects) may also include and relate to any integrations that the user may have installed that define custom objects and any other custom objects that the user may find in their data (e.g., list of the tabs in a spreadsheet for user). Another data store may be a properties data store that may be a system of records for storing properties of custom objects such as tracking properties or attributes of custom objects as well as properties of core objects. Another data store may be a values data store that may be a system of records for tracking values of properties. The larger multi-tenant data stores 552 may not discriminate based upon a user ID or a custom object itself. In some examples, each data store may include one or more databases.

In example embodiments, for the definitions data store, the system of record for what custom object types exists may be a "used car". The properties data store may include properties or attributes that may include color, make, model, year, etc. for the used car custom object. The values data store may refer to the user, particular car, object type (e.g., which may be a car), related ID, property (e.g., car is red), etc. that may be laid out in such a way that the user may be able to dynamically create, edit, and remove values data of custom objects. Also, the user may be able to dynamically create, edit, and remove object properties and the user may dynamically create, edit, and remove properties (e.g., property values) of custom objects. This may provide flexibility immediately in terms of the user creating, editing, and/or removing custom objects, definitions of custom objects, and/or properties of custom objects.

In some example embodiments, the definitions and properties data of the multi-tenant data stores 552 may be located in a relational-type database such as relational database management system (e.g., structured query language database such as open source MySQL™ database) such that most of the data may be stored using a JavaScript™ Object Notation (JSON) (e.g., web-based tool JSON blob) to assist in creating, editing, viewing, formatting, and sharing JSON. The various metadata may be stored as columns for efficient indexing and queries. JSON may be used as data format such that JSON may be an open standard file format and data interchange format that may use text to store and transmit data objects. Other data formats may be used to accomplish the same or similar functionality described in the disclosure. In some examples, the values data store may be run by a non-structured query language (SQL) (NoSQL) or non-relational key value database which may be a similar database to Google™ Bigtable™ database.

The multi-tenant data stores 552 may include database storing metadata about object types, e.g., once metadata may be established and/or instances of custom objects may be created. Another set of APIs may be used for processing instance requests relating to specific instances of custom object. Importing may occur over a representational state transfer (REST) endpoint (e.g., REST API) over Internet as described in more detail below in the disclosure. Data may be written into a database (e.g., vastly horizontally distributed database) such that straight bytes may be written into a distributed file system. In some examples, the bytes may be interpreted using metadata in the relational database (e.g., MySQL™ systems). The multi-service business platform 510 may convert the interpreted data to a JSON representation of data (e.g., human readable or machine readable data) to be sent to a user device (e.g., user device(s) 570) or may be available on the platform 510 via a user interface of the user device. The horizontally distributed database may be used primarily as a system of record for storing object values as well as association values. In some examples, the relational database (e.g., mySQL™) may be used for storing property definitions, object definitions, and association definitions. In another example, the horizontally distributed database (e.g., may also be referred to as object instance databases) may include object property values and association instances. The relational databases (e.g., mySQL™ and/or other metadata databases) may include object types, property definitions, and association definitions. The above-described examples of storage for multi-tenant data stores 552 may be some examples of how data may be stored such that other similar and/or different examples of data storage may be utilized while maintaining core functionality of the multi-service business platform 510 and without departing from scope of this disclosure.

In some examples, the multi-service business platform 510 may include security functionality, for example, to avoid exposing entirety of multi-tenant data stores 552 (e.g., platform's object type definition data) to users. Further, in some examples, there may be assumptions about what users may want to do and these assumptions may be internal details. For example, administrators of the multi-service business platform 510 may not want a certain object type exposed to the APIs (e.g., search APIs). In another example, as described in the disclosure, business logic/sensible default service 624 such as sensible defaults may be used by the multi-service business platform 510 in accepting a new custom object (e.g., new custom object type definition) and when creating new associations.

The multi-service business platform may use a process to configure/update data stores (in some examples updating one or more databases in the data stores) based on custom objects. For example, users may use APIs (e.g., the APIs 610) that may include representational state transfer (REST) APIs that may be exposed via a network (e.g., network 560 such as the Internet). These APIs (e.g., REST APIs) may be used by users (e.g., via the Internet) to specify different operations that may be invoked to establish data needed that may define a new custom object type and/or may define instances of that new custom object type. The REST APIs may include data APIs (e.g., object definition APIs described in the disclosure) that may be used to receive custom object information from user devices 570 and/or integrator devices 576. This process may utilize a wrapper interface such as the object schema service 620 as described in the disclosure. The user may provide information using the object schema service 602 that may include a name of a custom object, properties of a custom object, and associations of the provided custom object type with other custom object types and/or core object types. Users may submit this information via a web request to the APIs. The customization system 520 may execute the business logic/sensible default service 624 (e.g., may use condensed business logic and/or sensible defaults) to interpret the information and insert necessary data in a relational database management system (e.g., set of mySQL™ tables). These mySQL™ tables may be a type of database where metadata may be stored about object types (specifically types of custom objects). Once the metadata may be established, the users may create instances of the custom objects.

In an example where a user affiliated with a drone selling/rental business creates a drone custom object, the user may want to or prefer to import data relating to several drone products and/or instances of drone products (e.g., information related to millions of drones owned by the business and/or instances of activities related to the drones) into the multi-service business platform 510 with different drone IDs and links to different deals that the drones may have been sold or rented under. When this import may be executed, a set of APIs may process these instance requests. For importing several drones (e.g., drone information and/or activities related to drone products), the user may invoke operations over REST APIs (e.g., endpoint over the Internet). The multi-service business platform 510 may take information received and may start writing data into another style of database which may be the vastly horizontally distributed database. The multi-service business platform 510 may be used to add on more virtual machines and continue to store all user data without impacting performance of the overall multi-service business platform 510. This data may be written as straight bytes into what may be essentially a distributed file system. Then, the multi-service business platform 510 may interpret the bytes accurately by using the metadata that may be available in mySQL™ systems (e.g., mySQL™ tables). When the user may want to fetch this data, the multi-service business platform 510 may read all the bytes from the distributed database system. The multi-service business platform 510 may interpret what it means to use the data from the mySQL™ systems. Then, the multi-service business platform 510 may convert this information or data into a human readable or a machine readable JSON representation of the data and may send it back to users. Alternatively, the JSON representation may be available through the existing user interface of the multi-service business platform 510.

In examples, the multi-service business platform 510 may provide a mechanism (e.g., a GUI) for a user to login to the multi-service business platform 510 to start using the created custom objects with the services 530 (e.g., framework features such as workflows, reporting). The multi-service business platform 510 may direct the usage of the integrated custom objects with various functionality. Simply, by creating the custom objects, the user may immediately be able to utilize all the functionality of the multi-service business platform 510 with the created custom objects. For example, the user may use services such as workflow automation 532 (e.g., workflows tool) and the user may see the option to include and/or use the created custom objects with workflows. The multi-service business platform 510 may direct the custom objects to be used with the services 530 providing all the automation of services described in the disclosure (e.g., automatically capable of using services with custom objects created). The custom objects may be account specific such that custom objects may only be used and viewed under one or more user accounts and/or one or more company accounts (e.g., custom object created by owner user of business may only be viewed and used with services by the same owner user). In some examples, the multi-service business platform 510 may be an external/visible entity into which users log in. In other examples, the multi-service business platform 510 may serve as a backbone of higher-level functionality that may be exposed throughout an application user interface (UI) and external APIs of the multi-service business platform 510. For example, as described in the disclosure, a manifestation of this automation integration functionality of the multi-service business platform 510 may be with services 530 (e.g., workflow automation 532 or workflows feature). As described in the disclosure, the multi-service business platform 510 may use the synchronization system 504 for providing custom object synchronization between the customization system 520 and the services 530 of the multi-service business platform 510.

In example embodiments, the multi-service business platform 510 may include the customization system 520 for providing a framework for customized programming. The multi-service business platform 510 may be configured in various ways with the customization system 520 to allow for users to be able to program custom objects. In example embodiments, the customization system 520 may be a tool whereby a user, an internal developer or team of internal developers, and/or a third-party integrator may define code that may run inside the customization system 520 of the multi-service business platform 510. An added benefit of internal developer teams being able to define new custom object types may be the improved speed from development to shipping of these customized objects to users. For example, previously with core objects, release of these objects to users on the multi-service business platform 510 may take several months. Using this new process for creating custom objects on the multi-service business platform 510, the custom objects and related services (e.g., features)

may be released to users much sooner and faster such that a user may define a new custom object in minutes and may make use of the custom object immediately. The multi-service business platform 510 may also provide for the execution and/or use of the custom objects that may be programmed with the services 530 and/or other systems of the multi-service business platform 510. For example, custom objects may be defined and the multi-service business platform 510 may be the execution engine that makes use of the custom objects.

The multi-service business platform 510 with the customization system 520 together may form the multi-tenant distributed system (e.g., multi-tenant data stores 552 of the multi-service business platform 510) as described in the disclosure. In some examples, the multi-tenant distributed system and/or multi-tenant data stores as described in the disclosure may be configured generally such that all users' data may reside within a single system. For example, rather than provisioning dedicated systems for each user, the multi-service business platform 510 may be architected to allow for all customer data to co-exist within the same single system. However, the data may be segregated such that the multi-service business platform 510 may prevent mixing of the data (e.g., data from one user is never exposed to another user despite having their data stored in the same system). For example, one data store of the multi-tenant data stores 552 may include all core objects (e.g., CRM objects) and custom objects that may be defined by users, integrator users, and the developers of the multi-service business platform 510. For example, a core object (e.g., contact object), a first custom object (e.g., drone custom object), and a second custom object (e.g., yoga class object) may all coexist within the same multi-service business platform 510 or system. The multi-service business platform 510 may use the services 530 to perform actions and operations on the defined custom objects (e.g., defining workflows, reporting with respect to custom objects, etc.) from the multi-tenant system. In some examples, data of custom objects and instances of custom objects (e.g., drone custom object data and/or instance data of the drone custom object) may be proprietary data even within the multi-tenant data stores 552. This proprietary data within the multi-tenant data stores 552 may be segmented and separated such that the services 530 (and systems of the multi-service business platform 510) may be executed on top of the custom objects and/or instances of objects without any need for these services 530 and systems of the multi-service business platform 510 to access the proprietary data. For example, when values data of the values data store (and possibly other data of the multi-tenant data stores 552) may be populated from a user and knowledge graphs 556 may be created for the individual users based on this populated data, the services 530 and systems of the multi-service business platform 510 may then operate on the custom objects and instantiations of the custom objects.

In example embodiments, custom objects may be generated to be used in connections with the customer relationship management (CRM) system 502 and the content management system (CMS) 508 that may be based on custom object definitions provided by users. In some examples, as shown in FIG. 45, the multi-service business platform 510 may provide for custom objects to be linked/connected to and/or used with the CRM system 502 in terms of associations with core objects (e.g., contact objects, company objects, deal objects, and ticket objects) and/or other custom objects. The multi-service business platform 510 may also provide for a relationship between custom objects and the content management system (CMS) 508. Custom objects may be shared between the CRM system 502 and the CMS 508. For example, the CMS 508 may have a database that users may use to define data models to drive pages and content in the CMS 508. Since the building of APIs and systems may be needed for custom objects, the CMS 508 may also migrate its database objects into the customization system 520, storage system 550, and/or other systems of the multi-service business platform 510. Also, when building pages in the CMS 508, users may leverage various tags that pull in data from other parts of the multi-service business platform 510 when a page may be rendered. For example, one such tag may be "crm_object" which may pull in the specified object into the CMS page when it may be rendered. For example, a user that has a "rental property" custom object may use the CMS 508 to define a page that may have a list of all "rental properties" that may be available and ready to rent. The user may then define subpages for when a customer clicks on a specific rental property. The content on the defined subpages may be populated from information stored on those custom objects. Thus, in example embodiments, user defined custom objects may be trackable throughout a user account lifecycle beginning in the CMS 508, through the CRM system 502, and potentially through the multi-client service system 1600. In this way, users may be able to obtain insights from their data that may not have been previously available to them.

In example embodiments, the multi-service business platform 510 may use a common format for integrating custom objects with the multi-service business platform 510. The common format may be embedded in a core of data processing systems. Various applications may be updated automatically, e.g., CRM applications and/or reporting applications may be updated automatically by syncing into third party services 574 (e.g., third party applications). The synchronization system 504 of the multi-service business platform 510 may be used to synchronize custom objects between third party services 574 and the multi-service business platform 510. Custom objects may be configured to synchronize with external objects that exist externally from the multi-service business platform 510 (e.g., external to the CRM system 502/CMS 508). The synchronization system 504 of the multi-service business platform 510 may be used to sync arbitrary custom objects outside the multi-service business platform 510 to objects inside the platform 510, which may facilitate creation of custom objects and workflows (e.g., using workflow automation 532).

In example embodiments, the customization system 520 may provide mechanisms (e.g., GUIs) and processes for creating associations for the custom objects. For example, the customization system 520 may allow for the creation of an association definition entry (e.g., the relationship of identification (ID) representing one object type to an ID representing another object type) in a relational database management system (e.g., mySQL™ tables). The association definition entry may have an ID used to associate instances of two object types with one another. This process may use similar techniques used with graph database processes (e.g., graph database management system processes such as Neo4j processes). Different name associations may be between different object types as well as between same object types.

For example, creating an association may first require a definition of a valid association which may also require a unique ID representing one object type and a unique ID representing another object type that may be the object types associated by this association. When users request that two object types be associated (e.g., where one object may be a custom object), then the customization system 520 of the multi-service business platform 510 may create an association definition entry in a relational database management system (e.g., mySQL™) that may link the custom object type with either another custom object type or a core object as requested. Once the association definition may be created, the association definition may be given an association type ID. The association type ID may be used by users to associate specific instances of two object types with one another. For example, associating two custom objects (e.g., associating two custom object instances may be two rows in a table) may start with a request to associate through an associations API. The customization system 520 of the multi-service business platform 510 may then write a row into the vastly horizontally distributed database (e.g., may also be referred to as an associations database) which may include a "fat row" format (e.g., may have the source object ID as the key and every linked object ID of the same object type belonging to an association type which may extend out in a wide row from that object type). This implementation, for example, may be similar to high end sophisticated graph databases such as a graph database management (e.g., Neo4j) that may use a similar strategy that may be a common proprietary open source graph database.

In some example embodiments, a qualifier may be added to an association type that may be a name of the association. The multi-service business platform 510 may have directed named associations and may expand metadata to more sophisticated metadata based on types of associations defined. In examples, company conduct associations may be used such that there may be different types of the associations (e.g., different named associations such that there may be different names of associations between the same object types).

In example embodiments, each respective association may include an inverse or opposite association that may be created automatically in response to defining the respective association. For example, when a user may create an association type (e.g., sold a car between business and customers), the multi-service business platform 510 may automatically create the inverse association type (e.g., "car was sold by") and may give the inverse association the same name as the association. Even though an association may be created such that the user may represent a sale of a car to a customer as the customer "purchased" the car (e.g., when defining the association), the multi-service business platform 510 may also automatically create the inverse association in the opposite direction (e.g., the car was "purchased by" the customer) which may be given the same name but a different association type ID. In summary, when an association may be created for a relationship in one direction, the multi-service business platform 510 may always automatically create an association in the other direction such that the multi-service business platform 510 may support both representations for the association and inverse association which refer to same relationship between objects. For example, using the yoga class example, two custom objects may include class and student. An association between these custom objects may be the class having a student that is Bob. An inverse association (e.g., opposite) of the association may be that student Bob may be an attendee or a member of the class (e.g., yoga class B). In summary, the inverse may mean that an association may be from the opposite view which may be from the view of the student or from the view of the class depending on the original association that was created. In this way, the time to process some search results, listing results, and/or other relevant requests may be reduced via the inverse associations.

Figure 47:
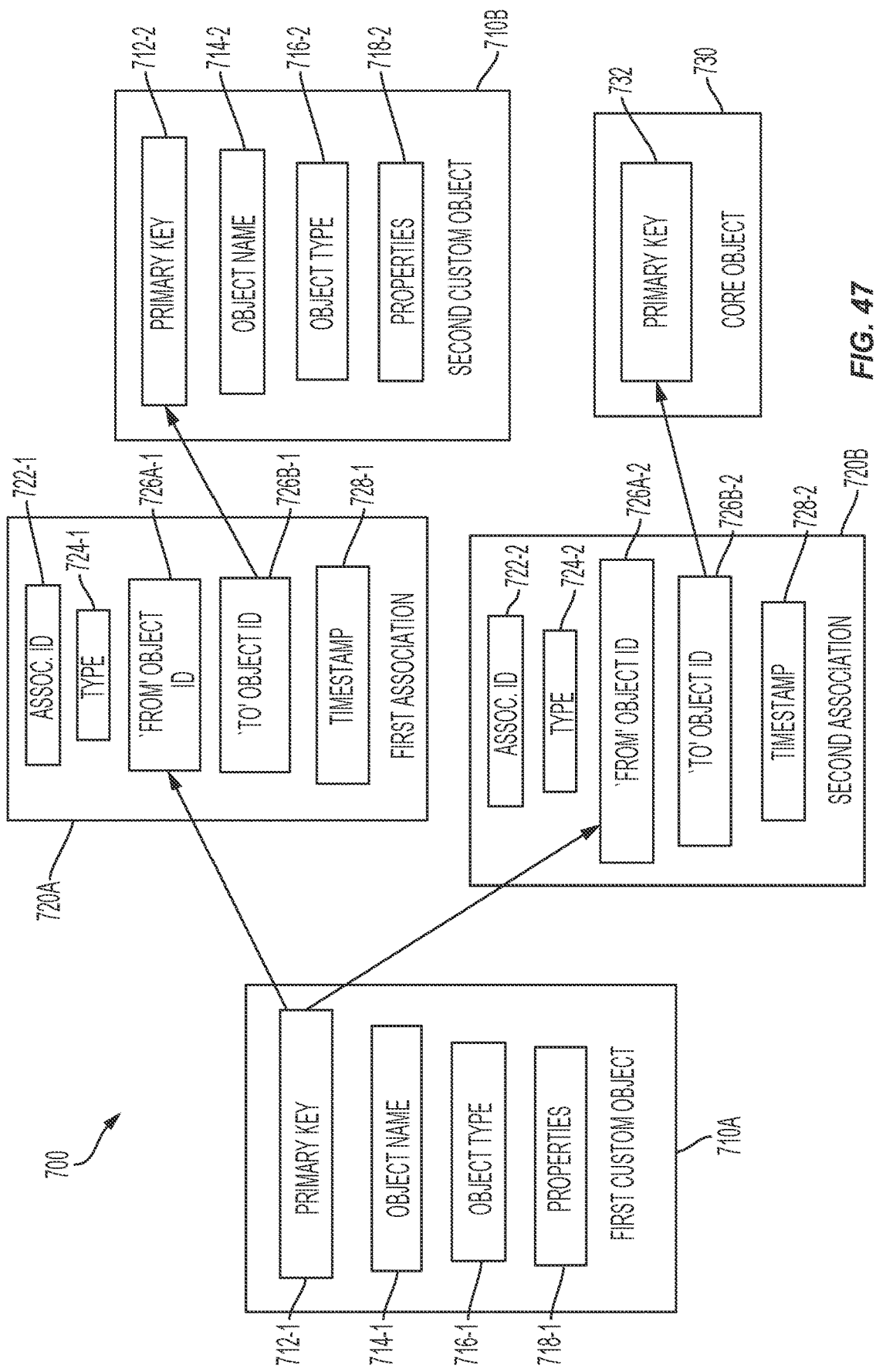
FIG. 47 is an example detailed view of a custom object and associations between the custom object and other objects according to one or more embodiments of the disclosure.

Referring now to example implementations of FIG. 47, there is shown an example 700 of a custom object (e.g., first custom object 710A) and associations 720A, 720B between the first custom object 710A and other objects (e.g., second custom object 710B, core object 730) according to example embodiments of the disclosure. As shown, each custom object 710A, 710B may include a primary key 712-1, 712-2 (e.g., directed associations may be defined between pairs of object identifications (IDs) within a context of a portal and object type). The primary key 712-1, 712-2 may be used to locate specific objects. In examples, the primary key 712-1, 712-2 may include a combination of a portal ID, an object type ID, and an object ID. These three unique identifiers may, in combination, uniquely allow for the ability to find objects. Each custom object 710A, 710B may also include a custom object name 714-1, 714-2, a custom object type 716-1, 716-2, and custom object properties 718-1, 718-2. The customization system 520 may be used to create at least one association (e.g., first association 720A and/or second association 720B) for the first custom object 710A with another object 710B, 730 based on the custom object information received (e.g., as received via the form filling service 622). As shown in FIG. 47, in example embodiments, each association 720A, 720B may include an association identification (ID) 722-1, 722-2, an association type 724-1, 724-2, two IDs involved in association (e.g., a 'From' object identification (ID) 726A-1, 726A-2 and a 'To' object identification (ID) 726B-1, 726B-2), and a timestamp 728-1, 728-2 that may refer to when the association may have been created. In examples, the directionality of each association 720A, 720B may be indicated by the 'From' object ID 726A-1, 726A-2 and the 'To' object ID 726B-1, 726B-2. For example, where a directed association between object IDs may be defined, the association in an opposite direction (e.g., inverse association) may also be defined that may result in two associations (e.g., two association records) for pairs of associated objects per association type. In some examples, a user may decide to define associations in terms of hierarchy by defining names of associations (e.g., user may name one association as "Parent" between two objects and/or may name another association as "child" between the same two objects but in the opposite direction) based on their business model. Any further information from each association may be derived from looking up and/or searching for the IDs, the object tables, and/or viewing what property values may be associated with those IDs.

The primary key 712-1 of the first custom object 710A may be directed to either the 'From' object ID 726A-1, 726A-2 or the 'To' object ID 726B-1, 726B-2 based on a defined relationship between the custom object 710A and another object (e.g., second custom object 710B or a core object 730). In some examples, this defined relationship may be linked both ways such that two objects may be linked via a same association, e.g., where the first custom object 710A may be the 'From' (e.g., directed to 'From' object ID 726A-1 of the first association 720A) and a second custom object 720B may be the 'To' (e.g., direct to 'To' object ID 726B-1 of the first association 720A) and vice versa where the second custom object 710B may be the 'From' and the first custom object 710A may be the 'To' for the same association but from a different perspective. These inverse associations may be automatically created within each association (e.g., same association but may have different IDs distinguishing between association and inverse association) where the inverse association may be referring to the same association but from an inverse perspective of the other object.

For example, where the first custom object 710A may be a customer and the second custom object 710B may be a "yoga class" and the first association 720A may be "class attendance", the same association may be described as "customer" (From') attended "yoga class" (To') or "yoga class" (From') was attended by "customer" (To'). In another example, where the first custom object 710A may be a "salesperson" and the second custom object 710B may be a "vehicle" and the association may be "sold", the same association may be described as "salesperson" (From') sold (association) "vehicle" (To') or "vehicle" (From') was sold by (inverse association) "salesperson" (To'). In another example, as shown, the first custom object 710A may relate to the core object 730 via a second association 720B. Similar to custom objects, the core object 730 may also include a name, a type, and properties but for purposes of showing relationships with custom objects, only a core object primary key 732 is shown in the core object 730. The core object primary key 732 may be similar to the primary keys 712-1, 712-2. Using the previous example, the first custom object 710A may be the "salesperson" and the core object 730 may be a company object (e.g., having an object name, company object type, and company object properties) that may be related by second association 720B. In this example, where the first custom object 710A may be a "salesperson" and the core object may be a "company" and the second association 720B may be "employed by", the same association 720B may be described as "salesperson" (From') employed by (association) "company" (To') or "company" (From') employs (inverse association) "salesperson" (To'). For the example of the vehicle and the salesperson, in some examples, absent an inverse association, a request to view who may have sold a particular vehicle may require processing each instance of the salesperson custom object before identifying which salesperson may have sold the particular vehicle. Conversely, with the inverse association, the same request may be processed by fetching the instances of the particular vehicle (e.g., particular vehicle custom object) and identifying the salesperson instances (e.g., instances of salesperson custom objects) via the inverse association ("sold by") between the vehicle record and the salesperson record (e.g., between instances of the particular vehicle custom objects and all instances of salesperson custom objects based on "sold by" inverse association).

In example embodiments, associations such as association instances may include association ID labels 722-1, 722-2 that may define relationships but may be dynamic. For example, where a student may become a graduate or an alumnus such that the relationship with a given school may evolve from student to alumni. The association ID label 722-1, 722-2 may exist on the details between the two objects but not necessarily on either specific object.

In creating custom objects, the customization system 520 of the multi-service business platform 510 may include safeguards. For example, one safeguard may be a guided service that may assist users in creating quality object types in the schema service. In some examples, part of the guided service may include the customization system 520 providing requirements for users creating custom objects (e.g., users may be required to define objects). Also, part of the guided service may use the customization system 520 and the multi-service business platform 510 to provide the ability to automatically introduce some relationships (e.g., associations) to core object types. In some examples, there may be a limited number of association types, number of distinct object types, number of specific instances per given object type, etc. that may be provided in prompts to users providing various advantages. For example, the multi-service business platform 510 may limit the number of association types that may be created to prevent an overload of the association functionality of the customization system 520 of the multi-service business platform 510. In another example, the multi-service business platform 510 may limit the number of distinct object types that may be created to avoid accidentally confusing object types with object instances. In another example, the system may limit the number of specific instances of a given type that may be created to avoid spamming with data through an import process. Other requirements may include the multi-service business platform 510 requiring that users may define a primary display label for objects so that the objects may be represented in a UI.

As described herein, the multi-service business platform 510 may be used for a business that markets towards customers interested in drone renting (e.g., renting a fleet of drones). The drone business may consider important information to track such as who may be renting drones and point of time of renting. A user from this drone business may use the customization system 520 of the multi-service business platform 510 to create a "drone" custom object that may be associated with core objects (e.g., deal objects and company objects) based on customers renting drones. After creating "drone" custom objects, the user may use the customization system 520 (e.g., import service) to import drone data having different drone IDs and links to different deals (e.g., via the APIs 610 of the customization system 520).

For example, a user may use the multi-service business platform 510 to track drones and particularly determine who may rent drones and at what point in time. Accordingly, the user may create a drone custom object that may be linked with systems and services of the multi-service business platform 510 (e.g., particularly the CRM system 502) as to what deal objects the drone custom object may be associated with, what customers may be renting the drones, etc. The services 530 (e.g., reporting 534 such as standard reporting and workflow automation 532) may leverage data that the drone user defined. The drone user may use the customization system 520 (e.g., generic data representation system) to define whatever data the user may want and relationships between the data.

Then, code or automation may be run against the user's data (e.g., drone-related data from a user's business) in a multi-tenant distributed system (e.g., multi-tenant data stores 552). Using the multi-tenant data stores 552 may mean that there may be some separation of user drone data from the rest of the data in the multi-tenant data stores 552 of the multi-service business platform 510 such that the multi-service business platform 510 may not know that the user that relates to any particular data set thereby providing privacy between data of users and user accounts. Also, the multi-service business platform 510 may not be aware of what object type may be used by accounts to uphold the privacy of users. However, the user may still use the multi-service business platform 510 to perform actions and operations on the drone custom objects and data as defined by the users that may be exclusively accessed by the drone user accounts (e.g., from drone renting business or client).

In another example, a business may be an auto dealership. The auto dealership may wish to represent particularly important objects on the multi-service business platform 510, e.g., vehicles, salespeople, parts suppliers, other suitable elements that may be represented in datastores (e.g., databases of datastores), and the like. In this example, a user of the auto dealership may run their business using a spreadsheet (e.g., Microsoft Excel™ spreadsheet) for recording information about the auto dealership business. Tabs of each spreadsheet may refer to inventory (e.g., new inventory and/or used inventory), salespeople, and customers. The user may create custom objects corresponding to these tabs. For example, the user may create custom objects that may include a salesperson custom object, an inventory (e.g., vehicle) custom object, and a customer custom object using the customization system 520. Each tab may refer to a different custom object or custom object definition that may be created. These custom objects may include properties based on the tabs. For example, each custom object (e.g., custom object definition) may include a collection of properties as described in more detail in the disclosure below as property instances for custom object instances. The user may also create possible associations between these custom objects and other objects (e.g., core objects and/or other custom objects) using the customization system 520. These custom objects (e.g., custom objects 632) and associations 636 (e.g., association instances) may be stored in the ontology 630 of the knowledge graph(s) 556. In general, all this data may be stored in the spreadsheet such that every tab may be a different custom object (e.g., different custom object definition). Each row of the spreadsheet may be a different object instance (e.g., different custom object instance).

Figure 48:
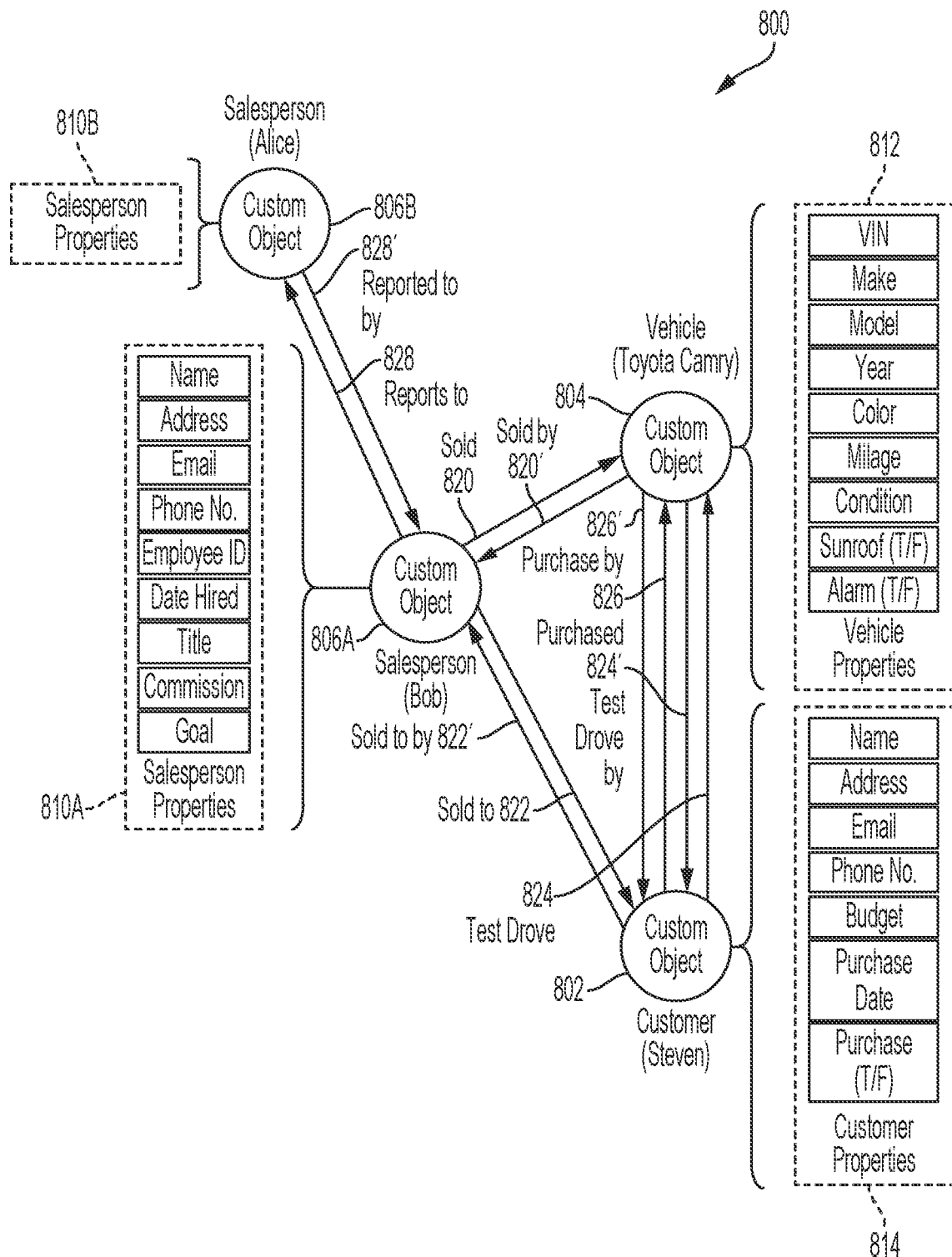
FIG. 48 depicts a visual representation of a portion of an example instance knowledge graph representation according to one or more embodiments of the disclosure.

Referring now to FIG. 48, there is shown a visual representation of a portion of an example instance knowledge graph 800 according to example embodiments. In this example, the instance knowledge graph may relate to instances of the custom objects (e.g., from rows of a spreadsheet) that may be based on the created custom objects (e.g., from the tabs of a spreadsheet) for the auto dealership business. The custom object instances may include a salesperson custom object instance (Bob) 806A, another salesperson custom object instance 806B (Alice), a customer custom object instance 802 (John), and an inventory custom object instance 804 (e.g., vehicle custom object instance such as "Toyota Camry"). These custom object instances may be based on the following custom objects (e.g., custom objects 632 of the ontology 630): salesperson custom object, customer custom object, and vehicle custom object. Corresponding defined properties are shown with each custom object instance as well as possible relationships (e.g., associations) between the custom object instances. For example, as properties may be defined when creating custom objects, the salesperson custom object instance 806A (Bob) may include salesperson properties 810A (e.g., a name such as "Bob", address, email, phone number, employee ID, date hired, title, commission, and one or more goals such as per year, per quarter, per month) for a particular salesperson. The other salesperson custom object instance 806B (Alice) may include similar salesperson properties 810B to the salesperson properties 810A of the salesperson custom object instance 806A (Bob). The inventory custom object instance 804 (Toyota Camry) may include inventory properties (e.g., specifically vehicle properties 812) as defined when creating the vehicle custom objects. The vehicle properties 812 (e.g., from car inventory tab of spreadsheet) may include a vehicle identification number (VIN), car make such as Toyota, model such as Camry, year, color, mileage, condition, sunroof (T/F), and alarm (T/F). The customer custom object instance 802 (John) may include customer properties 814 as defined when creating the customer custom objects. The customer properties 814 may include name such as John, address, email, phone number, budget, purchase date, and purchase (T/F). In examples, some of the properties of the custom objects may be added as being set for the custom objects. Properties may be created for each custom object and may be set on an instance. Other properties (e.g., T/F properties) may be added as being flexible or optional depending on instance such that these properties may also be set on an instance such as alarm (T/F) which may refer to whether vehicle "has alarm system" property for inventory custom object but not known until instance occurs. The alarm (T/F) (e.g., "has alarm system") may be true for some cars, false for other cars, and even unknown for some cars based on the vehicle custom object instance 804. Accordingly, this type of flexible or optional property information may be left empty (e.g., similar to leaving a cell empty in spreadsheet) such that this property information may be filled in as instances occur. As activities occur relating to any one of these custom objects (e.g., custom objects 632) and associations 636 (e.g., association instances) of the ontology (e.g., the ontology 630), the instance knowledge graph (instance knowledge graph 640) may be generated creating instances of these custom objects (e.g., custom object instances 642) along with association instances (association instances 646) directly corresponding to the activities that occurred (e.g., a Toyota Camry vehicle was sold by salesperson Bob to customer Steven). In this example, rows in the spreadsheet may refer to instances of the custom objects.

In an example, as shown in FIG. 48, there are several association instances 820-828 between the different custom object instances that may be based on the possible associations defined in the ontology (e.g., associations 636 of the ontology 630). These association instances 820-828 may be added to the instance knowledge graph 640 as activities occur relating to any one of the associations 636 between custom objects 632 of the ontology 630. For example, an association instance between the salesperson custom object instance 806A (Bob) and another salesperson custom object instance 806B (Alice) may be "reports to" association instance 828 (or, for example, "is supervised by" association instance as described in the disclosure) such that the other salesperson custom object instance 806B (Alice) relates to the salesperson custom object instance 806A (Bob) as a manager. As described in the disclosure, there may be an inverse association (e.g., inverse association instance) created automatically for every association (e.g., association instance). The association and inverse association may be traced bidirectionally. The inverse association for "reports to" association instance 828 may be "reported to by" association instance 828' (or, for example, "supervises" association instance as described in the disclosure) such that the other salesperson custom object instance 806B (Alice) "reported to by" 828' the salesperson custom object instance 806A (Bob). The salesperson custom object instance 806A (Bob) may relate to the inventory (e.g., vehicle) custom object instance 804 (Toyota Camry) by a "sold" association instance 820 such that the salesperson custom object instance 806A (Bob) "sold" 820 the vehicle custom object instance 804 (Toyota Camry). The inverse association for "sold" 820 association instance may be "sold by" association instance 820' such that the vehicle custom object instance 804 (Toyota Camry) may be "sold by" 820' the salesperson custom object instance 806A (Bob). The salesperson custom object instance 806A (Bob) may relate to the customer custom object instance 802 (Steven) by a "sold to" association instance 822 such that the salesperson custom object instance 806A (Bob) "sold to" 822 the customer custom object instance 802 (Steven). The inverse association for "sold to" association instance 822 may be "sold to by" association instance 822' such that the customer custom object instance 802 (Steven) may be "sold to by" 822' the salesperson custom object instance 806A (Bob). The customer custom object instance 802 (Steven) may relate to the inventory (e.g., vehicle) custom object instance 804 (Toyota Camry) by a "purchased" association instance 826 such that the customer custom object instance 802 (Steven) "purchased" 826 the vehicle custom object instance 804 (Toyota Camry). The inverse association for "purchased" association instance 826 may be "purchased by" association instance 826' such that the vehicle custom object instance 804 (Toyota Camry) may be "purchased by" 826' the customer custom object instance 802 (Steven). The customer custom object instance 802 (Steven) may also relate to the vehicle custom object instance 804 (Toyota Camry) by a "test drove" association instance 824 such that the customer custom object instance 802 (Steven) "test drove" 824 the vehicle custom object instance 804 (Toyota Camry). The inverse association for "test drove" association instance 824 may be "test drove by" association instance 824' such that the vehicle custom object instance 804 (Toyota Camry) may be "test drove by" 824' the customer custom object instance 802 (Steven). In an example, the customer (e.g., referring to customer custom object instance 802 (Steven)) may decide to trade-in or sell their purchased vehicle (e.g., referring to the same vehicle custom object instance 804 (Toyota Camry)) back to the same salesperson (e.g., referring to the salesperson custom object instance 806A (Bob)) such that new association instances may be added automatically with respect to and between these different custom objects.

In some examples, advanced reporting, as described in the disclosure, may be used with the auto dealership. For example, a user may want to know a home and zip code of the customers who are buying the most cars from the salesperson (Bob). The user may select all the associated sales for the salesperson (Bob). For those sales, the user may then select the associated customers and for those selected customers, the user may access or obtain their zip codes. The advanced reporting service may aggregate by zip code and count the number of instances of zip code. This may involve a standard style SQL query but may be advanced in terms of the query or by tooling which may be used in building these reports by advanced reporting.

FIGS. 49A-49G show example screenshots of user interfaces (UIs) relating to processes of creating custom objects and processes of using custom objects on the multi-service business platform 510. These figures are screenshots of example graphical user interfaces (GUIs) allowing a user to create custom objects and then use the custom objects with services of the multi-service business platform 510 according to one or more example embodiments of the disclosure.

Figure 49A:
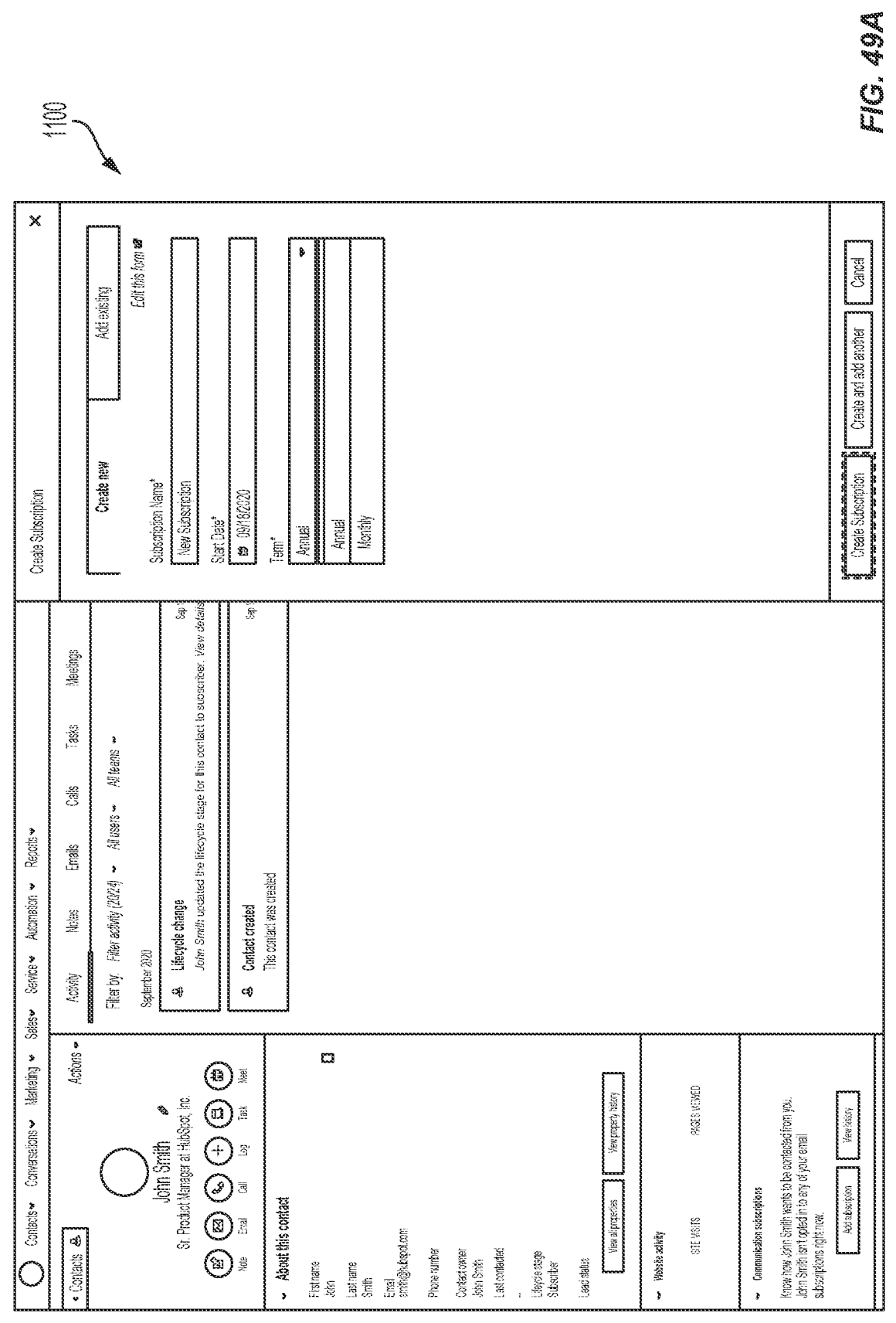
Figure 49B:

For example, FIG. 49A shows a screenshot of graphical user interface (GUI) 1100 for creating custom objects (e.g., creating custom object definitions including creation of properties of the custom objects). In example embodiments, other GUIs may be used such as an object definition GUI that may be presented to a user where the user may define schemas of their custom objects. In defining schemas of a custom object, the user may provide an object name (e.g., may describe type of object) and properties of the custom object. In this example, the subscriptions may refer to a type of custom objects such that subscription custom objects may be created in the GUI 1100 from directing APIs. The GUI 1100 and other examples of GUIs may show an ability to create custom objects and associations (e.g., creating association definitions) that may be handled via external APIs as described in the disclosure. For example, the form filling service 622 may be used with these APIs with respect to GUI 1100. FIG. 49B shows a screenshot of GUI 1200 for listing custom objects (e.g., shown as subscription custom objects) that were created. As shown in FIG. 49B, in some examples, the user may view the custom objects along with core objects in a grid view. In this example, the user may select links associated with objects such as custom objects to view their records. This may be expanded across and throughout the multi-service business platform 510 which may be used by users for their businesses.

Figure 49D:
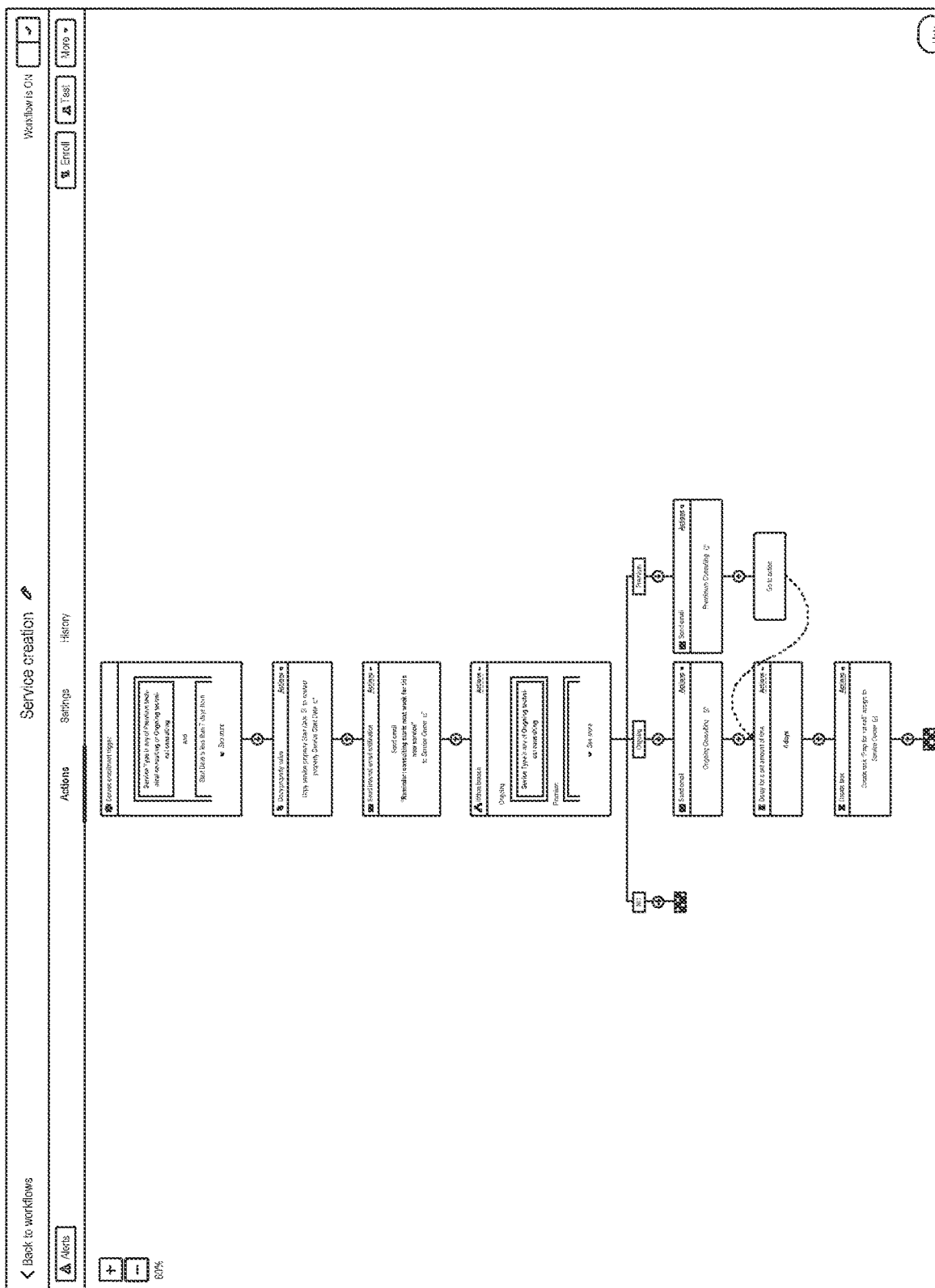
Figure 49E:
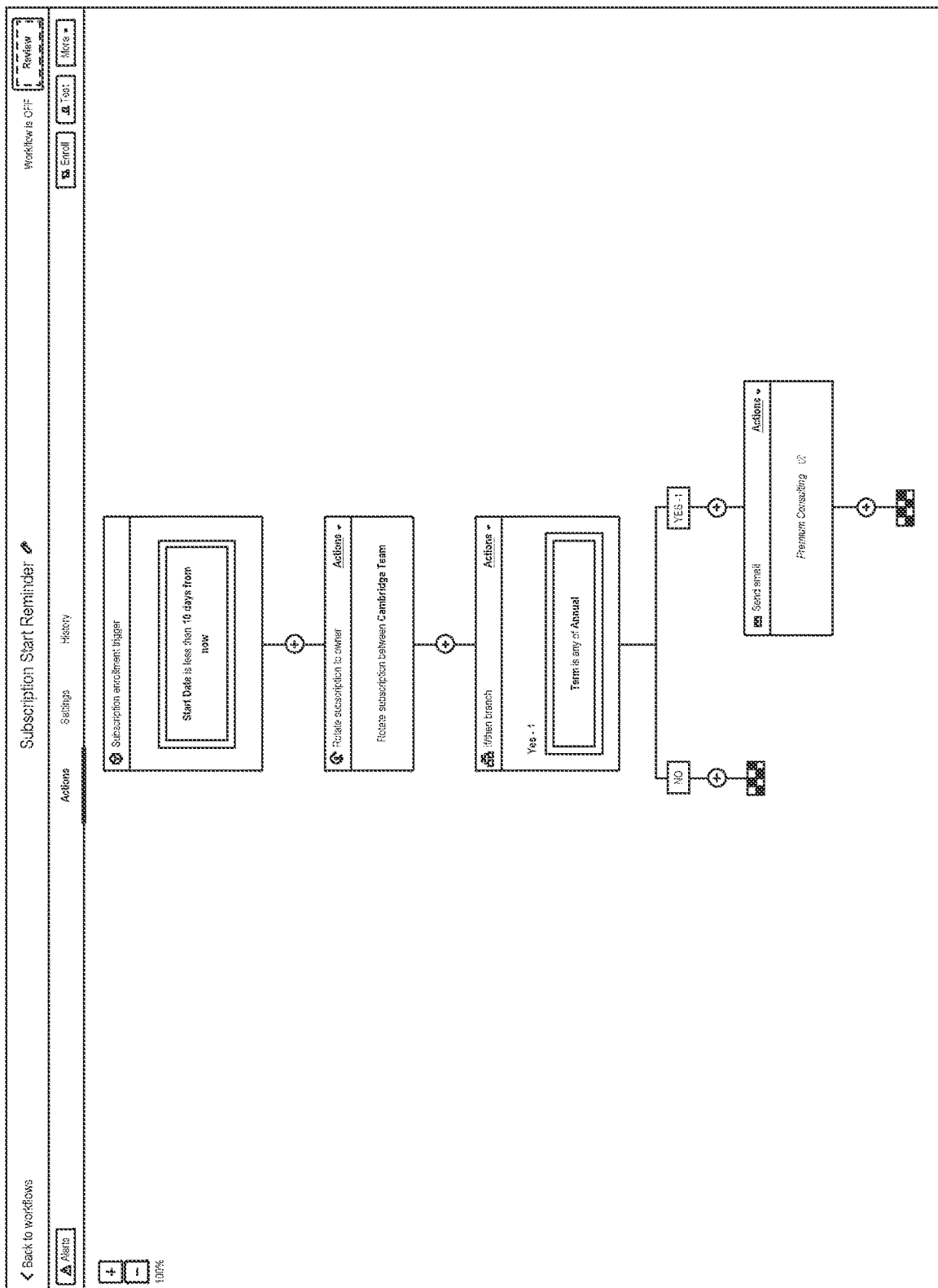

In examples, some of screenshots show use of the custom objects with various services (e.g., the services 530). For example, these screenshots may be GUIs involving use of custom objects with services (e.g., using workflows and reporting). These example GUIs may be showing instance-level usage throughout a user interface (UI). For example, FIG. 49C shows a screenshot of GUI 1300 for listing custom objects with filtering capability services (e.g., search/filter capabilities). In this example, properties of custom objects (e.g., properties of subscription custom objects) may be searched using filtering capability services. In other example embodiments, FIG. 49D shows a screenshot of GUI 1400 for custom object workflows that may relate to assigning a proper service package to a subscription. In this example, actions may be shown related to service creation that may involve custom objects. Another workflow example is in FIG. 49E showing a screenshot of GUI 1500 for custom object workflows that may relate to sending an email to a customer automatically if the custom may be starting their subscription soon. In this example, actions may be shown related to a subscription start reminder that may involve custom objects. In another example, FIG. 49F shows a screenshot of GUI 1800 for reporting with custom objects that may relate to breaking down subscription custom object types. Another reporting example is in FIG. 49G showing a screenshot of GUI 3000 for reporting with custom objects that may relate to breaking down subscription terms by subscription owner. These reporting examples show options for users in configuring charts based on type of charts and/or data that may be included in charts as relating to one or more custom objects.

In example embodiments, there are other custom object API examples such as relating to customer relationship management (CRM) objects. For example, a CRM objects API (e.g., public API) may be able to represent and organize data based on business requirements. Specifically, the CRM objects API may be created to define and manage custom objects. Users and/or integrators may use the CRM objects API to define custom objects, properties, associations, and/or leverage the multi-service business platform 510 to increase business. Custom objects may be specific to a portal. The custom objects may exist with core objects (e.g., contacts, companies, deals, and/or tickets) in the multi-service business platform 510. Custom objects and custom properties may be defined to organize and represent business data for a company or industry. Custom objects may be linked and/or associated to the core objects or other custom objects.

In example embodiments, a custom object may be defined by defining a custom object type and property definitions. This defining process may also include defining association definitions with core objects (e.g., contact objects) and/or custom objects. By default, the property type and field type may be a string and text, respectively (e.g., a property may exist under properties to be specified as various code terminology). As part of the schema, there may be association definitions automatically created between the custom object and email, meeting events, notes, tasks, calls, and conversation sessions. Custom objects may be retrieved (e.g., retrieved as meta-type custom objects, fully qualified named custom objects, and/or portal-specific custom objects). Related object schema may be modified. Once a custom object may be defined, in some examples, the name and labels (singular and plural) may not be changed. Properties of the custom object may be modified after creation. Custom objects may be associated with core objects (e.g., contact, company, deal, or ticket objects) or other custom objects. Custom objects may be deleted after all object instances of a same or similar type are deleted (e.g., custom object type may be deleted after all object instances of the same or similar type, associations, and custom object properties may be deleted). In examples, custom objects may be associated with core objects or other custom objects.

In example embodiments, when creating or updating properties for custom objects, both type and field type values may be required. The "type" value may determine the type of the property (e.g., a string or a number). The field type property may determine how the property may appear in the multi-service business platform 510 or on a form (e.g., as a plain text field, a dropdown menu, or a date picker). There are various examples of how type and field type may be configured for properties on new custom objects. Values for field type and compatible field type values may include enumeration (e.g., string representing a set of options), date (e.g., representing a specific day, month, and year), date time (e.g., representing day, month, year, and time of day), string (e.g., plain text strings), and/or number (e.g., value containing numeric digits such as one decimal). Other field type values may include Boolean checkbox (e.g., input that may allow users to select either "Yes" or "No" as used in a form displaying a single checkbox), checkbox (e.g., a list of checkboxes that may allow a user to select multiple options from a set of options allowed for the property), date (e.g., date value that may be displayed as a date picker), file (e.g., allows for file to be uploaded to a form such as stored and displayed as a URL link to the file), number (e.g., string of numbers in decimal or scientific notation), radio (e.g., input that may allow users to select one of a set of options allowed for the property which may be displayed as a set of radio buttons when used in a form), select (e.g., dropdown input that may allow users to select one of a set of options allowed for the property), text (e.g., plain text string that may be displayed as a single line text input), and/or text area (e.g., plain text string that may be displayed as a multi-line text input).

In example embodiments, a custom object process may include creation of a custom object schema (e.g., object type, properties, and associations). The custom object schema may be fetched. A custom object instance may be created. An association may be created between the custom object instance and an existing contact. A new association definition may be created between the custom object and a ticket object. A new property definition may be created. The object schema may be updated with the new property.

In example embodiments, the multi-service business platform 510 may provide marketing and sales functionality for communicating with customers, tracking interest, and/or offering possible deals based on inventory. For example, where the user is a car dealership, object schema may be created to define and represent car inventory in the multi-service business platform 510. There may be attributes of the car that may be stored. The car may be represented as having the following properties: condition (new or used): enumeration, Date received (at a dealership): date, Year: number, Make: string, Model: string, VIN: string, Color: string, Mileage: number, Price: number, and/or Notes: string. To connect with a potential customer, a relationship between core contact objects and the custom car object may be defined. By defining an association between the contact (core object) and the car (custom object), the multi-service business platform 510 may be utilized to communicate with potential buyers and track progress on a potential deal. Once a data model may be finalized, the object schema may be created using the API. This may define the custom object and its properties as well as its association with other core objects (e.g., contact objects). A property group relating to car information may be created. Some object properties may be created when creating the schema. Additional properties may be added, and the object schema may be updated at a later time.

The custom object process for creation of the custom object schema may be applied to the car dealership example. For example, an object schema related to cars may be fetched. An object instance may be created which may allow for the use of the multi-service business platform 510 to communicate with potential customers, track potential interest, and offer possible deals for them based on inventory (e.g., creating a new custom car object instance and associating this instance with an existing contact object instance). A new object identification (ID) may be used for associations created such as the association between the custom car object and an existing contact. Objects and properties may be retrieved as needed. An association may be created to an object instance. For example, with the new object ID and a target contact ID, the multi-service business platform 510 may be used to create an association between the new car instance and the contact. As described in the disclosure, associations may be described in both directions or bidirectionally (e.g., between car and contact such that each association may relate to the car's association or relationship to the contact in one direction as well as the contact's association or relation to the car in the other direction). There may be a new association definition. For example, the multi-service business platform 510 may be used to track services performed on cars sold. The multi-service business platform 510 may further use tickets to log any maintenance performed. A new relationship between custom car objects and core ticket objects may be created by creation of a new association. There may be a new property definition. For example, maintenance packages may be offered to customers (e.g., oil change every 5 k miles) which may be tracked by adding a new property. A new field may show up in a sidebar interface of the multi-service business platform 510 as a secondary property which may provide quick identification of a level of service when a car goes into a car shop.

As shown in FIGS. 49A-49G, in an example CRM, properties may be found and may show up in several services. For example, properties may show up in reports, workflows, imports, profile page, etc. Specifically, there may be a listing page GUI (e.g., the GUI 1200 of FIG. 49B) that may show a listing of all the object instances for a type. In this page, the user may shift from one object type to other object types that may be defined in this portal. For example, there may be a subscriptions custom object and services object. There may be several instances of services. If a user clicks into an individual profile for each service, the user may view different fields. Each and every single one of these fields may be a property in the multi-tenant data store that may be related to the object definition for the corresponding custom object. In another example, if a user goes to settings and goes to properties, the user may go into service properties and may create a new property for the service custom object (e.g., custom object definition). Then, when the user goes back to the services, the user may then be able to add the property as a column in this table, may drill in and add the property as an item that the user may want to view, and the user may start reading and writing data from that property which may be from the CRM side. When the user goes into automation and defined workflows, the user may request that they want a workflow from scratch, e.g., a service-based workflow. For the triggers and the actions on this service-based workflow, the user may have access to all these properties that may have been previously defined. If the user went in and added a new property, the new property may show up in this list, and the user may trigger logic based on values of the "service" custom objects.

Additionally, in some examples, the user may filter on associated custom objects. For example, if a service instance may be associated with a deal. The user may filter on the associated deal information by leveraging associations with custom objects. If the associations are not defined and in the knowledge graph, then the user may not leverage them in workflows. In summary, anytime users load a part of the multi-service business platform 510, the platform 510 may pull in the knowledge graphs (e.g., knowledge graph(s) 556) and then may expose or may hide different services (e.g., features) based on the data that may be stored therein. If properties exist, then they may show up. If associations to other custom objects and other object types may exist, then those associations may be visible within the multi-service business platform 510. For example, when going into the listing tool of the multi-service business platform 510, a user may create a list. This may function similarly to how the user may view this function in workflows. It may be visible throughout the software such that the multi-service business platform 510 may pull in the knowledge graph(s) 556 throughout the platform 510 so that the user may then leverage the instance data throughout the platform 510.

Figure 50:
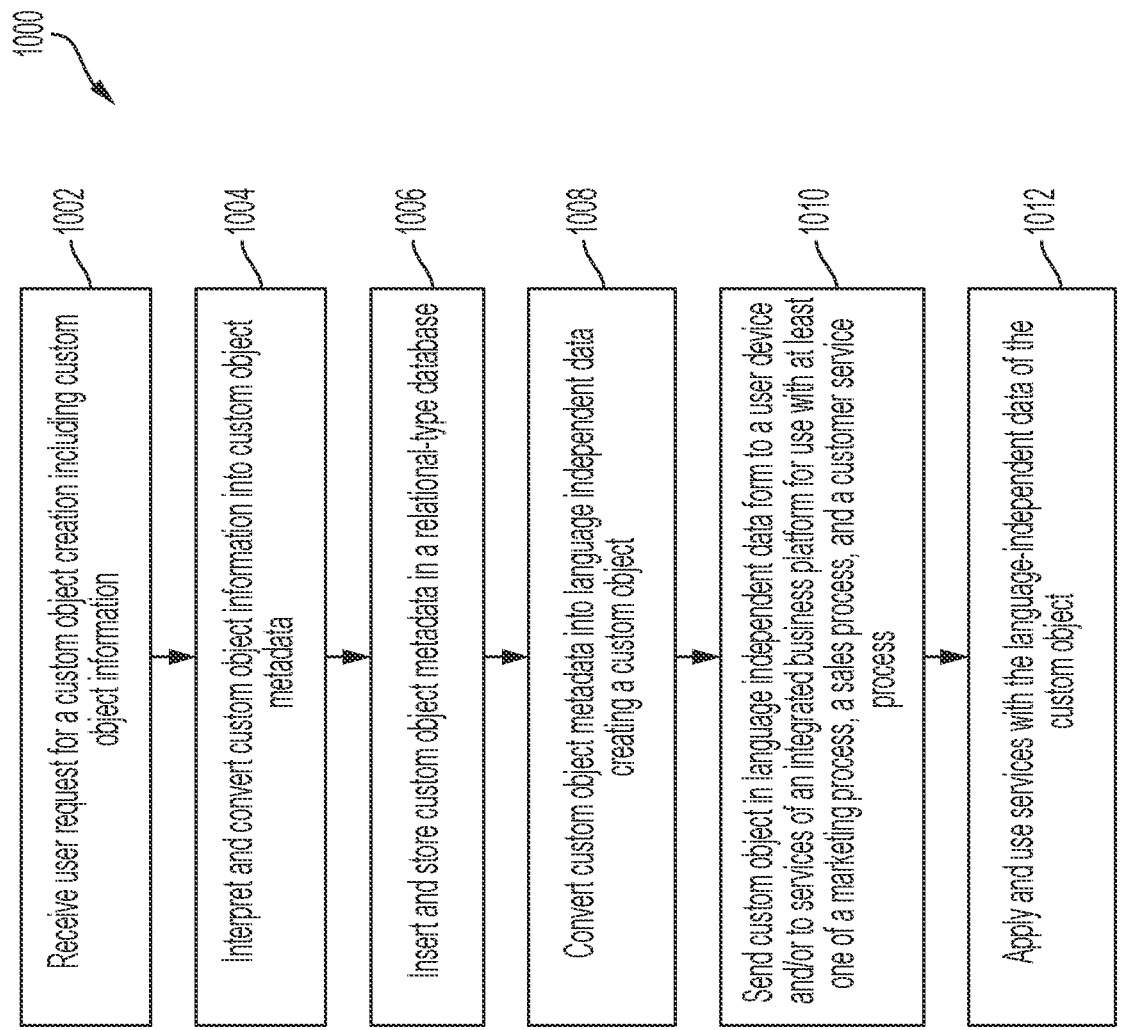
FIG. 50 is a flow chart illustrating a set of operations of a method for using the customization system of the multi-service business platform according to one or more embodiments of the disclosure.

Referring now to example implementations of FIG. 50, there is shown a flow chart including a set of operations of a process 1000 for creating a custom object according to example embodiments of the disclosure. In this example, a user request for a custom object creation including custom object information 1002 may be received. The custom object information may be interpreted and converted into custom object metadata 1004. The custom object metadata may be inserted and stored into a relational-type database 1006. The custom object metadata may be converted into language-independent data creating a custom object 1008. The custom object in language-independent data form may be sent to a user device and/or one or more services of a multi-service business platform for use with a marketing process, a sales process, and/or a customer service process 1010. Services may be applied and used with language-independent data of the custom object 1012.

As described in the disclosure, the multi-service business platform 510 may include the services 530 (e.g., features) that may be used with and customized for interacting with custom objects. As new instances of the services 530 may be added or instances of the services 530 may be changed, the multi-service business platform 510 may automatically apply the added and/or changed instances of the services 530 to all custom objects. The multi-service business platform 510 may also automatically integrate use of all custom objects with any new services that are added to the services 530.

In another example, a user may be from a yoga business. In this example, the user may create the following custom objects that may include studio custom objects, class custom objects, instructor custom objects, student custom objects, and schedule custom objects as described in the disclosure. The user may use the customization system 520 of the multi-service business platform 510 to create these custom objects. The user may also use the other systems and the services 530 of the multi-service business platform 510 for assisting with management of their yoga business (e.g., especially use of custom objects of the yoga business).

For example, the yoga user may use the workflow automation 532 (e.g., workflows) to send out a "special" to students who may have not attended a specific class more than 90 days ago. Using the workflow automation 532 (e.g., workflows tool), the user may create a "student" workflow. Enrollment criteria may be that the student may have attended at least one class and the date the student last attended was more than 90 days ago. An action for this workflow may be to email the contact record (e.g., contact information in properties such as email) associated with the student a discount for a new package of classes. This workflow may be updated and kept in sync automatically as students attend classes in real time and/or periodically as time passes. For example, the user may use reporting 534 to find out how many classes students may be attending. Using reporting 534 (e.g., reporting tool), the user may build a histogram of student counts by number of classes attended. A CRM-related action 536 may include searching capabilities that may be used with CRM records. The search may be used by the user to create a public listing of all classes and locations so students may be able to view and access what classes may be available and may sign up to attend online. A search page may be supported by a CRM search engine of this CRM-related action 536 (e.g., search) which may support defining well-formed queries against a data set. For example, a search may be a query such as "Show me all classes at a specific location that are taught by instructor X and are held on weeknights". The user may use import/export services 540 (e.g., importing and/or exporting properties from external data source(s) such as external information source(s) to the multi-service business platform 510). In this example, the user may specifically use import service (e.g., import tool). For example, when the user (e.g., owner of yoga business) starts using the multi-service business platform 510, the user may need to import data when creating custom objects. After the user defines the custom objects, the user may leverage the import tool in the CRM to import all of their data (e.g., yoga business data from external information sources 580) in a comma-separated values (CSV) file form into the multi-service business platform 510.

Another action 542 of the services 530 may be a listing service (e.g., a listing tool or a lists tool). The user may use the listing tool to create a list of all instructors who need to be re-certified. Using the listing tool, the user may define a list of all instructors whose certification may be 90 days from expiring. A manager of the yoga business may then connect with any instructors on that list and may ensure that the listed instructors may get re-certified. This list may be automatically updated and kept in sync in real time and/or updated periodically as time passes. Another action 542 or service that may be used by the user may be a public API. For example, as the yoga business grows and becomes more sophisticated, the yoga business may want to develop their own programs that may run in-house that may leverage the data stored on the multi-service business platform 510. For example, the multi-service business platform 510 (e.g., specifically the customization system 520 of the platform 510) may include custom object APIs that may allow for the user to read and write object data from a custom object datastore of the multi-tenant data stores 552. Any services (e.g., features) of the multi-service business platform 510 may automatically take newly written data into account. Another action 542 or service that may be used by the user may be permissions (e.g., custom object permission service or system). As the yoga business or company grows, the yoga company may need to hide sensitive information about units from different agents. By leveraging the custom object permission service, the user of the yoga company may effectively partition what data specific reps may access and edit. For example, the user (e.g., yoga company user, which may be an administrator user) may use this permissions service to hide classes taught by one instructor from another instructor.

Another action 542 or service that may be used by the user may be advanced reporting. For example, the yoga business or company may want to leverage more sophisticated business intelligence tools. Data in a custom objects data store (e.g., of the multi-tenant data stores 552) may be automatically synced into a platform instance (e.g., platform instance that may be from a third party hosted and managed database such as Snowflake™) that may then be used to drive advanced queries and joins. For example, all the same information may be mirrored and/or copied into the third party hosted and managed database (e.g., using third party service 574 such as Snowflake™) that may be leveraged to do efficient analytic queries. Most of the CRM may be meant to be real time or near real time as possible so that as users may make changes to properties of their objects, workflows may be updated, reports may be updated, lists may be updated, content may be updated, etc. For more advanced reporting, where real time may be less important, all that data may be sent off to the third party hosted and managed database (e.g., Snowflake™) where users may then perform SQL-style queries into the data set. Whenever a user may define a new custom object or install an integration that may bring in custom objects, the user may then leverage this advanced SQL style query against that data set. With this link to third party hosted and managed database, the multi-service business platform 510 may provide hosted data warehousing solutions for users. Users may then join their data sets that they already have in third party hosted and managed databases with the data of the multi-service business platform 510 (e.g., storage system 550), which may provide an expansion of users' data.

Another action 542 or service that may be used by the user may be internal listing and profile pages. All objects (e.g., specifically custom objects) may be defined in the custom object data store (e.g., of the multi-tenant data stores 552) that may have internal listing pages and profile pages out of the box. This may make it relatively easy for a user to view and/or have access to all of the instances of the custom object that the user may have created and interact with the related data.

In example embodiments, the multi-service business platform 510 may include a reporting system 526 that allows users to create different types of visual reports using various data sources associated with a client's business. In example embodiments, the reporting system 526 may allow users to generate visual reports that incorporate data collected with respect to core objects and/or custom objects, thereby providing for multi-dimensional custom reports. The custom event reporting may generate reports using disparate data that was collected, derived, generated, and/or otherwise obtained by the various services of the multi-service business platform 510 (e.g., CRM 502, CMS 508, payment system 524, event system 522, and/or the like) based on the common object definitions that may be applied across the platform. In some example embodiments, the custom event reporting may implement or leverage a unified analytics pipeline such that all event reporting may be based on that pipeline (e.g., utilizing common infrastructure).

The multi-service business platform 510 may include an event system (e.g., event system 522). The event system 522 may be configured to monitor for and record the occurrence of events. In some example embodiments, the event system 522 may be configured to maintain unified events that are tracked across several systems of the multi-service business platform 510. In some of these example embodiments, event records may track all the different types of events that may occur with respect to a particular type of object such that the event record provides a log of all instances of different types of events that occurred with respect to the object. The event system 522 may fit with several of the services in this disclosure including reporting aspects and triggering of workflows and actions as related to default and custom objects.

The multi-service business platform 510 may include instances of custom objects that may be used to perform customer-defined analytics (e.g., analytics 538) across the CRM system 502 and the CMS 508. The multi-service business platform 510 may include a common infrastructure such that all objects (new, old, core, and custom objects) may be tracked via a unified analytics pipeline. The custom analytics may be associated with CRM/CMS based on custom object definitions that may be provided by users. The custom analytics may be used with a unified analytics pipeline such that all event reporting may be based on that pipeline (e.g., utilizing common infrastructure).

The multi-service business platform 510 may generate custom actions that may operate on or with respect to instances of the custom objects. The custom actions may be part of another system that may reside within the multi-service business platform 510. The multi-service business platform 510 may be built on top of the customization system 520 (e.g., custom object data system) and may not be aware of workflows or their custom actions. The custom actions may be based on objects being considered nouns and actions being considered verbs such that automation of the multi-service business platform 510 may allow for verbs as actions may be added easily along with adding nouns as custom objects. The multi-service business platform 510 may include APIs such that any user may write their own extensions (e.g., using Lambdas or serverless functions). For example, custom actions may be new types of actions that may be implemented due to creation of new custom objects (e.g., new actions tracked based on new custom objects).

The multi-service business platform 510 may provide custom object filtering. For example, custom objects may include a set of custom properties that may be used to filter instances of the custom objects based on values of the respective custom properties. Examples of custom object filtering may include list segmentation, filtering, and searching across custom object types and being able to automate off changes (e.g., changes in custom objects and/or core objects).

The multi-service business platform 510 may use the machine learning system 506 with custom objects. For example, instances of custom objects may be used with machine learning system 506 to train machine-learned models that may be used with the user (e.g., related to a user's business) for all objects (e.g., custom objects and core objects). In one example, the machine learning system 506 may provide custom object filtering for custom objects.

For example, the machine learning system 506 may be used with real estate custom objects such that a user may use the CRM system 502 to track homes for sale and may have built landing pages in the CMS 508 for each house that may be for sale. The machine learning system 506 (e.g., machine learning as a service (MLaaS)) may be used to predict interesting things. Two examples may be a likelihood that a home may sell and the most likely prices. In each example, the user may request for the machine learning system 506 of the multi-service business platform 510 to predict the value of these properties on the house and may use the machine learning system 506 (e.g., MLaaS) to predict other insights. The machine learning system 506 may use machine-learning models to take into account information about a specific home, data from other home custom objects in the CRM system 502, and data from objects associated with the house (e.g., core objects and/or custom objects), such as the realtor and contacts that may have viewed landing pages for the homes.

The multi-service business platform 510 may include custom objects that may be configured to support a custom application architecture of a user that may connect with the CRM system 502/CMS 508 of the multi-service business platform 510. The multi-service business platform 510 may be an arbitrary platform that may act on arbitrary objects to do arbitrary actions and sync to arbitrary systems and may get the benefit of various capabilities. In an example, the CMS 508 may be made front end to the CRM system 502 (e.g., under protection of login) such that a user may view what they need in the CMS 508. The custom application may be any type of application, e.g., a web application. For example, a yoga studio business may include custom objects such as schedule objects, class objects, "my calendar" (gigantic web application) that may be built on top of the CMS 508 and the CRM system 502 such that users may build and present CMS-driven apps integrated with the multi-service business platform 510.

The multi-service business platform 510 may support a custom application architecture of a user that may integrate with a payment processing service (e.g., payment system 524) and may connect with the CRM system 502/CMS 508 such that a payment processing service may feed payment data to the CRM system 502 and the CMS 508 of the multi-service business platform 510 in real-time. In example embodiments, the payment system 524 is configured to establish payment sessions for customers with third-party payment processors on behalf of clients of the multi-service business platform 510. The payment processing service may, for example, assist a manufacturing company in creating invoices for its customers and may initiate payment sessions with a third-party payment processor that allows the customers to pay the amounts indicated in the invoices directly via the third-party payment processor. In this way, the multi-service business platform 510 may not have to request, receive, or securely store sensitive payment information from the client's customers, while still being involved in the payments' workflows. Using this payment processing service, customers may easily go onto a website and make a purchase similar to other purchasing sites. The payment processing service may be used with business to business (B2B) transactions, e.g., custom objects for B2B; custom actions for B2B; and tight integration between objects in a B-commerce framework (e.g., product catalog may be in the CRM, the website may be in the CMS, payments may be immediately reflected in the CRM and deal records, custom objects may be shipping and/or tracking, etc.).

The multi-service business platform 510 may include an attribution reporting tool which may be an extremely powerful tool that may leverage much of this disclosure. Attribution reporting may be a measure of efficacy of effort. For example, a user's business may have website visitors that may be reviewing web pages, may be filling out forms, etc. and the user's business may have sales reps making calls. All these actions by visitors and by members of the business may be measured by how effective each of these individual touch points was in order to have some outcomes (e.g., closing deal). Attribution reporting may take all these different inputs which may be happening in the multi-service business platform 510 (e.g., the CRM system 502 of the multi-service business platform 510) and may weight them using different models. The weighting may be prescriptive or customizable. When prescriptive, weighting may be based on some industry standard attribution models that may be built (e.g., W model or a U model or an "all touch" model may be used). These standard attribution models may focus on what may be the weighting percentages that may be attributed to specific touch points which may be the first interaction some customers have with the business or it may be the way that customers became a contact in CRM (e.g., these may be important touch points that users may want to add or increase weight for). In another example, weighting may use a machine learning (ML) powered model which may take in various actions that may be happening and may try to determine what may actually be the most likely property along the same customer journey (e.g., may use ML model that may be indicative of user's business process). Then, the attribution reporting may report on which may be the most valuable touch points along a customer's journey through the process till outcome (e.g., closing a deal). Custom objects may fit in with attribution reporting such that custom objects may be the output of this attribution system. The multi-service business platform 510 may include an attribution engine for providing these functionalities. The attribution engine may be able to leverage custom objects as the output, which may mean all services and/or systems described in the disclosure may also be utilized. For example, this attribution reporting may be used alongside other services such as custom object reporting. There may be workflows that may be triggered based on the attribution engine which may be a result of the fact that custom objects are the way that various data may be processed on the multi-service business platform 510.

Dedupe—Entity Resolution Systems and Methods

Business entity databases often include entries that are duplicative or at least contain duplicative information about a common entity. Entries may be duplicative despite there being variances in entity-related details, such as spelling of a business name, missing contact middle initial, multiple business email addresses and the like. Existing techniques for entity resolution including determining entries that are similar and that may be duplicates may prove useful for small or moderately sized entity databases. However, such techniques, such as string comparison, entity heuristics, and the like consume excessive amounts of computing resources when attempting to handle large or massively large entity databases, which are becoming more common. Determining duplicate entries in a set of entities is generally an N-squared problem (e.g., $(N*(N-1)/2)$, meaning that the number of comparisons required to determine if any two entries in an entity set are duplicates grows as a square of the count (e.g., N^2) of entries. Therefore, the number of comparisons for large entity sets of, for example, 100,000 or more entries is prohibitive (e.g., 5 billion). Resolving entities by, for example, detecting and addressing duplicate entries in business entity databases provides great benefits to a business operation. Determining duplicate or likely duplicate entries applies to databases of various sizes and may be of particular need in large databases, as the number of likely duplicates tends to increase with database size. Additionally, publicly available entity information that can readily be harvested are continuously becoming available through the expansion of use of electronic marketing, sales, advertising, social media posting and the like. Therefore, ensuring that duplicate newly harvested entities may be identified as well as ensuring that the newly harvested entities may not be mistakenly deemed to be duplicates of existing entries requires ongoing entity resolution processing (e.g., daily processing in some cases). Therefore, techniques that consume moderate computing resources for detecting candidate duplicate entity entries may be beneficial for achieving acceptable levels of entity database processing for large or very large entity databases. Such techniques are described herein and may facilitate reducing the computing resources for fully determining duplicate entries in a large or very large entity database (e.g., a large database having 100,000 entries or more) by at least five orders of magnitude or more relative to earlier techniques.

Existing approaches for determining duplicates among a set of entity entries may be useful for achieving a high degree of confidence of a likelihood of two entities being duplicates. However, as noted above, the computing resource costs of existing approaches limit existing approaches to small and moderately sized entity sets (e.g., sets with a few thousand or fewer entries). One such approach involves generating heuristics for each entry and processing those heuristics to determine likely duplicate entries. While heuristics are referenced in this disclosure as an example existing approach, any other approach that provides high-confidence duplicate detection, optionally with both low false negative and low false positive results may be readily used as a basis for determining likely duplicate entries.

In embodiments, techniques for determining a candidate set of likely duplicate entries may rely, at least initially, on a duplicate determination approach to train a set of artificial intelligence entity resolution models (e.g., including entity deduplication models). When these trained models are combined with the further techniques described herein, determining a candidate set of likely duplicate entries may reduce the computing resources consumed by existing approaches, thereby enabling, deduplication of massively large entity databases in a scalable manner.

The entity resolution methods and systems of entity deduplication described herein may include various degrees of technical complexity that, when applied over time, may achieve a fully synthesized artificial intelligence approach to entity resolution through deduplication.

Referring now to an example implementation, FIG. 45 shows the example environment 500 including, in embodiments, the multi-service business platform 510 having an entity resolution system 566. As shown, the entity resolution system 566 may communicate with various systems, devices, and data sources according to one or more embodiments of the disclosure.

Figure 51:
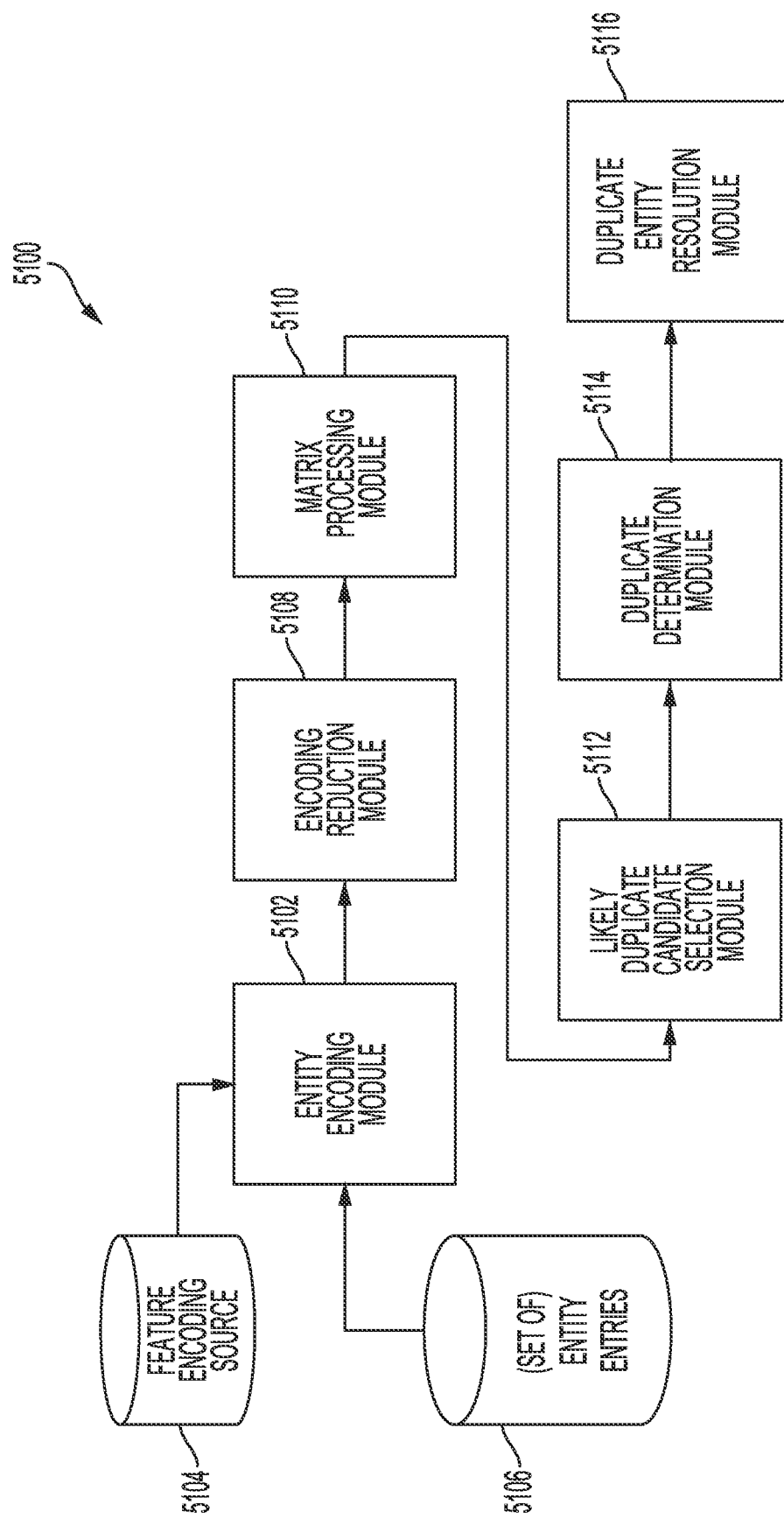
FIG. 51 is a block diagram of an example entity resolution system embodiment of entity deduplication methods and systems according to one or more embodiments of the disclosure.

Referring to FIG. 51, an entity resolution system 5100 (e.g., an artificial intelligence-based entity resolution system) for entity resolution through deduplication is shown. In example embodiments, the entity resolution system 566 may be the entity resolution system 5100. Elements of the entity resolution system 5100 presented in FIG. 51 will be described in greater detail below. Each entity may be described by and/or include, or reference one or more entity features. For example, in a Customer Relationship Management (CRM) system, there may be a contact entity. The contact entity may have or be associated with one or more of the following example entity features: first name, last name, address, email address, age, company name, location, and the like. In example embodiments, entity entries (e.g., entity entries 5106) may be received. The entry entities 5106 may be stored in the multi-service business platform 510 (e.g., stored in an entity database of the platform 510). In example embodiments, the entry entities 5106 may be objects obtained from the storage system 550. The objects may be Customer Relationship Management (CRM) objects. In some examples, the objects may be core objects (e.g., core objects 634) or custom objects (e.g., custom objects 632 that may be defined in the multi-service business platform 510). Some examples of these objects, as described herein, may include but may not be limited to a contact object, a prospect object, a marketing object, a services object, a company, a ticket (e.g., customer service ticket), a product, a deal, any other object or entity associated with activities or relationships of an organization with its current and prospective customers, and the like.

In example embodiments, the entity resolution system 5100 may include an entity encoding module 5102 that may receive an entity entry, may extract one or more entity features from the received entity entry, and may encode each of at least a portion of the one or more entity features as a vector (e.g., a multidimensional entity feature vector) suitable for use by an artificial intelligence system (e.g., a neural network system). In example embodiments, the entity features may be object properties that may be associated with the core object or custom object. The entity encoding module 5102 may encode the entity features into a vectorized representation, for example, text strings, identifiers, numbers, Boolean connectors, and the like of each entity feature (e.g., each element of the entity feature) of each entity of the entities (e.g., entity entries 5106). In example embodiments, a name feature of a first entity may be encoded into a first multidimensional feature vector of the first entity and an address feature of the first entity may be encoded into a second multidimensional feature vector of the first entity. The entity encoding module 5102 may reference a feature encoding source 5104, which may include one or more feature encoding schemes. In some examples, the encoding scheme (e.g., entity feature encoding scheme) may be a text encoding scheme (e.g., Universal Sentence Encoder (USE) type of encoding scheme, FastText word-centric encoding scheme, and the like). The entity encoding module 5102 may select an encoding scheme from the encoding source 5104 and apply the selected encoding scheme (e.g., the USE scheme) to the feature(s) of the entity entries 5106. The type of entity encoding scheme used may include encoding schemes that may be based on at least one of text, sentence(s), phrase(s), and/or word(s)). Independent of the type of entity encoding scheme used, a result of the encoding performed by the entity encoding module 5102 may be a vector with a value that may be specific to each entity feature of an entity in the entity entries 5106. While the USE encoding scheme is an exemplarily referenced type of encoding scheme, other vector-encoding schemes or approaches (e.g., other text string vector-encoding schemes)

may be used. In example embodiments, the text encoding scheme (e.g., feature encoding scheme) may not be limited to a commercially available scheme. As an example, the text encoding scheme may be produced or generated through use of one or more artificial intelligence approaches. In example embodiments, use of the USE encoding scheme may be instructive for further teaching the methods and systems of artificial intelligence-based entity resolution through entity data set entry deduplication described herein. As an example of use of a particular configuration of the USE encoding scheme, each entity feature processed with the particular configuration of the USE encoding scheme may result in or produce a 512-element feature vector. Other configurations of the USE encoding scheme may produce feature vectors with fewer or greater quantity of elements. Other encoding schemes applied to a given entity feature may result in a different size feature vector. In some examples, the feature vector may be referred to as a name vector (e.g., for a name entity feature), an address vector (e.g., for an address entity feature), etc. (e.g., where each unique feature may relate to a different vector).

In example embodiments, the entity encoding module 5102 may provide its output entity feature vector(s) to an encoding reduction module 5108 (e.g., that may use a trained neural network and/or trained entity deduplication model). In example embodiments, the encoding reduction module 5108 may be implemented to leverage a neural network (e.g., a Siamese neural network) or a suitable model that may be trained to produce a reduced entity-specific vector by processing the feature vector(s) associated with a specific entity. In example embodiments, the reduced entity-specific vector produced from the encoding reduction module 5108 may be suitable for further processing to generate a numeric value indicative of a likelihood that the entity that the reduced entity-specific vector represents may be a duplicate of another entity that is similarly represented by a corresponding reduced entity-specific vector. In other words, the reduced entity-specific vector facilitates determining, for any pair of entities, if the pair of entities may likely be duplicates. In example embodiments, the further processing may include a matrix processing module 5110 may receive the reduced entity-specific vector(s) output by the encoding reduction module 5108. The matrix processing module 5110 may organize the received reduced entity-specific vectors as an entity feature matrix (e.g., two-dimensional entity feature matrix, two-dimensional matrix, entity matrix, entity-specific vector matrix, 2D matrix). In some example embodiments, this two-dimensional (2D) entity feature matrix may be a structured list of the reduced entity-specific vectors indexed by entity, such that a reduced entity-specific vector representative of an entity appears on a single row of the 2D entity feature matrix. The matrix processing module 5110 may produce a transposed version of the entity feature matrix (e.g., transposed 2D entity feature matrix) such that rows and columns may be swapped. The matrix processing module 5110 may further multiply the entity feature matrix with its transposed version, such as through a dot-product (e.g., Dp) process, to produce a companion matrix comprising numeric values indicative of a likelihood that each pair of entities represented in the entity feature matrix may be duplicates. In other words, the companion matrix may hold values indicative of a likelihood that all pairwise combinations of entities in the entity feature matrix are duplicates. Example embodiments of an entity feature matrix and a companion matrix are depicted in FIG. 57 that is described in the disclosure. In example embodiments, when all entities in the set of entities 5106 are represented in the entity feature matrix, the companion matrix may hold a value indicative of a likelihood that all pairwise combinations of entities in the set of entities 5106 may be duplicates. In example embodiments, the entity resolution system 5100 may include a likely duplicate candidate selection module 5112. The likely duplicate candidate selection module 5112 may use the likelihood values from the companion matrix for pairs of entities to select entity pairs (e.g., candidate duplicate entities for a business entity) for further processing. In one example, the selected entity pairs may be a result of a selection of top ten pairs (e.g., top ten pairs having the highest likelihood values). In example embodiments, a duplicate determination module 5114 (e.g., may also be referred to as a duplicate refinement module or a duplicate refinement/determination module) may produce a set of the selected entity pairs for further processing. In example embodiments, a duplicate entity resolution module 5116 may process the selected entity pairs (e.g., top ten pairs) with one or more automated entity comparison algorithms, human operators, and artificial intelligence systems to determine which of the selected entity pairs represent one entity and therefore may be deemed to be duplicate entries (e.g., may also be referred to as common entities). In example embodiments, two entities may represent one entity (e.g., may represent the same business, contact, product, and the like) when the only difference is a phone number feature (e.g., where the one entity may be referred to as a common entity). Two entities may represent one entity when, for example, an entity name feature, entity address feature, and entity primary phone number feature match, independent of any lack of matching of other features. In yet another example of two entities representing one entity, an entity name feature (e.g., a business name of the entity) may match while an address feature may not match (e.g., a regional hospital may have several locations for serving patients).

Figure 52:
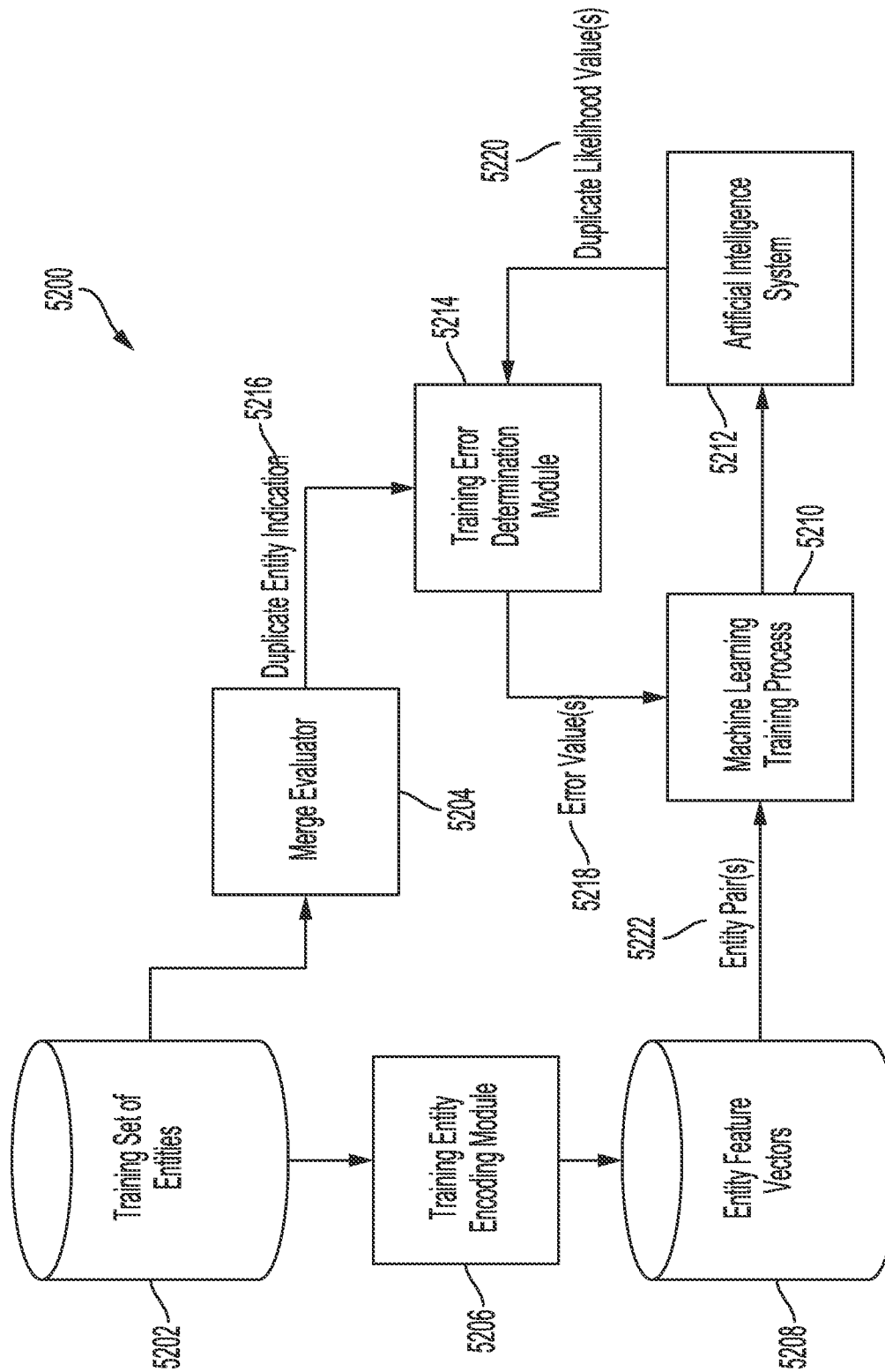
FIG. 52 is a block diagram of an example entity deduplication training process according to one or more embodiments of the disclosure.

FIG. 52 shows an example entity dedupe setup/training process 5200 according to example embodiments. In an initial phase of the entity dedupe setup/training process 5200, entity deduplication-specific artificial intelligence models may be prepared using machine learning. In example embodiments, entity deduplication artificial intelligence models may be trained using a training set of entity data 5202 for which duplicate status may be known. In other words, a duplicate status of each pairwise combination of entities represented in the entity data 5202 may be known (e.g., precomputed) so that when any pair of entities from the training set of entity data 5202 is presented for training, a corresponding duplicate status may be referenced to facilitate entity deduplication artificial intelligence model training. In example embodiments, the training set of entity data 5202 may include one or more of duplicate entities, near duplicate entities, and/or non-duplicate entities. Corresponding duplicate status for each pair of entities may be included in the training set of entity data 5202 and/or may be stored external to the training set of entity data 5202.

In example embodiments of the training process 5200, each pairwise combination of entities (e.g., referred herein to as a pair or a pair of entities or entity pair) in the training set of entity data 5202 may be processed through the training process 5200. A merge evaluator 5204 may receive a pair of training entities (e.g., pair (A,B)) from the training set of entity data 5202 (e.g., entries of training entities that may refer to training entities that were entered into the platform) and may produce a corresponding duplicate entity indication 5216 (e.g., P(merge) value for (A,B)), referred to herein as Pmerge and/or p-merge, that may reflect the duplicate entity status for the pair of entities received from the training set of entity data 5202. For example, the merge evaluator 5204 may generate a Pmerge value for a pair of training entities from the training set of entity data 5202. As described in the disclosure, this duplicate pair status value may be referred to herein as a Pmerge value (or a "Pmerge"), which may be a probability of seamless merging of the two entities (e.g., the two entities being duplicates). In example embodiments, a duplicate detection approach, such as the use of heuristics or string matching may be used by the merge evaluator 5204 to determine the Pmerge value. The training process 5200 may be repeated for each pair of entities in the training set of entity data 5202. Therefore, for each pair of entities in the training set of entity data 5202, the corresponding duplicate entity indication 5216 (e.g., Pmerge value) may represent a probability that the pair may be duplicates. For simplicity, this duplicate entity indication 5216 value (e.g., Pmerge value) may be computed to be in a range from about 0 to about 1. The probability of the two entities being duplicates may correspond to the duplicate entity indication 5216 (e.g., the Pmerge value). In example embodiments, a Pmerge value of 1 may represent a 100% probability that the two entities may be duplicates, whereas a Pmerge value of 0 may represent a 0% probability that the two entities may be duplicates. This Pmerge value for a pair of entities (e.g., entry entities) may be used as a label in training an artificial intelligence entity deduplication model to facilitate determining likely duplicate entries. As an example use of a label, a Pmerge value may be input to a machine learning process as a control against which an accuracy of an entity resolution model (e.g., an entity deduplication model) may be measured.

In example embodiments, each entity in the t training set of entity data 5202 (e.g., training data set) may include any of multiple values in one or more features (e.g., first name, last name, address, email address, age, company name, location, and many others). In example embodiments, the entity dedupe setup/training process 5200 may include a training entity encoding module 5206 that may be configured and operate comparably or similarly to the entity encoding module 5102 of FIG. 51. The training entity encoding module 5206 may encode the training set of entities 5202 (e.g., training entity data) into one or more entity feature vectors 5208 per entity (e.g., where each entity may be encoded into entity feature vectors). These encoded entity feature vectors 5208 may be stored for each training entity (e.g., training entity entry in the training set of entity data 5202) in a machine learning training encoded entity feature vector data set (e.g., entity feature vector data set 5208). In example embodiments, a neural network configured for entity resolution may reduce the one or more of entity feature vectors for each respective entity to a single N-dimensional entity-specific vector. The methods and systems of entity resolution through entity deduplication described herein may reduce the processing required to produce at least a manageable entity duplicate candidate set for large or massive entity databases. In example embodiments, entity deduplication may produce an accurate indication of a likelihood of any two entities being duplicates. Therefore, the neural network may be configured to reduce the number of entity feature-specific vectors for each entity down to a single entity-specific vector (e.g., single 256 element entity-specific vector). This reduction in dimensions may facilitate reducing computation requirements since a substantively smaller number of dimensions to be processed may achieve a lower computation load per entity pair. Generally, models with more nodes may potentially improve model performance (e.g., ability to reproduce a function that the model emulates), although that performance may likely plateau at some point such that further increases in nodes may not be economical (e.g., the additional computing costs for a model with a count of nodes that has plateaued may provide insignificant improvement in performance). In example embodiments, processing increases as a number of nodes in the model increases. In a non-limiting example, doubling a count of nodes in a model may correspond to roughly doubling the computing effort (e.g., time for a given processor). Also, time to train the model may increase as a count of nodes in the model increases. Additionally, a required amount of training data may be greater for models with higher node counts. In example embodiments, a count of nodes of an artificial intelligence model (e.g., artificial intelligence entity deduplication model) may be set to be a power of 2 (in examples $2^8=256$) to make computation more efficient. In a non-limiting example of a sample technique for reducing dimensions for entity deduplication, a tower neural network (e.g., Siamese tower neural network) may be configured with multiple input nodes (e.g., 3,072 input nodes for reducing six (6) 512 feature-specific vectors). In this example, the tower neural network may reduce these 3,072 inputs to a single entity-specific vector of about 256 output nodes (e.g., a 256 element entity-specific vector). The number of entity vectors, size of each entity vector, and the resulting entity-specific vector size may vary from these examples. Therefore, other combinations of inputs and output nodes may be contemplated and included herein.

In example embodiments, an overview of a feedback portion of the training process 5200 may include retrieving feature vectors for a pair of entities (mathematically represented as pair (A,B)) from the feature vector storage 5208, such as by a machine learning process 210. The feature vectors for the pair (A,B) may be processed through an artificial intelligence system 5212. Optionally, the machine learning processing 5210 may provide the retrieved feature vectors to the artificial intelligence system 5212. The artificial intelligence system 5212 may generate an output duplicate likelihood value 5220 for the pair (A,B). In example embodiments, the artificial intelligence system 5212 may employ a dot-product function (e.g., Dp) when producing the duplicate likelihood value 5220. A training error determination module 5214 may determine an error value 5218 for the two entities (A,B) by processing the duplicate likelihood value 5220 with the duplicate entity indication 5216 (e.g., a precomputed indication of a likelihood that the pair (A,B) are duplicates). This error value may be fed back to the machine learning process 5210 where it may be matched with the corresponding entity feature vectors for pair (A,B). The machine learning process 5210 may use the feedback 5218 to train the artificial intelligence system 5212 to produce the duplicate likelihood value 5220 that approximates the corresponding duplicate entity indication value 5216 (e.g., minimizes the error value 5218). In example embodiments, all pair-wise combinations of entities represented in the feature vector storage 5208 may be processed at least one time for training of an artificial intelligence system 5212.

As described in the disclosure, the methods and systems of entity resolution (e.g., of the entity resolution system 5100), such as artificial intelligence-based deduplication may benefit from being trained by feedback. In example embodiments, the entity dedupe setup/training process 5200 may include a training error determination module 5214 that may generate error feedback as an error value 5218 (e.g., a duplicate entry-pair error value). For example, the training error determination module 5214 may determine the error as the absolute value of the difference between a result of the dot product function of the artificial intelligence system 5212 and the Pmerge value for the pair (e.g., |Dp−Pmerge|). A machine learning training process 5210 may receive the error value 5218 (e.g., from the training error determination module 5214) as feedback. In example embodiments, the machine learning training process 5210 may provide machine learning for training an artificial intelligence system 5212, optionally comprising a neural network to generate vectors to facilitate entity deduplication. The training process 5200 may include the machine learning training process 5210 retrieving the one or more feature vectors for a pair of entities 5222 (e.g., mathematically represented as entity pair (A,B) of the entity pairs) from the entity feature vectors 5208. In example embodiments, as shown in FIG. 52, the machine learning training process 5210 may train an artificial intelligence system 5212 responsive to the entity pair 5222 and the corresponding error value 5218 (e.g., the machine learning training process 5210 may adjust the artificial intelligence system 5212 such as by adjusting weights of a neural network of the artificial intelligence system 5212, optionally to minimize the corresponding error value 5218). Training of the artificial intelligence system 5212 may include adjusting weights and the like of an entity deduplication model of the artificial intelligence system, such as an entity deduplication model within a neural network. In examples, the artificial intelligence system 5212 may, at least in part through use of the entity duplication model, facilitate entity resolution through deduplication of entities (e.g., output the duplicate likelihood value 5220). The training error determination module 5214 may mathematically compare the duplicate entity indication 5216 (e.g., Pmerge value) for each entity pair in the training set of entities with the generated duplicate likelihood value(s) 5220 for each entity in each training set pair from the artificial intelligence system 5212 (e.g., generates the duplicate likelihood value(s) 5220).). In examples, the generated duplicate likelihood value 5220 may be mathematically expressed as Dp for (A,B). In example embodiments, the artificial intelligence system 5212 may employ a vector dimension reducing neural network to produce a reduced dimension entity-specific vector for each entity in the pair (A,B) that represents the feature vectors for the corresponding entity in the pair (A,B). The artificial intelligence system 5212 may further include a vector processor that may employ a dot-product function (e.g., Dp) to produce a dot-product value as a duplicate likelihood value (e.g., the duplicate likelihood value 5220) for each pair of training reduced dimension entity-specific vectors generated from the training set of entity data 5202. An objective of the training may be to produce dot-product pair values (e.g., the duplicate likelihood value 5220) that approximate the Pmerge value for each entity pair in the training set of entity data 5202. Therefore, as described for the example embodiments of FIG. 51, the entity feature vectors may be generated in such a way that their dot product may be generally a value in the range of about zero (0) to about one (1). In an example, the training error determination module 5214 may generate the training error value 5218 by taking an absolute value of a difference of the duplicate likelihood value 5220 and the corresponding duplicate entity indication 5216 (e.g., corresponding Pmerge value). The corresponding Pmerge value may be for the same pair of training set entries (e.g., training data set) that were used by the artificial intelligence system 5212 to produce the duplicate likelihood value 5220. The machine learning process 5210 may receive the training error value 5218 as feedback to be used for adjusting aspects of the artificial intelligence system 5212, (e.g., adjusting weights and the like of a neural network). An objective of the feedback process may be to produce entity feature vectors that, when processed through the dot-product function, may produce a value that may approximate a corresponding duplicate entity indication 5216 (e.g., Pmerge value) with improved quality. In example embodiments, an entity deduplication model may be updated based on a machine learning system applying the training error (e.g., training error value 5218). In embodiments, the entity deduplication model may be updated to reduce and/or minimize the training error value 5218.

In example embodiments, training of the neural network may proceed by a training system that may feed or input pairs of training entity vectors through the neural network and may use a portion of the output produced by the neural network, or another value derived from the neural network output as feedback to affect the learning or training of the neural network. Further, while a Siamese neural network may be used as an example of a type of neural network suitable for the technology expressed herein, a single tower neural network may be used in another example, with each entity being processed sequentially through the single tower neural network. Using the single tower neural network may involve adjustments to the overall system in that each entity-specific vector produced may need to be stored for subsequent duplicate detection processing and/or feedback during training. Similarly, a multi-tower approach or multi-neural network approach (e.g., more than two towers or more than two neural networks) may be applied with any number of identically configured neural networks being used to process the training set of entities (e.g., the training set of entity data 5202). In some example embodiments, for a training entity set of N entries (where N may refer to any number entries or any range of numbers of entries), as many as N neural networks may be used, with each of the neural networks processing a corresponding entry. The quantity and type of neural network may be determined by factors other than those relevant for determining duplicate entity entries, such as available computing resources, time available for the training, and the like.

Figure 53:
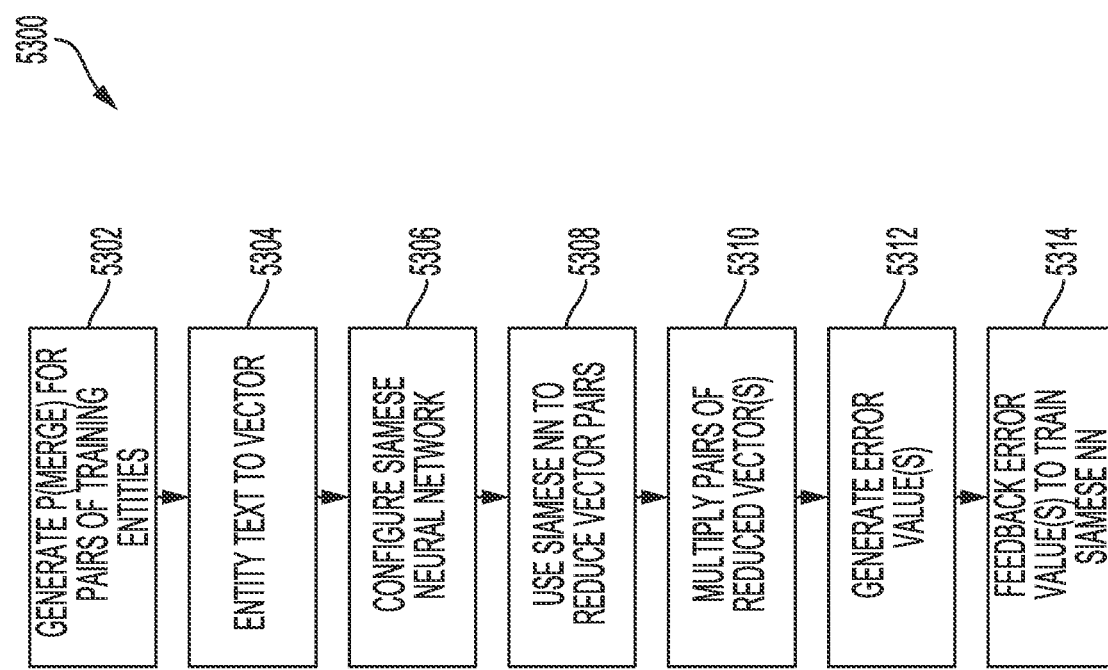
FIG. 53 is a flow chart of an example entity deduplication training process according to one or more embodiments of the disclosure.

FIG. 53 shows an example set of operations of a method for training an entity deduplication model 5300 according to some example embodiments of the disclosure. For example, at 5302, pairs of training entities in a training set may be processed through an entity duplicate detection process, such as one based on heuristics and the like that may produce and record a probability of an entity duplicate value for each pair (e.g., a Pmerge value). For example, at 5302, the Pmerge value may be generated for pairs of training entities. At 5304, a text-to-vector encoding module may generate vector representations of one or more features for the entities in the training set (e.g., entity feature text to vector of one or more features for the entities). A neural network (e.g., a Siamese tower neural network) may be configured, at 5306, to produce reduced complexity entity-specific vectors that may be suitable for generating, via dot-product vector processing, a value that may be comparable to the Pmerge value generated at 5302 (e.g., the Siamese neural network may be configured at 5306). At 5308, the neural network (e.g., Siamese neural network) may be used to reduce vector pairs. For example, at 5308, pairs of entity feature-specific vectors (e.g., one set of feature-specific vectors for each entity in the pair of entities) may be processed through the Siamese neural network configured at 5306 to produce a pair of reduced complexity entity-specific vectors (e.g., one entity-specific vector for each entity in the pair of entities). At 5310, pairs of reduced vectors may be multiplied. For example, at 5310, the pair of reduced complexity entity-specific vectors produced at 5308 may be processed with a dot product function, thereby generating an entity duplicate likelihood value for the pair of entities. At 5312, an error value may be generated. For example, at 5312, the duplicate likelihood value may be processed (e.g., compared) with the corresponding Pmerge value for the entity pair produced at 5302 to produce an error value. In example embodiments, each error value may be produced from generating an absolute value of a difference of the duplicate likelihood value and the corresponding Pmerge value. In example embodiments, the error value may be one or more of a compound value, a mean value and a range, a standard deviation, a ranking, a percentage of difference, normalized values, an absolute difference and a count of occurrences, a difference from a prior error value, a multi-dimensional vector, and the like. At 5314, error value(s) may be used as feedback to train the neural network (e.g., Siamese neural network). For example, at 5314, the error value(s) may be returned to a machine learning training system that may facilitate training an artificial intelligence system for entity resolution, including at least the neural network being configured at 5306. This process may be repeated for all pairs of entities in the training set of entities and with varying neural network configurations.

In example embodiments, artificial intelligence methods and systems may be used to replace, with substantially similar accuracy, an example high computing load entity deduplicating scheme. An example flow that uses artificial intelligence as a proxy for a high computation demand process, such as text string matching and/or heuristics, may include a front-end text encoder (e.g., Universal Sentence Encoder), a middle stage trained neural network (e.g., a trained Siamese neural network), and a back-end merge indicator function (e.g., dot-product). This approach may process pairs of entities efficiently, one pair at a time and may further be scaled to handle any quantity of pairs concurrently. Scaling may be accomplished by, for example, replicating portions of the system, such as the middle stage trained neural network.

Figure 54:
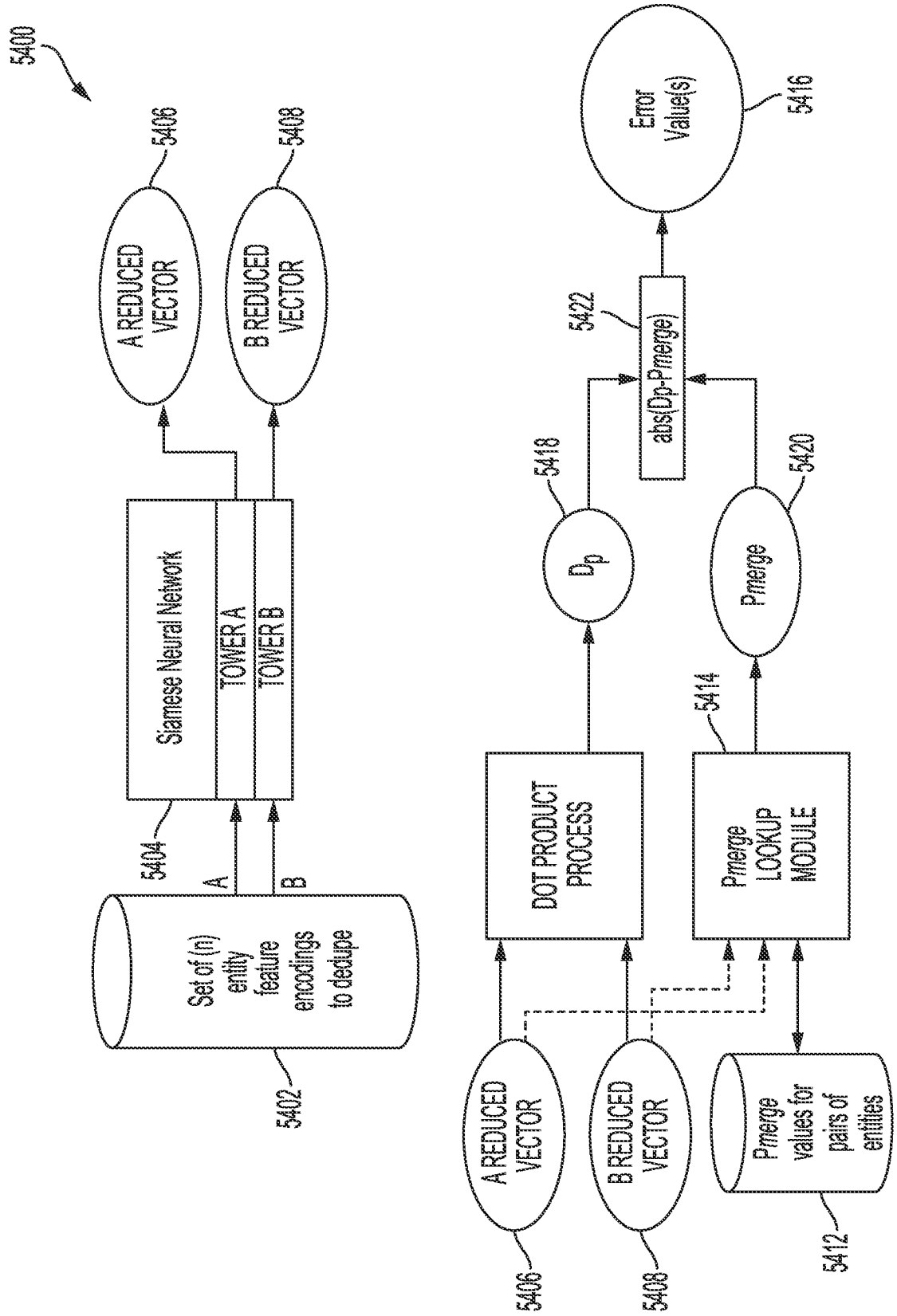
FIG. 54 is a block and data flow diagram of a training embodiment for entity deduplication according to one or more embodiments of the disclosure.
Figure 55:
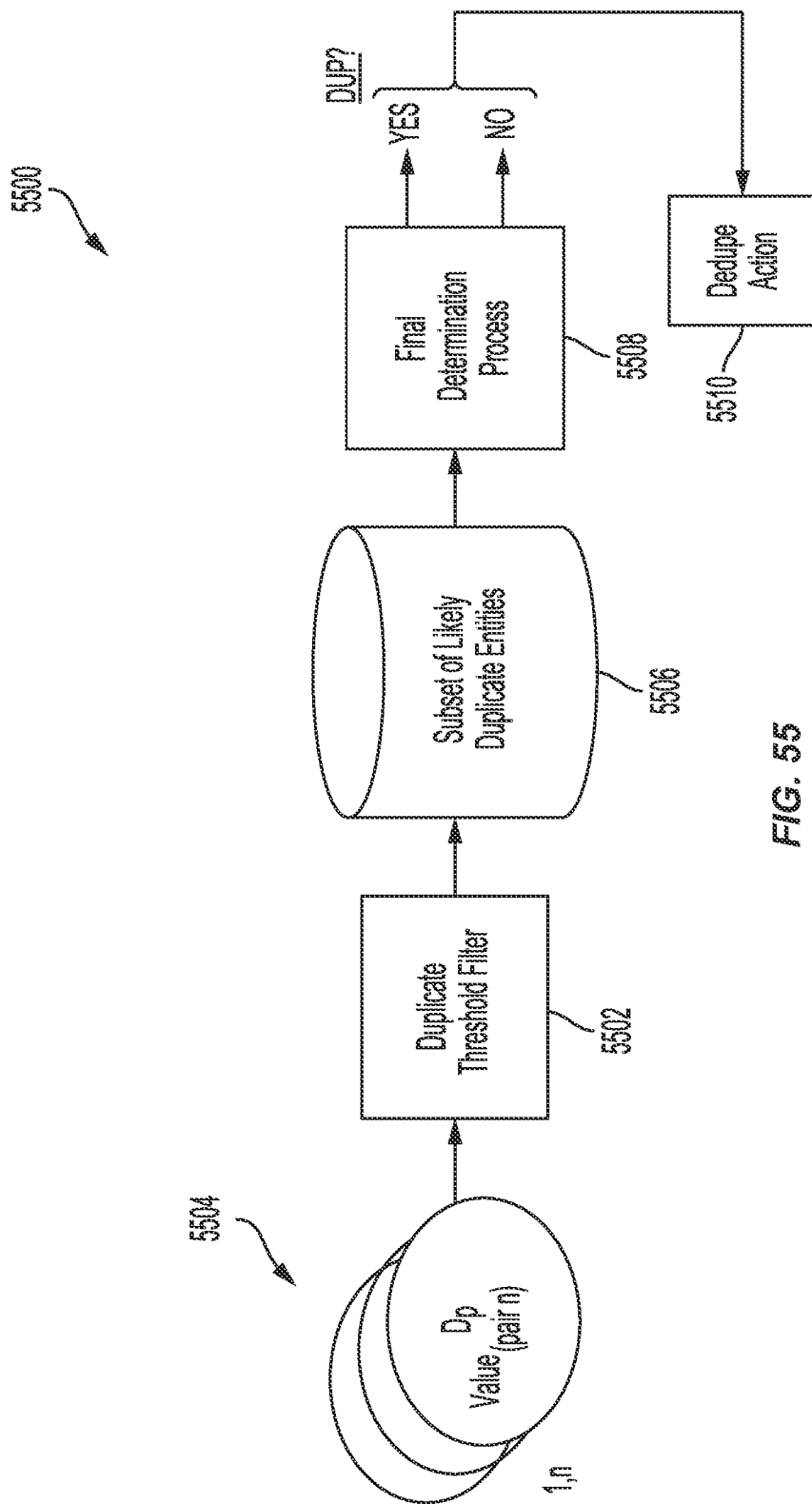
FIG. 55 is a portion of a system for entity deduplication showing backend functions that facilitate refining a neural network generated probability of entity pairs being duplicates according to one or more embodiments of the disclosure.

An example system configuration and data flow of this approach are shown in FIG. 54 and FIG. 55. FIG. 54 shows a training system and process for entity deduplication 5400 according to example embodiments. This training system and process may include entity deduplication operations that may have a set of entity feature encodings 5402 to be processed for determining duplicate entities. The set of entity feature encodings 5402 may be grouped into entity feature encoding groups, where an entity feature encoding group (e.g., feature group) may represent features of the entity. In example embodiments, a Siamese twin tower neural network 5404 may receive a feature group of entity feature encodings from the set of entity feature encodings 5402 (e.g., feature encodings) for a pair of the entities, where one group of feature encodings may correspond to one entity per tower (e.g., tower A or tower B in the Siamese neural network 5404). The Siamese neural network 5404 may produce a first reduced vector 5406 (e.g., vector A) from tower A (e.g., of the Siamese neural network 5404) and a second reduced vector 5408 (e.g., vector B) from tower B (e.g., of the Siamese neural network 5404), representing a reduced complexity vector per entity. In example embodiments, a dot product process 5410 (e.g., using a dot product module) may process the reduced vectors 5406 and 5408 to obtain a dot product 5418 (e.g., Dp) of the reduced complexity vectors. This dot product may represent, at least in part, a likelihood that the pair of entities processed by the Siamese neural network 5404 are duplicates. A Pmerge lookup module 5414 (e.g., Pmerge lookup module) may retrieve one or more Pmerge values 5420 (e.g., Pmerge values may be a control for the training) from a set of Pmerge values 5412 that may correspond to the pair of entities for which the current reduced vector pair was produced by the Siamese neural network 5404 (e.g., produced by Siamese neural network towers A and B). The dot product(s) 5418 and Pmerge value(s) 5420 may then be processed as described herein (e.g., processed by the training error module 5214 in FIG. 52 as described in the disclosure) to generate an error value 5416 for each pair of training entities (e.g., dot product error value for use by machine learning). As shown in FIG. 54 and described elsewhere herein, the dot product error value may be computed as an absolute value of a difference between value Dp 5418 and value Pmerge 5420 (e.g., resulting in |Dp−Pmerge| or an absolute of Dp−Pmerge). This error value 5416 may be returned to a machine learning training system as feedback to improve learning.

FIG. 55 shows a flow that may correspond to the backend merge indicator process 5500 (e.g., entity dedupe for the backend) referenced in the disclosure according to some example embodiments. A duplicate threshold filter 5502 (e.g., likely duplicate threshold filter or duplicate probability threshold filter) may reference a likelihood of duplication threshold value to filter an artificial intelligence system-generated dot-product duplicate probability value 5504 (e.g., AI-derived pair duplicate probability) for each pair of entities. In example embodiments, a dot-product duplicate probability value 5504 (e.g., Dp (pair n)) may be comparable to, for example, Dp 5418 of FIG. 54 or as otherwise described herein. The filter 5502 may limit entity pairs for further processing to those pairs that may exceed a duplicate probability/likelihood threshold value (e.g., more likely to be duplicates) and may store the filtered pairs in a subset of likely duplicate entities 5506 (e.g., a subset of likely duplicate entities from the set of entities to dedupe). Optionally rather than using a numeric probability threshold, a fixed number of the pairs with the highest probability value may be passed on for further processing. In example embodiments, a final duplicate determination process 5508 (e.g., final determination of duplicates for each pair of entities in the subset) may organize and process this subset of likely duplicate entities 5506 by optionally combining computer automated entity comparison functions and human entity comparison operation(s) to determine for each pair of likely duplicate entities 5506 if the two entities in each pair are duplicates. In example embodiments, the final duplicate determination process 5508 (e.g., embodied as a duplicate entity determination module) may classify each entity of the pair as one of duplicate of the other entity of the pair or a non-duplicate of the other entity of the pair (e.g., each entity in the pair is classified as either duplicate or non-duplicate of the other). The backend merge indicator process 5500 may include a dedupe action at 5510 (e.g., embodied as a duplicate entity resolution module) in which an action is taken in response to final duplicate determination process 5508. In example embodiments, a dedupe action taken at dedupe action at 5510 (e.g., and optionally by a duplicate entity resolution module) may include deleting one or more of the pair of duplicate entries, merging features of the duplicate entries, and the like. The dedupe action taken at 5510 may be performed automatically by a computer processor that has access privileges to a database that includes the duplicate entries. A dedupe action taken at 5510 may include saving the classification into a duplicate entity classification log for later processing, such as by an operator and the like.

Figure 56:
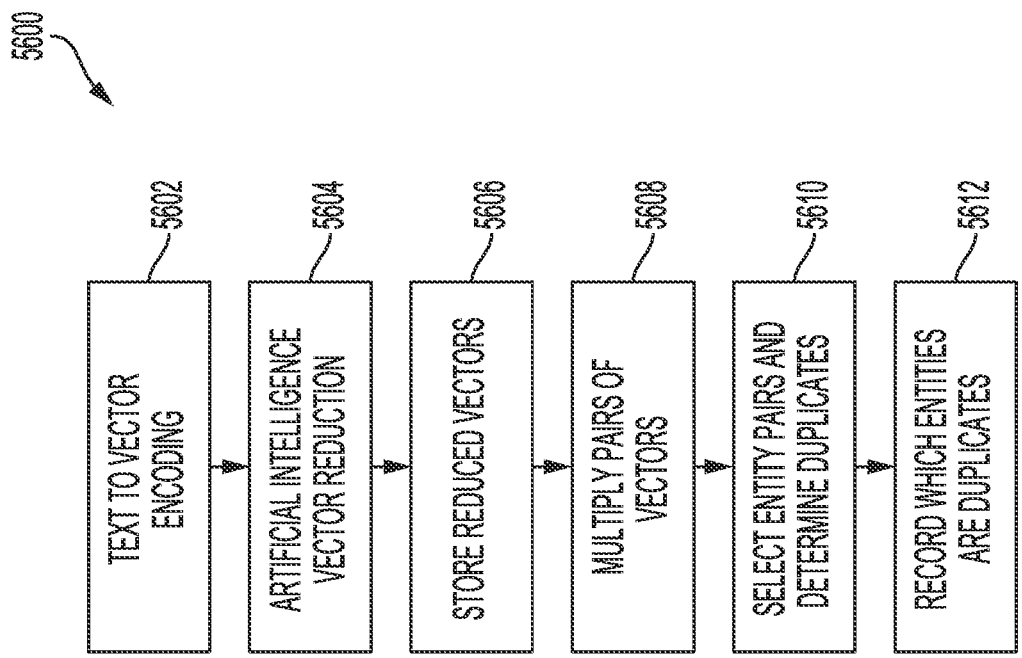
FIG. 56 is a flow chart of a first embodiment of an artificial intelligence-based deduplication process where pairs of entities are processed singly according to one or more embodiments of the disclosure.

FIG. 56 is a flow chart that shows a set of operations of an example process for performing artificial intelligence-based entity deduplication 5600. At 5602, text to vector encoding may occur. For example, at 5602, entities may be processed with a text-to-vector encoding module to produce a set of vectors representing text features (e.g., name, address, and the like) of an entity. At 5604, artificial intelligence vector reduction may occur. For example, at 5604, the resulting entity feature-specific vectors for at least one of the entities may be processed through a trained artificial intelligence system to produce a reduced complexity entity-specific vector that may be suitable for the methods of dot-product-based entity deduplicating described herein. In example embodiments, the trained artificial intelligence system may include a Siamese neural network that may process sets of vectors for pairs of entities. At 5606, reduced vectors may be stored. For example, at 5606, the reduced complexity entity-specific vector(s) may be stored for later optional use. At 5608, pairs of vectors may be multiplied. For example, at 5608, pairs of reduced complexity entity-specific vectors produced from the neural network may be processed with a dot product function, thereby producing an entity duplicate likelihood value for the pair of entities. At 5610, entity pairs may be selected, and duplicates may be determined. For example, at 5610, based on the value of the entity duplicate likelihood value, the entity pair may be processed with an entity comparison module that may use one or more of heuristics, string comparison, and the like to determine whether the pair of entities may be duplicates. At 5612, the process 5600 records which entities may be duplicates. For example, at 5612, a result (e.g., duplicate or non-duplicate) may be recorded for each entity pair. Duplicate entities, as determined by the process 5600 of FIG. 56 may be addressed by one or more human operators through use of one or more user devices, such as by deleting duplicates, merging duplicates, and the like (e.g., received as instructed commands from users via user devices).

In example embodiments, the computing required for checking combinations of entity pairs in larger entity data sets may be further simplified. One example approach may include processing, substantially in parallel, all entities in a large entity database to identify a candidate set of likely duplicate entries. This simplified computing technique or approach may be enabled by use of the artificial intelligence entity feature encoding processes and systems described in the disclosure. As described in the disclosure, a trained neural network may be used to generate entity-specific vectors that, when processed as pairs through a dot-product process, may generate a value indicative of a probability of the two entities being duplicates.

FIG. 57 shows examples of one or more entity-specific vector matrices (e.g., entity feature matrix) and a companion matrix. An example of a further simplification of computation requirements may be to arrange the entity-specific vectors generated from the trained neural network for a set of N entities (e.g., where "N" may refer to any number of entities) to be deduplicated into a first two-dimensional matrix (A) at 5702, wherein each column at 5704 in entity-specific vector matrix A at 5702 may represent one element value in the entity-specific vector and each row at 5706 in entity-specific vector matrix A may represent a corresponding entity. A number of columns in matrix A may correspond to a number of elements/values in the entity-specific vector.

In example embodiments, for a 256-value entity-specific vector, entity-specific vector matrix A may be constructed with 256 columns; for a 64-value entity-specific vector, entity-specific vector matrix A may be constructed with 64 columns. In example embodiments, the entity-specific vector matrix comprises an array of M columns wherein M corresponds to the number of values in the entity-specific vector and N rows where N corresponds to a count of the entities to be deduplicated. In the example entity-specific vector matrix A at 5702, an entity-specific vector matrix includes five columns (e.g., five elements in each entity-specific vector) and four rows (e.g., four entities). The generated entity-specific vector value for each entity may be entered in the cells of a row for the entity in corresponding columns. The entity-specific vector matrix A may be copied and transposed (e.g., matrix B at 5708), and the two matrices (e.g., matrix A and the matrix transposed copy) may be multiplied to produce a duplicate-likelihood matrix D at 5710 (e.g., companion matrix) with pair-wise dot-product values for each entity pair appearing in the cells. Therefore, cell D(A,B), for example, may hold a value that may be indicative of the likelihood that entities A and B are duplicates. Likewise, cell D(A,C), for example, may hold a value that may be indicative of entities A and C being duplicates.

The resulting cell values in each of the rows of the duplicate likelihood matrix D (e.g., companion matrix) may be sorted from highest to lowest value while maintaining reference to the two entities for which the duplicate indication value(s) may apply. Independent of sorting matrix D at 5710, a subset of the values in each row representing likely duplicates of the entity for which the row may be labeled, such as the top n values (e.g., top ten) or, for example, only values above a duplicate likelihood threshold and the like may be selected for further processing. In the example companion matrix D at 5710, a most likely duplicate of entity A may be entity C due to the cell value at D(A,C) being greater than other entries in row A. Also, in the example companion matrix D at 5710, the pair of entities that are most likely to be duplicates are entities C and D due to the cell value at D(C,D) being higher than any other cell value in the matrix D. at 5710. While the companion matrix D at 5710 shows values in all cells, in example embodiments, values along the diagonal and in cells below the diagonal may be unfilled. Values along the diagonal may represent only one entity (e.g., D(A,A) only represents entity A). Values below the diagonal may be duplicates of corresponding cells above the diagonal (e.g., D(B,A) may be a duplicate of D(A,B)).

The further processing may include processing the corresponding pairs of entities through another type of entity duplication detection function, such as the heuristic or string-matching functions generally described in the disclosure. In this example further processing, only the selected subset of entity pairs may be processed through this other potentially more accurate duplicate detection process. As a result, duplicate entries may be automatically found within a relatively large set of entities with much less computing load than applying this other duplicate detection process to all pairwise combinations of entities. For example, rather than requiring N-squared computations (where N represents a numerical count of entities) for determining which entities may be duplicate, only those entity pairs that may exhibit a likelihood of being duplicates, based on for example a value in companion matrix D at 5710, may be processed with the relatively larger computation demanding functions. In example embodiments, the further processing may include presenting the selected subset of entity pairs to a user (e.g., via a user device) who may use various digital and/or visual comparison tools and/or judgment to determine which, if any, of the selected set of entity pairs may be duplicates.

Figure 58:
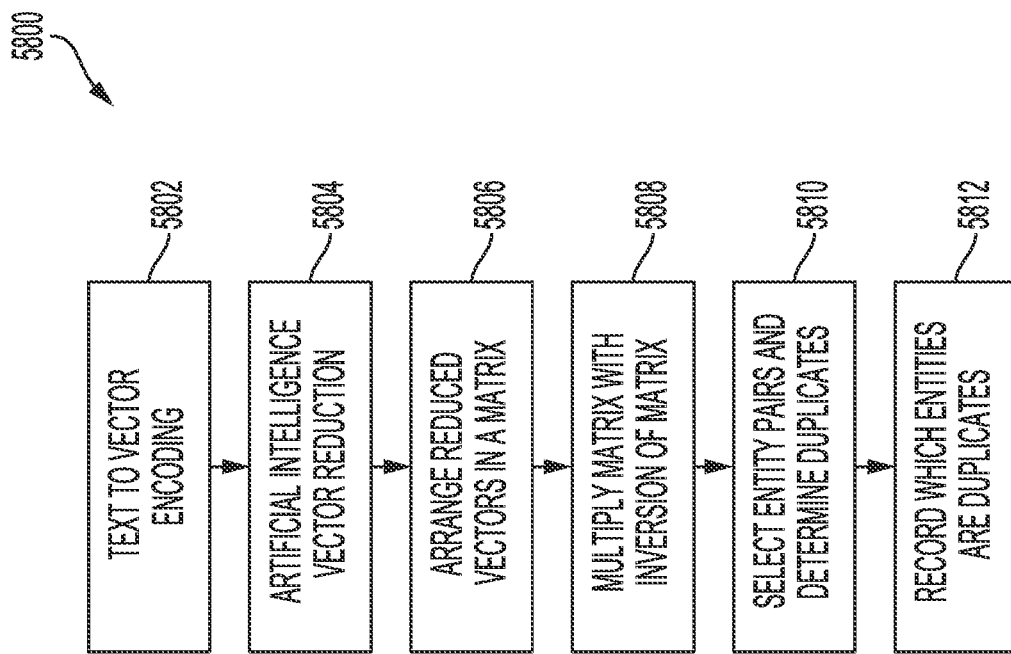
FIG. 58 is a flow chart of an artificial intelligence-based deduplication process where an entire set of entities are processed concurrently according to one or more embodiments of the disclosure.

FIG. 58 shows an example set of operations of a process for performing artificial intelligence-based entity deduplication 5800. At 5802, text to vector encoding may occur. For example, entities may be processed with a text-to-vector encoding module at 5802. In example embodiments, the text-to-vector encoding at 5802 may be comparable to entity encoding described in the disclosure, such as for the entity encoding module 5102, training entity encoding module 5206, entity text to vector at 5304, and the like that may produce entity feature-specific vectors. At 5804, there may be artificial intelligence vector reduction. For example, at 5804, the resulting entity feature-specific vectors may be processed through a trained artificial intelligence system to produce a reduced complexity entity-specific vector suitable for dot-product-based entity deduplicating. At 5806, the reduced complexity entity-specific vectors may be arranged in a matrix. For example, at 5806, the reduced complexity entity-specific vectors may be arranged in an entity interim matrix. In example embodiments, the entity interim matrix may be transposed to obtain a transposed matrix. At 5808, the artificial intelligence-based entity deduplication process 5800 may multiply the interim matrix with the transposed matrix. For example, at 5808, the transposed matrix and the interim matrix may be multiplied, thereby producing a matrix comprising an entity duplicate likelihood value for each pair of entities (e.g., a companion matrix). At 5810, entity pairs may be selected, and duplicates may be determined. For example, at 5810, the top N duplicate candidates for each entity may be selected and processed, as pairs, through an entity comparison module that may use heuristics, string comparison, and the like to determine whether the pairs of entities may be duplicates. At 5812, the artificial intelligence-based entity deduplication process 5800 may record which entities are duplicates. For example, at 5812, a result (duplicate or non-duplicate) may be recorded for each entity pair. Duplicate entities, as determined by the artificial intelligence-based entity deduplication process 5800, may be addressed by deleting duplicates, merging duplicates, and the like.

In example embodiments, an entity resolution system may optionally use fully synthesized artificial intelligence models to reduce a massive entity database to a manageable candidate set of likely duplicates. Such an entity resolution system may also perform duplicate entity detection with accuracy comparable to existing high computing resource demand techniques, such as string comparison, heuristics, and the like. Such an entity resolution system may be constructed by using a machine learning-trained artificial intelligence process for determining which pairs of a selected subset of entity pairs in a companion matrix are to be classified as duplicates (e.g., an artificial intelligence-based backend deduplication process). This entity resolution system may be constructed by replacing, at least for production embodiments, the high computation backend (e.g., heuristic, string comparison, and the like) process applied, for example in 5812 of the artificial intelligence-based entity deduplication process 5800, with a machine learning-trained artificial intelligence backend deduplication process. In example embodiments, predetermining which companion matrix entities may be duplicates and which companion matrix entities may be non-duplicates may be used to train a duplicate detection artificial intelligence system that may be used to automatically determine which entities are to be classified as duplicates.

Figure 59:
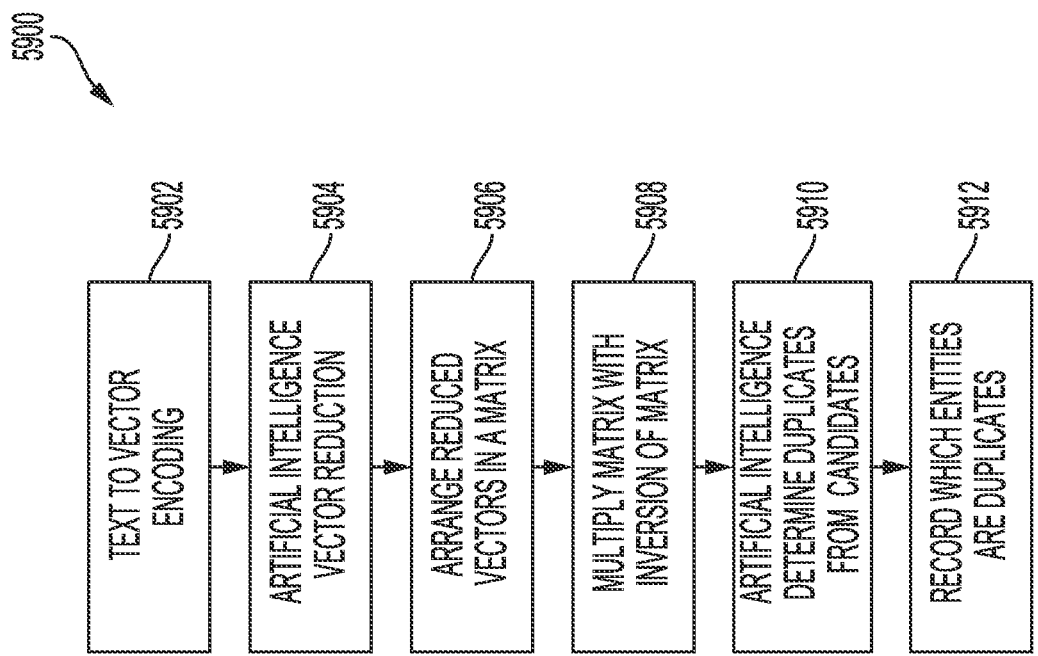
FIG. 59 is a flow chart of an artificial intelligence-based deduplication where artificial intelligence is used in entity duplication determination refinement actions according to one or more embodiments of the disclosure.

FIG. 59 shows an example set of operations of a process for performing fully automated entity deduplication process 5900 according to some example embodiments of the disclosure. At 5902, text to vector encoding that produces entity feature-specific vectors for entity features may occur. For example, at 5902, entities may be processed with a text-to-vector encoding module. At 5904, artificial intelligence vector reduction may occur. For example, at 5904, the resulting entity feature-specific vectors may be processed through a trained artificial intelligence system to produce a reduced complexity entity-specific vector suitable for dot-product-based entity deduplication. The process 5900 may arrange the reduced complexity entity-specific vectors in a matrix at 5906. For example, the reduced complexity entity-specific vectors may be arranged in a duplicate entity interim matrix at 5906. In example embodiments, the entity interim matrix may be transposed to obtain a transposed matrix. At 5908, the process 5900 may multiply the interim matrix with the transposed matrix. For example, at 5908, the transposed matrix and the interim matrix may be multiplied, thereby producing a matrix comprising an entity duplicate likelihood value for each pair of entities (e.g., a companion matrix, such as companion matrix D at 5710). At 5910, artificial intelligence may determine duplicates from candidates. For example, at 5910, the top N duplicate candidates (those most likely to be a duplicate) for each entity may be selected and processed, as pairs, through the duplicate detection artificial intelligence system. At 5912, the process 5900 may record which entities may be duplicates. For example, at 5912, the duplicate detection artificial intelligence system may determine, for each entity pair, if they are duplicates or not (e.g., non-duplicates) and may record the information. Duplicate entities, as determined by the process 5900, may be addressed by performing one or more actions, such as by deleting duplicates, merging duplicates, and the like.

Referring back to FIG. 45, in example embodiments, the multi-service business platform 510 may include an event system 522 that may be configured to monitor for and record the occurrence of events. In example embodiments, the multi-service business platform 510 may include a payment system 524 that processes payments on behalf of clients of the multi-service business platform 510. In example embodiments, the multi-service business platform 510 may include a reporting system 526 that may allow users to create different types of reports using various data sources associated with a client's business (e.g., including data sources corresponding to custom objects defined with respect to the client's business and/or any core objects that are maintained with respect to the client's business). In example embodiments, the multi-service business platform 510 may include a conversation intelligence (CI) system 528 that may be configured to process recorded conversations (e.g., video calls, audio calls, chat transcripts, and/or the like). In example embodiments, the multi-service business platform 510 may include a workflow system 562 that may relate to controlling, configuring, and/or executing of workflows in the platform 510. In example embodiments, the workflow system 562 may include a custom workflow actions system 564 that may communicate with various systems, devices, and data sources according to one or more embodiments of the disclosure. The custom workflow actions system 564 may provide users with the ability to create custom workflow actions (e.g., custom code actions).

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

As used herein, the term system may define any combination of one or more computing devices, processors, modules, software, firmware, or circuits that operate either independently or in a distributed manner to perform one or more functions. A system may include one or more subsystems.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described in the disclosure.

The computer readable medium or media may be transportable, such that the program or programs stored thereon may be loaded onto one or more different computers or other processors to implement various ones of the aspects described in the disclosure. In some embodiments, computer readable media may be non-transitory media.

The terms "program" or "software" are used herein in a generic sense to refer to any type of computer code or set of computer-executable instructions that may be employed to program a computer or other processor to implement various aspects as described in the disclosure. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The disclosure should therefore not be considered limited to the particular embodiments described in the disclosure. Various modifications, equivalent processes, as well as numerous structures to which the disclosure may be applicable, will be readily apparent to those skilled in the art to which the disclosure is directed upon review of the disclosure.

Detailed embodiments of the disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the disclosure in virtually any appropriately detailed structure.

The terms "a" or "an," as used herein, are defined as one or more than one. The term "another," as used herein, is defined as at least a second or more. The terms "including" and/or "having", as used herein, are defined as comprising (i.e., open transition).

While only a few embodiments of the disclosure have been shown and described, it will be obvious to those skilled in the art that many changes and modifications may be made thereunto without departing from the spirit and scope of the disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described in the disclosure may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described in the disclosure, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described in the disclosure and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described in the disclosure may include any of the hardware and/or software described in the disclosure. All such permutations and combinations are intended to fall within the scope of the disclosure.

While the disclosure has been disclosed in connection with the preferred embodiments shown and described in detail, various modifications and improvements thereon will become readily apparent to those skilled in the art. Accordingly, the spirit and scope of the disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the disclosure, the scope of the disclosure is reflected by the breadth of the claims below rather than narrowed by the embodiments described in the disclosure.

What is claimed is:

1. A computer-implemented method comprising:
   receiving a user request comprising custom object information for creating a custom object defining an action that is performed by an individual, represented by the customer object, and a business represented by an object;
   interpreting the custom object information to create custom object metadata using business logic;
   converting the custom object metadata into language-independent data, having a language-independent data form, that is inserted into a relational-type database as the custom object;
   providing the custom object, comprising the language-independent data in the language-independent data form, from the relational-type database to a service of a multi-service platform;
   generating, by the service, an insight for the custom object by performing predictive machine learning utilizing a machine learning model, wherein the generating the insight comprises:
      retrieving, by the service, data from instances of the action, defined by the custom object, being performed by individuals with respect to the business; and
      generating, by the machine learning model using the data as input, the insight as to a future instance of the action being performed based upon an association directed from the custom object to the object and an inverse association directed from the object to the custom object, wherein the association specifies a first action performed by the individual in relation to the business and the inverse association specifies a second action performed by the business in relation to the individual; and
   utilizing the insight to perform a computer implemented customer interaction.

2. The computer-implemented method of claim 1, wherein the custom object information includes a custom object name, an object type, and a property of the custom object.

3. The computer-implemented method of claim 1, wherein the custom object information includes a second association of the custom object with a second object.

4. The computer-implemented method of claim 1, wherein the interpreting of the custom object information further comprises executing sensible default to interpret the custom object information.

5. The computer-implemented method of claim 1, further comprising generating the insight as data is received from occurrences of actions related to the custom object being performed.

6. The computer-implemented method of claim 1, wherein the computer implemented customer interaction is a marketing activity executed by a marketing process of the multi-service platform using the custom object.

7. The computer-implemented method of claim 1, further comprising applying and using the service of the multi-service platform to process the language-independent data of the custom object.

8. The computer-implemented method of claim 7, wherein the service includes workflow automation.

9. The computer-implemented method of claim 1, wherein the service includes a customer service process.

10. The computer-implemented method of claim 1, wherein creation of the custom object includes updating definitions, properties, values, instances, and associations for objects within a multi-tenant data store.

11. The computer-implemented method of claim 1, wherein the custom object includes a custom identification label, or a property of the custom object.

12. The computer-implemented method of claim 1, further comprising creating second association for the custom object with a second object based on the custom object information, wherein the association includes an association identification, an association type, a first object identification, a second object identification, and a timestamp, wherein the custom object is directed to the first object identification based on a defined relationship between the custom object and the second object.

13. The computer-implemented method of claim 1, wherein the computer implemented customer interaction is a sales activity executed by a sales process of the multi-service platform using the custom object.

14. A computing system including memory storing instructions and including a processor that executes the instructions to perform operations comprising:
   receiving a user request comprising custom object information for creating a custom object defining an action that is performed by an individual, represented by the customer object, and a business represented by an object;
   interpreting the custom object information to create custom object metadata using business logic;
   converting the custom object metadata into language-independent data, having a language-independent data form, that is inserted into a relational-type database as the custom object;
   providing the custom object, comprising the language-independent data in the language-independent data form, from the relational-type database to a service of a multi-service platform;

generating, by the service, an insight for the custom object by performing predictive machine learning utilizing a machine learning model, wherein the generating the insight comprises:
- retrieving, by the service, data from instances of the action, defined by the custom object, being performed by individuals with respect to the business; and
- generating, by the machine learning model using the data as input, the insight as to a future instance of the action being performed based upon an association directed from the custom object to the object and an inverse association directed from the object to the custom object, wherein the association specifies a first action performed by the individual in relation to the business and the inverse association specifies a second action performed by the business in relation to the individual; and utilizing the insight to perform a computer implemented customer interaction.

15. The computing system of claim 14, further comprising a multi-tenant data store including properties that are changed as part of creating the custom object.

16. The computing system of claim 14, further comprising an ontology including the custom object, other custom objects, and core objects, wherein the ontology further includes associations between the custom object, the other custom objects, and the core objects.

17. The computing system of claim 14, further comprising an instance knowledge structure including an instance of the custom object, other custom object instances, and core object instances, wherein the instance knowledge structure further includes association instances between the instance of the custom object instance, the other custom object instances, and the core object instances.

18. The computing system of claim 14, wherein the computer implemented customer interaction is a customer service activity executed by a customer service process of the multi-service platform using the custom object.

19. The computing system of claim 14, further comprising an object schema service for providing an object definition application programming interface (API) for receiving the custom object information from a user device.

20. The computing system of claim 14, wherein the computer implemented customer interaction is a marketing activity executed by a marketing process of the multi-service platform using the custom object.

21. The computing system of claim 14, further comprising common data format conversion service to assist with synchronization and integration of the custom object within the multi-service platform for use by the process.

22. A non-transitory computer readable storage medium having a plurality of instructions stored thereon which, when executed across one or more processors, causes at least a portion of the one or more processors to perform operations comprising:
- receiving a user request comprising custom object information for creating a custom object defining an action that is performed by an individual, represented by the customer object, and a business represented by an object;
- interpreting the custom object information to create custom object metadata using business logic;
- converting the custom object metadata into language-independent data, having a language-independent data form, that is inserted into a relational-type database as the custom object;
- providing the custom object, comprising the language-independent data in the language-independent data form, from the relational-type database to a service of a multi-service platform;
- generating, by the service, an insight for the custom object by performing predictive machine learning utilizing a machine learning model, wherein the generating the insight comprises:
  - retrieving, by the service, data from instances of the action, defined by the custom object, being performed by individuals with respect to the business; and
  - generating, by the machine learning model using the data as input, the insight as to a future instance of the action being performed based upon an association directed from the custom object to the object and an inverse association directed from the object to the custom object, wherein the association specifies a first action performed by the individual in relation to the business and the inverse association specifies a second action performed by the business in relation to the individual; and
- utilizing the insight to perform a computer implemented customer interaction.

23. The non-transitory computer readable storage medium of claim 22, wherein creation of the custom object includes updating definitions, properties, values, instances, and associations for objects within a multi-tenant data store.

* * * * *